US012699109B2

(12) United States Patent
Silbert

(10) Patent No.: US 12,699,109 B2
(45) Date of Patent: Aug. 4, 2026

(54) AUTOMATED PROCESSING OF SAMPLES CARRIED IN SAMPLE CONTAINERS AND GROUPING SAMPLE CONTAINERS ACCORDING TO ASSAYS TO BE PERFORMED ON SAMPLES CONTAINED THEREIN

(71) Applicant: GEN-PROBE INCORPORATED, San Diego, CA (US)

(72) Inventor: Rolf Silbert, Del Mar, CA (US)

(73) Assignees: GEN-PROBE INCORPORATED, San Diego, CA (US); GRIFOLS, S.A., Barcelona (ES)

( * ) Notice: Subject to any disclaimer, the term of this patent is extended or adjusted under 35 U.S.C. 154(b) by 751 days.

(21) Appl. No.: 17/996,419

(22) PCT Filed: Apr. 22, 2021

(86) PCT No.: PCT/US2021/028722
     § 371 (c)(1),
     (2) Date: Oct. 17, 2022

(87) PCT Pub. No.: WO2021/216932
     PCT Pub. Date: Oct. 28, 2021

(65) Prior Publication Data
     US 2023/0305030 A1      Sep. 28, 2023

Related U.S. Application Data

(60) Provisional application No. 63/143,705, filed on Jan. 29, 2021, provisional application No. 63/015,129, (Continued)

(51) Int. Cl.
     *G01N 35/00*      (2006.01)
     *G01N 35/02*      (2006.01)

(52) U.S. Cl.
     CPC ... *G01N 35/0095* (2013.01); *G01N 35/00732* (2013.01); *G01N 35/026* (2013.01)

(58) Field of Classification Search
     CPC ......... G01N 35/0095; G01N 35/00732; G01N 35/026
     See application file for complete search history.

(56) References Cited

U.S. PATENT DOCUMENTS 4,805,469 A    2/1989   Commarmot
5,623,415 A    4/1997   O'Bryan et al.
           (Continued)

FOREIGN PATENT DOCUMENTS

AU    200218823 A1    4/2002
CN    104040352 A     9/2014
           (Continued)

OTHER PUBLICATIONS

CNIPA Office Action No. 1, Chinese Application No. 202180043373.5, Jul. 10, 2025.
           (Continued)

*Primary Examiner* — John Mcguirk
(74) *Attorney, Agent, or Firm* — Rothwell, Figg, Ernst & Manbeck, P.C.; Charles B. Cappellari

(57)            ABSTRACT

A system for processing a plurality of sample containers, each containing sample with at least one open assay associated therewith, includes two or more analyzers, each configured to perform at least one functional assay in receptacle apparatuses including a process number of two or more receptacle vessels, a conveyance for transporting containers to the analyzers, a buffer queue associated with each analyzer for holding containers to be processed by the associated analyzer, and a scanner associated with each analyzer. Each scanner scans machine-readable identification information associated with each container transported
            (Continued)

100 by the conveyance past the scanner and the open assay(s) for that container are identified based on the scanned information. The sample container is diverted into the associated buffer queue only if at least one open assay for that container matches at least one functional assay of the associated analyzer. The system attempts to accumulate at least the process number of sample containers with the same open assay so that the matching functional assay can be performed on the different samples in each of the process number of receptacle vessels of each receptacle apparatus.

20 Claims, 8 Drawing Sheets

Related U.S. Application Data filed on Apr. 24, 2020, provisional application No. 63/014,624, filed on Apr. 23, 2020.

(56)                    References Cited

U.S. PATENT DOCUMENTS

| | | | |
|---|---|---|---|
| 6,721,615 | B2 | 4/2004 | Fava et al. |
| 6,984,527 | B2 | 1/2006 | Miller |
| 8,322,510 | B2 | 12/2012 | Pedrazzini |
| 9,446,418 | B2 | 9/2016 | Johns et al. |
| 9,511,947 | B2 | 12/2016 | Pollack et al. |
| 9,835,637 | B2 | 12/2017 | Pollack et al. |
| 9,910,054 | B2 | 3/2018 | Johns |
| 9,927,450 | B2 | 3/2018 | Pollack et al. |
| 9,927,451 | B2 | 3/2018 | Pollack et al. |
| 10,031,150 | B2 | 7/2018 | Heise et al. |
| 10,101,351 | B2 | 10/2018 | Pollack et al. |
| 10,302,667 | B2 | 5/2019 | Ferihumer et al. |
| 10,429,401 | B2 | 10/2019 | Streibl et al. |
| 10,557,835 | B2 | 2/2020 | DeWitte et al. |
| 10,705,103 | B2 | 7/2020 | Pollack et al. |
| 11,143,666 | B2 | 10/2021 | Curcie et al. |
| 11,181,541 | B2 | 11/2021 | VanSickler et al. |
| 2008/0226498 | A1 | 9/2008 | Stylli et al. |
| 2012/0109531 | A1 | 5/2012 | Knafel et al. |
| 2014/0342465 | A1 | 11/2014 | Haechler et al. |
| 2015/0079695 | A1 | 3/2015 | Pollack et al. |
| 2015/0166265 | A1 | 6/2015 | Pollack et al. |
| 2016/0349278 | A1 | 12/2016 | Johns et al. |
| 2018/0180635 | A1 | 6/2018 | Lapham et al. |
| 2018/0340949 | A1 | 11/2018 | Maetzler et al. |
| 2019/0265260 | A1 | 8/2019 | Curcie et al. |
| 2019/0277869 | A1 | 9/2019 | Stein et al. |
| 2020/0020441 | A1 | 1/2020 | Vijay |
| 2020/0400697 | A1 | 12/2020 | Sinz et al. |

FOREIGN PATENT DOCUMENTS

| | | | |
|---|---|---|---|
| CN | 108738348 A | | 11/2018 |
| CN | 109476427 A | | 3/2019 |
| JP | H02290557 A | | 11/1990 |
| JP | 2017053829 A | * | 3/2017 |
| JP | 2023-076822 A | | 6/2023 |
| WO | 2017-143182 A2 | | 8/2017 |
| WO | 2018/017771 A1 | | 1/2018 |
| WO | 20210216932 A1 | | 10/2021 |

OTHER PUBLICATIONS

CNIPA Search Report, Chinese Application No. 202180043373.5, Jul. 9, 2025.

JPO Penultimate Official Action, Japanese Patent Application No. 2022-209388, Jan. 6, 2025.

International Search Report and Written Opinion issued in PCT/US2021/028722 dated Aug. 26, 2021 (18 pages).

Office Action issued in JP2022-563937 dated Nov. 13, 2023 (8 pages).

EPO Communication pursuant to Article 94(3) EPC, European Application No. 21725878.9, Aug. 23, 2024.

CIPO Examination Report, Canadian Application No. 3,176,901, Feb. 26, 2024.

IPA Examination Report No. 1, Australian Application No. 2021259489, Dec. 12, 2025.

Penultimate Official Action received for Japanese Patent Application No. 2024-162091, mailed on Mar. 30, 2026, 09 pages including English translation.

Second Office Action received for Chinese Patent Application No. 202180043373.5, mailed on May 9, 2026, 18 pages including English Translation.

\* cited by examiner

AUTOMATED PROCESSING OF SAMPLES CARRIED IN SAMPLE CONTAINERS AND GROUPING SAMPLE CONTAINERS ACCORDING TO ASSAYS TO BE PERFORMED ON SAMPLES CONTAINED THEREIN

CROSS REFERENCE OF RELATED APPLICATION

This application is the National Stage of International Application No. PCT/US2021/028722, filed Apr. 22, 2021, which claims the benefit of U.S. Provisional Application No. 63/014,624, filed Apr. 23, 2020, U.S. Provisional Application No. 63/015,129, filed Apr. 24, 2020, and U.S. Provisional Application No. 63/143,705, filed Jan. 29, 2021, the respective disclosures of which are incorporated herein by reference.

FIELD OF THE DISCLOSURE

This disclosure relates to automated systems and methods for processing samples contained in discrete sample containers and grouping sample containers according to the assay to be performed on the sample contained therein so that multiple samples can be processed by analyzers simultaneously.

BACKGROUND

Various types of analytical tests and assays are performed in laboratories for patient diagnosis and therapy. Such assays may be performed by analysis of a liquid sample taken from a patient's bodily fluids, or abscesses and are typically performed with automated clinical chemistry analyzers onto which fluid containers, such as tubes or vials, containing patient sample specimens have been loaded. The analyzer extracts an amount of liquid sample from the container, combines the extracted sample with various reagents in special reaction vessels (e.g., tubes), exposes the resulting reaction mixture to reaction conditions and detects a measurable output, such as an optical output, from which an assay result may be determined.

In some laboratories, an automated or modular approach may be employed. A lab automation system conveys samples, e.g., via a track, between a sample processing module or modules and an analyzer or analyzers. Different analyzers can be configured to perform certain types of assays. Samples are typically provided to the analyzers by an operator placing the containers, typically carried in a rack holding multiple containers, into an input module, the containers are then automatically transferred from the input module to the track, such as with a robotic mechanism, and the containers are then conveyed by the track to the analyzer(s) configured to perform the assays(s) required for each sample. After sample has been extracted from each container to perform the required assay(s), the sample may be transferred from the track to an output module, e.g., to a rack within the output module configured to hold multiple containers, and the containers can then be removed from the output module by an operator. This automated system allows different types of assays to be performed on multiple samples at different, interconnected analyzers, and/or allows two analyzers configured to perform the same assay to be linked to increase sample throughput capacity.

Traditional lab automation systems lack significant intelligence or autonomy to allow samples to independently move between analyzers or to allow intelligent grouping of sample containers requiring common assays so as to enable more efficient processing of such samples. Another challenge associated with such automated systems relates to the issue of handling STAT samples. A STAT sample is a sample that an operator, or ordering physician, wishes to have moved to the front of the line so that results for that sample can be returned quickly.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Aspects of the disclosure include a system for processing a plurality of distinct samples, wherein each sample is contained within a discrete sample container. The system may include two or more analyzers, and each analyzer may be configured to perform one or more functional assays on sample extracted from a sample container. The one or more functional assays performed by each analyzer may be the same or different than the one or more functional assays performed by each of the other analyzers. Each analyzer may be configured to perform each of the one or more functional assays within a receptacle apparatus that includes a process number of two or more operatively associated process vessels, and each analyzer may be configured to perform the same one of the one or more functional assays on a different sample contained within each process vessel of the receptacle apparatus. That is, each analyzer performs the same assay on the sample contained in each process vessel of a receptacle apparatus. The system may include a sample transfer device associated with each analyzer and configured to transfer a portion of a sample from a sample container to one of the process vessels of a receptacle apparatus, a conveyance configured to transport sample containers between the two or more analyzers, a buffer queue associated with each analyzer and configured to hold multiple sample containers diverted to the buffer queue from the conveyance, a scanner associated with each analyzer and configured to detect machine-readable identification information associated with each sample container transported on the conveyance, and one or more controllers. The one or more controllers may be configured to identify one or more open assays for each sample container based on the identification information detected by the scanner, determine if the sample container is a STAT sample container based on the identification information detected by the scanner, cause a sample container to be diverted from the conveyance into one of the buffer queues if an open assay for that sample container corresponds to a functional assay of the analyzer associated with the buffer queue, monitor a buffered container count for each buffer queue, wherein the buffered container count may include, for each buffer queue, the number of sample containers held in that buffer queue with the same open assay, monitor a buffered container holding time for each buffer queue, wherein the buffered container holding time may include an elapsed time since a first sample container of each buffered container count was diverted into the buffer queue, and with the sample transfer device of the associated analyzer, perform at least one specified task. The specified tasks include a) transfer a portion of sample from each of a process number of sample containers within the associated buffer queue having the same open assay into a different one of the process vessels of a receptacle apparatus receptacle apparatus if the buffered container count in the associated buffer queue for that assay is at least equal to the process number, b) transfer a portion of sample from each of a number of sample containers within the associated buffer queue having the same open assay into a different one of the process vessels of a receptacle apparatus if the buffered container holding time for the associated buffer queue for that open assay reaches a maximum holding time and the buffered container count in the associated buffer queue for that assay is less than the process number, or c) transfer a portion of sample from a STAT sample container diverted into the associated buffer queue into one of the process vessels of a receptacle apparatus.

According to further aspects of the disclosure, if a STAT sample container is diverted into the associated buffer queue, the one or more controllers may be configured to (i) transfer a portion of sample from each of any blocking sample containers that were diverted to the associated buffer queue before the STAT sample container into a different one of the process vessels of one or more receptacle apparatus, (ii) move any blocking sample containers from which sample was transferred in step (i) out of the buffer queue, and (iii) then transfer a portion of sample from the STAT sample container diverted into the associated buffer queue into one of the process vessels of a receptacle apparatus.

According to further aspects of the disclosure, if the open assay of the blocking sample containers is the same as the open assay of the STAT sample container, sample is transferred from each of the blocking sample containers and the STAT sample container to different process vessels of the same receptacle apparatus in steps (i) and (iii) of the previous aspect of the disclosure.

According to further aspects of the disclosure, if the open assay of the blocking sample containers is different from the open assay of the STAT sample container, sample is transferred from the blocking sample containers and the STAT sample container to different receptacle apparatus in steps (i) and (iii) of the previous aspects of the disclosure.

According to further aspects of the disclosure, if a STAT sample container is diverted into the associated buffer queue, the one or more controllers are configured to (i) move any blocking sample containers diverted to the associated buffer queue before the STAT sample container out of the buffer queue, without transferring any sample from the blocking sample containers into the process vessels of a receptacle apparatus, and then (ii) transfer a portion of sample from the STAT sample container diverted into the associated buffer queue into one of the process vessels of a receptacle apparatus.

According to further aspects of the disclosure, each analyzer may be configured to simultaneously perform the same one of the one or more functional assays of that analyzer on a different sample contained within each process vessel of the receptacle apparatus.

According to further aspects of the disclosure, the sample transfer device may include a robotic pipettor.

According to further aspects of the disclosure, the conveyance may include a first track and the system further may include a container holder associated with each sample container for holding the associated sample container, and the first track may be configured to convey the container holders on the first track.

According to further aspects of the disclosure, each buffer queue may include a second track configured to hold and convey the container holders, and the system may further include a diverter configured to selectively divert a container holder and sample container held thereby from the first track to the second track.

According to further aspects of the disclosure, the scanner may include a barcode scanner.

According to further aspects of the disclosure, at least one of the one or more controllers may be programmed to identify the one or more open assays of each sample container by accessing a database in which the identification information of each sample container is correlated with one or more open assays.

According to further aspects of the disclosure, the conveyance may include a recirculation loop configured and controlled to translate each sample container between the two or more analyzers until the first to occur of (1) sample has been extracted from the sample container to perform all open assays for that sample container, or (2) the sample container has traversed the recirculation loop a prescribed number of times or for a prescribed period of time.

According to further aspects of the disclosure, after sample has been extracted from a sample container to perform all open assays for that sample container or the sample container has traversed the recirculation loop the prescribed number of times or for a prescribed period of time, the conveyance may be configured to transfer the sample container to a container storage module.

According to further aspects of the disclosure, the system may further include a pick-and-place robot configured to transfer sample containers between the conveyance and the container storage module.

According to further aspects of the disclosure, the system may further include one or more pre-analytic modules. Each pre-analytic module may be configured to process a sample container before the sample container is made available to the two or more analyzers, and the conveyance may be configured to translate the sample containers to the pre-analytic modules before transporting the sample containers between the two or more analyzers.

According to further aspects of the disclosure, the pre-analytic modules may include one or more of a container de-capper configured to remove a cap from a sample container, a liquid level detection module configured to detect a liquid level within at least a portion of the sample containers, and a sample transfer module configured to transfer sample from a first type of sample container to a second type of sample container that will be made available to the two or more analyzers.

According to further aspects of the disclosure, the system may further include an input module coupled to the conveyance and configured to hold sample containers.

According to further aspects of the disclosure, the system may further include a pick-and-place robot configured to transfer sample containers between the input module and the conveyance.

According to further aspects of the disclosure, the input module may be configured to determine at least one of a height and width of the container, a shape of a bottom of the container, and whether the container is capped.

According to further aspects of the disclosure, the conveyance may include a recirculation segment configured to translate each sample container to the two or more analyzers, a pre-analytic segment, and an input module coupled to the pre-analytic segment and configured to hold sample containers According to further aspects of the disclosure, the recirculation segment may include a continuous recirculation loop configured to translate each sample container between the two or more analyzers until the first to occur of (1) sample has been extracted from the sample container to perform all open assays of that sample container, or (2) the sample container has traversed the recirculation loop a prescribed number of times or for a prescribed period of time.

According to further aspects of the disclosure, the system may further include a pick-and-place robot configured to transfer sample containers between the input module and the pre-analytic segment, and the pre-analytic segment may be configured to translate sample containers from the input module to the recirculation segment.

According to further aspects of the disclosure, the pick-and-place robot may be controlled so that whether a sample container is transferred from the input module to the pre-analytic segment, or the order in which sample containers are transferred from the input module to the pre-analytic segment, is independent of any identification information associated with each sample container and/or any open assay(s) of the sample container.

According to further aspects of the disclosure, the input module contains an area dedicated to STAT sample containers, and the STAT sample containers are transferred from the input module to the pre-analytic segment before any other sample containers are transferred from the input module to the pre-analytic segment.

According to further aspects of the disclosure, the system may further include a pre-analytic scanner configured to detect the machine-readable identification information associated with each sample container transported on the pre-analytic segment, and the controller may be configured to identify one or more open assays of each sample container based on the identification information detected by the pre-analytic scanner and to transfer a sample container from the pre-analytic segment to the recirculation segment if one or more functional assays of the two or more analyzers correspond to at least one of the one or more open assays of the sample container.

According to further aspects of the disclosure, the system may further include a container storage module coupled to the pre-analytic segment and configured to receive sample containers from the pre-analytic segment into the container storage module, and the controller may be configured to transfer a sample container on the conveyance to the container storage module if none of the two or more analyzers has a functional assay matching any of the one or more open assays of the sample container.

According to further aspects of the disclosure, the pre-analytic segment may include a continuous pre-analytic loop, and the controller may be configured to convey a sample container around the pre-analytic loop if none of the two or more analyzers has a functional assay matching any of the one or more open assays of the sample container.

According to further aspects of the disclosure, at least one of the two or more analyzers may include a molecular testing instrument.

According to further aspects of the disclosure, the molecular testing instrument may include a module for performing a nucleic acid-based amplification reaction.

According to further aspects of the disclosure, each process vessel of each receptacle apparatus may include a test tube, and the receptacle apparatus may include a process number of interconnected test tubes configured in an aligned arrangement.

According to further aspects of the disclosure, the system may further include a shuttle module associated with each analyzer, and the shuttle module may be configured to translate a sample container between the associated buffer queue and the associated analyzer.

According to further aspects of the disclosure, the system may further include a pick-and-place robot associated with each analyzer, and the pick-and-place robot may be configured to transfer a sample container from the associated buffer queue to a sample container handoff position on the shuttle module, and the shuttle module may be configured to translate the sample container between the sample container handoff position and a pipetting location within the associated analyzer.

According to further aspects of the disclosure, each of the two or more analyzers may be configured to move a receptacle apparatus into position to receive sample from the sample transfer device associated with the analyzer at the beginning of periodically recurring process cycles. The one or more controllers may be configured to transfer a portion of sample from each of a process number of sample containers within the associated buffer queue having the same open assay into a different one of the process vessels of a receptacle apparatus at the beginning of a first process cycle after a process number of sample containers with the same open assay have been diverted to the associated buffer queue, transfer a portion of sample from each of a number of sample containers within the associated buffer queue having the same open assay into a different one of the process vessels of a receptacle apparatus if the buffered container holding time for the associated buffer queue for that open assay reaches a maximum holding time and the buffered container count in the associated buffer queue for that assay is less than the process number at the beginning of a first process cycle after the buffered container holding time for the associated buffer queue for that assay reaches the maximum holding time, or transfer a portion of sample from a STAT sample container diverted into the associated buffer queue into one of the process vessels of a receptacle apparatus at the beginning of a first process cycle after a STAT sample is diverted.

According to further aspects of the disclosure, each of the two or more analyzers may be configured to move a receptacle apparatus into position to receive sample from the sample transfer device associated with the analyzer at the beginning of periodically recurring process cycles, and the maximum holding time may include at least time remaining in a process cycle that is in progress when the first sample container of each buffered container count is diverted into the buffer queue.

According to further aspects of the disclosure, the maximum holding time may include time remaining in a process cycle that is in progress when the first sample container of each buffered container count is diverted into the buffer queue plus the duration of one additional process cycle.

Aspects of the disclosure include a method for automatically processing a plurality of distinct samples, wherein each sample is contained within a discrete sample container, and the samples are processed in one or more of two or more analyzers. Each analyzer may be configured to perform one or more functional assays, and the two or more analyzers may be configured to perform the same or different functional assays. Each analyzer may be configured to perform each of the one or more functional assays within a receptacle apparatus that includes a process number of two or more operatively associated process vessels, and each analyzer may be configured to perform the same one of the one or more the functional assays on a different sample contained within each process vessel of the receptacle apparatus. That is, each analyzer performs the same assay on the sample contained in each process vessel of a receptacle apparatus. The method may include: a) automatically conveying the sample containers between the two or more analyzers, b) during step a), identifying one or more open assays of each sample container, c) diverting sample containers to a buffer queue associated with one of the two or more analyzers if at least one open assay identified in step b) for the sample containers corresponds to the functional assay configured to be performed by the associated analyzer, d) monitoring a buffered container count for each buffer queue and for each functional assay of the associated analyzer, wherein the buffered container count may include the number of sample containers held in each buffer queue for each functional assay of the associated analyzer, e) monitoring a buffered container holding time for each buffer queue, wherein the buffered container holding time may include an elapsed time since a first sample container of each buffered container count was diverted into the buffer queue, f) for each buffer queue, detecting a first to occur of a first process state, a second process state, and a third process state, wherein the first process state means the buffered container count for a first assay is equal to the process number and the buffered container holding time for that assay has not reached a maximum holding time, the second process state means the buffered container count for the first assay is less than the process number and the buffered container holding time for the first assay has reached the maximum holding time, and the third process state means a diverted sample container in the buffer queue is designated STAT, g) if the first process state is detected for a buffer queue, transferring an amount of sample from each of the process number of sample containers requiring the first assay that are held in the buffer queue into one of the process number of process vessels of a receptacle apparatus, h) if the second process state is detected for the buffer queue, transferring an amount of sample from each of a number of sample containers requiring the first assay that are held in the buffer queue into one of a number of process vessels of a receptacle apparatus, wherein the number of sample containers is less than the process number, and i) if the third process state is detected for the buffer queue, transferring an amount of sample from the STAT sample container held in the buffer queue into a process vessel of a receptacle apparatus.

According to further aspects of the disclosure, the operatively associated process vessels of the receptacle apparatus are physically interconnected.

According to further aspects of the disclosure, if the third process state is detected, step i) may include (1) transferring a portion of sample from each of any blocking sample containers diverted to the buffer queue before the STAT sample container and having the same open assay into a different one of the process vessels of a receptacle apparatus, (2) moving the blocking sample containers from which sample was transferred in step i)(1) out of the buffer queue, (3) moving any blocking sample containers not moved out of the buffer queue in step i)(2) out of the buffer queue, and (4) then transferring a portion of sample from the STAT sample container diverted into the buffer queue into one of the process vessels of a receptacle apparatus.

According to further aspects of the disclosure, if the third process state is detected, step i) may include (1) moving any blocking sample containers diverted to the buffer queue before the STAT sample container out of the buffer queue, without transferring any sample from the blocking sample containers, and, after step i)(1), (2) transferring a portion of sample from the STAT sample container diverted into the buffer queue into one of the process vessels of the receptacle apparatus.

According to further aspects of the disclosure, each analyzer may be configured to simultaneously perform the same one of the one or more functional assays of that analyzer on a different sample contained within each process vessel of the receptacle apparatus.

According to further aspects of the disclosure, transferring an amount of sample may include transferring sample from a sample container to a process vessel with a robotic pipettor.

According to further aspects of the disclosure, step a) may include securing each sample container in a container holder and conveying the container holders on a first track.

According to further aspects of the disclosure, each buffer queue may include a second track configured to hold and translate the container holders, and diverting each one of the sample containers to the buffer queue may include engaging at least one of the sample container and the container holder with a diverter configured to selectively divert a container holder and sample container held thereby from the first track to the second track.

According to further aspects of the disclosure, step a) may include conveying each sample container on a first track.

According to further aspects of the disclosure, each buffer queue may include a second track configured to hold and translate the sample containers, and diverting each one of the sample containers to the buffer queue may include engaging the sample container with a diverter configured to selectively divert a sample container from the first track to the second track.

According to further aspects of the disclosure, step b) may include detecting machine-readable identification information associated with each sample container conveyed between the two or more analyzers and accessing a database in which the identification information of each sample container is correlated with one or more open assays.

According to further aspects of the disclosure, step a) may include conveying each sample container between the two or more analyzers until the first to occur of (1) sample has been extracted from the sample container to perform all open assays of that sample container, or (2) the sample container has traversed a conveyance loop connecting the two or more analyzers a prescribed number of times or for a prescribed period of time.

According to further aspects of the disclosure, the method may further include processing a sample container with one or more pre-analytic modules before making the sample container available to the two or more analyzers, and step a) may further include conveying the sample containers to the pre-analytic modules before conveying the sample containers between the two or more analyzers.

According to further aspects of the disclosure, the pre-analytic modules may include one or more of a container de-capper configured to remove a cap from a sample container, a liquid level detection module configured to detect a liquid level within at least a portion of the sample containers, a sample transfer module configured to transfer sample from a first type of sample container to a second type of sample container that will be made available to the two or more analyzers, and a sample purification module configured to isolate and purify a target material within the sample.

According to further aspects of the disclosure, the method may further include prior to step a), receiving sample containers at an input module, and transferring received sample containers from the input module to a pre-analytic segment.

According to further aspects of the disclosure, transferring received sample containers from the input module to the pre-analytic segment may include moving each received sample container from the input module the pre-analytic segment with a pick-and-place robot.

According to further aspects of the disclosure, step b) may include detecting machine-readable identification information associated with each sample container transported on the pre-analytic segment and identifying the one or more open assays of each sample container based on the identification information detected on the pre-analytic segment.

According to further aspects of the disclosure, the method may further include transferring a sample container from the pre-analytic segment to a recirculation segment if at least one functional assay of the two or more analyzers corresponds to at least one of the one or more open assays of the sample container.

According to further aspects of the disclosure, the recirculation segment may include a continuous recirculation loop, and step a) may include conveying each sample container between the two or more analyzers on the recirculation loop until the first to occur of (1) sample has been extracted from the sample container to perform all open assays of that sample container, or (2) the sample container has traversed the recirculation loop a prescribed number of times or for a prescribed period of time.

According to further aspects of the disclosure, the method may further include transferring a sample container to a container storage module that is coupled to the pre-analytic segment or to an output module coupled to the pre-analytic segment if, at the time the one or more open assays of the sample container are identified, none of the two or more analyzers has a functional assay that corresponds to any of the one or more open assays of the sample container.

According to further aspects of the disclosure, whether a sample container is transferred from the input module to the pre-analytic segment, or the order in which sample containers are transferred from the input module to the pre-analytic segment, is independent of any identification information associated with each sample container and/or any open assay(s) of the sample container.

According to further aspects of the disclosure, the input module contains an area dedicated to STAT sample containers, and the STAT sample containers are transferred from the input module to the pre-analytic segment before any other sample containers are transferred from the input module to the pre-analytic segment.

According to further aspects of the disclosure, the pre-analytic segment may include a continuous pre-analytic loop, and the method may further include, if, at the time the one or more open assays of the sample container are identified, none of the two or more analyzers has a functional assay that corresponds to any of the one or more open assays of the sample container, transferring the sample container from the pre-analytic segment to a recirculation segment including a continuous recirculation loop and conveying the sample container on the recirculation loop until an analyzer having a functional assay that corresponds to one of the one or more open assays of the sample container becomes available or conveying the sample container on the pre-analytic loop until an analyzer having a functional assay that corresponds to one of the one or more open assays of the sample container becomes available.

According to further aspects of the disclosure, each of the two or more analyzers may be configured to move a receptacle apparatus into position to receive sample transferred from a sample container at the beginning of periodically recurring process cycles, and the maximum holding time may include at least time remaining in a process cycle that is in progress when the first sample container of each buffered container count is diverted into the buffer queue.

According to further aspects of the disclosure, the maximum holding time may include time remaining in a process cycle that is in progress when the first sample container of each buffered container count is diverted into the buffer queue plus the duration of one additional process cycle.

According to further aspects of the disclosure, step g) is commenced at the beginning of the first process cycle after a process number of sample containers requiring the same assay have been diverted to the associated buffer queue, step h) is commenced at the beginning of the first process cycle after the buffered container holding time for the associated buffer queue for that assay reaches the maximum holding time, or step i) is commenced at the beginning of the first process cycle after a STAT sample container is diverted to the buffer queue.

According to further aspects of the disclosure, steps b) and c) are performed at a first one of the two or more analyzers, and the method may further include conveying the sample container to a second one of the two or more analyzers if no open assay identified in step b) corresponds to a functional assay of the first analyzer and thereafter performing steps b) and c) at the second analyzer or (2) the first analyzer lacks sufficient materials to perform a functional assay matching an open assay of the sample container.

Aspects of the disclosure include a system for processing a plurality of distinct samples, wherein each sample is contained within a discrete sample container. The system may include two or more analyzers, and each analyzer may be configured to perform one or more functional assays on sample extracted from a sample container. The one or more functional assays performed by each analyzer may be the same or different than the one or more functional assays performed by each of the other analyzers. Each analyzer may be configured to perform each of the one or more functional assays within a receptacle apparatus that includes a process number of two or more operatively associated process vessels, and each analyzer may be configured to perform the same one of the one or more functional assays on a different sample contained within each process vessel of the receptacle apparatus. That is, each analyzer performs the same assay on the sample contained in each process vessel of a receptacle apparatus. The system may include a sample transfer device associated with each analyzer and configured to transfer a portion of a sample from a sample container to one of the process vessels of a receptacle apparatus, and a conveyance configured to transport sample containers between the two or more analyzers. The system may include a buffer queue associated with each analyzer and configured to hold multiple sample containers received from the conveyance and a scanner associated with each analyzer and configured to detect machine-readable identification information associated with each sample container transported on the conveyance. The system may include one or more controllers programmed to 1) identify one or more open assays to be performed on the sample contained in each sample container based on the identification information detected by the scanner, 2) cause a sample container to be diverted from the conveyance into one of the buffer queues if the sample container meets one or more sample selection criteria, wherein the sample selection criteria include whether an assay to be performed on the sample within that sample container corresponds to a functional assay of the analyzer associated with the buffer queue, 3) monitor a buffered container count for each buffer queue, wherein the buffered container count includes, for each buffer queue, the number of sample containers held in that buffer queue with the same open assay, wherein the buffered container count is not greater than the process number, and 4) cause the sample transfer device of the associated analyzer to transfer a portion of sample from each of a process number of sample containers within the associated buffer queue requiring the same open assay into a different one of the process vessels of a receptacle apparatus if the buffered container count in the associated buffer queue for that open assay is equal to the process number.

According to further aspects of the disclosure, the operatively associated process vessels of the receptacle apparatus are physically interconnected.

According to further aspects of the disclosure, the sample selection criteria further includes whether an open assay of the sample container matches an open assay of a sample container currently held in that buffer queue.

According to further aspects of the disclosure, the one or more controllers may be further configured to determine if the sample container is a STAT sample container based on the sample container's identification information detected by the scanner, the sample selection criteria further includes whether the sample container is a STAT sample container, and the one or more controllers may be configured to cause a sample container to be diverted from the conveyance into one of the buffer queues if the sample container is a STAT sample container, even if the open assay of the sample container does not match an open assay of a sample container currently held in that buffer queue.

According to further aspects of the disclosure, the one or more controllers are configured to cause the sample transfer device of the associated analyzer to transfer a portion of sample from one or more sample containers within the associated buffer queue requiring the same open assay, including the STAT sample container, even if the one or more sample containers are less than the process number.

According to further aspects of the disclosure, the one or more controllers may be further configured to monitor a buffered container holding time for each buffer queue, wherein the buffered container holding time may include an elapsed time since a first sample container of each buffered container count was diverted into the buffer queue and with the sample transfer device of the associated analyzer, transfer a portion of sample from each of a number of sample containers within the associated buffer queue with the same open assay into a different one of the process vessels of a receptacle apparatus, wherein the number of sample containers is less than the process number, if the buffered container holding time for the associated buffer queue for that assay reaches a maximum holding time and the buffered container count in the associated buffer queue for that assay is less than the process number.

According to further aspects of the disclosure, each of the two or more analyzers may be configured to move a process vessel into position to receive sample from the sample transfer device associated with the analyzer at the beginning of periodically recurring process cycles, and the one or more controllers may be configured to cause the sample transfer device of the associated analyzer to transfer a portion of sample from each of a process number of sample containers within the associated buffer queue requiring the same open assay into a different one of the process vessels of a receptacle apparatus if the buffered container count in the associated buffer queue for that open assay is equal to the process number at the beginning of the first process cycle after a process number of sample containers with the same open assay have been diverted to the associated buffer queue.

According to further aspects of the disclosure, if a STAT sample container is detected, the one or more controllers may be configured to perform the following tasks: (i) transfer a portion of sample from each of any blocking sample containers diverted to the associated buffer queue before the STAT sample container and with the same open assay into a different one of the process vessels of one or more receptacle apparatus, (ii) move any blocking sample containers from which sample was transferred in task (i) out of the buffer queue, and then (iii) transfer a portion of sample from the STAT sample container diverted into the associated buffer queue into one of the process vessels of a receptacle apparatus.

According to further aspects of the disclosure, if the open assay of the blocking sample containers is the same as the open assay of the STAT sample container, sample is transferred from the blocking sample container and the STAT sample container to the same receptacle apparatus in tasks (i) and (iii).

According to further aspects of the disclosure, if the open assay of the blocking sample containers is different than the open assay the STAT sample container, sample is transferred from the blocking sample containers and the STAT sample container to different receptacle apparatus in tasks (i) and (iii).

According to further aspects of the disclosure, if a STAT sample container is detected, the one or more controllers may be configured to (i) move any blocking sample containers diverted to the associated buffer queue before the STAT sample container out of the buffer queue, without transferring any sample from the blocking sample containers, and then (ii) transfer a portion of sample from the STAT sample container diverted into the associated buffer queue into one of the process vessels of a receptacle apparatus.

According to further aspects of the disclosure, each analyzer may be configured to simultaneously perform the same one of the one or more functional assays of that analyzer on a different sample contained within each process vessel of the receptacle apparatus.

According to further aspects of the disclosure, the sample transfer device may include a robotic pipettor.

According to further aspects of the disclosure, the conveyance may include a first track and the system may further include a container holder associated with each sample container for holding the associated sample container, wherein the first track may be configured to convey the container holders on the first track.

According to further aspects of the disclosure, each buffer queue may include a second track configured to hold and convey the container holders, and the system may further include a diverter configured to selectively divert a container holder and sample container held thereby from the first track to the second track.

According to further aspects of the disclosure, the scanner may include a barcode scanner.

According to further aspects of the disclosure, at least one of the one or more controllers may be programmed to identify the one or more open assays of each sample container by accessing a database in which the identification information of each sample container is correlated with one or more open assays.

According to further aspects of the disclosure, the conveyance may include a recirculation loop configured and controlled to translate each sample container between the two or more analyzers until the first to occur of (1) sample has been extracted from the sample container to perform all open assays of that sample container, or (2) the sample container has traversed the recirculation loop a prescribed number of times or for a prescribed period of time.

According to further aspects of the disclosure, after sample has been extracted from a sample container to perform all open assays of that sample container or the sample container has traversed the recirculation loop the prescribed number of times or for a prescribed period of time, the conveyance may be configured to transfer the sample container from the recirculation loop to a container storage module.

According to further aspects of the disclosure, the system may further include a pick-and-place robot configured to transfer sample containers between the conveyance and the container storage module.

According to further aspects of the disclosure, the system may further include one or more pre-analytic modules, wherein each pre-analytic module may be configured to process a sample container before making the sample container available to the two or more analyzers, and wherein the conveyance may be configured to translate the sample containers to the pre-analytic modules before transporting the sample containers between the two or more analyzers.

According to further aspects of the disclosure, the system may further include the pre-analytic modules include one or more of a container de-capper configured to remove a cap from a sample container, a liquid level detection module configured to detect a liquid level within at least a portion of the sample containers, and a sample transfer module configured to transfer sample from a first type of sample container to a second type of sample container that will be made available to the two or more analyzers.

According to further aspects of the disclosure, the system may further include an input module coupled to the conveyance and configured to receive sample containers.

According to further aspects of the disclosure, the system may further include a pick-and-place robot configured to transfer sample containers between the input module and the conveyance.

According to further aspects of the disclosure, the input module may be configured to determine at least one of a height and width of the container, a shape of a bottom of the container, and whether the container is capped.

According to further aspects of the disclosure, the conveyance may include a recirculation segment configured to translate each sample container to the two or more analyzers, a pre-analytic segment, and an input module coupled to the pre-analytic segment and configured to hold sample containers, wherein the pre-analytic segment may be configured to translate sample containers from the input module to the recirculation segment.

According to further aspects of the disclosure, the recirculation segment may include a continuous recirculation loop configured to translate each sample container between the two or more analyzers until the first to occur of (1) sample has been extracted from the sample container to perform all open assays of that sample container, or (2) the sample container has traversed the recirculation loop a prescribed number of times or for a prescribed period of time.

According to further aspects of the disclosure, the system may further include a pick-and-place robot configured to transfer sample containers between the input module and the pre-analytic segment.

According to further aspects of the disclosure, the pick-and-place robot is controlled so that whether a sample container is transferred from the input module to the pre-analytic segment, or the order in which sample containers are transferred from the input module to the pre-analytic segment, is independent of any identification information associated with each sample container and/or any open assay(s) of the sample container.

According to further aspects of the disclosure, the input module contains an area dedicated to STAT sample containers, and the STAT sample containers are transferred from the input module to the pre-analytic segment before any other sample containers are transferred from the input module to the pre-analytic segment.

According to further aspects of the disclosure, the system may further include a pre-analytic scanner configured to detect the machine-readable identification information associated with each sample container transported on the pre-analytic segment, and the controller may be configured to identify one or more open assays of each sample container based on the identification information detected by the pre-analytic scanner and to transfer a sample container from the pre-analytic segment to the recirculation segment if at least one of the two or more analyzers has a functional assay matching at least one of the one or more open assays of the sample container.

According to further aspects of the disclosure, the system may further include a container storage module coupled to the pre-analytic segment and configured to receive sample containers from the pre-analytic segment into the container storage module, and the controller may be configured to transfer a sample container on the pre-analytic segment to the container storage module if none of the two or more analyzers has a functional assay matching any of the one or more open assays of the sample container.

According to further aspects of the disclosure, the pre-analytic segment may include a continuous pre-analytic loop, and the controller may be configured to convey a sample container round the pre-analytic loop if none of the two or more analyzers has a functional assay matching any of the one or more open assays of the sample container.

According to further aspects of the disclosure, at least one of the two or more analyzers may include a molecular testing instrument.

According to further aspects of the disclosure, the molecular testing instrument may include a module for performing a nucleic acid-based amplification reaction.

According to further aspects of the disclosure, each process vessel of each receptacle apparatus includes a test tube, and the receptacle apparatus may include a process number of interconnected test tubes configured in an aligned arrangement.

According to further aspects of the disclosure, the system may further include a shuttle module associated with each analyzer, and the shuttle module may be configured to translate a sample container between the associated buffer queue and the associated analyzer.

According to further aspects of the disclosure, the system may further include a pick-and-place robot associated with each analyzer, and the pick-and-place robot may be configured to transfer a sample container from the associated buffer queue to a sample container handoff position on the shuttle module, and the shuttle module may be configured to translate the sample container between the sample container handoff position and a pipetting location within the associated analyzer.

According to further aspects of the disclosure, each of the two or more analyzers may be configured to move a receptacle apparatus into position to receive sample from the sample transfer device associated with the analyzer at the beginning of periodically recurring process cycles, and the maximum holding time may include at least the time remaining in a process cycle that is in progress when the first sample container of each buffered container count is diverted into the buffer queue.

According to further aspects of the disclosure, the maximum holding time may include time remaining in a process cycle that is in progress when the first sample container of each buffered container count is diverted into the buffer queue plus the duration of one additional process cycle.

Aspects of the disclosure include a non-transitory, computer-readable storage medium encoded with computer-executable instructions which, when executed by a computer, cause the computer to control a system for processing a plurality of distinct samples, wherein each sample is contained within a discrete sample container. The system may include two or more analyzers, and each analyzer may be configured to perform one or more functional assays on sample extracted from a sample container, and the one or more functional assays of each analyzer may be the same or different than the one or more functional assays of each of the other analyzers. Each analyzer may be configured to perform each of the one or more functional assays within a receptacle apparatus including a process number of two or more operatively associated process vessels, and each analyzer may be configured to perform the same one of the one or more functional assays on a different sample contained within each process vessel of the receptacle apparatus. That is, each analyzer performs the same assay on the sample contained in each process vessel of a receptacle apparatus. The system may include sample transfer device associated with each analyzer and configured to transfer a portion of a sample from a sample container to one of the process vessels of a receptacle apparatus, a conveyance configured to transport sample containers to the two or more analyzers, a buffer queue associated with each analyzer and configured to hold multiple sample containers received from the conveyance, a diverter associated with each analyzer and configured to divert a sample container from the conveyance to the associated buffer queue, and a scanner associated with each analyzer and configured to detect machine-readable identification information associated with each sample container transported on the conveyance. The computer-executable instructions may include instructions to receive identification information for each sample container from each of the scanners, interrogate a database of sample information to identify one or more open assays for each sample container based on the identification information received from the scanner, determine if at least one open assay of the sample container corresponds to a functional assay of the analyzer associated with the scanner, if at least one open assay of the sample container corresponds to a functional assay of the associated analyzer, activate the diverter to divert the sample container from the conveyance and into a buffer queue associated with the analyzer, monitor a buffered container count for each buffer queue, wherein the buffered container count may include, for each buffer queue, the number of sample containers held in that buffer queue with the same open assay, and cause the sample transfer device associated with the analyzer to transfer a portion of sample from each of a process number of sample containers within the associated buffer queue with the same open assay into a different one of the process vessels of a receptacle apparatus if the buffered container count in the associated buffer queue for that open assay is at least equal to the process number.

According to further aspects of the disclosure, the computer-executable instructions may further include instructions to, after activating the diverter to divert a container from the conveyance and into a buffer queue associated with the analyzer, determine whether an open assay of a subsequent sample container matches the open assay of the sample container currently held in that buffer queue, and to activate the diverter to divert the subsequent sample container from the conveyance into the buffer queue only if the open assay of the subsequent sample container matches the open assay of the sample container currently held in that buffer queue.

According to further aspects of the disclosure, the computer-executable instructions may further include instructions to not activate the diverter if no open assay of the subsequent sample container matches an open assay of the sample container currently held in that buffer queue so that the conveyance transports the subsequent sample container to a subsequent one of the two or more analyzers.

According to further aspects of the disclosure, the computer-executable instructions may further include instructions to, after activating the diverter to divert at least one sample container from the conveyance and into a buffer queue associated with the analyzer: determine whether an open assay of a subsequent sample container matches an open assay of a sample container currently held in that buffer queue, interrogate the database of sample information to determine if the subsequent sample container is a STAT sample container based on the identification information received from the scanner, and activate the diverter to divert the subsequent sample container from the conveyance into the buffer queue only if the open assay of the subsequent sample container matches the open assay of the sample container currently held in that buffer queue or the subsequent sample container is a STAT sample container having an open assay corresponding to a functional assay of the associated analyzer.

According to further aspects of the disclosure, the computer-executable instructions may further include instructions to cause the sample transfer device of the associated analyzer to transfer a portion of sample from one or more sample containers within the associated buffer queue having the same open assay, including the STAT sample container, even if the one or more sample containers are less than the process number.

According to further aspects of the disclosure, the computer-executable instructions may further include instructions to monitor a buffered container holding time for each buffer queue, wherein the buffered container holding time may include an elapsed time since a first sample container of each buffered container count was diverted into the buffer queue, and cause the sample transfer device associated with the analyzer to transfer a portion of sample from each of a number of sample containers within the associated buffer queue having the same open assay into a different one of the process vessels of a receptacle apparatus, and the number of sample containers is less than the process number, if the buffered container holding time for the associated buffer queue reaches a specified maximum holding time.

According to further aspects of the disclosure, each of the two or more analyzers may be configured to move a receptacle apparatus into position to receive sample transferred from a sample container at the beginning of periodically recurring process cycles, and the computer-executable instructions may further include instructions to cause the sample transfer device associated with the analyzer to transfer a portion of sample from each of a process number of sample containers within the associated buffer queue having the same open assay into a different one of the process vessels of a receptacle apparatus at the beginning of the first process cycle commencing after a process number of sample containers having the same open assay have been diverted to the associated buffer queue.

According to further aspects of the disclosure, if a STAT sample container is detected, the computer-executable instructions may further include instructions to (i) cause the sample transfer device associated with the analyzer to transfer a portion of sample from each of any blocking sample containers diverted to the associated buffer queue before the STAT sample container and having the same open assay into a different one of the process vessels of a receptacle apparatus, (ii) cause any blocking sample containers from which sample was transferred in step (i) to be moved out of the buffer queue, and (iii) after (ii), cause the sample transfer device associated with the analyzer to transfer a portion of sample from the STAT sample container diverted into the associated buffer queue into one of the process vessels of a receptacle apparatus.

According to further aspects of the disclosure, if the open assay of the blocking sample containers is the same as the open assay of the STAT sample container, the computer-executable instructions may further include instructions to cause the sample transfer device associated with the analyzer to transfer sample from the blocking sample containers and the STAT sample container to different process vessels of the same receptacle apparatus in steps (i) and (iii).

According to further aspects of the disclosure, if the open assay of the blocking sample containers is different than the open assay of the STAT sample container, the computer-executable instructions may further include instructions to cause the sample transfer device associated with the analyzer to transfer sample from the blocking sample containers and the STAT sample container to different receptacle apparatus in steps (i) and (iii).

According to further aspects of the disclosure, if a STAT sample container is detected, and more than a process number of blocking sample containers have been diverted to the associated buffer queue before the STAT sample container, and a process number of the blocking sample containers have the same open assay, the computer-executable instructions may further include instructions to: (i) cause the sample transfer device associated with the analyzer to transfer a portion of sample from each of the process number of blocking sample containers having the same open assay into a different one of the process vessels of a first receptacle apparatus, (ii) cause the blocking sample containers from which sample was transferred in step (i) to be moved out of the buffer queue, (iii) cause any remaining blocking sample containers to be moved out of the buffer queue, and (iv) then cause the sample transfer device associated with the analyzer to transfer a portion of sample from the STAT sample container diverted into the associated buffer queue into one of the process vessels of a second receptacle apparatus.

According to further aspects of the disclosure, if a STAT sample container is detected, the computer-executable instructions may further include instructions to: (i) cause any blocking sample containers diverted to the associated buffer queue before the STAT sample container to be moved out of the buffer queue, without transferring any sample from the blocking sample containers, and (ii) then cause the sample transfer device associated with the analyzer to transfer a portion of sample from the STAT sample container diverted into the associated buffer queue into one of the process vessels of a receptacle apparatus.

According to further aspects of the disclosure, each analyzer may be configured to simultaneously perform the same one of the one or more functional assays of that analyzer on a different sample contained within each of a plurality of the process vessels of the receptacle apparatus.

According to further aspects of the disclosure, the sample transfer device may include a robotic pipettor.

According to further aspects of the disclosure, the conveyance may include a first track and the system may further include a container holder associated with each sample container for holding the associated sample container, and the first track may be configured to convey the container holders on the first track.

According to further aspects of the disclosure, each buffer queue may include a second track configured to hold and convey the container holders, and the computer-executable instructions may further include instructions to activate the diverter to divert the sample container from the first track to the second track.

According to further aspects of the disclosure, the scanner may include a barcode scanner.

According to further aspects of the disclosure, the computer-executable instructions may further include instructions to identify the one or more open assays of each sample container by accessing the database of sample information in which the identification information of each sample container is correlated with one or more open assays.

According to further aspects of the disclosure, the conveyance may include a recirculation loop, and the computer-executable instructions may further include instructions to translate each sample container on the recirculation loop to the two or more analyzers until the first to occur of (1) sample has been extracted from the sample container to perform all open assays of that sample container, or (2) the sample container has traversed the recirculation loop a prescribed number of times.

According to further aspects of the disclosure, after sample has been extracted from a sample container to perform all open assays of that sample container, the computer-executable instructions may further include instructions to cause the conveyance to convey the sample container to a container storage module.

According to further aspects of the disclosure, the computer-executable instructions may further include instructions controlling a pick-and-place robot configured to transfer sample containers between the conveyance and the container storage module.

According to further aspects of the disclosure, the system may further include one or more pre-analytic modules, each pre-analytic module may be configured to perform an operation on a sample container before making the sample container available to the two or more analyzers, and the computer-executable instructions may further include instructions to cause the conveyance to translate the sample containers to the pre-analytic modules before conveying the sample containers to the two or more analyzers.

According to further aspects of the disclosure, the pre-analytic modules may include one or more of a container de-capper configured to remove a cap from a sample container, a liquid level detection module configured to detect a liquid level within at least a portion of the sample containers, and a sample transfer module configured to transfer sample from a first type of sample container to a second type of sample container that will be made available to the two or more analyzers, wherein the first type of sample container has one or more different dimensions than the second type of sample container.

According to further aspects of the disclosure, the system may further include an input module coupled to the conveyance and configured to receive sample containers, and the computer-executable instructions may further include instructions controlling a pick-and-place robot configured to transfer sample containers between the conveyance and the input module.

According to further aspects of the disclosure, the computer-executable instructions controlling the pick-and-place robot control the pick-and-place robot so that whether a sample container is transferred from the input module to the conveyance, or the order in which sample containers are transferred from the input module to the conveyance, is independent of any identification information associated with each sample container and/or any open assay(s) of the sample container.

According to further aspects of the disclosure, the computer-executable instructions controlling the pick-and-place robot control the pick-and-place robot so that STAT sample containers are transferred from a dedicated area of the input module to the conveyance before any other sample containers are transferred from the input module to the conveyance.

According to further aspects of the disclosure, the conveyance may include: a recirculation segment, wherein the computer-executable instructions may further include instructions to cause the recirculation segment to translate each sample container to the two or more analyzers, a pre-analytic segment, and an input module coupled to the pre-analytic segment and configured to hold sample containers, wherein the computer-executable instructions may further include instructions to cause the input module to transfer sample containers to the pre-analytic segment and to cause the pre-analytic segment to translate sample containers from the input module to the recirculation segment.

According to further aspects of the disclosure, the recirculation segment may include a continuous recirculation loop, wherein the computer-executable instructions may further include instructions to cause the recirculation loop to translate each sample container between the two or more analyzers until the first to occur of (1) sample has been extracted from the sample container to perform all open assays of that sample container, or (2) the sample container has traversed the recirculation loop a prescribed number of times or for a prescribed period of time.

According to further aspects of the disclosure, the system may further include a pre-analytic scanner configured to detect the machine-readable identification information associated with each sample container transported on the pre-analytic segment, and the computer-executable instructions may further include instructions to: receive identification information for each sample container from the pre-analytic scanner, interrogate the database of sample information to identify one or more assays to be performed on the sample contained in each sample container based on the sample container's identification information detected by the pre-analytic scanner, and cause a sample container to be transferred from the pre-analytic segment to the recirculation segment if at least one of the two or more analyzers has a functional assay matching at least one open assay of the sample container.

According to further aspects of the disclosure, the system may further include a container storage module coupled to the conveyance and configured to receive sample containers from the conveyance into the container storage module, and wherein the computer-executable instructions may further include instructions to transfer a sample container on the conveyance to the container storage module if none of the two or more analyzers has a functional assay corresponding to any of the one or more open assays of the sample container.

According to further aspects of the disclosure, the computer-executable instructions may further include instructions controlling a pick-and-place robot configured to transfer sample containers between the conveyance and the container storage module.

According to further aspects of the disclosure, at least one of the two or more analyzers may include a molecular testing instrument.

According to further aspects of the disclosure, the molecular testing instrument may include an instrument for performing a nucleic acid-based amplification reaction.

According to further aspects of the disclosure, each process vessel of each receptacle apparatus may include a test tube, and wherein the receptacle apparatus may include a process number of interconnected test tubes configured in an aligned arrangement.

According to further aspects of the disclosure, the system may further include a pick-and-place robot associated with each analyzer and a shuttle module associated with each analyzer, and the computer-executable instructions may further include instructions to cause the pick-and-place robot to transfer a sample container from the associated buffer queue to a sample container handoff position on the shuttle module and to cause the shuttle module to translate a sample container between the sample container handoff position and sample transfer location of the associated analyzer.

According to further aspects of the disclosure, each of the two or more analyzers may be configured to move a receptacle apparatus into position to receive sample transferred from a sample container at the beginning of periodically recurring process cycles, and the maximum holding time may include at least the time remaining in a process cycle that is in progress when the first sample container of each buffered container count is diverted into the buffer queue.

According to further aspects of the disclosure, the maximum holding time may include the time remaining in a process cycle that is in progress when the first sample container of each buffered container count is diverted into the buffer queue and the duration of one additional process cycle.

Further aspects of the disclosure include system for processing a plurality of samples contained within sample containers, and wherein each sample container has machine-readable identification information (which may be a barcode) associated therewith. The system may include a sample database, a conveyance (such as a conveyor belt or track and which may include a sample container carrier), an input module, a container transfer robot (which may include an input pick-and-place robot configured to transfer sample containers between the input module and the conveyance), an input scanner (which may be a barcode scanner), at least one analyzer, and at least one system controller in communication with the container transfer robot, the input scanner. The sample database stores identification information for each of the sample containers and the identification information of each sample container is correlated with one or more open assays associated with the sample container. The conveyance may be configured to transport sample containers throughout the system. The input module may be configured to hold a plurality of sample containers, and the container transfer robot may be configured to transfer sample containers from the input module to the conveyance. The input scanner may be configured to detect the machine-readable identification information associated with each sample container. Each analyzer is operatively associated with the conveyance and may be configured to perform one or more functional assays (which may be the same or different as the functional assay(s) of each other analyzer) on sample extracted from a sample container. The system controller is programmed to control the container transfer robot to transfer sample containers from the input module to the conveyance, wherein each sample container is removed from the input module before scanning the machine-readable identification information associated with the sample container and before identifying the one or more open assays associated with the sample container. As or after each sample container is removed from the input module, the controller activates the input scanner to automatically scan the machine-readable identification information of the sample container as the sample container passes the input scanner (e.g., on the conveyance), and the controller then accesses the sample database and identifies one or more open assays for each sample container transported on the conveyance based on the identification information detected by the input scanner.

According to further aspects of the disclosure, the conveyance may include a first loop segment, wherein the input module is operatively associated with the first loop segment and wherein the container transfer robot may be configured to transfer sample containers from the input module to the first loop segment, and a second loop segment configured to translate each sample container to the at least one analyzer. The system controller may be in communication with all analyzers and may be further programmed to monitor the functional assays of all analyzers and/or the number of sample containers being transported on the second loop segment and compare the one or more open assays of each sample container with the functional assays of all analyzers and/or compare the number of sample containers being transported on the second loop segment with a second loop segment capacity limit. The controller may be programmed to retain a sample container on the first loop segment if none of the functional assays matches any of the open assays for that sample container and/or if the number of sample containers being transported on the second loop segment is at least equal to the second loop segment capacity limit and to transport the sample container around the first loop segment until at least one of the functional assays matches at least one of the open assays for that sample container and/or the number of sample containers being transported on the second loop segment is less than the second loop segment capacity limit. The controller may be further programmed to transfer the sample container from the first loop segment to the second loop segment if at least one of the functional assays matches at least one of the open assays for that sample container and/or if the number of sample containers being transported on the second loop segment is less than the second loop segment capacity limit.

According to further aspects of the disclosure, the system controller may be programmed to retain a sample container on the first loop segment if none of the functional assays matches any of the open assays for that sample container and if the number of sample containers being transported on the second loop segment is at least equal to the second loop segment capacity limit and to transport the sample container around the first loop segment until at least one of the functional assays matches at least one of the open assays for that sample container and the number of sample containers being transported on the second loop segment is less than the second loop segment capacity limit.

According to further aspects of the disclosure, a portion of the input module is designated for STAT sample containers, and the system controller is programmed to control the container transfer robot to transfer all sample containers from the portion of the input module that is designated for STAT sample containers to the conveyance before transferring sample containers from any other portion of the input module.

According to further aspects of the disclosure, the conveyance comprises a recirculation loop configured and controlled (e.g., by the system controller) to repeatedly translate each sample container to the at least one analyzer until the first to occur of (1) sample has been extracted from the sample container to perform all open assays for that sample container, or (2) the sample container has traversed the recirculation loop a prescribed number of times or for a prescribed period of time.

According to further aspects of the disclosure, the system may further include a container storage module and may also include a container transfer robot (which may include a storage pick-and-place robot) configured to transfer sample containers between the conveyance and the container storage module. After sample has been extracted from a sample container to perform all open assays for that sample container or after the sample container has traversed the recirculation loop the prescribed number of times or for a prescribed period of time, the conveyance may be configured controlled (e.g., by the system controller) to transfer the sample container to the container storage module.

In some examples, the input pick-and-place robot and the storage pick-and-place robot comprise the same pick-and-place robot.

According to further aspects of the disclosure, the system may further include one or more pre-analytic modules. Each pre-analytic module may be configured to process a sample container before making the sample container available to the at least one analyzer, and the conveyance may be configured to translate the sample containers to the pre-analytic modules before transporting the sample containers to the at least one analyzer. The pre-analytic modules may comprise at least one of a container de-capper configured to remove a cap from a sample container and a liquid level detection module configured to detect a liquid level within at least a portion of the sample containers.

According to further aspects of the disclosure, the system may further include a sample transfer module configured to transfer sample from at least one first type of sample container to at least one second type of sample container; and a container transfer robot configured to transfer each second type of sample container from the sample transfer module to the conveyance. Each second type of sample container (which may be the same as the first type of sample container or may have a different shape, different volume, and/or different dimensions than the first type of sample container) has machine-readable identification information associated therewith, and the sample database may include identification information for each second type of sample container that is correlated with one or more open assays associated with each second type of sample container.

According to further aspects of the disclosure, the input module may be configured to determine at least one of a height and width of the container, a shape of a bottom of the container, and whether the container is capped.

According to further aspects of the disclosure, the conveyance may include a pre-analytic loop, the input module is operatively associated with the pre-analytic loop, and the system controller is programmed to monitor the number of sample containers being transported on the recirculation loop. The system may further include a pre-analytic scanner configured to detect the machine-readable identification information associated with each sample container transported on the pre-analytic loop, the system controller may be programmed to identify one or more open assays of each sample container based on the identification information detected by the pre-analytic scanner and to transfer a sample container from the pre-analytic loop to the recirculation loop if one or more functional assays of the at least one analyzer correspond to at least one of the one or more open assays of the sample container and/or if the number of sample containers being transported on the recirculation loop is less than a recirculation loop capacity limit.

According to further aspects of the disclosure, the system controller is programmed to transfer a sample container from the pre-analytic loop to the recirculation loop if both the one or more functional assays of the at least one analyzer correspond to at least one of the one or more open assays of the sample container and the number of sample containers being transported on the recirculation loop is less than the recirculation loop capacity limit.

According to further aspects of the disclosure, the container storage module is coupled to the pre-analytic loop, and the system controller is programmed to cause a sample container on the pre-analytic loop to be transferred to the container storage module if the at least one analyzer has no functional assay matching any of the one or more open assays of the sample container or to cause a sample container to be conveyed around the pre-analytic loop if the at least one analyzer has no functional assay matching any of the one or more open assays of the sample container.

According to further aspects of the disclosure, the system controller is programmed to monitor the number of times the sample container has traversed the pre-analytic loop or the amount of time the sample container has been on the pre-analytic loop and to cause the sample container to be transferred from the pre-analytic loop to the container storage module if the number of times the sample container has traversed the pre-analytic loop or the amount of time the sample container has been on the pre-analytic loop reaches a limit.

Further aspects of the disclosure include a method for processing a plurality of samples with an automated system. Each sample is contained within a sample container, and each sample container has machine-readable identification information (which may be a barcode) and one or more open assays (identifying test(s) or assay(s) to be performed on the sample) associated therewith. The automated system comprises a conveyance for transporting sample containers, an input module for holding a plurality of sample containers, an input scanner (which may be barcode scanner) for detecting the machine-readable identification information associated with each sample container, at least one analyzer operatively associated with the conveyance, a sample database storing identification information for each of the sample containers and in which the identification information is correlated with one or more open assays for each sample container, and a system controller in communication with the sample database and the input scanner. Each analyzer may be configured to perform one or more functional assays (which may be the same or different as the functional assay(s) of each other analyzer) on sample extracted from a sample container. In step (A) of the method, the system controller causes each sample container to be automatically transferred from the input module to the conveyance, wherein the sample container is removed from the input module before scanning the machine-readable identification information associated with the sample container and before identifying the one or more open assays associated with the sample container. In step (B), as or after each sample container is removed from the input module, the machine-readable identification information of the sample container is detected with the input scanner as the sample container passes the input scanner (e.g., on the conveyance). In step (C), with the system controller, the sample database is accessed and the one or more open assays for the sample container transported on the conveyance is identified based on the identification information detected by the input scanner.

According to further aspects of the disclosure, the conveyance comprises a first loop segment and a second loop segment, and the input module is operatively associated with the first loop segment. The at least one analyzer is operatively associated with the second loop segment, and the second loop segment is configured to transport sample containers to the at least one analyzer. According to a further step of the method, the system controller monitors the functional assays of all analyzers operatively associated with the second loop segment and/or monitors the number of sample containers being transported on the second loop segment and compares the one or more open assays of each sample container with the functional assays of all analyzers operatively associated with the second loop segment and/or compares the number of sample containers being transported on the second loop segment with a second loop segment capacity limit. In a further step, the system controller causes the sample container to be retained on the first loop segment if none of the functional assays matches any of the open assays for that sample container and/or if the number of sample containers being transported on the second loop segment is at least equal to the second loop segment capacity limit and causes the sample container to be transported around the first loop segment until at least one of the functional assays matches at least one of the open assays for that sample container and/or until the number of sample containers being transported on the second loop segment is less than the second loop segment capacity limit. In a further step, the system controller causes the sample container to be transferred from the first loop segment to the second loop segment if at least one of the functional assays matches at least one of the open assays for that sample container and/or if the number of sample containers being transported on the second loop segment is less than the second loop segment capacity limit.

According to further aspects of the disclosure, the method includes the steps of the system controller causing the sample container to be retained on the first loop segment if none of the functional assays matches any of the open assays for that sample container and if the number of sample containers being transported on the second loop segment is at least equal to the second loop segment capacity limit, transporting the sample container around the first loop segment until at least one of the functional assays matches at least one of the open assays for that sample container and the number of sample containers being transported on the second loop segment is less than the second loop segment capacity limit, and causing the sample container to be transferred from the first loop segment to the second loop segment if at least one of the functional assays matches at least one of the open assays for that sample container and the number of sample containers being transported on the second loop segment is less than the second loop segment capacity limit.

According to further aspects of the disclosure, a portion of the input module is designated for STAT sample containers, and the step of transferring sample containers from the input module to the conveyance with a container transfer robot comprises transferring all sample containers from the portion of the input module that is designated for STAT sample containers to the conveyance before transferring sample containers from any other portion of the input module.

According to further aspects of the disclosure, the automated system comprises a pick-and-place robot configured to transfer sample containers between the input module and the conveyance, and the system controller may be in communication with the pick-and-place robot. Step (A) comprises the system controller activating the pick-and-place robot to remove sample containers, one at a time, from the input module and then transferring each sample container to the conveyance.

According to further aspects of the disclosure, the conveyance comprises a recirculation loop, and the method may include the system controller causing a sample container to be repeatedly translated to the at least one analyzer by the recirculation loop until the first to occur of (1) sample has been extracted from the sample container to perform all open assays for that sample container, or (2) the sample container has traversed the recirculation loop a prescribed number of times or for a prescribed period of time.

According to further aspects of the disclosure, the automated system may include a container storage module (which may include a temperature-controlled housing), and the method may include the system controller causing the conveyance to transfer the sample container to the container storage module after sample has been extracted from a sample container to perform all open assays for that sample container or the sample container has traversed the recirculation loop the prescribed number of times or for a prescribed period of time.

According to further aspects of the disclosure, after step (C), the system controller causes a cap to be removed from a sample container with a decapper, detects a liquid level within at least a portion of the sample containers with a liquid level detection module, and/or uses the input module to determine at least one of a height and width of the container, a shape of a bottom of the container, and whether the container is capped.

According to further aspects of the disclosure, the method may include the steps of transferring sample from at least one first type of sample container to at least one second type of sample container with a sample transfer apparatus and the system controller causing each second type sample container to be automatically transferred from the sample transfer module to the conveyance with a container transfer robot.

According to further aspects of the disclosure, the automated system may include two or more analyzers operatively associated with the conveyance, and each analyzer is configured to perform one or more functional assays (which may be the same or different as the functional assay(s) of each other analyzer) on sample extracted from a sample container. The system may further include a distinct analyzer software module associated with each analyzer, which stores the identity of each of the one or more functional assays of each analyzer in an analyzer database associated with the analyzer software module, a buffer queue associated with each analyzer and configured to hold multiple sample containers diverted to the buffer queue from the conveyance, and a scanner (which may be a barcode scanner) associated with each analyzer and configured to detect the machine-readable identification information associated with each sample container transported on the conveyance past the scanner. The system controller may be in communication with each analyzer software module and each scanner, and the method may include the additional steps of (D) with each scanner, detecting the machine-readable identification information associated with each sample container transported on the conveyance past the scanner, (E) with the system controller, accessing the sample database and identifying the one or more open assays for the sample container based on the identification information detected by the scanner, (F) with the system controller, communicating the one or more open assays of the sample container to the analyzer software module of the analyzer associated with the scanner, (G) with the analyzer software module of the analyzer associated with the scanner, comparing the one or more open assays of the sample container with the identity of each of the one or more functional assays stored in the analyzer database of the associated analyzer, (H) communicating a divert instruction from the associated analyzer software module to the system controller to divert the sample container from the conveyance into the associated buffer queue if an open assay for that sample container corresponds to a functional assay of the analyzer associated, and (I) upon receiving the divert instruction, the system controller causing the sample container to be diverted from the conveyance into the associated buffer queue.

According to further aspects of the disclosure, the conveyance comprises a first track and the system may include a container holder associated with each sample container for holding the associated sample container, and the first track may be configured to convey container holders on the first track. Each buffer queue may comprise a second track configured to hold and convey the container holders diverted into the buffer queue, the system further includes a container diverter configured to selectively divert a sample container from the first track to the second track, and step (I) comprises the system controller causing the container diverter to divert the sample container from the conveyance into the associated buffer queue.

According to further aspects of the disclosure, the system may include a sample transfer device associated with each analyzer and configured to transfer a portion of a sample from a sample container to a process vessel within the associated analyzer, and the method may further include (J) with the system controller, causing the sample transfer device to transfer an amount of sample from the sample container diverted into the buffer queue to a process vessel within the associated analyzer; and (K) with the system controller, causing the buffer queue to transport the sample container back to the conveyance.

Aspects of the disclosure may include a method for processing a plurality of samples with an automated system, wherein each sample is contained within a sample container, and wherein the automated system comprises a conveyance for transporting sample containers, an input module for holding a plurality of sample containers, an input scanner for detecting machine-readable identification information, at least one analyzer operatively associated with the conveyance, and a system controller. The method may include the steps of (A) associating machine-readable identification information (which may be a barcode) with each sample container, (B) associating one or more open assays with each sample container, (C) in a sample database accessible to the system controller, storing identification information for each of the sample containers and correlating the identification information of each sample container with the one or more open assays associated with the sample container, (D) configuring each analyzer to perform one or more functional assays on sample extracted from a sample container, wherein the one or more functional assays performed by each analyzer may be the same or different than the one or more functional assays performed by any other analyzer operatively associated with the conveyance, (E) with the system controller, causing each sample container to be automatically transferred from the input module to the conveyance before scanning the machine-readable identification information associated with the sample container and before identifying the one or more open assays associated with the sample container, (F) as or after each sample container is transferred from the input module, detecting the machine-readable identification information of the sample container with the input scanner as the sample container passes the input scanner, and (G) with the system controller, accessing the sample database and identifying one or more open assays for the sample container transported on the conveyance based on the identification information detected by the input scanner.

Aspects of the disclosure include a system for processing a plurality of samples, wherein each sample is contained within a sample container, and each sample container has machine-readable identification information (such as a barcode) associated therewith. The system may include a sample database, a conveyance, a pre-analytic scanner (which may be a barcode scanner), at least one analyzer (which may be a molecular testing instrument, such as module for performing a nucleic acid-based amplification reaction), and at least one system controller (which may be in communication with the sample database, the pre-analytic scanner, and the at least one analyzer). The sample database stores identification information for each of the sample containers and the identification information is correlated with one or more open assays for each sample container. The conveyance may be configured to transport sample containers and may include a first loop segment and a second loop segment, and sample containers are introduced to the system at the first loop segment. The pre-analytic scanner may be operatively associated with the first loop segment and may be configured to detect the machine-readable identification information associated with each sample container as the sample container passes the pre-analytic scanner (e.g., on the first loop segment). The at least one analyzer may be operatively associated with the second loop segment, and each analyzer is configured to perform one or more functional assays on sample extracted from a sample container (which may be the same or different as the functional assay(s) of each other analyzer). The number of analyzers that are operatively associated with the second loop segment and/or the one or more functional assays that each analyzer is configured to perform may vary with time. The system controller is programmed to access the sample database and identify one or more open assays for each sample container transported on the first loop segment based on the identification information detected by the pre-analytic scanner, monitor the functional assays that all analyzers operatively associated with the second loop segment are configured to perform and the number of sample containers being transported on the second loop segment, compare the one or more open assays of each sample container with the functional assays of all analyzers operatively associated with the second loop segment and/or compare the number of sample containers being transported on the second loop segment with a second loop segment capacity limit, cause the sample container to be retained on the first loop segment if none of the functional assays matches any of the open assays for that sample container and/or if the number of sample containers being transported on the second loop segment is at least equal to the second loop segment capacity limit and cause the sample container to be transported around the first loop segment until at least one of the functional assays matches at least one of the open assays for that sample container and/or the number of sample containers being transported on the second loop segment is less than the second loop segment capacity limit, and cause the sample container to be transferred from the first loop segment to the second loop segment if at least one of the functional assays matches at least one of the open assays for that sample container and/or the number of sample containers being transported on the second loop segment is less than the second loop segment capacity limit.

According to further aspects of the disclosure, the system may include a distinct analyzer software module associated with each analyzer. The identity of each of the one or more functional assays of each analyzer is stored in an analyzer database associated with the analyzer software module, and the system controller may be in communication with the analyzer software module of each analyzer. The system controller is programmed to monitor the functional assays of all analyzers by receiving information transmissions from each analyzer software module, and each information transmission includes the identity of each of the one or more functional assays of the associated analyzer.

According to further aspects of the disclosure, the system controller is programmed to monitor the number of sample containers being transported on the second loop segment by monitoring the number of sample containers transferred from the first loop segment to the second loop segment and monitoring the number of sample containers transferred from the second loop segment to the first loop segment.

According to further aspects of the disclosure, the system may further include a container storage module operatively associated with the first loop segment, and the system controller may be configured to monitor the number of times the sample container traverses the first loop segment and/or the period of time the sample container has been traversing the first loop segment and to cause the sample container to be transferred from the first loop segment to the container storage module if the number of times the sample container traverses the first loop segment and/or the period of time the sample container has been traversing the first loop segment exceeds a limit.

According to further aspects of the disclosure, the system may include a diverter operatively associated with the first loop segment and selectively configurable in a first configuration preventing a sample container from being transferred from the first loop segment to the second loop segment or a second configuration causing a sample container to be transferred from the first loop segment to the second loop segment. The system controller may be in communication with the diverter and may be programmed to cause the sample container to be retained on the first loop segment by causing the diverter to be configured in the first configuration and to cause the sample container to be transferred from the first loop segment to the second loop segment by causing the diverter to be configured in the second configuration.

According to further aspects of the disclosure, the second loop segment may be configured and controlled to repeatedly translate each sample container transferred to the second loop segment to the at least one analyzer until the first to occur of (1) sample has been extracted from the sample container to perform all open assays for that sample container, or (2) the sample container has traversed the second loop segment a prescribed number of times or for a prescribed period of time.

According to further aspects of the disclosure, the system may further include a container storage module (which may be temperature-controlled), and after sample has been extracted from a sample container to perform all open assays for that sample container or the sample container has traversed the second loop segment the prescribed number of times or for the prescribed period of time, the conveyance may be configured and controlled to transfer the sample container to the container storage module. A pick-and-place robot may be provided to transfer sample containers between the conveyance and the container storage module.

According to further aspects of the disclosure, the system may further include one or more pre-analytic modules operatively associated with the first loop segment, and each pre-analytic module may be configured to process a sample container on the first loop segment before transferring the sample container to the second loop segment. The pre-analytic modules may include a container de-capper configured to remove a cap from a sample container and/or a liquid level detection module configured to detect a liquid level within at least a portion of the sample containers.

According to further aspects of the disclosure, they system may further include a sample transfer module configured to transfer sample from at least one first type of sample container to at least one second type of sample container and a container transfer robot configured to transfer each second type of sample container from the sample transfer module to the conveyance. The system controller may be programmed to cause each second type sample container to be transferred from the sample transfer module to the first loop segment.

According to further aspects of the disclosure, each second type of sample container has machine-readable identification information (which may be a barcode) associated therewith, and the sample database includes identification information for each second type of sample container that is correlated with one or more open assays associated with each second type of sample container. The system controller may be further programmed to cause the pre-analytic scanner to detect the machine-readable identification information associated with each second type sample container as the second type sample container passes the pre-analytic scanner, access the sample database and identify one or more open assays for each second type sample container transported on the first loop segment based on the identification information detected by the pre-analytic scanner, cause the second type sample container to be retained on the first loop segment if none of the functional assays matches any of the open assays for that second type sample container and/or if the number of sample containers being transported on the second loop segment is at least equal to the second loop segment capacity limit and cause the second type sample container to be transported around the first loop segment until at least one of the functional assays matches at least one of the open assays for that second type sample container and/or the number of sample containers being transported on the second loop segment is less than the second loop segment capacity limit, and cause the second type sample container to be transferred from the first loop segment to the second loop segment if at least one of the functional assays matches at least one of the open assays for that second type sample container and/or the number of sample containers being transported on the second loop segment is less than the second loop segment capacity limit.

According to further aspects of the disclosure, the system may include an input module configured to hold sample containers, and a pick-and-place robot configured to transfer sample containers between the input module and the first loop segment. The input module may be configured to determine at least one of a height and width of the container, a shape of a bottom of the container, and whether the container is capped.

Aspects of the disclosure include a method for processing a plurality of samples with an automated system. Each sample is contained within a sample container and each sample container has machine-readable identification information (which may be a barcode) associated therewith. The automated system comprises a sample database storing identification information for each of the sample containers that is correlated with one or more open assays for each sample container, a conveyance configured to transport sample containers, wherein the conveyance comprises a first loop segment and a second loop segment, and sample containers are introduced to the system at the first loop segment, an pre-analytic scanner (which may be a barcode scanner) operatively associated with the first loop segment and configured to detect the machine-readable identification information associated with each sample container as the sample container passes the pre-analytic scanner; at least one analyzer operatively associated with the second loop segment, wherein each analyzer may be configured to perform one or more functional assays (which may be the same or different as the functional assay(s) of each other analyzer, and the number of analyzers that are operatively associated with the second loop segment and/or the one or more functional assays that each analyzer is configured to perform may vary with time); and at least one system controller in communication with the sample database, the pre-analytic scanner, and the at least one analyzer. The method may include the steps of (A) with the pre-analytic scanner, detecting the machine-readable identification information associated with each sample container transported past the pre-analytic scanner (e.g., as the sample container is transported past the pre-analytic scanner on the first loop segment); (B) with the system controller, accessing the sample database and identifying one or more open assays for each sample container transported on the first loop segment based on the identification information detected by the pre-analytic scanner; (C) with the system controller, monitoring the functional assays that all analyzers operatively associated with the second loop segment are configured to perform and/or monitoring the number of sample containers being transported on the second loop segment; (D) with the system controller, comparing the one or more open assays of each sample container with the functional assays of all analyzers operatively associated with the second loop segment, and/or comparing the number of sample containers being transported on the second loop segment with a second loop segment capacity limit, (E) with the system controller, causing the sample container to be retained on the first loop segment if none of the functional assays matches any of the open assays for that sample container and/or if the number of sample containers being transported on the second loop segment is at least equal to the second loop segment capacity limit, and causing the sample container to be transported around the first loop segment until at least one of the functional assays matches at least one of the open assays for that sample container and/or the number of sample containers being transported on the second loop segment is less than the second loop segment capacity limit, and (F) with the system controller, causing the sample container to be transferred from the first loop segment to the second loop segment if at least one of the functional assays matches at least one of the open assays for that sample container and/or if the number of sample containers being transported on the second loop segment is less than the second loop segment capacity limit.

According to further aspects of the disclosure, the system may further include a container storage module operatively associated with the first loop segment, and the method may further include the system controller monitoring the number of times the sample container traverses the first loop segment and/or the period of time the sample container has been traversing the first loop segment and causing the sample container to be transferred from the first loop segment to the container storage module if the number of times the sample container traverses the first loop segment and/or the period of time the sample container has been traversing the first loop segment reaches a limit.

According to further aspects of the disclosure, the automated system may include a distinct analyzer software module associated with each analyzer, and the identity of each of the one or more functional assays of each analyzer is stored in an analyzer database associated with the analyzer software module. The system controller may be in communication with the analyzer software module of each analyzer, and monitoring the functional assays that all analyzers operatively associated with the second loop segment are configured to perform comprises the system controller receiving information transmissions including the identity of each of the one or more functional assays of the associated analyzer from each analyzer software module.

According to further aspects of the disclosure, the automated system may include a diverter operatively associated with the first loop segment, and step (E) comprises, with the system controller, causing the diverter to be configured in a first configuration preventing a sample container from being transferred from the first loop segment to the second loop segment, and step (F) comprises, with the system controller, causing the diverter to be configured in a second configuration causing a sample container to be transferred from the first loop segment to the second loop segment.

According to further aspects of the disclosure, the second loop segment may be configured and controlled to repeatedly translate each sample container to the at least one analyzer, and the automated system further includes a recirculation scanner operatively associated with the second loop segment and configured to detect the machine-readable identification information associated with each sample container transported on the second loop segment past the recirculation scanner. The system controller may be in communication with the recirculation scanner, and the method may further include after step (F), extracting sample from a sample container transferred to the second loop segment to perform one of the one or more open assays of the sample container matching one of the one or more functional assays, revising the sample database to update the open assays correlated with the sample identification information for the sample container by changing the status of the open assay for which sample was extracted, with the recirculation scanner, detecting the machine-readable identification information associated with each sample container transported on the second loop segment past the recirculation scanner, with the system controller, accessing the sample database and identifying the one or more open assays for the sample container for which sample has not been extracted based on the identification information detected by the recirculation scanner; and with the system controller, causing the sample container to be conveyed off the second loop segment if there are no more open assays for the sample container.

According to further aspects of the disclosure, the method may further include, with the system controller, counting the number of times each sample container has traversed the second loop segment and/or tracking the period of time each sample container has been on the second loop segment; and, with the system controller, causing the sample container to be conveyed off the second loop segment if the sample container has traversed the second loop segment a prescribed number of times or for a prescribed period of time.

According to further aspects of the disclosure, the second loop segment may be configured and controlled to repeatedly translate each sample container to the at least one analyzer, and the method may further include, with the system controller, counting the number of times each sample container has traversed the second loop segment and/or tracking the period of time each sample container has been on the second loop segment; and with the system controller, causing the sample container to be conveyed off the second loop segment if the sample container has traversed the second loop segment a prescribed number of times or for a prescribed period of time.

According to further aspects of the disclosure, the automated system further may include a container storage module (which may be temperature-controlled), and wherein the method may further include, with the system controller, causing the sample container to be transferred to the container storage module if there are no more open assays for the sample container or the sample container has traversed the second loop segment the prescribed number of times or for a prescribed period of time.

According to further aspects of the disclosure, the automated system may include a pick-and-place robot configured to transfer sample containers between the conveyance and the container storage module, and the system controller may be in communication with the pick-and-place robot. Causing the sample container to be transferred to the storage module may include the system controller activating the pick-and-place robot to transfer the sample container from the conveyance to the container storage module.

According to further aspects of the disclosure, the automated system may include an input module configured to hold sample containers, and the method may include the system controller causing sample containers to be transferred from the input module to the first loop segment.

According to further aspects of the disclosure, the method may include removing a cap from a sample container with a decapper; and/or detecting a liquid level within at least a portion of the sample containers with a liquid level detection module.

According to further aspects of the disclosure, the method may include, with a sample transfer module, transferring sample from at least one first type of sample container to at least one second type of sample container; and, with the system controller, causing each second type sample container to be transferred from the sample transfer module to the first loop segment with a container transfer robot.

According to further aspects of the disclosure, each second type of sample container has machine-readable identification information associated therewith, and the sample database includes identification information for each second type of sample container that is correlated with one or more open assays associated with each second type of sample container. The method may include, with the pre-analytic scanner, detecting the machine-readable identification information associated with each second type sample container transported past the pre-analytic scanner; with the system controller, accessing the sample database and identifying one or more open assays for each second type sample container transported on the first loop segment based on the identification information detected by the pre-analytic scanner; with the system controller, comparing the one or more open assays of each second type sample container with the functional assays of all analyzers operatively associated with the second loop segment and/or comparing the number of sample containers being transported on the second loop segment with a second loop segment capacity limit; with the system controller, causing the second type sample container to be retained on the first loop segment if none of the functional assays matches any of the open assays for that second type sample container and/or if the number of sample containers being transported on the second loop segment is at least equal to the second loop segment capacity limit, and causing the second type sample container to be transported around the first loop segment until at least one of the functional assays matches at least one of the open assays for that second type sample container and/or the number of sample containers being transported on the second loop segment is less than the second loop segment capacity limit, and with the system controller, causing the second type sample container to be transferred from the first loop segment to the second loop segment if at least one of the functional assays matches at least one of the open assays for that sample container and/or if the number of sample containers being transported on the second loop segment is less than the second loop segment capacity limit.

According to further aspects of the disclosure, the method may include determining, with the input module, at least one of a height and width of the container, a shape of a bottom of the container, and whether the container is capped.

Aspects of the disclosure include a method for processing a plurality of samples with an automated system, wherein each sample is contained within a sample container, and wherein the automated system may include a conveyance configured to transport sample containers, wherein the conveyance comprises a first loop segment and a second loop segment, and wherein sample containers are introduced to the system at the first loop segment; an pre-analytic scanner for detecting machine-readable identification information; at least one analyzer operatively associated with the second loop segment; and at least one system controller. The method may include (A) associating machine-readable identification information with each sample container; (B) associating one or more open assays with each sample container; (C) in a sample database accessible to the system controller, storing identification information for each of the sample containers and correlating the identification information of each sample container with the one or more open assays associated with the sample container; (D) configuring each analyzer to perform one or more functional assays on sample extracted from a sample container, wherein the one or more functional assays performed by each analyzer may be the same or different than the one or more functional assays performed by any other analyzer operatively associated with the conveyance, and wherein the number of analyzers that are operatively associated with the second loop segment and/or the one or more functional assays that each analyzer is configured to perform may vary with time; (E) with the pre-analytic scanner, detecting the machine-readable identification information associated with each sample container transported past the pre-analytic scanner; (F) with the system controller, accessing the sample database and identifying one or more open assays for each sample container transported on the first loop segment based on the identification information detected by the pre-analytic scanner; (G) with the system controller, monitoring the functional assays that all analyzers operatively associated with the second loop segment are configured to perform and/or monitoring the number of sample containers being transported on the second loop segment; (H) with the system controller, comparing the one or more open assays of each sample container with the functional assays of all analyzers operatively associated with the second loop segment, and/or comparing the number of sample containers being transported on the second loop segment with a second loop segment capacity limit; (I) with the system controller, causing the sample container to be retained on the first loop segment if none of the functional assays matches any of the open assays for that sample container and/or if the number of sample containers being transported on the second loop segment is at least equal to the second loop segment capacity limit, and causing the sample container to be transported around the first loop segment until at least one of the functional assays matches at least one of the open assays for that sample container and/or the number of sample containers being transported on the second loop segment is less than the second loop segment capacity limit, and (J) with the system controller, causing the sample container to be transferred from the first loop segment to the second loop segment if at least one of the functional assays matches at least one of the open assays for that sample container and/or if the number of sample containers being transported on the second loop segment is less than the second loop segment capacity limit.

Aspects of the disclosure include a system for processing a plurality of samples, wherein each sample is contained within a sample container, and each sample container has machine-readable identification information (such as a barcode) associated therewith. The system may include a conveyance, a container storage module (which may be temperature-controlled), a scanner (such as a barcode scanner), a sample database, at least one analyzer (which may be a molecular testing instrument, such as module for performing a nucleic acid-based amplification reaction), and at least one system controller. The conveyance may be configured to transport sample containers and may comprise a first loop segment and a second loop segment. The container storage module may be operatively associated with the first loop segment and may be configured to receive sample containers from the first loop segment and hold a plurality of sample containers. The scanner may be operatively associated with the first loop segment and may be configured to detect the machine-readable identification information associated with each sample container transported on the first loop segment. The sample database stores identification information for each of the sample containers that is correlated with one or more open assays for each sample container. The least one analyzer may be operatively associated with the second loop segment, and each analyzer may be configured to perform one or more functional assays on sample extracted from a sample container. The number of analyzers that are operatively associated with the second loop segment and/or the one or more functional assays that each analyzer is configured to perform may vary with time. The system controller may be programmed to (A) access the sample database and identify one or more open assays for each sample container transported on the first loop segment based on the identification information detected by the scanner; (B) monitor the functional assays that all analyzers operatively associated with the second loop segment are configured to perform and/or monitor the number of sample containers being transported on the second loop segment; (C) compare the one or more open assays of each sample container transported on the first loop segment with the functional assays of all analyzers operatively associated with the second loop segment and/or compare the number of sample containers being transported on the second loop segment with a second loop segment capacity limit; (D) cause a sample container to be retained on the first loop segment if none of the functional assays matches any of the open assays for that sample container and/or if the number of sample containers being transported on the second loop segment is at least equal to the second loop segment capacity limit; (E) cause the sample container to be transported around the first loop segment and repeat functions A, B, C, and D each time the sample container traverses the first loop segment until at least one of the functional assays matches at least one of the open assays for that sample container and/or until the number of sample containers being transported on the second loop segment is less than the second loop segment capacity limit; (F) monitor the number of times the sample container traverses the first loop segment and/or the amount of time the sample container has been traversing the first loop segment; and (G) cause the sample container to be transferred from the first loop segment to the container storage module if the number of times the sample container traverses the first loop segment and/or the amount of time the sample container has been traversing the first loop segment exceeds a limit.

According to further aspects of the disclosure, the system controller may be programmed to record the one or more open assays of each sample container transferred to the container storage module; compare the one or more open assays of each sample container stored in the container storage module with the functional assays of all analyzers operatively associated with the second loop segment and/or compare the number of sample containers being transported on the second loop segment with a second loop segment capacity limit; cause a sample container stored in the container storage module to be transferred from the container storage module to the first loop segment if at least one of the functional assays matches any of the open assays for that sample container and/or if the number of sample containers being transported on the second loop segment is less than the second loop segment capacity limit; and after the sample container is transferred from the container storage module to the first loop segment, cause the sample container to be transferred from the first loop segment to the second loop segment.

According to further aspects of the disclosure, the system may include a container transfer robot that may be configured to transfer sample containers between the first loop segment and the container storage module. The system controller may be in communication with the container transfer robot and may be programmed to cause a sample container to be transferred from the first loop segment to the container storage module with the container transfer robot and to cause a sample container to be transferred from the container storage module to the first loop segment with the container transfer robot.

According to further aspects of the disclosure, the system may include a distinct analyzer software module associated with each analyzer, wherein the identity of each of the one or more functional assays of each analyzer is stored in an analyzer database associated with the analyzer software module, and the system controller may be in communication with the analyzer software module of each analyzer. The system controller may be programmed to monitor the functional assays of all analyzers by receiving information transmissions from each analyzer software module, wherein each information transmission includes the identity of each of the one or more functional assays of the associated analyzer.

According to further aspects of the disclosure, the system may include an input diverter operatively associated with the first loop segment and selectively configurable in a first configuration preventing a sample container from being transferred from the first loop segment to the second loop segment or a second configuration causing a sample container to be transferred from the first loop segment to the second loop segment. The system controller may be in communication with the input diverter, and the system controller may be programmed to cause the sample container to be retained on the first loop segment by causing the input diverter to be configured in the first configuration to cause the sample container to be transferred from the first loop segment to the second loop segment by causing the input diverter to be configured in the second configuration.

Aspects of the disclosure include a method for processing a plurality of samples with an automated system, wherein each sample is contained within a sample container, and each sample container has machine-readable identification information. The automated system may include a conveyance configured to transport sample containers and which may include a first loop segment and a second loop segment; a container storage module operatively associated with the first loop segment and configured to receive sample containers from the first loop segment and hold a plurality of sample containers; a scanner operatively associated with the first loop segment and configured to detect the machine-readable identification information associated with each sample container transported on the first loop segment; a sample database storing identification information for each of the sample containers that is correlated with one or more open assays for each sample container; at least one analyzer operatively associated with the second loop segment, wherein each analyzer may be configured to perform one or more functional assays on sample extracted from a sample container, and wherein the number of analyzers that are operatively associated with the second loop segment and/or the one or more functional assays that each analyzer is configured to perform may vary with time; and at least one system controller in communication with the sample database and the scanner. The method may include the steps of (A) with the scanner, detecting the machine-readable identification information associated with each sample container transported on the first loop segment; (B) with the system controller, accessing the sample database and identifying one or more open assays for each sample container transported on the first loop segment based on the identification information detected by the scanner; (C) with the system controller, monitoring the functional assays of all analyzers operatively associated with the second loop segment and/or monitoring the number of sample containers being transported on the second loop segment; (D) with the system controller, comparing the one or more open assays of each sample container transported on the first loop segment with the functional assays of all analyzers operatively associated with the second loop segment and/or comparing the number of sample containers being transported on the second loop segment with a second loop segment capacity limit; (E) with the system controller, causing a sample container to be retained on the first loop segment if none of the functional assays matches any of the open assays for that sample container and/or if the number of sample containers being transported on the second loop segment is at least equal to the second loop segment capacity limit; (F) with the system controller, causing the sample container to be transported around the first loop segment and repeating steps (A), (B), (C), (D), and (E) each time the sample container traverses the first loop segment until at least one of the functional assays matches at least one of the open assays for that sample container and/or until the number of sample containers being transported on the second loop segment is less than the second loop segment capacity limit; (G) with the system controller, monitoring the number of times the sample container traverses the first loop segment and/or the amount of time the sample container has been traversing the first loop segment; and (H) with the system controller, causing the sample container to be transferred from the first loop segment to the container storage module if the number of times the sample container traverses the first loop segment and/or the amount of time the sample container has been traversing the first loop segment reaches a limit.

According to further aspects of the disclosure, the method may include (I) with the system controller, recording the one or more open assays of each sample container transferred to the container storage module in step (H); (J) with the system controller, comparing the one or more open assays of each sample container stored in the container storage module with the functional assays of all analyzers operatively associated with the second loop segment and/or comparing the number of sample containers being transported on the second loop segment with a second loop segment capacity limit; (K) with the system controller, causing a sample container stored in the container storage module to be transferred from the container storage module to the first loop segment if at least one of the functional assays matches any of the open assays for that sample container and/or if the number of sample containers being transported on the second loop segment is less than the second loop segment capacity limit, and (L) after the sample container is transferred from the container storage module to the first loop segment, with the system controller, causing the sample container to be transferred from the first loop segment to the second loop segment.

According to further aspects of the disclosure, the automated method may include a container transfer robot configured to transfer sample containers between the first loop segment and the container storage module. The system controller may be in communication with the container transfer robot, and step (H) comprises, causing the container transfer robot to transfer the sample container from the first loop segment to the container storage module, and step (K) comprises causing the container transfer robot to transfer the sample container from the container storage module to the first loop segment.

According to further aspects of the disclosure, the automated system may include a distinct analyzer software module associated with each analyzer, and the identity of each of the one or more functional assays of each analyzer is stored in an analyzer database associated with the analyzer software module. The system controller may be in communication with the analyzer software module of each analyzer, and monitoring the functional assays of all analyzers operatively associated with the second loop segment comprises the system controller receiving information transmissions from each analyzer software module, and each information transmission includes the identity of each of the one or more functional assays of the associated analyzer.

According to further aspects of the disclosure, the automated system may include an input diverter operatively associated with the first loop segment and selectively configurable in a first configuration preventing a sample container from being transferred from the first loop segment to the second loop segment or a second configuration causing a sample container to be transferred from the first loop segment to the second loop segment. The system controller may be in communication with the input diverter, and step (E) may include, with the system controller, causing the input diverter to be configured in the first configuration, and step (L) may include, with the system controller, causing the input diverter to be configured in the second configuration.

Aspects of the disclosure include a system for processing a plurality of samples, wherein each sample is contained within a sample container, and each sample container has machine-readable identification information associated therewith. The system may include a conveyance, a container storage module (which may be temperature-controlled), a recirculation scanner, a sample database, at least one analyzer, and at least one system controller. The conveyance may be configured to transport sample containers and includes a first loop segment and a second loop segment. The container storage module may be operatively associated with the first loop segment and is configured to receive sample containers from the first loop segment and hold a plurality of sample containers. The recirculation scanner may be operatively associated with the second loop segment and configured to detect the machine-readable identification information associated with each sample container as the sample container is transported past the recirculation scanner on the second loop segment. The sample database stores identification information for each of the sample containers that is correlated with one or more open assays for each sample container. The at least one analyzer may be operatively associated with the second loop segment, and each analyzer may be configured to perform one or more functional assays on sample extracted from a sample container. The number of analyzers that are operatively associated with the second loop segment and/or the one or more functional assays that each analyzer is configured to perform may vary with time. The system controller may be in communication with the sample database and the scanner, and may be programmed to (A) access the sample database and identify any open assay(s) for each sample container transported on the second loop segment based on the identification information detected by the recirculation scanner, (B) cause the sample container to be retained on the second loop segment if the sample container has at least one open assay, (C) cause the sample container to be transported around the second loop segment and repeat functions A and B each time the sample container traverses the second loop segment, (D) monitor the number of times the sample container traverses the second loop segment and/or the amount of time the sample container has been traversing the second loop segment, (E) cause the sample container to be transferred from the second loop segment to the first loop segment if the number of times the sample container traverses the second loop segment and/or the amount of time the sample container has been traversing the second loop segment exceeds a limit, and (F) cause the sample container to be transferred from the first loop segment to the container storage module.

According to further aspects of the disclosure, the system controller may be programmed to record the one or more open assays of each sample container transferred to the container storage module; monitor the functional assays of all analyzers operatively associated with the second loop segment; compare the one or more open assays of each sample container stored in the container storage module with the functional assays of all analyzers operatively associated with the second loop segment; cause a sample container stored in the container storage module to be transferred from the container storage module to the first loop segment if at least one of the functional assays matches any of the open assays for that sample container; and after the sample container is transferred from the container storage module to the first loop segment, cause the sample container to be transferred from the first loop segment to the second loop segment.

According to further aspects of the disclosure, the system controller may be programmed to monitor the number of sample containers being transported on the second loop segment; compare the number of sample containers being transported on the second loop segment with a second loop segment capacity limit; and cause a sample container stored in the container storage module to be transferred from the container storage module to the first loop segment if at least one of the functional assays matches any of the open assays for that sample container and if the number of sample containers being transported on the second loop segment is less than the second loop segment capacity limit.

According to further aspects of the disclosure, the system controller may be programmed to monitor the functional assays of all analyzers operatively associated with the second loop segment; compare the open assays of each sample container that has been scanned with the recirculation scanner with the functional assays of all analyzers operatively associated with the second loop segment; and cause the sample container to be retained on the second loop segment if the sample container has at least one open assay matching at least one functional assay until the number of times the sample container traverses the second loop segment and/or the amount of time the sample container has been traversing the second loop segment exceeds a limit.

According to further aspects of the disclosure, the system controller may be programmed to record the one or more open assays of each sample container transferred to the container storage module; compare the one or more open assays of each sample container stored in the container storage module with the functional assays of all analyzers operatively associated with the second loop segment; cause a sample container stored in the container storage module to be transferred from the container storage module to the first loop segment if at least one of the functional assays matches any of the open assays for that sample container; and after the sample container is transferred from the container storage module to the first loop segment, cause the sample container to be transferred from the first loop segment to the second loop segment.

According to further aspects of the disclosure, the system controller is programmed to monitor the number of sample containers being transported on the second loop segment; compare the number of sample containers being transported on the second loop segment with a second loop segment capacity limit; and cause a sample container stored in the container storage module to be transferred from the container storage module to the first loop segment if at least one of the functional assays matches any of the open assays for that sample container and if the number of sample containers being transported on the second loop segment is less than the second loop segment capacity limit.

According to further aspects of the disclosure, the system may include a container transfer robot configured to transfer sample containers between the first loop segment and the storage module. The system controller may be in communication with the container transfer robot and may be programmed to cause a sample container to be transferred from the first loop segment to the container storage module with the container transfer robot and to cause a sample container to be transferred from the container storage module to the first loop segment with the container transfer robot.

According to further aspects of the disclosure, the system many include a distinct analyzer software module associated with each analyzer, wherein the identity of each of the one or more functional assays of each analyzer is stored in an analyzer database that is associated with the analyzer software module. The system controller may be in communication with the analyzer software module of each analyzer, and the system controller is programmed to monitor the functional assays of all analyzers by receiving information transmissions from each analyzer software module, wherein each information transmission includes the identity of each of the one or more functional assays of the associated analyzer.

According to further aspects of the disclosure, the system may include an outlet diverter operatively associated with the second loop segment and selectively configurable in a first configuration preventing a sample container from being transferred from the second loop segment to the first loop segment or a second configuration causing a sample container to be transferred from the second loop segment to the first loop segment. The system controller may be in communication with the outlet diverter and may be programmed to cause the sample container to be retained on the second loop segment by causing the outlet diverter to be configured in the first configuration and to cause the sample container to be transferred from the second loop segment to the first loop segment by causing the outlet diverter to be configured in the second configuration.

Aspects of the disclosure include a method for processing a plurality of samples with an automated system, wherein each sample is contained within a sample container, and each sample container has machine-readable identification information associated therewith. The automated system may include a conveyance configured to transport sample containers and including a first loop segment and a second loop segment; a container storage module operatively associated with the first loop segment and configured to receive sample containers from the first loop segment and hold a plurality of sample containers; a recirculation scanner operatively associated with the second loop segment and configured to detect the machine-readable identification information associated with each sample container as the sample container is transported past the recirculation scanner on the second loop segment; a sample database storing identification information for each of the sample containers that is correlated with one or more open assays for each sample container: at least one analyzer operatively associated with the second loop segment, wherein each analyzer may be configured to perform one or more functional assays on sample extracted from a sample container, and wherein the number of analyzers that are operatively associated with the second loop segment and/or the one or more functional assays that each analyzer is configured to perform may vary with time, and at least one system controller in communication with the sample database and the scanner. The method may include the steps of (A) with the recirculation scanner, detecting the machine-readable identification information associated with each sample container transported past the recirculation scanner; (B) with the system controller, accessing the sample database and identify any open assay(s) for each sample container transported on the second loop segment based on the identification information detected by the recirculation scanner; (C) with the system controller, causing the sample container to be retained on the second loop segment if the sample container has at least one open assay; (D) with the system controller, causing the sample container to be transported around the second loop segment and repeating steps (A), (B), and (C) each time the sample container traverses the second loop segment; (E) with the system controller, monitoring the number of times the sample container traverses the second loop segment and/or the amount of time the sample container has been traversing the second loop segment; (F) with the system controller, causing the sample container to be transferred from the second loop segment to the first loop segment if the number of times the sample container traverses the second loop segment and/or the amount of time the sample container has been traversing the second loop segment exceeds a limit; and (G) with the system controller, causing the sample container to be transferred from the first loop segment to the container storage module.

According to further aspects of the disclosure, the method may include (H) with the system controller, recording the one or more open assays of each sample container transferred to the container storage module; (I) with the system controller, monitoring the functional assays of all analyzers operatively associated with the second loop segment; (J) with the system controller, comparing the one or more open assays of each sample container stored in the container storage module with the functional assays of all analyzers operatively associated with the second loop segment; (K) with the system controller, causing a sample container stored in the container storage module to be transferred from the container storage module to the first loop segment if at least one of the functional assays matches any of the open assays for that sample container; and (L) after the sample container is transferred from the container storage module to the first loop segment, with the system controller, causing the sample container to be transferred from the first loop segment to the second loop segment.

According to further aspects of the disclosure, the method may include, with the system controller, monitoring the number of sample containers being transported on the second loop segment; with the system controller, comparing the number of sample containers being transported on the second loop segment with a second loop segment capacity limit; and with the system controller, causing a sample container stored in the container storage module to be transferred from the container storage module to the first loop segment if at least one of the functional assays matches any of the open assays for that sample container and if the number of sample containers being transported on the second loop segment is less than the second loop segment capacity limit.

According to further aspects of the disclosure, the method may include, with the system controller, monitoring the functional assays of all analyzers operatively associated with the second loop segment; with the system controller, comparing the open assays of each sample container that has been scanned with the recirculation scanner with the functional assays of all analyzers operatively associated with the second loop segment; and with the system controller, causing the sample container to be retained on the second loop segment if the sample container has at least one open assay matching at least one functional assay until the number of times the sample container traverses the second loop segment and/or the amount of time the sample container has been traversing the second loop segment exceeds a limit.

According to further aspects of the disclosure, the method may include, with the system controller, recording the one or more open assays of each sample container transferred to the container storage module; with the system controller, comparing the one or more open assays of each sample container stored in the container storage module with the functional assays of all analyzers operatively associated with the second loop segment; with the system controller, causing a sample container stored in the container storage module to be transferred from the container storage module to the first loop segment if at least one of the functional assays matches any of the open assays for that sample container; and after the sample container is transferred from the container storage module to the first loop segment, with the system controller, causing the sample container to be transferred from the first loop segment to the second loop segment.

According to further aspects of the disclosure, the method may include, with the system controller, monitoring the number of sample containers being transported on the second loop segment; with the system controller, comparing the number of sample containers being transported on the second loop segment with a second loop segment capacity limit; and with the system controller, causing a sample container stored in the container storage module to be transferred from the container storage module to the first loop segment if at least one of the functional assays matches any of the open assays for that sample container and if the number of sample containers being transported on the second loop segment is less than the second loop segment capacity limit.

According to further aspects of the disclosure, the automated system may include a container transfer robot configured to transfer sample containers between the first loop segment and the storage module, the system controller may be in communication with the container transfer robot, and step (G) comprises causing the sample container robot to transfer the sample container from the first loop segment to the container storage module and step (K) comprises causing the sample container robot to transfer the sample container from the container storage module to the first loop segment.

Aspects of the disclosure include a system for processing a plurality of samples, wherein each sample is contained within a sample container, and each sample container has machine-readable identification information associated therewith. The system may include a conveyance, two or more analyzers, a distinct analyzer software module, a sample database, a buffer queue, a scanner, at least one system controller. The conveyance may be configured to transport sample containers. The two or more analyzers may be operatively associated with the conveyance, and each analyzer may be configured to perform one or more functional assays on sample extracted from a sample container. Each analyzer software module is associated with one analyzer, and the identity of each of the one or more functional assays of each analyzer is stored in an analyzer database associated with the analyzer software module. The sample database stores identification information for each of the sample containers that is correlated with one or more open assays for each sample container, and the sample database is independent of the analyzer software modules and analyzer databases. The buffer queue is associated with each analyzer and is configured to hold multiple sample containers diverted to the buffer queue from the conveyance. One scanner is associated with each analyzer and may be configured to detect the machine-readable identification information associated with each sample container transported on the conveyance past the scanner. The system controller may be programmed to access the sample database and identify the one or more open assays for each sample container transported on the conveyance based on the identification information detected by each scanner and to communicate the one or more open assays of the sample container to the analyzer software module of the analyzer associated with the scanner. The associated analyzer software module may be programmed to compare the one or more open assays of the sample container with the identity of each of the one or more functional assays stored in the analyzer database of the associated analyzer and to communicate an instruction to the system controller whether or not to divert the sample container from the conveyance into the associated buffer queue based at least in part on a result of the comparison.

According to further aspects of the disclosure, the analyzer software module may be programmed to communicate an instruction to the system controller to divert the sample container from the conveyance into the associated buffer queue if at least one open assay for that sample container corresponds to at least one functional assay of the analyzer associated with the buffer queue, or communicate an instruction to the system controller to not divert the sample container from the conveyance into the associated buffer queue if no open assay for that sample container corresponds to any functional assay of the analyzer associated with the buffer queue.

According to further aspects of the disclosure, the identity of each of one or more queued open assays is stored in the associated analyzer database, wherein each queued open assay comprises the identity of at least one open assay of each sample container previously diverted into the associated buffer queue that corresponds to at least one functional assay of the associated analyzer and from which sample has not yet been extracted for performing one of the corresponding functional assays. A the associated analyzer software module may be programmed to compare the one or more open assays of the sample container scanned with the associated scanner with the identity of each of the one or more queued open assays stored in the analyzer database of the associated analyzer and to communicate an instruction to the system controller whether or not to divert the sample container from the conveyance into the associated buffer queue based at least in part on a result of the comparison.

According to further aspects of the disclosure, the associated analyzer software module is programmed to communicate an instruction to the system controller whether or not to divert the sample container from the conveyance into the associated buffer queue based on whether one of the one or more open assays corresponds to a selected one of the one or more queued open assays.

According to further aspects of the disclosure, the analyzer software module associated with each analyzer comprises a computer module housed within the associated analyzer.

According to further aspects of the disclosure, the conveyance may include a first track, and the system may include a container holder associated with each sample container for holding the associated sample container, and wherein the first track may be configured to convey container holders on the first track.

According to further aspects of the disclosure, each buffer queue comprises a second track configured to hold and convey the container holders diverted into the buffer queue, and the system further includes a container diverter configured to selectively divert a sample container from the first track to the second track.

According to further aspects of the disclosure, the system may include an automated pipettor associated with each analyzer and configured to transfer a portion of a sample from a sample container to a process vessel within the associated analyzer. The system controller may be programmed to cause the automated pipettor to transfer an amount of sample from the sample container diverted into the buffer queue to a process vessel within the associated analyzer; and after sample is transferred from the sample container to the process vessel, cause the buffer queue to transport the sample container back to the conveyance.

According to further aspects of the disclosure, the conveyance may include a recirculation loop configured and controlled to repeatedly translate each sample container to the two or more analyzers until the first to occur of (1) sample has been extracted from the sample container to perform all open assays for that sample container, or (2) the sample container has traversed the recirculation loop a prescribed number of times or for a prescribed period of time.

According to further aspects of the disclosure, the system may include a container storage module, and, after sample has been extracted from a sample container to perform all open assays for that sample container or the sample container has traversed the recirculation loop the prescribed number of times or for the prescribed period of time, the conveyance may be configured and controlled to transfer the sample container to the container storage module.

According to further aspects of the disclosure, the system may include a pick-and-place robot configured to transfer sample containers between the conveyance and the container storage module.

According to further aspects of the disclosure, the system may include one or more pre-analytic modules, each pre-analytic module may be configured to process a sample container before making the sample container available to the two or more analyzers. They conveyance may be configured to translate the sample containers to the pre-analytic modules before transporting the sample containers between the two or more analyzers, and the pre-analytic modules comprise one or more of a container de-capper configured to remove a cap from a sample container and a liquid level detection module configured to detect a liquid level within at least a portion of the sample containers.

According to further aspects of the disclosure, the system may include a sample transfer module configured to transfer sample from at least one first type of sample container to at least one second type of sample container, and the system controller may be programmed to cause each second type sample container to which sample has been transferred to be transferred from the sample transfer module to the conveyance.

According to further aspects of the disclosure, the system may include an input module configured to hold sample containers; and a pick-and-place robot configured to transfer sample containers between the input module and the conveyance.

According to further aspects of the disclosure, the system may include a pre-analytic loop at which sample containers are provided to the system and a pre-analytic scanner configured to detect the machine-readable identification information associated with each sample container transported on the pre-analytic loop. The system controller may be programmed to identify one or more open assays of each sample container based on the identification information detected by the pre-analytic scanner and to transfer a sample container from the pre-analytic loop to the recirculation loop if one or more functional assays of the two or more analyzers correspond to at least one of the one or more open assays of the sample container and/or if a number of sample containers being transported on the recirculation loop is less than a recirculation loop capacity limit.

According to further aspects of the disclosure, the system may include a container storage module coupled to the pre-analytic loop and configured to receive sample containers from the pre-analytic loop into the container storage module, and the system controller may be programmed to cause a sample container on the pre-analytic loop to be transferred from the pre-analytic loop to the container storage module if none of the two or more analyzers has a functional assay matching any of the one or more open assays of the sample container.

According to further aspects of the disclosure, the system controller may be programmed to cause a sample container to be conveyed around the pre-analytic loop if none of the two or more analyzers has a functional assay matching any of the one or more open assays of the sample container.

According to further aspects of the disclosure, the system controller may be programmed to identify one or more open assays of each sample container based on the identification information detected by the pre-analytic scanner each time the sample container is conveyed around the pre-analytic loop, retain the sample container on the pre-analytic loop if none of the two or more analyzers has a functional assay that corresponds to any of the one or more open assays of the sample container and/or if a number of sample containers being transported on the recirculation loop is at least equal to the recirculation loop capacity limit, monitor the number of times the sample container traverses the pre-analytic loop and/or the period of time the sample container has been traversing the pre-analytic loop; and cause the sample container to be transferred from the pre-analytic loop to the container storage module if the number of times the sample container traverses the pre-analytic loop and/or if the period of time the sample container has been traversing the pre-analytic loop exceeds a limit.

According to further aspects of the disclosure, the system controller may be programmed to retain the sample container on the pre-analytic loop if none of the two or more analyzers has a functional assay that corresponds to any of the one or more open assays of the sample container and/or if a number of sample containers being transported on the recirculation loop is at least equal to the recirculation loop capacity limit.

According to further aspects of the disclosure, the system may include a shuttle module associated with each analyzer, and the shuttle module may be configured to translate a sample container between the associated buffer queue and the associated analyzer; and a pick-and-place robot associated with each analyzer, wherein the pick-and-place robot may be configured to transfer a sample container from the associated buffer queue to a sample container handoff position on the shuttle module, and the shuttle module may be configured to translate the sample container between the sample container handoff position and a pipetting location within the associated analyzer.

Aspects of the disclosure include a method for processing a plurality of samples with an automated system, wherein each sample is contained within a sample container and each sample container has machine-readable identification information associated therewith. The automated system may include a conveyance configured to transport sample containers; two or more analyzers operatively associated with the conveyance, wherein each analyzer may be configured to perform one or more functional assays on sample extracted from a sample container; a distinct analyzer software module associated with each analyzer operatively associated with the conveyance, wherein the identity of each of the one or more functional assays of each analyzer is stored in an analyzer database that is associated with the analyzer software module; a sample database storing identification information for each of the sample containers and in which the identification information is correlated with one or more open assays for each sample container, and wherein the sample database is independent of the analyzer software modules and analyzer databases; a buffer queue associated with each analyzer and configured to hold multiple sample containers diverted to the buffer queue from the conveyance; a scanner associated with each analyzer and configured to detect the machine-readable identification information associated with each sample container transported on the conveyance past the scanner; and at least one system controller in communication with each analyzer software module, the sample database, and each scanner. The method may include the steps of (A) with each scanner, detecting the machine-readable identification information associated with each sample container transported on the conveyance past the scanner; (B) with the system controller, accessing the sample database and identifying the one or more open assays for the sample container based on the identification information detected by the scanner; (C) with the system controller, communicating the one or more open assays of the sample container to the analyzer software module of the analyzer associated with the scanner; (D) with the analyzer software module of the analyzer associated with the scanner, comparing the one or more open assays of the sample container with the identity of each of the one or more functional assays stored in the analyzer database of the associated analyzer; (E) communicating an instruction from the associated analyzer software module to the system controller whether or not to divert the sample container from the conveyance into the associated buffer queue based at least in part on a result of the comparison of step (D).

According to further aspects of the disclosure, the method may include communicating an instruction from the associated analyzer software module to the system controller to divert the sample container from the conveyance into the associated buffer queue only if one of the one or more open assays for that sample container corresponds to one of the one or more functional assays of the analyzer associated with the buffer queue; or communicating an instruction from the associated analyzer software module to the system controller to not divert the sample container from the conveyance into the associated buffer queue if no open assay for that sample container corresponds to any functional assay of the analyzer associated with the buffer queue.

According to further aspects of the disclosure, the method may include step (F) storing an identity of each of one or more queued open assays in the associated analyzer database, wherein each queued open assay comprises the identity of at least one open assay of each sample container previously diverted into the associated buffer queue that corresponds to at least one functional assay of the associated analyzer and from which sample has not yet been extracted for performing one of the corresponding functional assays; (G) with the associated analyzer software module, comparing the one or more open assays communicated in step (C) with the identity of each of the one or more queued open assays stored in step (F); and (H) communicating an instruction from the associated analyzer software module to the system controller whether or not to divert the sample container from the conveyance into the associated buffer queue based at least in part on a result of the comparison of step (G).

According to further aspects of the disclosure, the method may include step (F) storing an identity of each of one or more queued open assays in the associated analyzer database, wherein each queued open assay comprises the identity of at least one open assay of each sample container previously diverted into the associated buffer queue that corresponds to at least one functional assay of the associated analyzer and from which sample has not yet been extracted for performing one of the corresponding functional assays; (G) with the associated analyzer software module, comparing the one or more open assays communicated in step (C) with the identity of a selected one of the one or more queued open assays stored in step (F); and (H) communicating an instruction from the associated analyzer software module to the system controller whether or not to divert the sample container from the conveyance into the associated buffer queue based at least in part on a result of the comparison of step (G).

According to further aspects of the disclosure, the method may include, upon receiving an instruction from the associated analyzer software module to divert the sample container from the conveyance into the associated buffer queue, the system controller causing the sample container to be diverted from the conveyance into the associated buffer queue.

According to further aspects of the disclosure, the conveyance may include a first track, and the system may include a container holder associated with each sample container for holding the associated sample container, wherein the first track may be configured to convey container holders on the first track.

According to further aspects of the disclosure, the conveyance may include a first track configured to convey sample containers thereon, and each buffer queue comprises a second track configured to convey the sample containers diverted into the buffer queue, and the automated system may include a container diverter configured to selectively divert a sample container from the first track to the second track. Causing the sample container to be diverted from the conveyance into the associated buffer queue may include the system controller causing the container diverter to divert the sample container from the first track onto the second track.

According to further aspects of the disclosure, the automated system may include an automated pipettor associated with each analyzer and configured to transfer a portion of a sample from a sample container to a process vessel within the associated analyzer. And the method may include the system controller causing the automated pipettor to transfer an amount of sample from the sample container diverted into the buffer queue to a process vessel within the associated analyzer; and the system controller causing the buffer queue to transport the sample container back to the conveyance.

According to further aspects of the disclosure, the conveyance may include a recirculation loop configured and controlled to repeatedly translate each sample container past the two or more analyzers, and wherein the method may include the system controller counting the number of times each sample container has traversed the recirculation loop or tracking the period of time each sample container has been on the recirculation loop; and the system controller causing the sample container to be conveyed off the recirculation loop if the sample container has traversed the recirculation loop a prescribed number of times or for a prescribed period of time.

According to further aspects of the disclosure, the conveyance may include a recirculation loop configured and controlled to repeatedly translate each sample container past the two or more analyzers, and the automated system may include an automated pipettor associated with each analyzer and configured to extract a portion of a sample from a sample container and a recirculation scanner operatively associated with the recirculation loop and configured to detect the machine-readable identification information associated with each sample container transported on the recirculation loop past the recirculation scanner. The system controller may be in communication with the recirculation scanner, and the method may include, after causing the sample container to be diverted from the conveyance into the associated buffer queue, the system controller causing the automated pipettor to extract sample from the sample container to perform one of the one or more open assays of the sample container with the associated analyzer; revising the sample database to update the open assays correlated with the sample identification information for the diverted sample container by changing the status of the open assay performed by the associated analyzer; the recirculation scanner detecting the machine-readable identification information associated with each sample container transported on the recirculation loop past the recirculation scanner; the system controller accessing the sample database and identifying the one or more open assays for the sample container for which sample has not been extracted based on the identification information detected by the recirculation scanner; and the system controller causing the sample container to be conveyed off the recirculation loop if there are no remaining open assays for the sample container.

According to further aspects of the disclosure, the method may include the system controller counting the number of times each sample container has traversed the recirculation loop or tracking the period of time each sample container has been on the recirculation loop; and the system controller causing the sample container to be conveyed off the recirculation loop if the sample container has traversed the recirculation loop a prescribed number of times or for a prescribed period of time.

According to further aspects of the disclosure, the automated system may include a container storage module configured to hold a plurality of sample containers, and the method may include the system controller causing the sample container to be transferred to the container storage module if there are no more open assays for the sample container or the sample container has traversed the recirculation loop the prescribed number of times or for a prescribed period of time.

According to further aspects of the disclosure, the automated system may include a pick-and-place robot configured to transfer sample containers between the conveyance and the container storage module, and the system controller may be in communication with the pick-and-place robot. Causing the sample container to be transferred to the storage module may include the system controller activating the pick-and-place robot to transfer the sample container from the conveyance to the storage module.

According to further aspects of the disclosure, the method may include removing a cap from a sample container with a decapper or detecting a liquid level within at least a portion of the sample containers with a liquid level detection module.

According to further aspects of the disclosure, the method may include with a sample transfer module, transferring sample from at least one first type of sample container to at least one second type of sample container; and the system controller causing each second type sample container to be transferred from the sample transfer module to the conveyance.

According to further aspects of the disclosure, the conveyance may include a pre-analytic loop at which sample containers are provided to the system, and the automated system may include a pre-analytic scanner operatively associated with the pre-analytic loop and configured to detect the machine-readable identification information associated with each sample container transported on the pre-analytic loop past the pre-analytic scanner. The system controller may be in communication with the pre-analytic scanner, and the method may include the pre-analytic scanner detecting the machine-readable identification information associated with each sample container transported on the pre-analytic loop past the pre-analytic scanner; the system controller accessing the sample database and identifying the one or more open assays for the sample container based on the identification information detected by the pre-analytic scanner; the system controller comparing the one or more open assays for the sample container with the functional assays stored in all analyzer databases and/or comparing the number of sample containers being transported on the recirculation loop with a recirculation loop capacity limit; and with the system controller, causing a sample container to be transferred from the pre-analytic loop to the recirculation loop if one or more functional assays of the two or more analyzers correspond to at least one of the one or more open assays of the sample container and/or if the number of sample containers being transported on the second loop segment is less than the second loop segment capacity limit.

According to further aspects of the disclosure, the automated system may include a container storage module configured to receive sample containers, and the method may include the system controller causing a sample container on the pre-analytic loop to be transferred from the pre-analytic loop to the container storage module if none of the two or more analyzers has a functional assay matching any of the one or more open assays of the sample container.

According to further aspects of the disclosure, the method may include the system controller causing a sample container to be conveyed around the pre-analytic loop if none of the two or more analyzers has a functional assay matching any of the one or more open assays of the sample container.

According to further aspects of the disclosure, the method may include the system controller identifying one or more open assays of each sample container based on the identification information detected by the pre-analytic scanner each time the sample container is conveyed around the pre-analytic loop, the system controller causing the sample container to be retained on the pre-analytic loop if none of the two or more analyzers has a functional assay that corresponds to any of the one or more open assays of the sample container and/or if a number of sample containers being transported on the recirculation loop is at least equal to the recirculation loop capacity limit, the system controller monitoring the number of times the sample container traverses the pre-analytic loop and/or the period of time the sample container has been traversing the pre-analytic loop; and the system controller causing the sample container to be transferred from the pre-analytic loop to the container storage module if the number of times the sample container traverses the pre-analytic loop and/or if the period of time the sample container has been traversing the pre-analytic loop reaches a limit.

According to further aspects of the disclosure, the method may include the system controller causing the sample container to be retained on the pre-analytic loop if none of the two or more analyzers has a functional assay that corresponds to any of the one or more open assays of the sample container and/or if a number of sample containers being transported on the recirculation loop is at least equal to the recirculation loop capacity limit.

Aspects of the disclosure include a method for processing a plurality of samples with an automated system, wherein each sample is contained within a sample container, and each sample container has machine-readable identification information associated therewith. The automated system may include a sample database storing identification information for each of the sample containers that is correlated with one or more open assays for each sample container; a conveyance configured to transport sample containers; a container storage module operatively associated with the conveyance and configured to receive sample containers from the conveyance and hold a plurality of sample containers; a scanner operatively associated with the conveyance and configured to detect the machine-readable identification information associated with each sample container transported on the conveyance; at least one analyzer operatively associated with the conveyance and configured to perform the one or more functional assays on sample material extracted from a sample container, wherein the one or more functional assays include at least one of the one or more open assays; and at least one system controller in communication with the sample database, the conveyance, and the scanner. The method may include (A) with the system controller, causing each sample container to be automatically transported by the conveyance to the at least one analyzer; (B) at the analyzer, automatically extracting an amount of sample from the sample container so that one of the one or more open assays can be performed on the extracted sample by the analyzer; (C) revising the sample database to update the open assays correlated with the sample identification information for the sample container by changing the status of the open assay for which sample was extracted in step (B); (D) with the scanner, detecting the machine-readable identification information associated with the sample container; (E) with the system controller, accessing the sample database and identifying any open assay(s) for the sample container for which sample has not been extracted based on the identification information detected by the scanner; (F) if one or more open assays are identified for the sample container in step (E), repeating steps (A) through (E) for each of the one or more open assays; (G) if no open assays are identified for the sample container in step (E), with the system controller, causing the sample container to be transferred from the conveyance to the container storage module; (H) with the system controller, receiving additional test instructions for the sample container after the sample container has been transferred to the container storage module, wherein the additional test instructions are based on results of at least one of the one or more open assays for which sample was extracted in step (B); (T) with the system controller, causing the sample container for which additional test instructions have been received to be transferred from the container storage module to the conveyance; and (J) with the system controller, causing the sample container to be transferred by the conveyance to the at least one analyzer to extract sample for the additional test instructions.

According to further aspects of the disclosure, the additional test instructions include one or more of repeating an open assay because of an error encountered in previously performing the open assay; reflex testing; and performing an assay that is different from the one or more open assays to detect a different analyte.

According to further aspects of the disclosure, the conveyance may include a first loop segment and a second loop segment, the container storage module is operatively associated with the first loop segment, and the at least one analyzer is operatively associated with the second loop segment.

According to further aspects of the disclosure, the method may include, with the system controller, monitoring the functional assays of all analyzers and comparing the additional test instructions with the functional assays of all analyzers; and performing step (I), only if the additional test instructions correspond to at least one functional assay.

According to further aspects of the disclosure, the method may include, with the system controller, monitoring the number of sample containers being transported on the second loop segment and comparing the number of sample containers being transported on the second loop segment with a second loop segment capacity limit, and performing step (I), only if the additional test instructions correspond to at least one functional assay and the number of sample containers being transported on the second loop segment is less than the second loop segment capacity limit.

According to further aspects of the disclosure, the one or more of the sample containers includes a penetrable cap, and step (B) comprises extracting sample material through the penetrable cap without removing the penetrable cap from the sample container.

According to further aspects of the disclosure, the method may include (K) with the system controller, monitoring the number of sample containers being transported on the second loop segment; (L) with the system controller, comparing the number of sample containers being transported on the second loop segment with a second loop segment capacity limit; (M) with the system controller, causing the sample container to be retained on the first loop segment if the number of sample containers being transported on the second loop segment is at least equal to the second loop segment capacity limit, and causing the sample container to be transported around the first loop segment until the number of sample containers being transported on the second loop segment is less than the second loop segment capacity limit, and (N) with the system controller, causing the sample container to be transferred from the first loop segment to the second loop segment if the number of sample containers being transported on the second loop segment is less than the second loop segment capacity limit.

According to further aspects of the disclosure, the automated system may include a diverter operatively associated with the first loop segment, and step (M) comprises, with the system controller, causing the diverter to be configured in a first configuration preventing a sample container from being transferred from the first loop segment to the second loop segment, and step (N) comprises, with the system controller, causing the diverter to be configured in a second configuration causing a sample container to be transferred from the first loop segment to the second loop segment.

According to further aspects of the disclosure, step (D) comprises detecting the machine-readable identification information associated with each sample container as the sample container is transported past the scanner on the conveyance.

According to further aspects of the disclosure, the automated system may include an input module configured to hold sample containers, and the method may include, with the system controller, causing sample containers to be transferred from the input module to the first loop segment.

According to further aspects of the disclosure, the method may include determining, with the input module, at least one of a height and width of the container, a shape of a bottom of the container, and whether the container is capped.

According to further aspects of the disclosure, the method may include one or more of removing a cap from a sample container with a decapper; and detecting a liquid level within at least a portion of the sample containers with a liquid level detection module.

According to further aspects of the disclosure, the method may include with a sample transfer module, transferring sample material from at least one first type of sample container to at least one second type of sample container; and with the at least one system controller, causing each second type sample container to be transferred from the sample transfer module to the conveyance.

According to further aspects of the disclosure, the automated system may include at least one container transfer robot configured to transfer sample containers between the conveyance and the container storage module, and the system controller may be in communication with the container transfer robot, step (G) comprises, causing the container transfer robot to transfer the sample container from the conveyance to the container storage module, step (T) comprises causing the container transfer robot to transfer the sample container from the container storage module to the conveyance, and step (G) and step (I) are performed with the same container transfer robot or different container transfer robots.

Aspects of the disclosure include a non-transitory, computer-readable storage medium encoded with computer-executable instructions which, when executed by a computer, cause the computer the execute any of the methods described above.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

DETAILED DESCRIPTION

Figure 1:
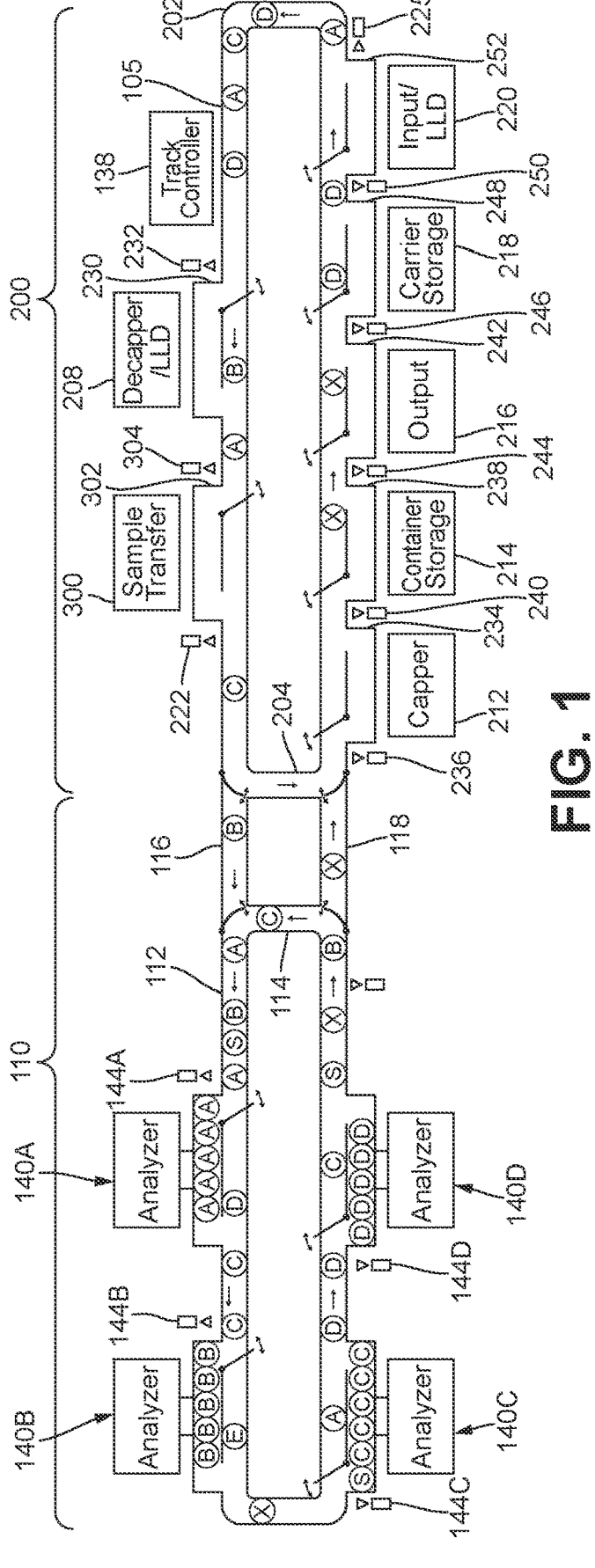
FIG. 1 is a schematic view of an automated sample processing system.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Definitions

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use various terms describing relative spatial arrangements and/or orientations or directions in describing the position and/or orientation of a component, apparatus, location, feature, or a portion thereof or direction of movement, force, or other dynamic action. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, clockwise, counter-clockwise, etc., are used for convenience in referring to such component, apparatus, location, feature, or a portion thereof or movement, force, or other dynamic action in the drawings and are not intended to be limiting.

Unless otherwise indicated, or the context suggests otherwise, terms used herein to describe a physical and/or spatial relationship between a first component, structure, or portion thereof and a second component, structure, or portion thereof, such as, attached, connected, fixed, joined, linked, coupled, or similar terms or variations of such terms, shall encompass both a direct relationship in which the first component, structure, or portion thereof is in direct contact with the second component, structure, or portion thereof or there are one or more intervening components, structures, or portions thereof between the first component, structure, or portion thereof and the second component, structure, or portion thereof.

Furthermore, unless otherwise stated, any specific dimensions mentioned in this description are merely representative of an exemplary implementation of a device embodying aspects of the disclosure and are not intended to be limiting.

The use of the term "about" applies to all numeric values specified herein, whether or not explicitly indicated. This term generally refers to a range of numbers that one of ordinary skill in the art would consider as a reasonable amount of deviation to the recited numeric values (i.e., having the equivalent function or result) in the context of the present disclosure. For example, and not intended to be limiting, this term can be construed as including a deviation of ±10 percent of the given numeric value provided such a deviation does not alter the end function or result of the value. Therefore, under some circumstances as would be appreciated by one of ordinary skill in the art a value of about 1% can be construed to be a range from 0.9% to 1.1%.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, the terms "optional" and "optionally" mean that the subsequently described, component, structure, element, event, circumstance, characteristic, property, step, etc. may or may not be included or occur and that the description includes instances where the component, structure, element, event, circumstance, characteristic, property, step, etc. is included or occurs and instances in which it is not or does not.

References in the specification to "one embodiment," "an embodiment," a "further embodiment," "an example embodiment," "some aspects," "a further aspect," "aspects," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic is also a description in connection with other embodiments whether or not explicitly described.

Reactions or processes: According to various embodiments, reactions or processes can comprise one or more of a sample preparation process, a washing process, a sample purification process, a pre-amplification process, a pre-amplified product purification process, an amplification process, an amplified product purification process, a separation process, a sequencing process, a sequencing product purification process, a labeling process, a detecting process, or the like. An amplification process may include a nucleic acid-based amplification reaction, such as, for example, a polymerase chain reaction (PCR).

Processing components: Processing components can comprise components performing reactions or processes and include sample preparation components, purification components, pre-amplification reaction components, amplification reaction components, sequencing reaction components, detecting components or the like.

Assay: As used herein, the term "assay" refers to a procedure for detecting and/or quantifying an analyte in a sample. A sample comprising or suspected of comprising the analyte is contacted with one or more reagents and subjected to conditions permissive for generating a detectable signal informative of whether the analyte is present or the amount (e.g., mass or concentration) of the analyte in the sample.

Analyzer: As used herein, the term "analyzer" refers to an automated instrument that is capable of performing one or more steps of an assay, including the step of determining the presence or absence of one or more analytes suspected of being present in a fluid sample. Automated clinical analyzers ("analyzers") may comprise one or more processing components and include molecular testing instrument, clinical chemistry analyzers, automated immunoassay analyzers, or any other type of in vitro diagnostics (IVD) testing analyzers. Generally, an analyzer performs a series of automated reactions or processes, such as, IVD tests on a plurality of patient samples. Patient samples may be loaded into an analyzer (manually or via an automated system), which can then perform one or more reactions or processes, such as, immunoassays, chemistry tests, or other observable tests on each sample.

Carrier: A carrier is a transportation unit that can be used to move sample containers (and, by extension, fluid samples) or other items in a sample processing system. In some embodiments, carriers may be traditional automation pucks (e.g., passive devices comprising a holder for engaging a tube or item, a friction surface to allow an external conveyor belt in an automation track to provide motive force, and a plurality of sides, or a continuous, circular side, that allow the puck to be guided by walls or rails in the track to allow the track to route the carrier to its destination). In some embodiments, carriers may include active components, such as processors, motion systems, guidance systems, sensors, and the like. In some embodiments, carriers can include onboard intelligence that allows carriers to be self-guided between points in an automation system. In some embodiments, carriers can include onboard components that provide motive forces while, in others, motive forces may be provided by an automation surface, such as a track. In some embodiments, carriers move along tracks that restrict motion to a single direction (e.g., fore and aft) between diversion points. Carriers may be specialized to a given payload in an IVD environment, such as having a tube holder to engage and carry a sample container or may include mounting surfaces suitable to carry different items around an automation system. Carriers can be configured to include one or more slots (e.g., a carrier may hold one or a plurality of sample containers).

In vitro diagnostics (IVD): In vitro diagnostics (IVD) are tests that can detect diseases, conditions, infections, metabolic markers, or quantify various constituents of bodily materials/fluids. IVD testing generally utilizes medical devices intended to perform diagnoses from assays in a test tube or other reaction or process vessel or, more generally, in a controlled environment outside a living organism and includes testing and diagnosis of disease or quantifying various constituents of bodily materials/fluids based on assays performed on patient fluid samples.

Module: A module is a component that performs specific task(s) or function(s). Examples of modules may include: a pre-analytic module, which manipulates a sample container or prepares a sample for analytic testing, (e.g., a decapper module, which removes a cap from a sample container, a centrifuge, a liquid level detection module, etc.), an analytic module, such as an analyzer, which extracts a portion of a sample from a sample container and performs tests, assays, or other process comprising one or more reactions, processes, or process steps; a post-analytic module, which prepares a sample container for storage after analytic testing (e.g., a capper, or recapper, module, which reseals a sample container); or a sample container handling module, such as an input module, an output module, or a storage module.

Conveyor, Conveyance, Track: As used herein, the terms "conveyor," "conveyance," or "track" refer to a mechanical apparatus for transporting articles (e.g., containers or carriers, which may or may not be holding containers) from one location to another along a defined path. Non-limiting examples of exemplary conveyors include robots, belts (such as, for example, a moving belt, a shuttle/carriage moving on a track, rail, etc.), magnetic devices, gear systems, cable systems, vacuum systems, automated cars with wheels, etc. The terms may be used to refer to entire apparatus for transporting the article from a first location to a second location or to a discrete portion, or extent, of the apparatus.

Computer or processor: A computer or processor may refer to one or more computers or processors and/or related software and processing circuits. This may include single or multicore processors, single or multiple processors, embedded systems, or distributed processing architectures, as appropriate, for implementing the specified function or functions in each embodiment.

Buffer Queue: The term buffer queue may be used to refer to a track section that is off the main portion of a track system. Buffer queues may include, parallel tracks, or other suitable means for separating some sample containers and associated carriers (if applicable) from a primary traffic pattern. In the present disclosure, a buffer queue may be associated with an analyzer or other processing module and receives sample containers, and associated carriers (if applicable), from a main conveyance track and holds the sample containers until such time as one or more of the sample containers held in the buffer queue can be processed in a accordance with processing decision logic described herein.

Sample, sample material, or sample fluid: These terms refer to the contents of a sample container, such as samples taken from an industrial or municipal material storage or processing system for chemical or biological testing or biological samples taken from a patient (human or animal) and may include blood (whole blood, blood serum, blood plasma), urine, hematocrit, amniotic fluid, interstitial fluid, phlegm, urine, fecal matter, semen, mucus, pus, tissue, food, or any other fluid suitable for performing assays or tests upon. Samples may sometimes refer to calibration fluids or other fluids used to assist an analyzer in processing other patient samples.

STAT (short turnaround time) sample: Samples may have different priority assigned by a laboratory information system (LIS) or operator to assign STAT priority to samples that should take precedence over non-STAT samples in the processing system.

Station: A station includes a portion of a system, i.e., a subsystem, which performs a specific task or function, or multiple tasks or functions within the system.

Sample containers: Samples may be carried in containers, such as test tubes, vials, or other suitable receptacles or vessels, to allow conveyor tracks or other conveyances—and optionally with carriers holding the sample containers—to transport samples without contaminating the conveyance or carrier surfaces. In some embodiments, in which the sample container is of a configuration able to rest upright without undue risk of tipping, sample containers may be carried directly by a conveyor without the need of a supporting carrier.

System Overview

The automated sample processing system described herein provides hardware and software interfaces to enable analyzer connectivity with automated track, or conveyor, systems in a manner that maximizes efficiency and throughput as compared to prior art systems. The automated sample processing system described herein provides a mechanical and software interface between analyzers in which multiple samples are processed simultaneously in a multi-vessel receptacle apparatus and an automated conveyor system or conveyance, e.g., a container-transporting track system. This will enable laboratories to interconnect several such analyzers to form one analytical system with the option to include pre- and post-analytical processing and sample archiving. The system may incorporate a mechanism for transferring a sample container from the track system to the analyzer, such as an electromechanical shuttle module that will accept the placement of a sample container from a pick-and-place robot (i.e., a container moving mechanism comprising an electromechanical device that translates a container in the X, Y, and/or Z directions), and then automatically transfer the sample container into a sample transfer location within the analyzer where a sample transfer robot, such as an automated pipettor, transfers sample material from the sample container to a receptacle apparatus. Once sample transfer from the sample container into a receptacle apparatus within the analyzer (e.g., by pipetting) is complete, the sample container will be shuttled back to a pick-and-place position where the pick-and-place robot will remove the sample container from the shuttle and replace it on the track system. This disclosure may refer to conveying, transferring, transporting, or otherwise moving a sample container within the system, between components or modules of the system, or within a specific component or module of the system. Unless otherwise specified, such disclosure may encompass moving the sample container alone or moving the sample container in combination with a supporting carrier, as generally applicable to the system described (i.e., whether the system does or does not employ carriers for releasably holding and supporting sample containers).

As opposed to analyzers in which assays or other processes are performed within separate, discrete reaction vessels, each analyzer of the sample processing system described herein is configured to perform an assay, or process, within a receptacle apparatus comprising a process number of two or more operatively associated discrete process vessels. Accordingly, an assay can be performed simultaneously on a process number of samples in separate vessels of a multi-vessel receptacle apparatus. In an embodiment, the receptacle apparatus comprises five interconnected test tubes (as described in further detail below), and an assay can be performed by an analyzer on five different samples within each of the five test tubes in parallel. Alternatively, the discrete, operatively associated process vessels may be held in a rack that holds a process number of vessels.

Therefore, to maximize analyzer throughput and efficiency, it is desirable to identify a process number of different samples (e.g., according to various embodiments, two, three, four, five, six, etc.) requiring the same assay so that sample material can be transferred from each of the process number of different sample containers to each of the process number of process vessels, and the analyzer can simultaneously perform an assay on a process number of samples. On the other hand, performing an assay on the contents of a receptacle apparatus in which less than all the process vessels contain a sample may negatively impact the throughput and efficiency of the analyzer.

Sample containers are delivered to the analyzers via an automated track system. In some examples, sample containers may be held in a carrier on the track system. In order for a track system to route and distribute sample containers to the appropriate analyzers, a system controller (which may comprise one or more individual controllers) monitors what assay(s) each analyzer of the system is configured, or equipped, to perform and what assays are required (variously referred to herein as "open assay(s)" or "assay order(s)" or "open order(s)") for each sample container within the system. For shorthand, this disclosure may refer to one or more assays required of a sample container. A person of ordinary skill in the art will appreciate, however, that it is the sample contained in the sample container, and not the sample container itself, for which one or more assays have been ordered and will be required.

Exemplary carriers for releasably holding a sample container and transporting the sample container on pre-/post-analytic track 202 are described in U.S. Pat. Nos. 7,485,264, 8,147,778, 10,041,965, and 10,386,381; U.S. Published Patent Application Nos. 2006/0222573; 2017/0153262; 2017/0248623; and 2018/0052183; and U.S. patent application Ser. No. 17/003,754. The individual carriers may be conveyed by motive elements, e.g., a conveyor, associated with the track or the carrier itself may be self-propelled along a passive track. Exemplary conveyor track assemblies and instruments are described in U.S. Pat. Nos. 9,766,258 and 9,776,811 and U.S. Published Patent Application No. 2017/0254827 and are embodied in commercially available systems from FlexLink, Inpeco (Flexlab, FlexLab-HT, etc.), Integrated Drive Systems (e.g., IDS-CLAS-Xl), Thermo Fisher Scientific, Hitachi, MagneMotion, GLP, etc. In an embodiment in which the sample containers are self-supporting on a container conveyance, a carrier for supporting the sample container may be omitted.

An analyzer is "configured" to perform one or more assays, or processes, by, for example, having the proper and sufficient materials (e.g., reagents, buffer solutions, probes, etc.) on board for performing the assay(s), having the proper and sufficient consumables on board for performing the assay(s) (e.g., disposable pipette tips, disposable processing or reaction receptacles, disposable multi-vessel receptacle apparatus, etc.), having sufficient liquid and solid waste capacity, having the proper processing modules on board for performing the assay(s) (e.g., one or more substance transfer devices (e.g., pipettors), incubators set at appropriate temperature(s), sample purification modules, detectors, centrifuges, etc.), and having executable software for performing the assay(s) (i.e., the analyzer is programmed to perform the assay). An assay or other process that an analyzer is configured to perform may be referred to herein as a "functional assay" or "functional process" of the analyzer. Each analyzer may be configured to perform more than one functional assay and two or more analyzers may be configured to perform one or more of the same functional assay(s) or entirely different functional assay(s). The functional assay(s) that an analyzer is configured to perform may vary with time as one or more resources required to perform an assay become depleted and before the resources or after the resources are replenished.

In one embodiment, after sample containers have been placed into an input module of the system, each sample container is individually scanned for its identification information (e.g. barcode or radio frequency ID), which may include a patient ID. The sample identification information for each of the sample containers introduced into the system is stored in a first controller, known in one embodiment as a Workflow Management System ("WMS"). The WMS will query a laboratory information system ("LIS") against the sample identification to identify assay orders (open assays) for each associated sample container. The WMS will then update its sample container data structure (e.g. in a sample database) with all open assays correlated to sample identification information for each sample container.

The WMS is also responsible for running the appropriate workflow(s) for any particular assay. Therefore, the WMS will run assay specific workflows which may include pre- and post-analytical steps such as centrifuging, decapping, aliquoting, storage, reflex testing, capping, etc. After any required pre-analytical steps are performed, sample containers will be routed from a pre-/post-analytic segment of the system to an analytic segment of the system if there is at least one analyzer on the analytic segment having a functional assay matching an open assay of the sample container and if there is sufficient room on the analytic segment for an additional sample container.

Movement of sample containers from the pre-/post-analytic segment into the analytic segment may be controlled by an "introduction diverter," or gate, which is configured and controlled to yield routing priority to sample containers already within the analytic segment. In some embodiments, a second controller, known as a track controller, controls basic operation of the track and will route each sample container to the first analyzer. A scanner (e.g., a bar code or radio frequency identification ("RFID") scanner) associated with each analyzer reads the sample identification associated with each sample container, and the sample identification code will be passed to the WMS to thereby access the open assays for that sample container. The WMS will then query the analyzer with the open assays for that sample container and that data is compared to data stored within an analyzer software module relating to the one or more functional assays of the associated analyzer. The analyzer software module will respond to the WMS with an instruction to either divert (i.e., a "divert instruction") or to not-divert (a "no-divert instruction") the sample container into the buffer queue of the associated analyzer based on whether there is a match between at least one open assay of the sample container and the one or more functional assays of the analyzer. If a divert message is received, the WMS will instruct the track controller to activating a diverter to divert the sample container into a buffer queue associated with the analyzer. If a not-divert message is received, the sample container will be routed to next analyzer within the analytic segment.

The process is repeated, with each subsequent sample container on the track scanned to identify the open assay(s) for that sample container and the sample container diverted into the buffer queue if the associated analyzer is configured to perform an open assay (i.e., the open assay of the sample container matches a functional assay of the analyzer), until a process number of sample containers requiring a particular assay are held in the buffer queue. In one embodiment, to group sample containers requiring a particular assay, once a sample container requiring the particular assay is diverted to the buffer queue, only sample containers requiring that specific assay will also be diverted to that buffer queue until a process number of sample containers have been diverted—even if the analyzer is able to perform other assays required of other sample containers that do not require the specific assay.

Once a process number of sample containers requiring a particular assay are accumulated in the buffer queue, the sample containers are transferred, one-by-one, into the analyzer, e.g., by the shuttle module, and an amount of sample material is transferred from each sample container to one process vessel of a receptacle apparatus within the analyzer. After a process number of samples have been transferred from a process number of sample containers to a process number of process vessels of a receptacle apparatus, the particular assay is performed within the analyzer on each of the process number of samples in the receptacle apparatus.

After each sample container has been transferred into the analyzer, and sample has been transferred to the receptacle apparatus, the sample container is returned to the track. The analyzer software module will send a message to the WMS updating the sample container's data with information including remaining open assays and status codes (e.g., errors, such as, pipetting anomalies and unreadable barcode, and a test order status update message (described below)). Assays that have been performed on the sample will be removed from the sample container's open assays list by the analyzer software module. The analyzer may also update its own status at this time as well (e.g., analyzer's assay inventory, etc.).

Sample containers placed back onto the track will travel to the next analyzer in the analytic segment attempting to complete any remaining open assays. If a sample container travels an entire loop of the analytic segment and arrives at a "recirculation diverter" with open assays and there are analyzers that can process the open assays (as determined by the WMS in communication with the analyzer software modules), the sample container will be recirculated to the first analyzer within the analytic segment while the WMS increments the sample container's priority value by 1. If a sample container has open assays but there are no analyzers available to process the open orders, (as determined by WMS in communication with the analyzer software modules), or if the sample container has no open test orders, or there are critical sample container errors, the sample container will be diverted out of the analytic segment for post-analytical processing.

Description of Illustrated Embodiments

FIG. 1 illustrates an automated sample processing system 100 for processing a plurality of samples, each carried in a distinct sample container. System 100 includes a track or other conveyance 105 for carrying each of a plurality of sample containers A, B, C, D, S, and X between each of a number of modules that perform one or more pre- or post-analytic steps on the container and one or more analyzers that extract sample material from the sample container and perform assays on the extracted material.

In the illustrated embodiment, the system 100 includes a pre-/post-analytic segment 200 with a pre-/post-analytic track 202. System 100 further includes an analytic segment 110 including an analytic track 112 and a plurality of analyzer stations 140A, 140B, 140C, and 140D, each analyzer station being operatively associated as described herein with analytic track 112. In some embodiments, analytic segment 110 may include a recirculation segment 114 in addition to analytic track 112 to form a continuous track, or recirculation loop (which may be referred to herein, or in the appended claims, as a second loop segment, analytic loop, or analytic loop segment), for conveying sample containers through the analytic segment 110. In the illustrated embodiment, containers move counterclockwise around the continuous loop formed by recirculation segment 114 and analytic track 112. Introduction track segment 116 and outlet track segment 118 connect the pre-/post-analytic track 202 and analytic track 112.

System 100 may include a track controller 138 which, as described above, provides high-level control of electromechanical track components as instructed by the WMS.

Figure 2:
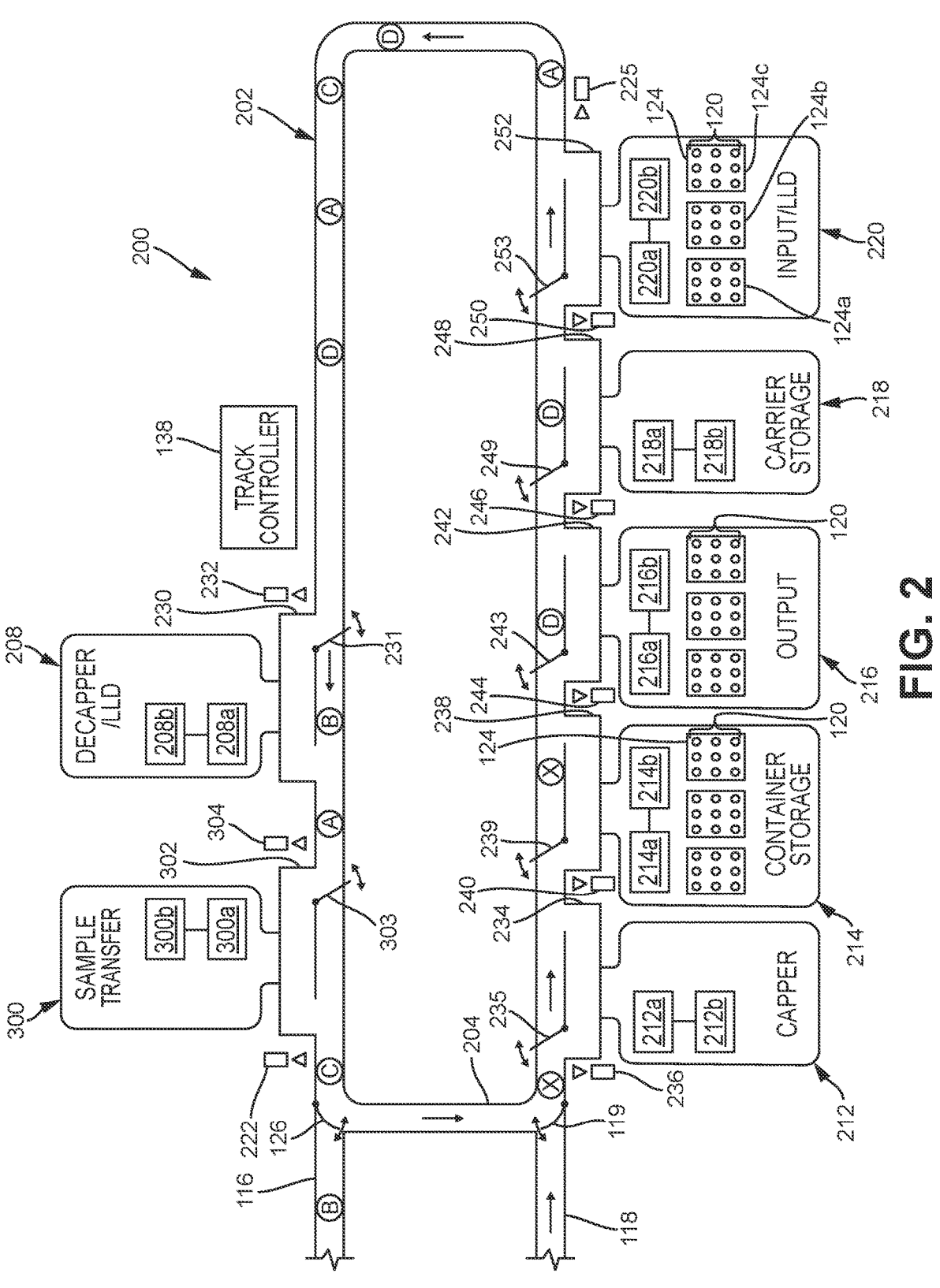
FIG. 2 is a schematic view of a pre-/post-analytic segment of the automated sample processing system.

Features of the pre-/post-analytic segment 200 are shown in FIG. 2. Pre-/post-analytic segment 200 includes the pre-/post-analytic track 202 and may include a number of modules, such as, a capper module 212, a container storage module 214, and an output module 216, a carrier storage module 218, an input module 220, a decapper module 208, and a sample transfer module 300, each operatively associated with track 202 as described herein. Pre-/post-analytic segment 200 may include a pre-analytic return segment 204 in addition to the pre-/post-analytic track 202, thereby forming a continuous loop (which may be referred to herein, or in the appended claims, as a first loop segment, preanalytic loop, or pre-analytic loop segment) for conveying sample containers. In the illustrated embodiment, containers move counterclockwise around the continuous loop formed by pre-analytic return segment 204 and pre-/post-analytic track 202.

Decapper module 208 comprises a device for automatically removing a cap from a sample container. The module may remove a cap from a sample container while the sample container is on the pre-/post-analytic track 202, or the module may remove the sample container from the pre-/post-analytic track 202, remove the cap from the sample container, and return the uncapped sample container to the pre-/post-analytic track 202. Decapper module 208 may include a dedicated sub-controller 208a that cooperatively communicates with the main system controller (e.g., the WMS). Track 202 may include a buffer queue 230 associated with decapper module 208 for holding sample containers off the main container traffic lane of the pre-/post-analytic track 202 while the containers are waiting to be decapped, and, after the containers are decapped, while they are waiting to be returned to the pre-/post-analytic track 202. A diverter 231, e.g., a pivotable gate, may be selectively deployed (moved from a non-diverting position to a diverting position as shown in FIG. 2) by track controller 138, as instructed by the WMS, to divert a sample container and carrier, if applicable, from the pre-/post-analytic track 202 into the buffer queue 230. A container transfer robot 208b, such as a pick-and-place robot, may be provided to move a container from the buffer queue 230 into the decapper module 208 to be decapped, or the container may be decapped while on the buffer queue 230. A scanner 232 (e.g., a barcode scanner or RFID scanner and/or a machine vision scanner) may be associated with decapper 208 for scanning and identifying containers while the containers are on the pre-/post-analytic track 202 to determine if the container should be diverted from the pre-/post-analytic track 202 into the buffer queue 230. Whether the container includes a cap needing to be removed by the decapper module 208 could be included among the information stored in the sample database for the container and correlated with the machine-readable container identification information detected by a barcode scanner or RFID scanner. Information stored for the container may also include the type of container so that decapper module 208 knows what type of cap is being removed—e.g., a threaded cap or a stopper and the size of the cap or stopper. Alternatively, or in addition, whether the container includes a cap needing to be removed by the decapper module 208 could be determined by a machine vision scanner. After a cap is removed, container data correlated with the machine-readable container identification information may be updated to indicate that the container lacks a cap.

Capper module 212 comprises a device for automatically placing a cap on a sample container. The module may place a cap on a sample container while the sample container is on the pre-/post-analytic track 202, or the module may remove the sample container from the pre-/post-analytic track 202, place the cap on the sample container, and return the capped sample container to the pre-/post-analytic track 202. Capper module 212 may include a dedicated sub-controller 212a that cooperatively communicates with the main system controller (e.g., the WMS). Track 202 may include a buffer queue 234 associated with capper module 212 for holding containers off the main container traffic lane of the pre-/post-analytic track 202 while the containers are waiting to be capped, and, after the containers are capped, while they are waiting to be returned to the pre-/post-analytic track 202. A diverter 235, e.g., a pivotable gate, may be selectively deployed (moved from a non-diverting position to a diverting position as shown in FIG. 2) by track controller 138, as instructed by the WMS, to divert a sample container and carrier, if applicable, from the track 202 into the buffer queue 234. A container transfer robot 212b, such as a pick-and-place robot, may be provided to move a container from the buffer queue 234 into the capper module 212 to be capped, or the container may be capped while on the buffer queue 234. A scanner 236 (e.g., a barcode scanner or RFID scanner and/or a machine vision scanner) may be associated with capper module 212 for scanning and identifying containers while the containers are on the track 202 to determine if the container should be diverted from the track 202 into the buffer queue 234. Whether the container needs to be capped by the capper module 212 could be included among the information stored in the sample database for the container and correlated with the machine-readable container identification information detected by a barcode scanner or RFID scanner. Information stored for the container may also include the type of container so that capper module 212 knows what type of cap is being replaced—e.g., a threaded cap or a stopper and the size of the cap or stopper. Alternatively, or in addition, whether the container needs to be capped by the capper module 212 could be determined by a machine vision scanner. After a container is capped, container data correlated with the machine-readable container identification information may be updated to indicate that the container is capped.

Exemplary capper modules and decapper modules are described in U.S. Pat. Nos. 6,321,619 and 7,152,504.

Container storage module 214 is configured to receive sample containers from track 202 and to hold sample containers 120, e.g., on one or more sample container racks 214, either temporarily until such time as the sample container can be returned to the pre-/post-analytic track 202, or after all processing of the sample container is complete, e.g., no remaining open assays, and then the sample container can be removed from the container storage module 214 and thus from the system 100. In various embodiments, sample containers can be removed from the container storage module en masse by removing one or more rack(s) holding sample containers. In some embodiments, the container storage module may include a user access point at which a user can remove single sample containers by instruct the system to present the sample container to be removed to the user access point. Container storage module 214 may comprise a refrigerated (or otherwise temperature-controlled) housing within which sample containers are stored. The temperature within the housing may be controlled by a system controller (as described below) that controls one or more heating and/or cooling devices (e.g., Peltier thermoelectric devices, fan(s), etc.) based on signals from one or more temperature sensors. Container storage module 214 may include a dedicated sub-controller 214a that cooperatively communicates with the main system controller (e.g., the WMS). Track 202 may include a buffer queue 238 associated with container storage module 214 for holding sample containers off the main container traffic lane of the pre-/post-analytic track 202 while the containers are waiting to be transferred to the container storage module 214, and, for sample containers being returned to the pre-/post-analytic track 202, while the containers are waiting to be returned to the pre-/post-analytic track 202. A diverter 239, e.g., a pivotable gate, may be selectively deployed (moved from a non-diverting position to a diverting position as shown in FIG. 2) by track controller 138, as instructed by WMS, to divert a sample container and carrier, if applicable, from the track 202 into the buffer queue 238. A container transfer robot 214b, such as a pick-and-place robot, may be provided to move a container from the buffer queue 238 into the container storage module 214 or from the container storage module 214 to the buffer queue 234. A scanner 240 (e.g., a barcode scanner or RFID scanner) may be associated with container storage module 214 for scanning and identifying containers while the containers are on the pre-/post-analytic track 202. Scanner 240 is in communication with the WMS, which instructs the track controller 138 to deploy the diverter 239 to divert the container if, based on stored information correlated to the machine-readable container identification information, the container is to be moved from the track 202 to the container storage module 214.

Output module 216 is configured to receive sample containers from the track 202 and to hold sample containers 120, e.g., on one or more sample container racks 124, after all processing of the sample container is complete, e.g., no remaining open assays, and then the sample container can be removed from the output module 216 and thus from the system 100. Alternatively, the sample container may not need to be complete to be directed to the output module 216. For example, system 100 may be configured to enable an operator to generate queries or commands to remove uncompleted sample containers from container storage module 214 or to direct uncompleted sample containers circulating on the analytic track 112 to be routed and grouped into the output module 216. In such an embodiment, output module 216 may be used as a "triage" station, to which an operator can actively request certain sample container(s) be sent for removal, or to which sample containers having errors can be automatically directed and quarantined. In some examples, such operator queries or commands are fully customizable and can be constructed based on one or more of a variety of sample container attributes, such as, assay type, container type, errors, sample container status, assays open/closed for the sample container, customer ID, barcode ID ranges, etc.

Output module 216 may include a dedicated sub-controller 216a that cooperatively communicates with the main system controller (e.g., the WMS).

Track 202 may include buffer queue 242 associated with output module 216 for holding sample containers off the main container traffic lane of the pre-/post-analytic track 202 while the containers are waiting to be transferred to the output module 216. A diverter 243, e.g., a pivotable gate, may be selectively deployed (moved from a non-diverting position to a diverting position as shown in FIG. 2) by track controller 138, as instructed by WMS, to divert a sample container and carrier, if applicable, from the track 202 into the buffer queue 242. A container transfer robot 216b, such as a pick-and-place robot, may be provided to move a container from the buffer queue 242 into the output module 216. In some embodiments, output module 216 and container storage module 214 share a common container transfer robot. A scanner 244 (e.g., a barcode scanner or RFID scanner) may be associated with output module 212 for scanning and identifying containers while the containers are on the track 202 to determine if, based on stored information correlated to the machine-readable container identification information, the container should be diverted from the track 202 into the buffer queue 242.

Empty carriers may be supplied to the system 100 by carrier storage module 218, which may contain a supply of empty carriers and is configured to transfer carriers from the carrier storage module 218 to the pre-analytic track 202. Carrier storage module 218 may include a dedicated sub-controller 218a that cooperatively communicates with the main system controller (e.g., the WMS). Track 202 may include a buffer queue 248 associated with carrier storage module 218 for holding carriers off the main container traffic lane of the pre-/post-analytic track 202 while the carriers are waiting to be transferred to the carrier storage module 218 and, for carriers being returned to the pre-/post-analytic track 202, while the carriers are waiting to be returned to the pre-/post-analytic track 202. A diverter 249, e.g., a pivotable gate, may be selectively deployed (moved from a non-diverting position to a diverting position as shown in FIG. 2) by track controller 138, as instructed by WMS, to divert an empty carrier from the track 202 into the buffer queue 248. A transfer robot 218b, such as a pick-and-place robot, may be provided to move a carrier from the buffer queue 248 into the carrier storage module 218 or from the carrier storage module 218 to the buffer queue 248. In some example, carriers may be diverted directly into the carrier storage module 218 via the buffer queue 248. A scanner 246 (e.g., a machine vision system) may be associated with carrier storage module 218 for scanning and identifying empty carriers while the carriers are on the pre-/post-analytic track 202. Scanner 246 may comprise two machine vision cameras: a lower camera to detect the presence of a carrier in front of the scanner 246 and an upper camera to detect the presence of a sample container in the carrier. Alternatively, scanner 246 may comprise a lower proximity sensor that detects the carrier and an upper photo sensor to detect whether a sample container is positioned in the carrier. Scanner 246 may be in communication with the WMS, and, if no sample container is detected by the upper camera, i.e., the carrier is empty, the WMS may instruct the track controller 138 to deploy the diverter 249 to divert the empty carrier to the buffer queue 248 so the carrier can be returned to the carrier storage module 218.

Sample containers may be introduced to the system 100 by placing them in the input module 220. For example, the sample containers 120 may be placed on one or more racks 124 that can be placed by an operator into the input module 220. Sample containers are then transferred, e.g., one at a time, from the input module 220 to the track 202 and to a carrier, if applicable, by, for example, a container transfer robot 220b, such as a pick-and-place robot. In some embodiments, output module 216 and input module 220 are adjacent to each other and share a common container transfer robot. Input module 220 may include a dedicated sub-controller 220a that cooperatively communicates with the main system controller (e.g., the WMS). Track 202 may include a buffer queue 252 associated with input module 220 for holding empty carriers off the main carrier traffic lane of the pre-/post-analytic track 202 while the carrier(s) are waiting for a sample container to be transferred from the input module 220 to the waiting carrier and, for carrier(s) to which sample containers have been transferred, while the carriers and containers are waiting to be transferred to the pre-/post-analytic track 202. A diverter 253, e.g., a pivotable gate, may be selectively deployed (moved from a non-diverting position to a diverting position as shown in FIG. 2) by track controller 138, as instructed by WMS, to divert an empty carrier from the track 202 into the buffer queue 252. A scanner 250 (e.g., a machine vision system) may be associated with input module 220 for scanning and identifying empty carriers while the carriers are on the pre-/post-analytic track 202. Scanner 250 may comprise two machine vision cameras: a lower camera to detect the presence of a carrier in front of the scanner 250 and an upper camera to detect the presence a sample container in the carrier. Alternatively, scanner 250 may comprise a lower proximity sensor that detects the carrier and an upper photo sensor to detect whether a sample container is positioned in the carrier. Scanner 250 may be in communication with the WMS and, if no sample container is detected by the upper camera, i.e., the carrier is empty, the WMS may instruct the track controller 138 to deploy the diverter 253 to divert the empty carrier to the buffer queue 252 so that a sample container may be transferred from the input module to the carrier.

An additional scanner 225, an input scanner, (e.g., a barcode scanner or RFID scanner) may be associated with input module 220 for scanning and identifying containers being removed from the input module 220 and routed to the track 202. Identification information will be used to determine if, based on stored information correlated to the machine-readable container identification information, the container has an open assay matching a functional assay of one of the analyzers of the analytic segment 110 or if the open assay(s) of the container do not match any functional assay(s) of the analyzers. If the container has an open assay matching a functional assay, information correlated with the identification information may also indicate what, if any, pre-analytic processing is required prior to routing the container to the analytic segment 110.

If, on the other hand, the sample container has no open assay(s) matching any functional assay(s), the WMS may route the sample container to the storage module 214, where it can wait until an analyzer having a functional assay matching the open assay becomes available, or to the output module 216, where it can wait until an analyzer having a functional assay matching the open assay becomes available or from which the container can be removed from the system 100, or the WMS may retain the sample container on the continuous loop of track 202 and pre-analytic return segment 204 (i.e., the first loop segment or pre-analytic loop) and transport or circulate the sample container around the continuous loop of track 202 and pre-analytic return segment 204 until an analyzer having a functional assay matching the open assay becomes available. When an analyzer having a functional assay matching the open assay becomes available, the system controller will cause the sample container to be transferred from the first loop segment, or pre-analytic loop, to the second loop segment, or analytic loop. If the sample container is circulated around the pre-analytic loop, a counter or a timer records the number of times the sample container has traversed the pre-analytic loop or the period of time the sample container has spent traversing the pre-analytic loop. If the counter or timer reaches a certain threshold, or limit, e.g., a prescribed number of loops or a prescribed time duration on the pre-analytic loop, and an analyzer having a functional assay matching the open assay has not yet become available, the WMS may then route the sample container to the storage module 214, where it can wait until an analyzer having a functional assay matching the open assay becomes available, or to the output module 216, where it can wait until an analyzer having a functional assay matching the open assay becomes available or from which the container can be removed from the system 100.

In some embodiments, the functional assays of the analyzer stations of the system may vary with time, depending on the changing availability of one or more analyzers or changes in status of one or more analyzers. For example, as described in more detail below, analyzer stations may be taken off line, so that the functional assay(s) of the off line analyzer are no longer available to the system, or analyzer stations may brought on line, so that the functional assay(s) of the on line analyzer are now available to the system. An analyzer station may also become temporarily unavailable if the number sample containers waiting to be processed by the analyzer station reaches a specified limit. In other examples, one or more functional assays of an analyzer station may become unavailable due to depleted resources required to perform the functional assay, such as assay reagents, supplies of one or more consumables, and/or waste capacity. In such embodiments, the WMS, for example, may continually monitor and update, as necessary, the functional assays available to the system.

In some embodiments, the input module 220, or another pre-analytic module, is configured to determine at least one of a height and width of the container, a shape of a bottom of the container, and whether the container is capped, e.g., using a laser curtain, and may also function as a liquid level detection module configured to detect the liquid level (liquid level detection or "LLD") in the container. The LLD may be part of the input module 220 and/or the decapper module 208 (which may function as a liquid level detection module) or any other module, or it may be a stand-alone liquid level detection module. One reason for detecting the liquid level in the container before transferring the container from the input module to the pre-/post-analytic track 202 is to confirm there is sufficient "head space" between the liquid level and the top of the container. In some examples, if there is insufficient head space because the fluid height is too close to the top of an open-ended sample container, in which case the container could potentially spill its contents and cause contamination, the container is transferred to an error/quarantine rack 124c within the input module 220 and ultimately removed from the system 100. In some examples, liquid level detection may only be performed for uncapped sample containers.

In one example, scanner 225 may also include, or incorporate, a machine vision system that detects whether the container being transferred from the input module 220 does or does not include a cap. That information may be added to the container information correlated with the machine-readable container identification information, and, from that point onward, the WMS tracks the open/closed (capped/uncapped) status of that container, and various other sensors may be distributed about system 100 to detect and confirm cap presence throughout the system. Other information that may be added to the container information correlated with the machine-readable container identification information may include information derived from an LLD or laser curtain capability of the input module 220, such as container size (e.g., diameter and height), head space if the container is uncapped, and the container bottom profile (e.g., flat or round).

Sample transfer module 300 is configured to transfer sample from a first type of sample container to a second type of sample container that will be transported on track 105 and made available to the two or more analyzers. Sample transfer module 300 may include a dedicated sub-controller 300a that cooperatively communicates with the main system controller (e.g., the WMS). In some embodiments the first type of sample container and the second type of sample container may be identical containers and in other embodiments, the first type of sample container and the second type of sample container may be different containers (e.g., different dimensions, different shape, and/or different volume). The sample transfer module 300 is configured to prepare a fluid sample contained in a sample collection receptacle for testing in one or more of the analyzer stations. That is, the sample transfer module 300 may serve as an input through which trays of sample collection receptacles containing specimens can be manually loaded by an operator into a loading bay (not shown) of the sample transfer module 300. The sample transfer module 300 then transfers one or more aliquots of specimen from each of the collection receptacles to at least one empty sample container. For example, the sample transfer module 300 may be configured for transferring a portion of fluid sample from one type of sample receptacle (e.g., a sample collection receptacle) to another type of sample receptacle (e.g., sample container having a configuration that is adapted for use in one or more of the analyzer stations 140A-140D to perform a test on the transferred fluid sample). The sample transfer module 300 may include one or more devices for removing caps from and replacing caps on the sample collection receptacles and the sample containers. The sample container may have a different configuration (e.g., different size and/or shape) than the sample collection receptacle. The sample transfer module 300 may also combine a fluid sample (or portion thereof) with reagents from another receptacle (e.g., a bulk reagent receptacle), in order to prepare the fluid sample for testing in at least one of the analyzer stations 140A-140D. Thus, the sample transfer module 300 may include one or more pipettors (not shown) that aspirate and dispense fluid sample 102 and/or reagents. In some examples, sample transfer module 300 may be configured to perform vortexing, mixing, and incubation functions. A sample container to which a fluid sample has been transferred may then be transported, e.g., by a container transfer robot, such as a pick-and-place robot 300b, to the pre-/post-analytic track 202 or to a carrier on the track.

Track 202 may include a buffer queue 302 associated with sample transfer module 300 for holding empty carriers off the main container traffic lane of the pre-/post-analytic track 202 while the carrier(s) are waiting for a sample container to be transferred from the sample transfer module 300 to the waiting carrier, and, for carrier(s) to which sample containers have been transferred, e.g., by container transfer robot 300b, while the carriers and containers are waiting to be transferred to the pre-/post-analytic track 202. A diverter 303, e.g., a pivotable gate, may be selectively deployed (moved from a non-diverting position to a diverting position as shown in FIG. 2) by track controller 138, as instructed by WMS, to divert an empty carrier from the track 202 into the buffer queue 302. A scanner 304 (e.g., a machine vision system) may be associated with sample transfer module 300 for scanning and identifying empty carriers while the carriers are on the pre-/post-analytic track 202. Scanner 304 may comprise two machine vision cameras: a lower camera to detect the presence of a carrier in front of the scanner 304 and an upper camera to detect the presence a sample container in the carrier. Alternatively, scanner 304 may comprise a lower proximity sensor that detects the carrier and an upper photo sensor to detect whether a sample container is positioned in the carrier. Scanner 304 may be in communication with the WMS, and, if no sample container is detected by the upper camera, i.e., the carrier is empty, the WMS instructs the track controller 138 to deploy the diverter 303 to divert the empty carrier to the buffer queue 302 so that a sample container may be transferred from the sample transfer module 300 to the carrier.

In some embodiments, the sample collection containers loaded into the sample transfer module include machine-readable identification information (e.g., barcode or RFID), and that information is correlated (e.g., in an LIS or other sample database) with information regarding the sample, such as patient identification, STAT or no STAT status, and tests or assays ordered for the sample. The sample container to which the sample material is transferred may also include machine-readable identification information (e.g., barcode or RFID), and sample transfer module 300 may include a scanner for reading the machine-readable identification information associated with both the sample collection container and the sample container. The machine-readable information associated with the sample container may be stored, e.g., in the sample database of LIS 134, and correlated with identification information associated with the sample collection container, such as tests or assays ordered for the sample (i.e., open assays). Sample containers transferred from the sample transfer module 300 to the conveyance 105 (specifically to the pre/post-analytic track 202 of the conveyance 105) may thereafter be processed by system 100 in the same manner as sample containers transferred to the conveyance 105 via the input module 220.

An exemplary sample transfer module is described in U.S. Pat. No. 9,335,336 and embodied in the Tomcat® instrument available from Hologic, Inc. (Marlborough, MA).

Pre-/post-analytic segment 200 may also include a sample purification module (not shown) configured to isolate and purify a target material within a sample container, e.g., by a magnetic separation procedure, prior to making the sample container available to the two or more analyzers.

Pre-/post-analytic segment 200 may further include a pre-analytic scanner 222 (e.g., bar code scanner or RFID scanner), which may be located between sample transfer module 300 and pre-analytic return segment 204, upstream from pre-analytic return segment 204. Inlet segment 116 extends from one end of the pre-/post-analytic track 202, and outlet segment 118 extends from another end of the pre-/post-analytic track 202.

A first track diverter, or input diverter, 126 controls movement of sample containers from the pre-/post-analytic track 202 to the inlet segment 116 or to the pre-analytic return segment 204. A second track diverter, or return diverter, 119 directs containers moving on the pre-analytic return segment 204 back to the pre-/post-analytic track 202.

First track diverter 126 and second track diverter 119 are curved diverters that, when deployed, cause a container moving on a first track to be directed to a second track oriented transversely to the first track. First track diverter 126 and second track diverter 119 may each be configured to pivot between a first position, or first configuration, as shown in FIG. 2, in which the diverter extends across the track to divert a container, and a second position, or second configuration, in which a container moving on the first track is not diverted. When first track diverter 126 is in its second position or configuration, a container moving on the pre-/post-analytic track 202 is allowed to proceed onto the inlet segment 116 to thereby permit the sample container to be transferred from the pre-analytic segment 200 (or first loop segment) to the analytic segment 110 (or second loop segment). A retractable track wall segment (not shown) may be extended across pre-analytic return segment 204 when first track diverter 126 is in its second position to block a sample container from entering pre-analytic return segment 204 and ensure that the container proceeds onto the inlet segment 116. When the first track diverter 126 is pivoted to its first (diverting) position or configuration, the retractable track wall segment is retracted to permit the sample container to be diverted from pre-/post-analytic track 202 onto pre-analytic return segment 204 to thereby prevent the sample container from being transferred from the pre-analytic segment 200 to the analytic segment 110.

When second track diverter 119 is in its second position or configuration, a container moving on outlet track segment 118 is allowed to proceed onto the pre-/post-analytic track 202. A retractable track wall segment (not shown) may be extended across pre-analytic return segment 204 when second track diverter 119 is in its second position to block a sample container from entering pre-analytic return segment 204 and ensure that the container proceeds onto pre-/post-analytic track 202. When the second track diverter 119 is pivoted to its first (diverting) position or configuration, the retractable track wall segment is retracted to permit a sample container to be diverted from pre-analytic return segment 204 onto pre-/post-analytic track 202.

Figure 3:
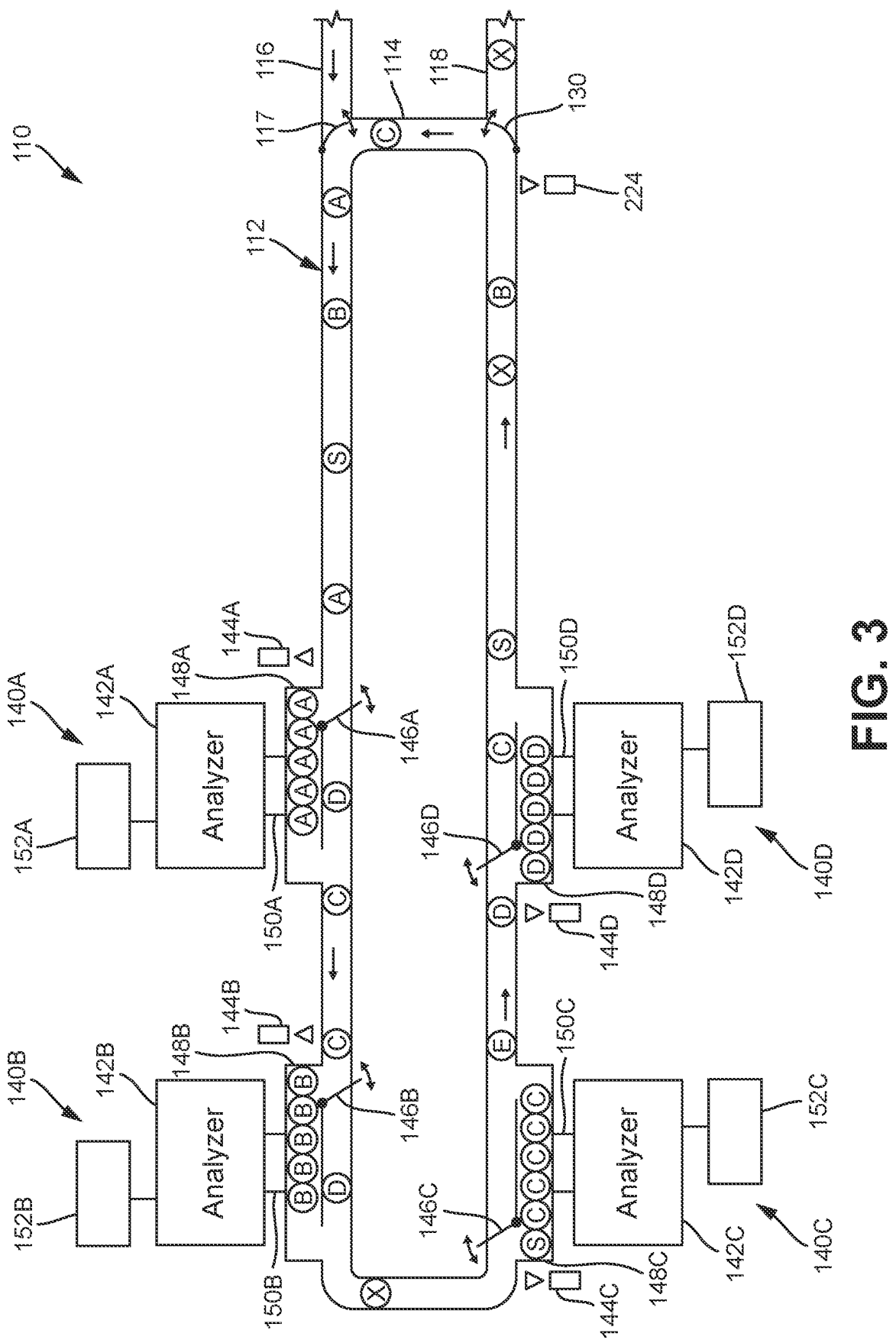
FIG. 3 is a schematic view of an analytic segment of the automated sample processing system.

Features of the analytic segment 110 are shown in FIG. 3. Analytic segment 110 includes one or more analyzer stations for extracting sample material from a sample container and performing specified assays on the extracted material. In the illustrated embodiment of FIG. 3, the analytic segment 110 includes four analyzer stations 140A, 140B, 140C, and 140D. In other embodiments, the system may include less than four analyzer stations or more than four analyzer stations. Analytic track 112 conveys sample containers to the analyzer stations 140A-140D in a counterclockwise direction in the illustrated embodiment and, if necessary, recirculation segment 114 will convey a sample container back to the analytic track 112.

Figure 4:
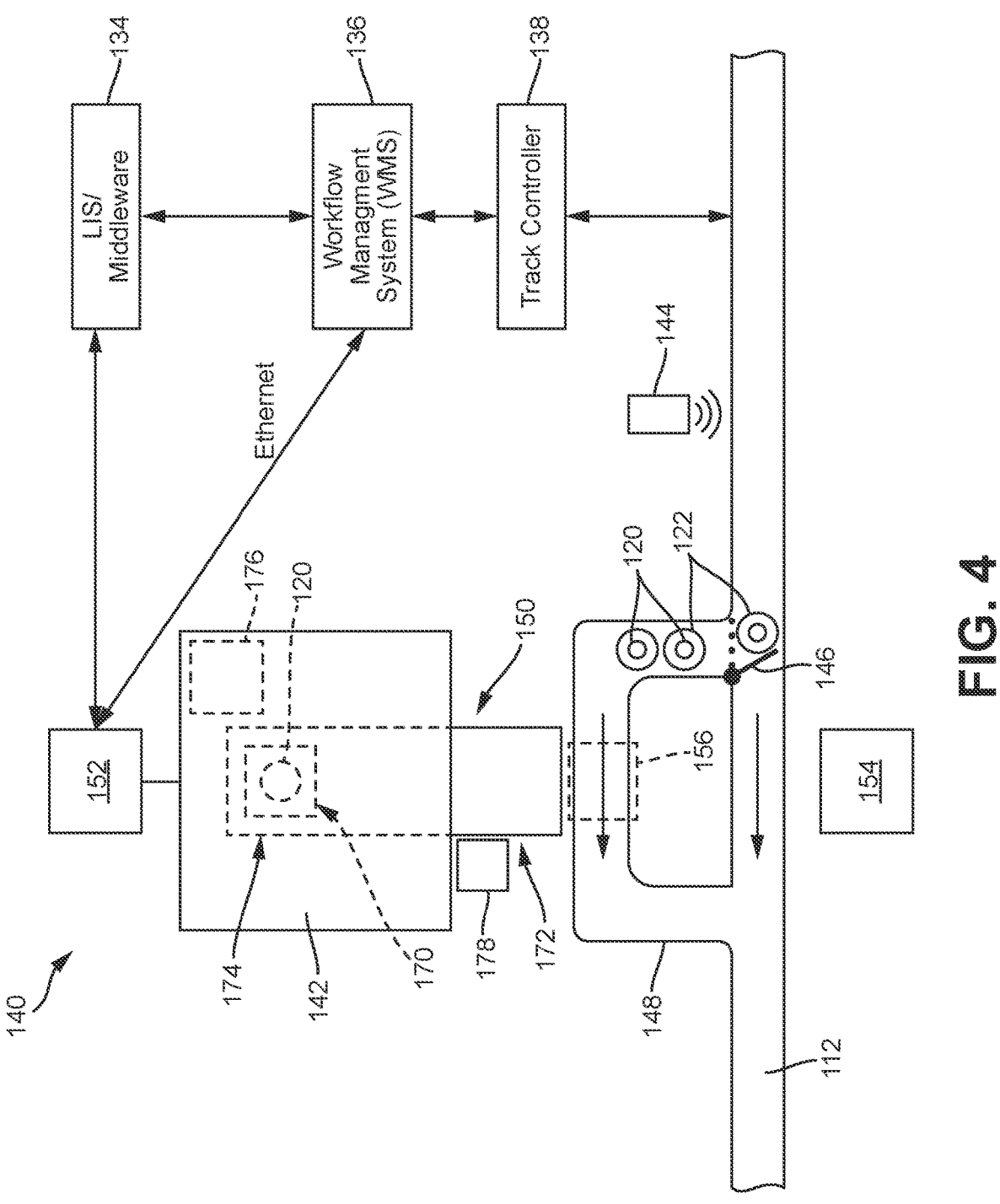
FIG. 4 is a schematic view showing details of an analyzer station and a system controller of the automated sample processing system.

FIG. 4 is a schematic view showing features of an analyzer station 140 (i.e., any one of analyzer stations 140A-140D) and a system controller that, in the illustrated embodiment, comprises the track controller 138, the workflow management system ("WMS") 136, which may include or be in communication with a sample database, and an analyzer software module 152, which may include or be in communication with an analyzer database which is associated with the analyzer station and analyzer software module and within which is stored, for example, the identities of functional assays of the associated analyzer, that are interconnected and communicate with each other and together communicate with a laboratory information system ("LIS") 134. FIG. 4 shows only a portion of the analytic track 112 and a single one of the analyzer stations 140. Analyzer software module may comprise a combination of hardware (such as a computer or processor) and/or software that controls operation and scheduling of the associated analyzer 142 and maintains and updates data and information relating to each associated analyzer 142.

Each analyzer station 140 is disposed adjacent to the analytic track 112 and is configured to transfer an amount of sample material from a sample container, e.g., using a sample transfer device, such as an automated (robotic) pipettor, and to perform an assay or other process on the sample in a receptacle apparatus within the analyzer. A scanner 144 configured to scan machine-readable identification information from a sample container 120 may be associated with each analyzer station 140. A buffer queue 148 may be associated with each analyzer station and may comprise an extent of track adjacent to the analytic track 112 and configured to receive sample containers 120, each of which may be supported by and carried on a carrier 122, which are diverted from the analytic track 112 to the buffer queue 148 by a diverter, or gate, 146 associated with the buffer queue 148. A pick-and-place robot, shown schematically at 154, transfers the sample containers 120, typically without the carrier 122, from a sample container handoff position 156 on the buffer queue 148 to a shuttle module 150, which transfers the sample container 120 into an analyzer 142 for processing. A sensor may be provided for detecting when the sample container 120 and carrier 122 are positioned at the sample container handoff position 156, and buffer queue 148 may include a brake, gripper, stop element or other means to immobilize the carrier 122 at the sample container handoff position 156. Longitudinally extending flanges may engage a peripheral groove of the container 122 to prevent the carrier 122 from being removed from the track when the sample container 120 is being removed from the carrier, for example, as described in U.S. Pat. No. 7,485,264. Pick-and-place robot 154 may have a robotic arm (not shown) with fingers or grasping members (not shown) configured to grasp and transfer a sample container 120 from buffer queue 148 to a carriage 170 of shuttle module 150 (and vice versa). Exemplary pick-and-place robots are described in U.S. Provisional Application No. 63/104,401.

In an embodiment, the shuttle module 150 generally comprises an electromechanical mechanism configured to accept the placement of a sample container from the pick-and-place robot 154 and then automatically transfer the sample container into a sample transfer location adjacent to or within the analyzer 142 (e.g., a pipetting location at which an automated pipettor (pipettor robot) transfers sample from the sample container to another container by extracting (aspirating) an amount of sample from the sample container and then dispensing the extracted sample into the other container). Carriage 170 travels between a first location (e.g., a container pick-up location or a first end 172) positioned proximate the buffer queue 148 to a second location (e.g., a pipetting location or a second end 174) along a path between the first and second ends. First end 172 and second end 174 may each be a location within analyzer 142 or a location outside analyzer 142. Carriage 170 is configured to receive sample container 120 from pick-and-place robot 154 and transport sample container 120 from first end 172 to second end 174. Carriage 170 may include structure for holding the sample container 120 in an upright orientation with an open upper end exposed and accessible by a material transfer device, such as a robotic pipettor 176. When carriage 170 is positioned at second end 174, the material transfer device (such as, for example, robotic pipettor 176) of analyzer 142 removes (aspirates) one or more aliquots of the fluid from sample container 120. After a sufficient amount of the fluid is removed from sample container 120, carriage 170 transports sample container 120 back to first end 172. Pick-and-place robot 154 then removes sample container 120 from carriage 170 and transfers sample container 120 to a carrier 122 (the same or a different carrier) positioned on buffer queue 148. Buffer queue 148 may then transport the carrier 122 with the transferred sample container 120 back to the analytic track 112, which transports the sample container 120 to another analyzer station 140 or to another module (e.g., container storage module 214 for temporarily holding sample containers in a refrigerated state or output module 216 on the pre-/post-analytic segment 200).

Shuttle module 150 may include a scanner 178 for scanning machine-readable sample identification information (e.g., barcode or RFID) associated with each sample container 120 shuttled between the buffer queue 148 and the analyzer 142 to validate the sample identification before transferring sample material from the sample container into a receptacle apparatus within the analyzer 142.

An exemplary shuttle mechanism is described in International Publication No. WO 2020/226969.

In this disclosure, unless otherwise specified explicitly or by context, a sample container is "processed" by transferring the sample container 120 from a buffer queue 148 to a sample transfer location in the analyzer station 140—adjacent to or within the analyzer 142—transferring an amount of sample material from the sample container to a process vessel of a receptacle apparatus within the analyzer 142, and then returning the sample container to the buffer queue 148.

After sample has been transferred from the sample container to the process vessel of the receptacle apparatus within the analyzer 142, the shuttle module 150 transfers the sample container back to the pick-and-place robot 154, which returns the sample container to the sample container handoff position 156 where the sample container is transferred by the transfer module 158 back to the buffer queue 148. The buffer queue track 148 routes the sample container to a diverter 168 that diverts the sample container from the buffer queue 148 back to the analytic track 112.

The shuttle module 150 is in signal communication with the track 112 and pick-and-place robot 154, for example by an RS232 interface, to coordinate and synchronize sample container transfer between the shuttle module 150 and the pick-and-place robot 154.

System 100 is controlled by one or more system controllers (e.g., as shown in FIG. 4 and described above), which may comprise a computer or processor for executing software (which may include firmware)—i.e., one or more special purpose computers—that effect a number of operations for system 100, including, system control (e.g., controlling operations of components and modules of the system), monitoring, sample container sorting and scheduling, and database management. The controller may be implemented via one or more logic elements, e.g., a computer, processor, embedded controller, programmable gate array, application specific integrated circuit, programmable logic device, etc., and may include or access data storage memory, which may include random access memory (RAM), read only memory (ROM), flash memory, and other types of memory now known or later developed. The controller may also include additional memory, including, for example, a hard disk drive and/or a removable storage drive, representing a magnetic tape drive, an optical disk drive, USB slot, memory card interface, internet memory, cloud-based memory, or any storage medium or format now known or later developed. Memory devices and storage units used herein may comprise any storage medium for persistent and/or volatile storage of electronic data now known or later developed. Such data may be stored within the storage medium in a database, which may comprise any data structure and format now known or later developed, including, for example, a relational database, an object database, a flat file, list, and so on, or some combination thereof. In various implementations, software may be embodied in computer-readable media or computer program product comprising computer-executable instructions which, when executed by a computer, processor, etc. (i.e., the special purpose computer), cause the computer, processor, etc. to carry out one or more functions, processes, methods, algorithms, etc. described herein. Functions may include motor control functions, signal control functions (e.g., processing, detection, transmission, etc.), logic functions, computing functions, power management functions, temperature control functions, data storage and/or reading functions, or any other automated function that may be performed by the system described.

Referring to FIG. 4, in an embodiment of the system 100, controller functionality for the system is implemented by a track controller 138, a workflow management system ("WMS") 136, and an analyzer software module 152 associated with each analyzer station 140 that communicates with a laboratory information system ("LIS") 134. The WMS 136 is responsible for coordinating workflow and high level sample container traffic. Additional, specific functions that may be performed by the WMS 136 will be described below. The track controller 138 controls the low level functions of components of the track system, such as the pre-/post-analytic track 202, pre-analytic return segment 204, buffer queue tracks 234, 238, 242, 248, 252, 230, and 302, and diverters 235, 239, 243, 249, 253, 231, and 303 on the pre-/post-analytic segment 200, the inlet segment 116 and outlet segment 118, the analytic track 112, recirculation segment 114, buffer queue tracks 148A, 148B, 148C, and 148D, and diverters 146A, 146B, 146C, and 146C of the analytic segment 110, and first, second, third, and fourth track diverters 126, 119, 117, and 130. Such low level control may include actuating track segments to move sample containers (or carriers) along each track segment or actuate the diverters to divert a container from one part of the track system to another, actuate the diverters to return to their non-diverting positions, low level error handling, and basic display of track information. Specific examples of functions that may be performed by the track controller 138 will be described below. Each analyzer software module 152 may control operation of a shuttle module 150 associated with each analyzer station 140, scheduling of queued sample containers 120, transmission of analyzer data (e.g., functional assays of the associated analyzer) and sample container information (e.g., to the WMS 136), and sample transfer from sample containers shuttled by the shuttle module 150 into the analyzer 140. Additional, specific functions that may be performed by the analyzer software module 152 will be described below. The LIS 134 may include a sample database that stores information about samples stored within sample containers added to the system 100, such as assay orders (open assay(s)) for each sample that is(are) correlated to sample identification information uniquely associated with each sample container, such as a barcode or radio frequency identifier. The LIS 134, the WMS 136, the analyzer software module 152, and the track controller 138 may be interconnected, e.g., by an Ethernet network or other suitable data connection means.

In the illustrated embodiment, each analyzer station 140A-140D includes an analyzer, a scanner, a diverter, a buffer queue, a shuttle module, and an analyzer software module. Thus, analyzer station 140A includes an analyzer 142A, a scanner 144A, a diverter 146A, a buffer queue 148A, a shuttle module 150A, and an analyzer software module 152A. Analyzer station 140B includes an analyzer 142B, a scanner 144B, a diverter 146B, a buffer queue 148B, a shuttle module 150B, and an analyzer software module 152B. Analyzer station 140C includes an analyzer 142C, a scanner 144C, a diverter 146C, a buffer queue 148C, a shuttle module 150C, and an analyzer software module 152C. Analyzer station 140D includes an analyzer 142D, a scanner 144D, a diverter 146D, a buffer queue 148D, a shuttle module 150D, and an analyzer software module 152D.

In the illustrated embodiment, each of the analyzers of the analyzer stations is configured to perform at least one, hypothetical assay. For purposes of illustration, assume hypothetical assay or process "A" is a functional assay of analyzer 142A, hypothetical assay or process "B" is a functional assay of analyzer 142B, hypothetical assay or process "C" is a functional assay of analyzer 142C, and hypothetical assay or process "D" is a functional assay of analyzer 142D. Similarly, sample containers are labeled in FIGS. 1-3 for illustration purposes to indicate the open assay or process for the sample contained therein, i.e., assay "A," assay "B," assay "C," or assay "D. Thus, under normal operation, each sample container A, B, C, or D will be diverted into the associated buffer queue of the respective analyzer 142A, 142B, 142C, or 142D configured to perform the required assay for that sample container. Each container "S" is a STAT sample container that will be processed in accordance with one or more schemes described below. Each container "X" is a sample container having no open assay—i.e., samples for all open assays have been processed or the sample container has only open assay(s) that do not correspond to any functional assay of the analyzers 142A-142D—and is being conveyed by one or more of the tracks 112, 116, and 202 to the container storage module 214 or output module 216.

This is a simplified arrangement for illustration purposes. In other embodiments, one or more of the analyzers may be configured to perform more than one assay (i.e., have more than one functional assay or process). In addition, two or more different analyzers may have the same functional assay or process. Finally, more than one assay may be ordered for a sample contained in a sample container.

Exemplary analyzers include analyzers described in U.S. Pat. Nos. 8,731,712 and 9,732,374, and in International Publication No. WO 2019/014239, and are embodied in the Panther® and Panther Fusion® systems available from Hologic, Inc. (Marlborough, MA).

Inlet segment 116 connects to one end of the analytic track 112, and outlet segment 118 connects to another end of the analytic track 112. Fourth track diverter, or recirculation/outlet diverter, 130 directs movement of sample containers from the analytic track 112 to the outlet segment 118 or to the recirculation segment 114, and third track diverter, or recirculation diverter, 117 is configured to direct sample containers from the recirculation segment 114 back to the analytic track 112.

Third track diverter 117 and fourth track diverter 130 are curved diverters that, when deployed, cause a container moving on a first track to be redirected to a second track oriented transversely to the first track. Third track diverter 117 and fourth track diverter 130 may be configured to pivot between a first position, or first configuration, as shown in FIG. 3, in which each diverter extends across the track to divert a container, and a second position, or second configuration, in which a container moving on the first track is not diverted. When fourth track diverter 130 is in its second position, or configuration, a container moving on the analytic track 112 is allowed to proceed onto the outlet segment 118, to thereby permit the sample container to be transferred from the analytic section 110 to the pre-analytic section 200 (i.e., from second loop segment to first loop segment). A retractable track wall segment (not shown) may be extended across recirculation segment 114 when fourth track diverter 130 is in its second position to block a sample container from entering recirculation segment 114 and ensure that the container proceeds onto the outlet segment 118. When the fourth track diverter 130 is pivoted to its first (diverting) position, or configuration, the retractable track wall segment is retracted to permit the sample container to be diverted from the analytic track 112 into recirculation segment 114 to thereby prevent the sample container from being transferred from the analytic section 110 to the pre-analytic section 200.

When third track diverter 117 is in its second position, or configuration, a container moving on inlet segment 116 is allowed to proceed onto the analytic track 112. A retractable track wall segment (not shown) may be extended across recirculation segment 114 when third track diverter 117 is in its second position to block a sample container from entering recirculation segment 114 and ensure that the container proceeds onto analytic track 112. When the third track diverter 117 is pivoted to its first (diverting) position or configuration, the retractable track wall segment is retracted to permit a sample container to be diverted from recirculation segment 114 onto analytic track 112.

Operation of the system 100 will now be described.

While transferring each sample container from the input module 220 to the track 202, each sample container may be individually scanned by the input scanner 225, e.g., while the container is on buffer queue 252, for machine-readable identification information associated with the sample container (i.e., sample identification information, such as a patient ID). While input scanner 225 is illustrated as being located outside the input module 220, scanning may instead occur inside the input module 220 by a scanner located inside the input module 220 or by a scanner otherwise configured to scan sample containers inside the input module 220 as the containers are being transferred from the input module 220.

In an embodiment, where input scanner 225 is located outside the input module 220, any sample identification information associated with the sample container has no bearing on whether or not, or the order in which, the sample container is transferred from the input module 220 to the track 202. That is, in such an embodiment, a sample container is automatically removed, e.g., by a container transfer mechanism controlled by the system controller, which may comprise the WMS, before scanning machine-readable identification information associated with each sample container and before identifying the one or more open assays associated with the sample container. Accordingly, whether a sample container is transferred from the input module 220 to the track 202, or the order in which sample containers are transferred from the input module 220 to the track 202, is independent of the identification information for each sample container and/or the open assay(s) of the sample container. Thus, in one embodiment, sample containers may be transferred from the input module 220 to the track 202 (i.e., to the conveyance, pre-analytic loop or first loop segment) in the order in which they are place in the input module, e.g., first in, first out, although any subsequently added STAT sample container may take priority over previously added non-STAT sample containers. STAT sample containers may be contained in a section of the input module 220, such as a rack 124*a* in a particular rack position, designated for STAT sample containers, and the input module 220, including the container transfer robot 220*b* thereof, may be controlled, e.g., by the WMS, to transfer STAT sample containers from the dedicated area to track 202 before the other sample containers. In an embodiment, the input module 220 may include a switch that is actuated any time rack 124*a* is removed from and replaced at the STAT rack position. Each time a rack 124*a* in the STAT position is replaced, the container transfer robot 220*b* may be controlled to remove sample containers from the rack 124*a* before removing sample containers from any other rack within the input module 220. The container transfer robot 220*b* may be controlled to remove sample containers from a particular rack, such as rack 124*a*, until sample containers have been removed from all positions within the rack, starting with a first position (e.g., row 1, column 1), or until the container transfer robot 220*b* detects a specified number, e.g., five, of consecutive empty sample container positions within the rack. After, or as, each sample container is automatically transferred from the input module 220, machine-readable identification information associated with the sample container may be scanned, e.g., by input scanner 225, and the one or more open assays for the sample container are identified from information correlated with the identification information in the sample database.

Rack 124*b* represents container holding space for sample containers 120 that are neither STAT sample containers nor quarantined sample containers.

Exemplary machine-readable sample identification information maybe embodied in a barcode (one-dimensional and/or two-dimensional bar codes) or a radio frequency identification ("RFID") tag, or a holographic tag, or any other suitable means for storing and conveying unique identification information of the sample container. The machine-readable identification information may be carried on the sample container itself, on a carrier supporting the sample container, or both. The sample identification information obtained by the input scanner 225 is stored in a database accessible by or otherwise associated with the WMS 136 and is correlated against sample information stored in a database (which may be the same database in which the sample identification information is stored), such as the laboratory information system ("LIS") 134 database. Information stored in the LIS database will include one or more open assays, or tests, to be conducted on the sample material contents of the sample container. Sample records within the WMS database are then updated to include open assay(s) for each sample, as well as other information, such as whether the sample has STAT priority. Sample records within the WMS may also be updated with information subsequently broadcast by the LIS 134, such as change in priority status—e.g., to STAT, or new or additional test orders or test instructions, such as a reflex test, a deconvolution test, or a discriminatory test.

Each of the analyzers 142A, 142B, 142C, and 142D is configured to perform at least one assay on a sample material (i.e., each analyzer has at least one functional assay or process). The analyzers may have different functional assays (i.e., the analyzers are not configured to perform the same assay), the same functional assays, or a mix of the same and different functional assays, where the analyzers have at least one functional assay that is the same.

After the open assays to be performed on the sample containers are determined from the sample identification information obtained at input scanner 225, the WMS determines whether there is at least one analyzer in the analytic segment 110 able to perform at least one open assay ordered for the sample material. This is determined from information transmitted by the analyzers, e.g., by the analyzer software module 152A-152D associated with each analyzer 142A-142D, respectively, to the WMS indicating the functional assay(s) of each analyzer. If there are no analyzers in the analytic segment 110 having a functional assay matching the open assays for the sample material, the sample container is retained on the first loop segment. That is, the container is conveyed, or routed, by the pre-/post-analytic track 202 to the first track diverter 126, and diverter 126 is controlled to be in its first configuration to divert the sample container into the pre-analytic return segment 204. The pre-analytic return segment 204 conveys, or routes, the sample container back to the pre-/post-analytic track 202 by diverter 119 configured in its first configuration, and the sample container is conveyed to container storage module 214 within the pre-/post-analytic segment 200 where it is stored until such time as an analyzer in the analytic segment 110 configured to perform one or more assays required by the sample material in the sample container is available. Alternatively, the sample container may be conveyed by the pre-/post-analytic track 202 to output module 216 within the pre-/post-analytic segment 200, from which it can be removed from the system 100. As a further alterative, the sample container may be conveyed around the pre-analytic segment 200, i.e., around the first loop segment formed by track 202 and pre-analytic return segment 204, until such time as the sample container can be processed by an analyzer 142. As a further alternative, the sample container may be conveyed to analytic track 112 via inlet segment 116, and the sample container may be conveyed around the analytic segment 110, i.e., around the second loop segment or recirculation loop formed by analytic track 112 and recirculation segment 114, until such time as the sample container can be processed by an analyzer 142.

At the container storage module 214, a container transfer mechanism (not shown), such as a pick-and-place robot or other container transfer robot, may be provided to move the sample container from track 202, or storage module buffer queue 238, if applicable, and place the sample container into a rack, a shelf, or other holding structure within the container storage module 214. The container transfer mechanism may remove the sample container from its carrier, or from the track 202 or from buffer queue 238 if supported directly thereon without a carrier. Similarly, at the output module 216, a container transfer mechanism (not shown), such as a pick-and-place robot or other container transfer robot, may be provided to remove the sample container from its carrier, or from the track 202 if supported directly on the track, and place the container on a shelf, a rack, or other holding structure within the output module 216. Sample containers placed in the output module 216 may then be removed from module 216. Exemplary pick-and-place robots that may be used with the container storage module 214 or the output module 216 are described in U.S. Provisional Application No. 63/104,401.

If the analytic segment 110 includes at least one analyzer having at least one functional assay matching the open assay of the sample container, the sample container may be conveyed by the track 202 to various pre-analytic modules within the pre-/post-analytic segment 200 for pre-processing of the sample container and/or the sample material contained therein. Such pre-analytic modules may include, for example, the decapper module 208 for removing a cap from each sample container, and which may include a liquid level detection ("LLD") device for detecting the level of liquid sample held in the sample container relative to the open top end of the sample container. Sample containers having penetrable, or pierceable, caps may bypass the decapper module 208. After pre-analytic processing by the pre-analytic modules (if any), the sample container is conveyed by the track 202 to pre-analytic scanner 222 where it is determined whether to route the sample container from the track 202 to the inlet segment 116 by activating diverter 126 to its second configuration or to activated diverter 126 to its first configuration to divert the sample container from the track 202 to the pre-analytic return segment 204 to thereby retain the sample container on the continuous loop of track 202 and pre-analytic return segment 204 (i.e., the first loop segment or pre-analytic loop).

In an embodiment, as a sample container passes pre-analytic scanner 222 on pre-/post-analytic track 202 of conveyance 105, the scanner 222 reads or scans the machine-readable identification information associated with the sample container. The system controller, e.g., WMS, queries the LIS (sample database) 134 to identify the one or more open assays correlated with the identification information associated with the sample container. The WMS then compares the open assay(s) for that sample container with the functional assay(s) of the one or more analyzers 142 operatively associated with the analytic loop (the functional assay(s) may be stored in the WMS and/or the WMS may query the analyzer software module 152 associated with each of the analyzers 142). In some embodiments, the system controller is configured to release the sample container from the pre-analytic track 202 to the analytic track 112 (e.g., by activating the diverter 126 to direct the sample container from track 202 to inlet segment 116) if one or more open assays of the sample container match one or more functional assays of the analyzers.

To avoid overloading the analytic segment 110, the WMS, which tracks all sample containers in the analytic segment 110, may not release an additional sample container to the analytic segment 110 if the analytic segment 110 is at capacity. Thus, the WMS may be programed to track the number of sample containers being transported on the analytic segment 110 and compare that number to a capacity limit of the analytic loop (or second loop segment or recirculation loop) (i.e., the maximum number of sample containers to be permitted, or that can be accommodated, on the analytic loop). In this case, the WMS 136 may instruct the track controller 138 to cause the first track diverter 126 to divert the sample container to the pre-analytic return segment 204 for routing the sample container to the container storage module 214 to hold the sample container, or to recirculate the sample container on the continuous track 202, 204, until such time as the analytic segment 110 is no longer at capacity. The WMS may monitor the number of sample containers on the second loop segment by monitoring and comparing the number of sample containers transferred from the first loop segment to the second loop segment and the number of sample containers transferred from the second loop segment to the first loop segment. The WMS may transfer a sample container from the pre-analytic track 202 to the analytic track 112 if a functional assay matches at least one open assay and/or if the number of sample containers on the analytic track 112 is not more than the analytic track capacity limit.

The WMS 136 may also be configured (programmed) to "load balance" sample containers released to the analytic segment 110, meaning that sample containers are released to the analytic segment 110 in proportion at least roughly corresponding to the proportion of analyzers configured to perform the open assays. To illustrate with a simple example, if the analytic segment 110 includes three analyzers, two having functional assay "A" and one having functional assay "B", the WMS 136 may be configured to release sample containers with open "A" assays and open "B" assays at a ratio of two "A" sample containers for each one "B" sample container.

As described above, the functional assays available to the system may vary with time, depending on the changing availability of one or more analyzers and/or the changes in the functional assay(s) of each analyzer. Load balancing, as described above, may result in one or more analyzer stations becoming temporarily unavailable.

Once the sample container is on the analytic track 112, it passes each of the analyzer stations 140A, 140B, 140C, and 140D. As the sample container approaches one of the analyzer stations, for example, analyzer station 140A, it passes the associated scanner 144A, which reads machine readable sample identification information (e.g., barcode or RFID) associated with the container. The sample identification information is used to determine the open assay or assays to be performed on the sample within the associated sample container. For example, sample records in the WMS 136 include sample identification information and open assay orders for each sample container. A further database, e.g., the analyzer database associated with the analyzer software module 152A of analyzer 142A, may be interrogated to determine whether the analyzer 142A has at least one functional assay matching the at least one open assay of the sample container. If the analyzer 142A is configured to perform at least one open assay, the analyzer software module 152A transmits a "divert" command to the WMS 136, and the WMS instructs the track controller 138 to signal the associated diverter 146A to divert the sample container from the analytic track 112 into associated buffer queue 148A. If the analyzer 142A is not configured to perform at least one assay required of the sample, the analyzer software module 152A transmits a "do not divert" command to the WMS 136, and the associated sample container continues along the analytic track 112 to the next analyzer station 140B.

As noted above, there may be a specified limit to the number of sample containers an analyzer station can process. One such limit is the finite number of sample containers that can be held in the buffer queue 148A. If the buffer queue is filled to capacity, the analyzer software module 152A may transmit a "do not divert" command to the WMS 136, even if the analyzer 142A is configured to perform at least one open assay.

Each scanner 144A-144D associated with each analyzer station 140A-140D, respectively, may also be thought of generically as a "decision point" at which, for each analyzer station, a decision is made as to whether an approaching sample container will be diverted into the associated buffer queue 148A-148D or will not be diverted and will be routed to the next analyzer station to the end of the analytic segment 110.

While approaching analyzer station 140B, the sample container passes the associated scanner 144B, which reads machine readable sample identification information (e.g.

barcode or RFID) associated with the container. The sample identification information is used to again determine the open assay or assays to be performed on the sample within the associated sample container, and the analyzer software module 152B associated with analyzer 142B may be interrogated to determine whether the analyzer 142B is configured to perform at least one open assay of the sample container. If the analyzer 142B is configured to perform at least one open assay, the analyzer software module 152B sends a "divert" command to the WMS 136, and the associated diverter 146B diverts the sample container from the analytic track 112 into an associated buffer queue 148B. If the analyzer 142B is not configured to perform at least one assay required of the sample the analyzer software module 152B sends a "do not divert" command to the WMS 136, and the associated sample container continues along the analytic track 112 to the next analyzer station 140C.

The above-described process may be repeated at each subsequent analyzer station 140C, 140D until an analyzer is identified that is configured to perform at least one assay required of the sample contained in the sample container.

After a sample container is diverted into a buffer queue 148A-148D, the WMS 136 will seek to find matching sample containers (i.e., sample containers with the same open assay(s)) to group with the previously-diverted sample container in an effort to accumulate a process number of sample containers with the same open assay in the buffer queue 148A-148D before each of the process number of sample containers is shuttled by the shuttle module 150A-150D, one by one, into the associated analyzer 142A-142D. Illustrating this concept, and assuming the process number is five, FIG. 3 shows five "A" sample containers (i.e., sample containers with open assay "A") in buffer queue 148A, five "B" sample containers (i.e., sample containers with open assay "B") in buffer queue 148B, five "C" sample containers (i.e., sample containers with open assay "C") in buffer queue 148C, and five "D" sample containers (i.e., sample containers with open assay "D") in buffer queue 148D.

To ensure that the correct sample container is being shuttled into the analyzer, the sample identification information associated with the sample container may be scanned within the shuttle module 150, e.g., as scanner 178, to validate the identity of the sample container. Sample containers are processed one-at-a-time for each analyzer 142A-142D. The next sample container does not start processing until the preceding sample container has been returned by the associated shuttle module 150A-150D to the associated buffer queue 148A-148D, and the sample container hand-off position 156 (see FIG. 4.) is clear for the next sample container. To track sample containers through the system 100, the sample container identification information is transmitted by the WMS 136 to analyzer software module 152 (e.g., via an Ethernet connection) before the sample container is accepted into the buffer queue 148.

As noted, once transfer of the sample container 120 from the buffer queue 148 to the analyzer 142 is initiated in the shuttle module 150, a scanner within the shuttle module reads and validates that the sample container identification information matches the sample container identification information in the analyzer schedule maintained by the analyzer software module. In an embodiment, if the match fails, the sample container is returned to the track system, and an appropriate error code is returned and posted to the WMS.

After the sample has been extracted from the sample container within the analyzer (e.g., by a robotic pipettor), and the sample container has been returned to the buffer queue, the sample container is then routed back to the analytic track 110. Sample container specific information will be updated within the analyzer software module 152 and pushed back to the WMS 136 upon sample container handoff back to the analytic track 110 from the analyzer. For example, the sample database may be revised with respect to that sample container to change the status of the open assay for which sample has just been extracted so as to indicate the assay is no longer open for that sample container. As noted above, assays that have been performed on the sample will be removed from the sample container's open assays list by the analyzer software module. The WMS will use this information for downstream functions and processing, such as error handling, sample container routing, workflow management, data display, follow up test orders, reflex test orders, etc.

After sample has been extracted from the sample container at one analyzer and the sample container has been returned to the analytic track 110, the sample container will be routed to any remaining analyzer stations. At each analyzer station, the sample container identification information will be scanned to determine (from the WMS) if there are any remaining open assay(s) for that sample container, and if there is an open assay that can be performed by the associated analyzer (as determined by the analyzer software module), the sample container is diverted into the associated buffer queue where the WMS will attempt to accumulate a process number of sample containers with the same open assay.

In various embodiments, the WMS will not wait indefinitely for a process number of sample containers requiring the same open assay to accumulate in the buffer queue. As described in more detail below, in one embodiment, after a predefined period of time after a first sample container requiring a specific open assay has been diverted to the buffer queue, if a process number of sample containers requiring the same specific assay has not accumulated in the buffer queue, the analyzer will process the sample container(s) requiring that specific assay that have accumulated, even though that number of sample containers is less than the process number. In another embodiment, each analyzer commences an assay by moving a receptacle apparatus into position to receive sample from the sample transfer device associated with the analyzer at the beginning of periodically recurring time intervals, referred to herein as process cycles. In one example, a new process cycle begins every five minutes. In this case, the WMS will seek to accumulate as many sample containers requiring the same open assay as possible, up to the process number, before the next process cycle begins. When a process cycle begins, the analyzer will transfer samples from all sample containers in the buffer queue requiring the same open assay, up to the process number, that have been accumulated since the last process cycle. In some embodiments, the WMS may skip one or more process cycles until a process number of sample containers with the same open assay have been accumulated.

In various embodiments, the WMS is configured to alter normal processing of a sample container to ensure that any sample containers designated as STAT samples "S" will be processed as soon as possible. As described in more detail below, if a sample container scanned at an analyzer station is determined to (1) have an open assay that can be performed by the associated analyzer and (2) is a STAT sample, the sample container is diverted into the associated buffer queue. After the STAT sample container is diverted, it is processed immediately (or, in some embodiments, at the beginning of the next process cycle) if there are no other previously diverted samples in the buffer queue. On the other hand, if there are previously diverted sample containers ahead of the STAT sample container in the buffer queue (referred to herein as "blocking sample containers"), the STAT sample container will be processed along with those sample containers if the STAT sample container and the blocking sample container(s) have the same open assay. If the STAT sample container and the blocking sample container(s) do not have the same open assay, the blocking sample container(s) will be processed immediately (or, in some embodiments, at the beginning of the next process cycle)—even if fewer than a process number of sample containers have accumulated, or the blocking sample container(s) will be moved out of the buffer queue without processing the sample container(s) and back to the analytic track 112. The STAT sample container will then be processed after the blocking sample containers are moved out of the buffer queue.

After a sample container has been routed past all the analyzer stations (e.g., analyzer stations 140A-140D, of the analytic segment 110), the sample container identification information is scanned at a recirculation scanner 224 (see FIG. 3)(e.g., bar code or RFID), and the WMS determines if the sample container has any remaining open assays. In an embodiment, the system controller, e.g., WMS, queries the LIS (sample database) 134 to identify the one or more open assays correlated with the identification information associated with the sample container. The WMS then compares the open assay(s) for that sample container with the functional assay(s) of the one or more analyzers 142A-142D operatively associated with the analytic loop (the functional assay(s) may be stored in the WMS and/or the WMS may query the analyzer software module 152 associated with each of the analyzers 142). If the sample container has one or more open assays and there is at least one analyzer in the analytic segment 110 able to perform the open assay, that sample container is routed by the recirculation/outlet diverter 130 to the recirculation segment 114 to be routed back to the analytic track 112. In various embodiments, a "lap counter" value may be incremented by 1 for the recirculated sample container to give that sample container processing priority over other sample containers having a lower lap counter value.

If the sample container scanned by the recirculation scanner 224 has no remaining open assays, or there are no analyzers in the analytic segment 110 able to perform the open assay the sample container does have, the sample container may be diverted by the recirculation/outlet diverter 130 to the outlet segment 118. That sample container is then routed by the outlet segment 118 and the pre-/post-analytic track 202 to (1) the container storage module 214 if the sample container has remaining open assays or (2) the output module 216 if the sample container has no remaining open assays. Prior to routing the sample container to the container storage module 214 or output module 216, the sample container may be routed to a post-processing module, such as capper module 212 to place a cap on the sample container.

By tracking sample containers released from the pre-analytic track 202 to the analytic track 112 (at input scanner 222) and tracking sample containers released from the analytic track 112 to the pre-analytic track 202 (at recirculation scanner 224), the WMS tracks the number of sample containers on the recirculation loop formed by analytic track 112 and recirculation segment 114 at any given time.

In another embodiment, if the sample container scanned at the recirculation scanner 224 has open assay(s), but none matching any functional assay(s) of an available analyzer, the WMS may circulate the sample container around the continuous loop of analytic track 112 and recirculation segment 114 (i.e., the second loop segment or analytic loop) until an analyzer having a functional assay matching the open assay becomes available. If the sample container is circulated around the analytic loop, a counter (the lap counter) or a timer records the number of times the sample container has traversed the analytic loop or the period of time the sample container has spent traversing the analytic loop. If the counter or timer reaches a certain threshold, or limit, e.g., a prescribed number of loops or a prescribed time duration on the analytic loop, and an analyzer having a functional assay matching the open assay of the sample container has not yet become available (or for some other reason, the sample container still has one or more open assays), the sample container may be diverted by the recirculation/outlet diverter 130 to the outlet segment 118. That sample container may then be routed by the outlet segment 118 and the pre-/post-analytic track 202 to (1) the container storage module 214 if the sample container has open assays and is waiting for an available analyzer having a matching functional assay or (2) the output module 216 for temporary storage under ambient conditions or removal from the system 100. Alternatively, the WMS may circulate the sample container around the continuous loop of pre-/post-analytic track 202 and pre-analytic return segment 204 (i.e., the first loop segment or pre-analytic loop) until an analyzer having a functional assay matching the open assay becomes available. In this case, after a prescribed number of times, or a prescribed period of time, traversing the pre-analytic loop without an analyzer having a functional assay matching an open assay of the sample container becoming available, the WMS may then route the sample container to the storage module 214, where the container can be stored until an analyzer having a functional assay matching the open assay becomes available, or to the output module 216, where the container can be stored until an analyzer having a functional assay matching the open assay becomes available or from which the sample container can be removed from the system 100.

Thus, in some embodiments, the WMS or other controller, may use a timer to track the time a sample container spends on the analytic loop and/or the pre-analytic loop or use a counter to track the number of times a sample container has traversed the analytic loop and/or the pre-analytic loop before routing the sample container to the storage module 214 or to the output module 216.

In some cases, a sample container having no current open assays may nonetheless need to be kept in the system 100 for the possibility of additional, follow-on test requirements. Thus, in some embodiments, a sample container having no open assays may be routed to the container storage module 214 (e.g. transferred from track 202 or buffer queue 238 into the container storage module 214 by container transfer robot 214b), and container storage module 214 may hold a combination of sample containers requiring no further processing (i.e., sample containers having no open assays) and sample containers requiring further processing (e.g., sample containers having remaining open assays and/or sample containers that require reflex testing or may require reflex testing based on the results of one or more open assays previously performed on the sample). One example of a reflex test application involves the Aptima® HPV assay and the Aptima® HPV 16 18/45 Genotype assay from Hologic (Marlborough, MA). While the former assay detects, but does not discriminate between, 14 high-risk types of human papillomavirus (HPV), the latter assay detects and differentiates HPV Type 16 from HPV Type 18 and/or HPV Type 45 (these three HPV types are associated with approximately 80% of all invasive cervical cancers worldwide). Thus, if a sample has a positive result for the Aptima HPV assay, it may be desirable to then run the Aptima 16 18/45 Genotype assay on the same sample. The sample container could be stored in the container storage module 214 until the Aptima HPV assay is complete and could be removed from the system if the Aptima HPV assay result is negative or re-run with the Aptima 16 18/45 Genotype assay if the result is positive.

Thus, sample containers may be held in container storage module 214 for a period of time after all open assays have been performed in the event that re-testing or add-on testing may be required, such as additional testing at the direction of the ordering physician based on the results of the open assays that have been completed. The position of each sample container within the storage module 214 (such as a row/column position) is retained by the WMS (or a database accessible to the WMS) so that if further testing is required based on prior test results, the container can be located by its recorded positon and transferred from the container storage module 214 back to the track 202. Sample containers may be transferred from the container storage module 214 to track 202 (or to buffer queue 238) by container transfer robot 214b (i.e., the same container transfer robot that transfers sample containers from the track 202 (or buffer queue 238) to the container storage module 214 or by a different container transfer robot). A sample container requiring no further processing (e.g., no further testing is indicated by prior test results) may be retained within the container storage module 214 and later removed from the system 100 by an operator. In some embodiments, the container storage module 214 is configured to sort sample containers held in the storage module based on identification information associated with the storage modules and information stored in the WMS that is correlated to the machine-readable container identification information so that sample containers requiring further processing can be isolated from sample containers requiring no further processing. Such sample containers requiring no further processing may be routed from the container storage module 214, to the track 202, and to the output module 216 to be further processed at the operator's discretion. In an alternate embodiment, the user can request—e.g., at the end of the day or the end of a shift—that all sample containers having remaining open assays (or possible remaining open assays) be moved from the container storage module 214 to the output module 216. This will leave only fully completed sample containers in the container storage module 214, which can be removed en masse by removing the rack(s) holding such sample containers. The uncompleted sample containers temporarily stored in the output module 216 can be reintroduced manually via the input module 220 and/or automatically via the output container transfer robot 216b.

In an embodiment, the analyzer can accept sample containers from both the track system (i.e., analytic track 112 and buffer queue 148) and from an operator loading sample containers directly into a loading interface of the analyzer (e.g., the manner in which an analyzer might normally operate when not integrated into the automated sample processing system 100). In one example, sample containers may be loaded by an operator into a loading drawer or loading bay of the analyzer that accepts sample containers or racks of sample containers. Preference may be given by system 100 to directly loaded sample containers in the following way. If sample containers are directly loaded onto an analyzer, the analyzer software module will update its functional assay information, e.g., in the analyzer database and/or to the WMS, to indicate no functional assays are available from that analyzer, effectively taking that analyzer "off-line" from the analytic segment 110 of system 100. The analyzer may finish processing any sample containers already in its buffer queue when sample containers are directly loaded and may then go "off-line" and only process the directly-loaded sample containers. After all directly loaded sample containers within the analyzer have completed sample transfer to receptacle apparatus within the analyzer, the analyzer software module will then put the associated analyzer back "on line" by updating its assay information to the WMS to indicate functional assays the analyzer is able to perform are available and begin accepting sample containers from the analytic track 112.

In other examples, the analyzer may be brought on/off-line with dedicated commands entered at a user interface.

An analyzer may also be taken off-line—i.e., not available to the automated sample processing system 100—for servicing. If an analyzer is taken off-line, the WMS must be notified so that it can automatically bypass the off-line analyzers(s). An analyzer may be brought back on-line by updating its status in the WMS.

Figure 8:
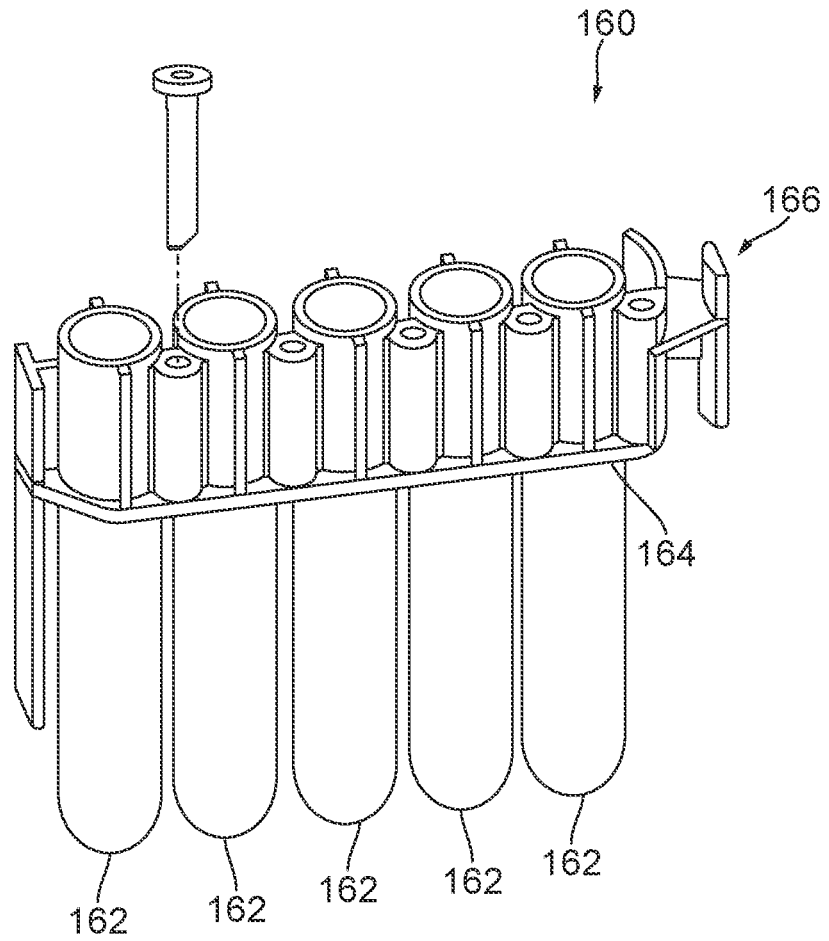
FIG. 8 is a perspective view of an exemplary receptacle apparatus—including a plurality of interconnected process vessels—that may be used in an analyzer of the automated sample processing system.

An exemplary receptacle apparatus 160 that may be used in an analyzer is shown in FIG. 8. As shown in FIG. 8, receptacle apparatus 160 comprises a process number (i.e., two or more) of individual process vessels 162 (five in the illustrated embodiment). In alternate embodiments, a receptacle apparatus may include more or less than five (but more than two) process vessels 162. In the illustrated example, process vessels 162 are in the form of cylindrical tubes (e.g., test tubes) with open top ends and closed bottom ends and are connected to one another in an aligned arrangement by a connecting rib structure 164 which defines a downwardly facing shoulder extending longitudinally along either side of receptacle apparatus 160. In other examples, vessels having configurations other than cylindrical tubes are contemplated. The process vessels 162 may be the same size and shape, as shown in FIG. 8, or they may have different sizes and/or shapes.

In an embodiment, the receptacle apparatus 160 includes a manipulating structure 166. The manipulating structure 166 is adapted to be engaged by a receptacle distributor of an analyzer for moving the receptacle apparatus 160 between different locations within the analyzer.

An exemplary receptacle apparatus is described in U.S. Pat. No. 6,086,827.

As explained above, an analyzer is configured to perform an assay within a receptacle apparatus comprising a process number of two or more interconnected discrete process vessels. Thus, an analyzer configured to perform an assay in receptacle apparatus 160 is configured to perform reactions or processes in each of the five process vessels 162 simultaneously or in parallel. Therefore, to maximize throughput and efficiency of an analyzer configured to perform diagnostic assays in receptacle apparatus 160, it is desirable to identify a process number of five different sample containers requiring the same open assay so that sample material can be transferred from each of the five different sample containers to each of the five process vessels 162, and the samples can be assayed at once. On the other hand, performing an assay on the contents of a receptacle apparatus 160 in which less than five process vessels 162 contain a sample may negatively impact the throughput and efficiency of the analyzer.

Figure 5:
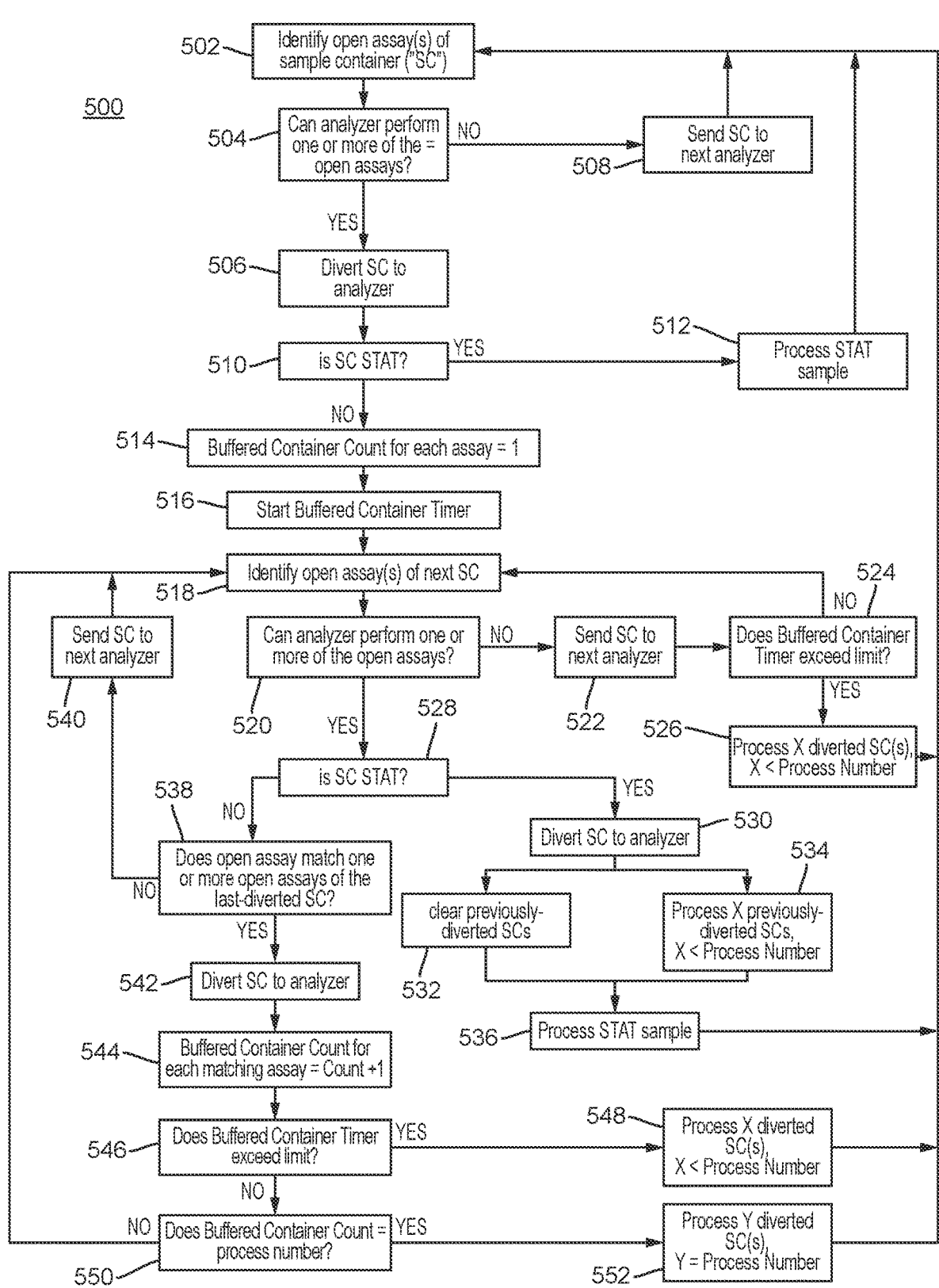
FIG. 5 is a flow chart illustrating an algorithm for sorting, scheduling, and processing sample containers within the analytic segment of the automated sample processing system.

FIG. 5 illustrates one example of a process or algorithm 500 for sorting, scheduling, and processing sample containers, such as sample containers A, B, C, D, and S, within the analytic segment 110 of the system 100.

In step 502, the open assay or assays for a first sample container approaching an analyzer station 140A-140D are determined. As described above, the open assays can be determined by scanning the sample container as it passes an associated scanner of the analyzer station, such as scanner 144A-144D, to obtain the sample identification information for the sample container, which is correlated against the open assay(s) for that sample container stored in the WMS.

Step 504 involves determining whether the associated analyzer, 142A-142D, can perform one or more of the open assays identified in step 502. As described above, in one embodiment, the WMS transmits the sample identification information, including the open assay(s), to the associated analyzer software module 152A-152D, and the analyzer software module will respond with a command to "divert" the sample container to the associated buffer queue 148A-148D or "not divert" the sample container depending on whether the associated analyzer is able to perform one or more of the open assays for that sample container. That is, whether the analyzer is able to perform one or more of the open assays identified in step 502 is a sample selection criteria for determining whether the sample container is diverted to the buffer queue or not. If the associated analyzer, e.g., analyzer 142A, is not able to perform one or more of the open assays, then, in step 508, the sample container is transmitted by the analytic track 112 to the next analyzer 142B, and the process 500 will begin again at the next analyzer 142B starting with step 502.

If the analyzer, e.g., analyzer 142A, is able to perform one or more of the open assays of the sample container, at step 506, the sample container is diverted to the analyzer for further processing (e.g., the analyzer software module transmits a "divert" command to the WMS, and the WMS commands the track controller to activate the associated diverter, e.g., diverter 146A, to divert the sample container into the associated buffer queue, e.g., buffer queue 148A).

In step 510, it is determined whether the sample container that has been diverted to the associated analyzer is a STAT sample (shown as sample container "S" in FIG. 3). As explained above, such information may reside in the WMS where it is correlated with the sample identification information for the particular sample container. Whether the sample container is a STAT sample is another sample selection criteria for assessing whether to divert the sample into the buffer queue. If the sample container is a STAT sample, at step 512, the sample container is processed immediately (this assumes no other sample containers have yet been diverted into the associated buffer queue 148A-148D, in which case the STAT sample would be handled as described below with regard to steps 530, 532, 534, and 536), or, if sample containers are currently being processed, immediately after the current processing is completed. That is, the STAT sample container will be transferred from the buffer queue 148A-148D to the associated shuttle module 150A-150D, shuttled into the analyzer by the associated shuttle module 150A-150D, and sample material will be extracted from the sample container and transferred to a receptacle apparatus within the analyzer. The sample container is returned to the buffer queue after sample material is extracted from the sample container and then returned to the analytic track 112, where it is conveyed to other processing stations 140A-140D in the analytic segment 110 and any remaining open assays for that sample container will be performed on the sample. Process 500 then returns to step 502.

If the sample container diverted in step 506 is not a STAT sample, then, at step 514, a buffered container counter is started to monitor a buffered container count. The buffered container count is the number of sample containers held within a buffer queue that require a particular assay to be performed. At step 514, since the first sample container requiring a particular assay has been diverted to the associated analyzer, the buffered container count is 1. If the first sample container has open assay orders for two assays, e.g., assay "A" and assay "B", that the associated analyzer is able to perform, it is possible that a buffered container count could be monitored for each of assays "A" and "B," at least initially.

In addition, in algorithm 500 of FIG. 5, at step 516, a buffered container timer is started to monitor a buffered container holding time. The buffered container holding time is the length of time after a first sample container requiring a particular assay is diverted to the associated buffer queue. In the previous example, a buffered container timer may be started for each of assays "A" and "B".

In step 518, the open assay or assays for a next sample container approaching the analyzer station are determined. Again, the open assays can be determined by scanning the sample container as it passes an associated scanner of the analyzer station, such as any of scanners 144A-144D, to obtain the sample identification information for the sample container, which is correlated against the open assay(s) for that sample container stored in the WMS.

Step 520 involves determining whether the associated analyzer, 142A-142D, can perform one or more of the open assays identified in step 518. Again, in one embodiment, the WMS transmits the sample identification information, including the open assay(s), to the associated analyzer software module 152A-152D, and the analyzer software module will respond with a "divert" or "do not divert" command depending on whether the associated analyzer is able to perform one or more of the open assays, i.e., sample selection criteria. If the associated analyzer is not able to perform one or more of the open assays, then, in step 522, the sample container is routed by the analytic track 112 to the next analyzer.

After step 522, at step 524, the controller determines if the buffered container holding time has exceeded a predefined time limit. As described above, to maximize analyzer throughput and efficiency, the controller will seek to accumulate a process number of sample containers requiring the same assay in the buffer queue, so that sample can be transferred from each of the process number of sample containers into each of a process number of process vessels of a receptacle apparatus within the analyzer. It may not be efficient or desirable, however, to wait an indefinite period of time to accumulate a process number of sample containers requiring the same assay, as the associated analyzer may stand idle while waiting to "fill out" a process number of sample containers requiring a particular assay. Therefore, in algorithm 500 of FIG. 5, a buffered container timer may be employed so that, after a predetermined period of time waiting to accumulate a process number of sample containers requiring the same assay, all sample containers in the buffer queue requiring a particular assay will be processed, even if that number of sample containers is less than the process number. A predetermined buffered container timer threshold (or "time-out" or "time-out limit") may, for example, be set based on the process cycle for the analyzer. Thus, in one, non-limiting example, the buffered container time-out may be set to the period of time remaining until a new receptacle is positioned to receive sample from the sample transfer device associated with the analyzer (i.e., the remainder of the current process cycle) when the first sample container requiring the particular assay is diverted into the associated buffer queue plus one additional process cycle. As an illustration, if the process cycle is five minutes, the buffered container timer time-out will be the remainder of any process cycle started when the first sample container requiring a particular assay has been diverted to the associated buffer queue (≤5 minutes) plus one additional process cycle (5 minutes). Thus, the timeout limit for this example will be at least 5 minutes after the first sample container is diverted to the buffer queue, but no more than 10 minutes after the first sample container is diverted to the buffer queue.

If the buffered container timer has not reached its time-out limit, process 500 returns to step 518 to identify the open assay(s) of the next sample container. If the buffered container timer has reached its time-out limit for sample containers requiring a particular assay, at step 526, all of the sample containers in the buffer queue requiring the particular assay will be processed, although that number of sample containers (i.e., the buffered container count) will be less than the process number. If step 526 results in all sample containers in the associated buffer queue being processed, and then returned to the analytic track 112, then, after step 526, process 500 may return to step 502 to identify the open assay(s) of the next, first sample container to start accumulating a new set of sample containers in the buffer queue.

In an alternative embodiment, as illustrated above, the buffer queue may contain two or more groups of sample containers requiring two or more different assays (e.g., assays "A" and "B"). In such an embodiment, a buffered container count may be maintained and a buffered container holding time may be monitored for each assay required of the sample containers held in the associated buffer queue. Thus, after step 526 in which a group of sample containers requiring a first assay is processed, process 500 may return to step 518 to identify the open assay(s) of the next sample container. If, at step 524, it is determined that the buffered container timer has reached its time-out limit with respect to more than one assay required of sample containers held in the associated buffer queue, the analyzer software module 152A-152D may apply prioritization logic to determine which open assay of the two or more open assays is processed. Assuming none of the sample containers in the buffer queue is a STAT sample, which are addressed elsewhere in algorithm 500, criteria for prioritizing one assay over others may include (1) selecting the assay reagents that are closest to expiration, (2) selecting the assay kit having the least volume of reagents (i.e., has the fewest tests remaining before going empty), (3) by alphabetical order of the assay name, (4) the physical location of the reagents with respect to the sample transfer location (e.g., the reagent that is physically closest to the sample transfer location may be given priority or reagents at a particular location are arbitrarily given priority over reagents at different locations), or (5) priority is alternated through the different sets of reagents (i.e., first one set is given priority, then the next set, and so-on).

Returning to step 520, if the associated analyzer is able to perform one or more of the open assays, then, in step 528, it is determined whether the next sample container is a STAT sample, i.e., further sample selection criteria. As explained above, such information may reside in the WMS where it is correlated with the sample identification information for the particular sample container. If the sample container is a STAT sample, then, at step 530, the sample container is diverted to the associated buffer queue (e.g., the analyzer software module 152A-152D transmits a "divert" command to the WMS, and the WMS commands the track controller to activate the associated diverter 146A-146D to divert the sample container into the associated buffer queue 148A-148D).

After the STAT sample container is diverted to the associated buffer queue in step 530, process 500 may incorporate any of a number of alternate steps, two of which are shown in FIG. 5.

In one alternative, in step 532, if a STAT sample container is diverted in step 530, all sample containers previously diverted into the associated buffer queue 148A-148D ahead of the STAT sample container (blocking sample containers) are cleared from the buffer queue without processing them in the associated analyzer 142A-142D. That is, all blocking sample containers within the buffer queue are routed from the buffer queue to the analytic track 112. The blocking sample containers removed from the buffer queue without being processed will be routed via the analytic track 112—and, if necessary, via the recirculation segment 114—to another analyzer—or, possibly, back to the same analyzer—able to perform the assay(s) required of the un-processed sample containers.

As an alternative to simply clearing all blocking sample containers without processing the sample containers, at step 534, all of the blocking sample containers requiring an assay different from the STAT sample container will be processed, although that number of blocking sample containers (i.e., the buffered container count) will be less than the process number for that assay. After each blocking sample container is shuttled into the analyzer and then shuttled back to the buffer queue, it is returned to the analytic track 112.

After all blocking sample containers are moved out of the buffer queue—and out of the way of the STAT sample container—either without processing the blocking sample containers (step 532) or with processing the blocking sample containers (step (534), at step 536 the STAT sample container is moved up in the buffer queue to a position to be processed.

Process 500 then returns to step 502.

As an alternative to steps 532 and 534, if the blocking sample containers require more than one specific assay that is to be performed by the associated analyzer 142A-142D, the process may include step 532 for some blocking sample containers and step 534 for other blocking sample containers. That is, all blocking sample containers requiring one particular assay may be processed in accordance with step 534 before being cleared out of the way of the STAT sample container, and all blocking sample containers requiring a different particular assay will be cleared from the buffer queue without processing in accordance with step 532. The analyzer software module 152A-152D may apply prioritization logic as described above to select which assay to process and which assay to clear without processing.

As a further alternative, although not shown in FIG. 5, if the assay required of the STAT sample container is the same as the assay required of one or more blocking sample containers, the STAT sample container may be processed together with the blocking sample containers requiring the same assay—even if the number of sample containers requiring that assay is less than the process number—and any blocking sample containers requiring a different assay may be cleared from the associated buffer queue without processing.

Returning to step 528, if the next sample container is not a STAT sample container, then, at step 538, it is determined whether the assay required of the next sample container matches one or more open assays of the sample container(s) previously diverted into the associated buffer queue, which may be referred to herein as "queued open assays." Recall that a purpose of the process 500 is to direct sample container to analyzers able to perform the open assay(s) required of the sample containers, to group the sample containers according to the assays required of them, and to collect groups of sample containers equal in number to the process number so that sample may be transferred from each sample container to each process vessel of a receptacle apparatus within an associated analyzer. Thus, in one embodiment, once a sample container having a particular open assay has been diverted into an associated buffer queue, a subsequent sample container having a different open assay not matching the queued open assay may not be diverted into that associated buffer queue even if the associated analyzer is able to perform the second assay. That is, the analyzer software module 152A-152D of the analyzer station 140A-140D becomes "locked" on sample containers with an open assay matching the open assay of the first sample container diverted into the associated buffer queue (i.e., matching the queued open assay). To illustrate, in one embodiment, if an analyzer is able to perform assay "A" and assay "B," after a sample container requiring assay "A" has been diverted into the associated buffer queue, only subsequent sample containers requiring assay "A" will also be diverted into the associated buffer queue, and sample containers requiring assay "B" will not be diverted and will be sent on to the next analyzer until a process number of sample containers requiring assay "A" has been diverted to the associated buffer queue. Alternatively, if the first sample container diverted into the associated buffer queue requires both assay "A" and assay "B," the analyzer station will "lock" on to the first subsequent sample container requiring assay "A" or assay "B." Alternatively, if the next sample container also requires both assays "A" and "B," the analyzer station may lock on the second subsequent sample container requiring assay "A" or assay "B." If the second subsequent sample container requires assay "B" and "C," the sample container will be diverted into the analyzer's buffer queue, and the analyzer will thereafter be locked onto assay "B." Accordingly, the one or more assays on which the analyzer software module is locked presents additional sample selection criteria for determining whether to divert the sample container into the buffer queue. Accordingly, a subsequent sample container may not be diverted to the buffer queue, even if it has an open assay matching a functional assay of the associated analyzer, if the open assay(s) of the subsequent sample container do not match the functional assay on which the analyzer station is locked. In addition, a subsequent sample container may not be diverted to the buffer queue, even if it has an open assay matching a functional assay of the associated analyzer, if the buffer queue is full or if the reagents on the associated analyzer are running low.

Note that in the illustrated example of FIG. 5, step 528—determining whether the sample container is STAT—precedes step 538—determining if the open assay(s) match open assay(s) of sample container currently held in the buffer queue. Thus, in such an embodiment, whether the sample container is STAT will override the assay on which the analyzer software module is locked, and a STAT sample container may be diverted into the buffer queue if the analyzer is able to perform the STAT open assay, even if the STAT open assay differs from the assay(s) on which the analyzer software module is locked.

Alternatively, other distinguishing parameters (i.e., other sample selection criteria) may be used for determining whether the analyzer station will lock onto assay "A" or assay "B." For example, the analyzer software module may apply reagent stability data, as supplied by the analyzer software module 152A-152D, to determine which assay will be prioritized over the other(s). Thus, if the reagents associated with assay "A" are scheduled to expire sooner than the reagents associated with assay "B", then the WMS may choose to lock onto assay "A" even though the analyzer is able to perform assay "A" and assay "B".

In a further example, a STAT sample container requiring an assay the analyzer is able to perform but different from the assay on which the analyzer is locked may override the lock, and the analyzer may divert and process the STAT sample container, as illustrated at steps 530, 532, 534 and 536.

As described above, if a sample container requiring more than one assay that the associated analyzer is able to perform is diverted to the buffer queue, a buffered container count may be maintained and a buffered container holding time may be monitored for each assay. Once the analyzer software module "locks" in on a single assay, however, the buffered container count and the buffered container holding time for the other assays will no longer be monitored.

Thus, at step 538, if the open assay(s) of the next sample container does not match one or more assays of the sample container last diverted to the associated buffer queue, then, at step 540, the sample container is passed along to the next analyzer, and process 500 returns to step 518. Conversely, if the assay required of the next sample container does match one or more assays required of the sample container last diverted into the associated buffer queue, then, at step 542, that next sample container is diverted to the associated buffer queue.

After the sample container is diverted to the associated buffer queue, at step 544, the buffered container count for each matching assay identified in step 538 is increased by 1. If the analyzer software module locks onto a single one of the matching assays, or has already locked onto a single one of the matching assays, the buffered container count will be incremented for only the one assay.

At step 546, the buffered container holding time for each matching assay, or for the one assay on which the analyzer software module is locked, is checked to determine whether it has reached its time-out limit. If the buffered container holding time has reached its time-out limit for a sample container requiring a particular assay, at step 548, all of the sample containers within the buffer queue requiring the particular assay will be processed, although that number of sample containers (i.e., the buffered container count) will be less than the process number. If step 548 results in all sample containers in the associated buffer queue being processed, and then returned to the analytic track 112, then, after step 548, process 500 may return to step 502 to identify the open assay(s) of the next, first sample container to start accumulating a new set of sample containers in the associated buffer queue.

As noted above, in an alternative embodiment not shown in FIG. 5, the buffer queue may contain two or more groups of sample containers requiring two or more different assays. In such an embodiment, a buffered container count may be maintained and a buffered container holding time may be monitored for each assay required of the sample containers held in the associated buffer queue. Thus, after step 548 in which a first group of sample containers requiring a first assay is processed, process 500 may return to step 518 to identify the open assay(s) of the next sample container to add to already-diverted sample containers held in the buffer queue and requiring a second assay. If, at step 546, it is determined that the buffered container holding time has reached its time-out limit with respect to more than one assay required of sample containers held in the associated buffer queue, the analyzer software module may apply prioritization logic as described above to determine which assay to process.

If the buffered container holding time has not reached its time-out limit for any assay, then at step 550, the controller determines whether the buffered container count for any assay required of sample container(s) in the buffer queue has reached the process number. If the buffered container count for no assay has reached the process number (i.e., there is less than a process number of sample containers in the associated buffer queue for any assay required of the containers within the buffer queue), then process 500 returns to step 518. If the buffered container count has reached the process number for any assay, at step 552 a process number of diverted sample containers requiring that particular assay are processed.

Since no more than a process number of sample containers can be processed in each receptacle apparatus at a time, in some embodiments, the buffered container count cannot exceed the process number. That is, if a process number of sample containers requiring the same open assay have been diverted into a buffer queue, and the analyzer is not yet able to process the sample containers, a new buffered container count—beginning at 1—will be started with the next sample container diverted to the buffer queue.

Figure 6:
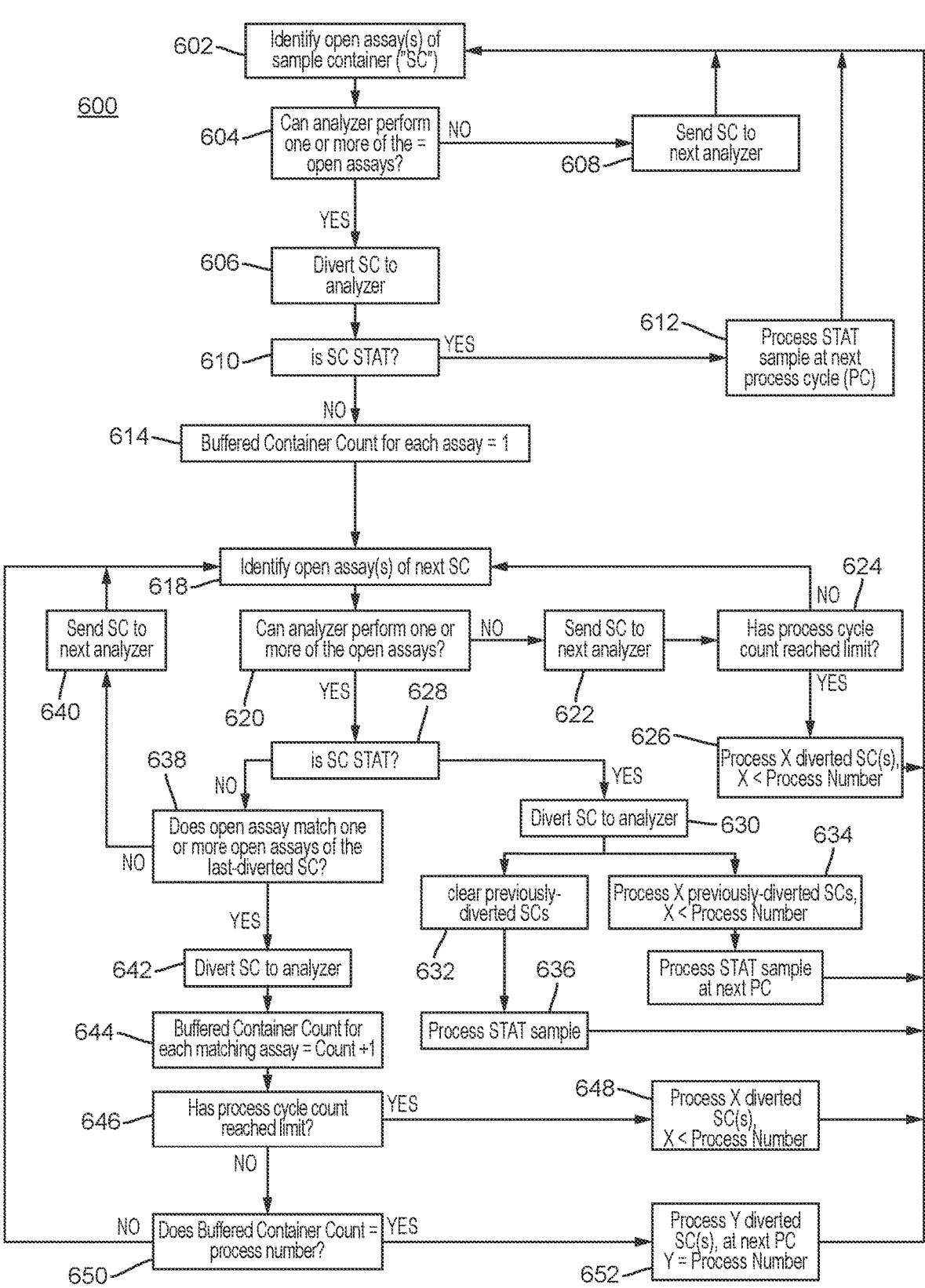
FIG. 6 is a flow chart illustrating an alternate algorithm for sorting, scheduling, and processing sample containers within the analytic segment of the automated sample processing system.

FIG. 6 illustrates an alternate example of a process or algorithm 600 for sorting, scheduling, and processing sample containers, such as sample containers A, B, C, D, and S, within the analytic segment 110 of the system 100. Algorithm 600 of FIG. 6 differs from algorithm 500 in FIG. 5 in that in an algorithm 600, each of the analyzers 142A-142D in the analytic segment 110 operates on a process clock, whereby the analyzer begins processing any available sample containers at the beginning of each process cycle. In one example, a process cycle is at least the amount of time required to transfer sample material from each of a process number of sample containers to each of a process number of process vessels of a receptacle apparatus within the analyzer, plus the amount of time required to move the receptacle apparatus to and from a sample transfer position within the analyzer. In an embodiment, a new process cycle begins every five minutes, and all analyzers 142A-142D begin their process cycle at the same time.

In the algorithm 500 shown in FIG. 5, on the other hand, each analyzer is governed by a dedicated timer, and the analyzer we will begin to process samples as soon as a process number of sample containers with the same open assay that can be performed by the analyzer have been accumulated, or after a specified period of time has passed (e.g., a current process cycle plus the next process cycle after the first sample container with an open assay that can be performed by the analyzer has been diverted, even if a process number of sample containers has not been diverted to the buffer queue).

In step 602, the open assay or assays for a first sample container approaching an analyzer station 140A-140D are determined. As described above, the open assays can be determined by scanning the sample container as it passes an associated scanner of the analyzer station, such as scanner 144A-144D, to obtain the sample identification information for the sample container, which is correlated against the open assay(s) for that sample container stored in the WMS.

Step 604 involves determining whether the associated analyzer, 142A-142D, can perform one or more of the open assays identified in step 602. As described above, in one embodiment, the WMS transmits the sample identification information, including the open assay(s), to the associated analyzer software module 152A-152D, and the analyzer software module will respond with a command to "divert" the sample container to the associated buffer queue 148A-148D or "not divert" the sample container depending on whether the associated analyzer is able to perform one or more of the open assays for that sample container. That is, whether the analyzer is able to perform one or more of the open assays identified in step 602 is a sample selection criteria for determining whether the sample container is diverted to the associated buffer queue or not. If the associated analyzer, e.g., analyzer 142A, is not able to perform one or more of the open assays, then, in step 608, the sample container is transmitted by the analytic track 112 to the next analyzer 142B, and the process 600 will begin again at the next analyzer 142B starting with step 602.

If the analyzer is able to perform one or more of the open assays of the sample container, at step 606, the sample container is diverted to the analyzer for further processing (e.g., the analyzer software module 152A-152D transmits a "divert" command to the WMS, and the WMS commands the track controller to activate the associated diverter 146A-146D to divert the sample container into the associated buffer queue 148A-148D).

In step 610, it is determined whether the sample container that has been diverted to the associated analyzer is a STAT sample (shown as sample container "S" in FIG. 3). As explained above, such information may reside in the WMS where it is correlated with the sample identification information for the particular sample container. Whether the sample container is a STAT sample is another sample selection criteria for assessing whether to divert the sample into the buffer queue. If the sample container is a STAT sample, at step 612, the sample is processed in the analyzer at the next process cycle. That is, at the beginning of the next process cycle, the STAT sample container will be transferred from the buffer queue 148A-148D to the associated shuttle module 150A-150D, shuttled into the analyzer by the associated shuttle module 150A-150D, and sample material will be extracted from the sample container and transferred to a receptacle apparatus within the analyzer. The sample container is returned to the buffer queue after sample material is extracted from the sample container and then returned to the analytic track 112, where it is conveyed to other processing stations 140A-140D in the analytic segment 110 and any remaining open assays for that sample container will be performed on the sample. Process 600 then returns to step 602.

Also, if there is sufficient time from the time the STAT sample is identified in step 610 to the time the STAT sample is processed at the next process cycle in step 612, the controller may attempt to accumulate more sample containers requiring the same assay as the STAT sample container so as to maximize the number of samples—up to the process number—that can be processed when the STAT sample is processed. Thus, although not shown in FIG. 6, after the STAT sample container is identified in step 610, but before the STAT sample container is processed at the next process cycle in step 612, additional sample containers passing the analyzer on the analytic track 112 will be scanned to identify the open assay(s) of each sample container, and, if an open assay matches the open assay of the STAT sample container, the sample container will be diverted into the buffer queue with the STAT sample container to be processed with the STAT sample container at step 612.

If the sample container diverted in step 606 is not a STAT sample, then, at step 614, a buffered container counter is started to monitor a buffered container count. The buffered container count is the number of sample containers held within a buffer queue that require a particular assay to be performed. At step 614, since the first sample container requiring a particular assay has been diverted to the associated analyzer, the buffer count is 1. If the first sample container has open assay orders for two assays, e.g., assay "A" and assay "B," that the associated analyzer is able to perform, it is possible that a buffered container count could be monitored for each of assays "A" and "B," at least initially.

In step 618, the open assay or assays for a next sample container approaching the analyzer station are determined. Again, the open assays can be determined by scanning the sample container as it passes an associated scanner of the analyzer station, such as any of scanners 144A-144D, to obtain the sample identification information for the sample container, which is correlated against the open assay(s) for that sample container stored in the WMS.

Step 620 involves determining whether the associated analyzer, 142A-142D, can perform one or more of the open assays identified in step 618. Again, in one embodiment, the WMS transmits the sample identification information, including the open assay(s), to the associated analyzer software module 152A-152D, and the analyzer software module will respond with a "divert" or "do not divert" command depending on whether the associated analyzer is able to perform one or more of the open assays, i.e., sample selection criteria. If the associated analyzer is not able to perform one or more of the open assays, then, in step 622, the sample container is routed by the analytic track 112 to the next analyzer.

If, between steps 614 and step 618, a new process cycle begins for the associated analyzer, the non-STAT sample container diverted in step 606 may be processed even though the number of sample containers being processed, i.e., one, is less than the process number, which means that sample will be transferred to only one process vessel of the receptacle apparatus within the analyzer. On the other hand, to improve throughput and efficiency while reducing consumable usage, the system may wait one or more additional process cycles—during which time the analyzer may sit idle—to allow additional time to accumulate more sample containers requiring the same assay, before the non-STAT sample diverted at step 606 is processed. This is described in further detail below.

After step 622, at step 624, the controller determines if a process cycle count has reached a predefined time limit. As described above, to maximize analyzer throughput and efficiency, and to minimize consumable usage, the controller will seek to accumulate a process number of sample containers requiring the same assay in the buffer queue, so that sample can be transferred from each of the process number of sample containers into each of a process number of process vessels of a receptacle apparatus within the analyzer. It may not be efficient or desirable, however, to wait an indefinite period of time to accumulate a process number of sample containers requiring the same assay, as the associated analyzer may stand idle while waiting to "fill out" a process number of sample containers requiring a particular assay. Therefore, in algorithm 600 of FIG. 6, process cycle count may be maintained to determine if the one or more sample containers diverted to the buffer queue should be processed, even if fewer than a process number of sample containers does with a particular open assay have been diverted.

The process cycle count is the number of process cycles that have passed since the first sample container with the particular open assay has been diverted. When the process cycle count has reached a predefined limit, the diverted sample container(s) will be processed, even if less than the process number. In one, non-limiting example, the process cycle count limit may be 2, i.e., the period of time remaining to process a receptacle that is currently being processed within an analyzer (i.e., the remainder of the current process cycle) when the first sample container requiring the particular assay is diverted into the associated buffer queue plus one additional process cycle. As an illustration, if the process cycle is five minutes, the process cycle count limit will be the remainder of any process cycle started when the first sample container requiring a particular assay has been diverted to the associated buffer queue (≤5 minutes) plus one additional process cycle (5 minutes). Thus, the timeout limit for this example will be at least 5 minutes after the first sample container is diverted to the buffer queue, but no more than 10 minutes after the first sample container is diverted to the buffer queue.

If the process cycle count has not reached its limit, process 600 returns to step 618 to identify the open assay(s) of the next sample container. If the process timer count has reached its limit for sample containers requiring a particular assay, at step 626, all of the sample containers in the buffer queue requiring the particular assay will be processed, although that number of sample containers (i.e., the buffered container count) will be less than the process number. If step 626 results in all sample containers in the associated buffer queue being processed and then returned to the analytic track 112, then, after step 626, process 600 may return to step 602 to identify the open assay(s) of the next, first sample container to start accumulating a new set of sample containers in the buffer queue.

In an alternative embodiment, as illustrated above, the buffer queue may contain two or more groups of sample containers requiring two or more different assays (e.g., assays "A" and "B"). In such an embodiment, a buffered container count may be maintained and a process cycle count may be monitored for each assay required of the sample containers held in the associated buffer queue. Thus, after step 626 in which a group of sample containers requiring a first assay is processed, process 600 may return to step 618 to identify the open assay(s) of the next sample container. If, at step 624, it is determined that the process cycle count has reached its limit with respect to more than one assay required of sample containers held in the associated buffer queue, the analyzer software module 152A-152D may apply prioritization logic to determine which open assay of the two or more open assays is processed—i.e., which particular assay reagents are combined with the sample material transferred from the sample containers to the process vessels of the receptacle apparatus within the analyzer. Assuming none of the sample containers in the buffer queue is a STAT sample, which are addressed elsewhere in algorithm 600, criteria for prioritizing one assay over others may include (1) selecting the assay reagents that are closest to expiration, (2) selecting the assay kit having the least volume of reagents (i.e., has the fewest tests remaining before going empty), (3) by alphabetical order of the assay name, (4) the physical location of the reagents with respect to the sample transfer location (e.g., the reagent that is physically closest to the sample transfer location may be given priority or reagents at a particular location are arbitrarily given priority over reagents at different locations), or (5) priority is alternated through the different sets of reagents (i.e., first one set is given priority, then the next set, and so-on).

Returning to step 620, if the associated analyzer is able to perform one or more of the open assays, then, in step 628, it is determined whether the next sample container is a STAT sample i.e., further sample selection criteria. As explained above, such information may reside in the WMS where it is correlated with the sample identification information for the particular sample container. If the sample container is a STAT sample, then, at step 630, the sample container is diverted to the associated buffer queue (e.g., the analyzer software module 152A-152D transmits a "divert" command to the WMS, and the WMS commands the track controller to activate the associated diverter 146A-146D to divert the sample container into the associated buffer queue 148A-148D).

After the STAT sample container is diverted to the associated buffer queue in step 630, process 600 may incorporate any of a number of alternate steps, two of which are shown in FIG. 6.

In one alternative, in step 632, if a STAT sample container is diverted in step 630, all sample containers previously diverted into the associated buffer queue 148A-148D ahead of the STAT sample container (hereinafter referred to as "blocking sample containers") are cleared from the buffer queue without processing them in the associated analyzer 142A-142D. That is, all blocking sample containers within the buffer queue are routed from the buffer queue to the analytic track 112. The blocking sample containers removed from the buffer queue without being processed will be routed via the analytic track 112—and, if necessary, via the recirculation segment 114—to another analyzer—or, possibly, back to the same analyzer—able to perform the assay(s) required of the un-processed sample containers.

After all blocking sample containers are moved out of the buffer queue—and out of the way of the STAT sample container-without processing the blocking sample containers (step 632), at step 636, the STAT sample container is moved up in the buffer queue to position to be shuttled to the analyzer and is processed at the next process cycle. Also, if there is sufficient time from the time the STAT sample is identified in step 628 to the time the STAT sample is processed at the next process cycle in step 636, the controller may attempt to accumulate more sample containers requiring the same assay as the STAT sample container so as to maximize the number of samples—up to the process number—that can be processed when the STAT sample is processed. Thus, although not shown in FIG. 6, after the STAT sample container is identified in step 628, but before the STAT sample container is processed at the next process cycle in step 636, additional sample containers passing the analyzer on the analytic track 112 will be scanned to identify the open assay(s) of each sample container, and, if an open assay matches the open assay of the STAT sample container, the sample container will be diverted into the buffer queue with the STAT sample container to be processed with the STAT sample container at step 636. Process 600 then returns to step 602.

As an alternative to simply clearing all blocking sample containers without processing the sample containers, at step 634, all of the blocking sample containers requiring an assay different from the STAT sample container will be processed at the next process cycle, although that number of blocking sample containers (i.e., the buffered container count) will be less than the process number for that assay. After each blocking sample container is shuttled into the analyzer and then shuttled back to the buffer queue, it is returned to the analytic track 112.

After all blocking sample containers are moved out of the buffer queue—and out of the way of the STAT sample container—by processing the blocking sample containers (step 634), at step 637, the STAT sample container is moved up in the buffer queue to position to be shuttled to the analyzer and is processed at the next process cycle. Also, if there is sufficient time from the time the STAT sample is identified in step 628 to the time the STAT sample is processed at the next process cycle in step 637, the controller may attempt to accumulate more sample containers requiring the same assay as the STAT sample container so as to maximize the number of samples—up to the process number—that can be processed when the STAT sample is processed. Thus, although not shown in FIG. 6, after the STAT sample container is identified in step 628, but before the STAT sample container is processed at the next process cycle in step 637, additional sample containers passing the analyzer on the analytic track 112 will be scanned to identify the open assay(s) of each sample container, and, if an open assay matches the open assay of the STAT sample container, the sample container will be diverted into the buffer queue with the STAT sample container to be processed with the STAT sample container at step 637.

Process 600 then returns to step 602.

As an alternative to steps 632 and 634, if the blocking sample containers require more than one specific assay that is to be performed by the associated analyzer 142A-142D, the process may include step 632 for some blocking sample containers and step 634 for other blocking sample containers. That is, all blocking sample containers requiring one particular assay may be processed in accordance with step 634 before being cleared out of the way of the STAT sample container, and all blocking sample containers requiring a different particular assay will be cleared from the buffer queue without processing in accordance with step 632. The analyzer software module 152A-152D may apply prioritization logic as described above to select which assay to process and which assay to clear without processing.

As a further alternative, although not shown in FIG. 6, if the assay required of the STAT sample container is the same as the assay required of one or more blocking sample containers, the STAT sample container may be processed together with the blocking sample containers requiring the same assay—even if the number of sample containers requiring that assay is less than the process number—and any blocking sample containers requiring a different assay may be cleared from the associated buffer queue without processing.

Returning to step 628, if the next sample container is not a STAT sample container, then, at step 638, it is determined whether the assay required of the next sample container matches one or more assays of the sample container previously diverted into the associated buffer queue. Recall that a purpose of the process 600 is to direct sample container to analyzers able to perform the assay(s) required of the sample containers, to group the sample containers according to the assays required of them, and to collect groups of sample containers equal in number to the process number so that sample may be transferred from each sample container to each process vessel of a receptacle apparatus within an associated analyzer. Thus, in one embodiment, once a sample container requiring a particular assay has been diverted into an associated buffer queue, a subsequent sample container requiring a different assay may not be diverted into that associated buffer queue even if the associated analyzer is able to perform the second assay. That is, as explained above, the analyzer software module 152A-152D of the analyzer station 140A-140D becomes "locked" on sample containers with an open assay matching the open assay of the first sample container diverted into the associated buffer queue or becomes locked onto a specific assay according to other criteria.

In a further example, a STAT sample container requiring an assay the analyzer is able to perform but different from the assay on which the analyzer is locked may override the lock, and the analyzer may divert and process the STAT sample container, as illustrated at steps 630, 632, 634, 636, and 637.

As described above, if a sample container requiring more than one assay that the associated analyzer is able to perform is diverted to the buffer queue, a buffered container count may be maintained and a process cycle count may be monitored for each assay. Once the analyzer software module "locks" in on a single assay, however, the buffered container count and the process cycle count for the other assays will no longer be monitored.

Thus, at step 638, if the open assay(s) of the next sample container does not match one or more assays of the sample container last diverted to the associated buffer queue, then, at step 640, the sample container is passed along to the next analyzer, and process 600 returns to step 618. Conversely, if the assay required of the next sample container does match one or more assays required of the sample container last diverted into the associated buffer queue, then, at step 642, that next sample container is diverted to the associated buffer queue.

Note that in the illustrated example of FIG. 6, step 628—determining whether the sample container is STAT—precedes step 638—determining if the open assay(s) match open assay(s) of sample container currently held in the buffer queue. Thus, whether the sample container is STAT will override the assay on which the analyzer software module is locked, and a STAT sample container may be diverted into the buffer queue if the analyzer is able to perform the STAT open assay, even if the STAT open assay differs from the assay(s) on which the analyzer software module is locked. Accordingly, the one or more assays on which the analyzer software module is locked presents additional sample selection criteria for determining whether to divert the sample container into the buffer queue.

After the sample container is diverted to the associated buffer queue, at step 644, the buffered container count for each matching assay identified in step 638 is increased by 1. If the analyzer software module locks onto a single one of the matching assays or has already locked onto a single one of the matching assays, the buffered container count will be incremented for only the one assay.

At step 646, the process cycle count for each matching assay, or for the one assay on which the analyzer software module is locked, is checked to determine whether it has reached its limit. If the process cycle count has reached its limit for a sample container requiring a particular assay, at step 648, all of the sample containers within the buffer queue requiring the particular assay will be processed, although that number of sample containers (i.e., the buffered container count) will be less than the process number. If step 648 results in all sample containers in the associated buffer queue being processed, and then returned to the analytic track 112, then, after step 648, process 600 may return to step 602 to identify the open assay(s) of the next, first sample container to start accumulating a new set of sample containers in the associated buffer queue.

As noted above, in an alternative embodiment not shown in FIG. 6, the buffer queue may contain two or more groups of sample containers requiring two or more different assays. In such an embodiment, a buffered container count may be maintained and a process cycle count may be monitored for each assay required of the sample containers held in the associated buffer queue. Thus, after step 648 in which a first group of sample containers requiring a first assay is processed, process 600 may return to step 618 to identify the open assay(s) of the next sample container to add to already-diverted sample containers held in the buffer queue and requiring a second assay. If, at step 646, it is determined that the process cycle count has reached its limit with respect to more than one assay required of sample containers held in the associated buffer queue, the analyzer software module may apply prioritization logic as described above to determine which assay to process.

If the process cycle count has not reached its limit for any assay, then at step 650, the controller determines whether the buffered container count for any assay required of sample container(s) in the buffer queue has reached the process number. If the buffered container count for no assay has reached the process number (i.e., there is less than a process number of sample containers in the associated buffer queue for any assay required of the containers within the buffer queue), then process 600 returns to step 618. If the buffered container count has reached the process number for any assay, at step 652 a process number of diverted sample containers requiring that particular assay are processed at the next process cycle. Then, after step 652, process 600 may return to step 602 to identify the open assay(s) of the next, first sample container to start accumulating a new set of sample containers in the buffer queue.

Timing Diagram

Figure 7:
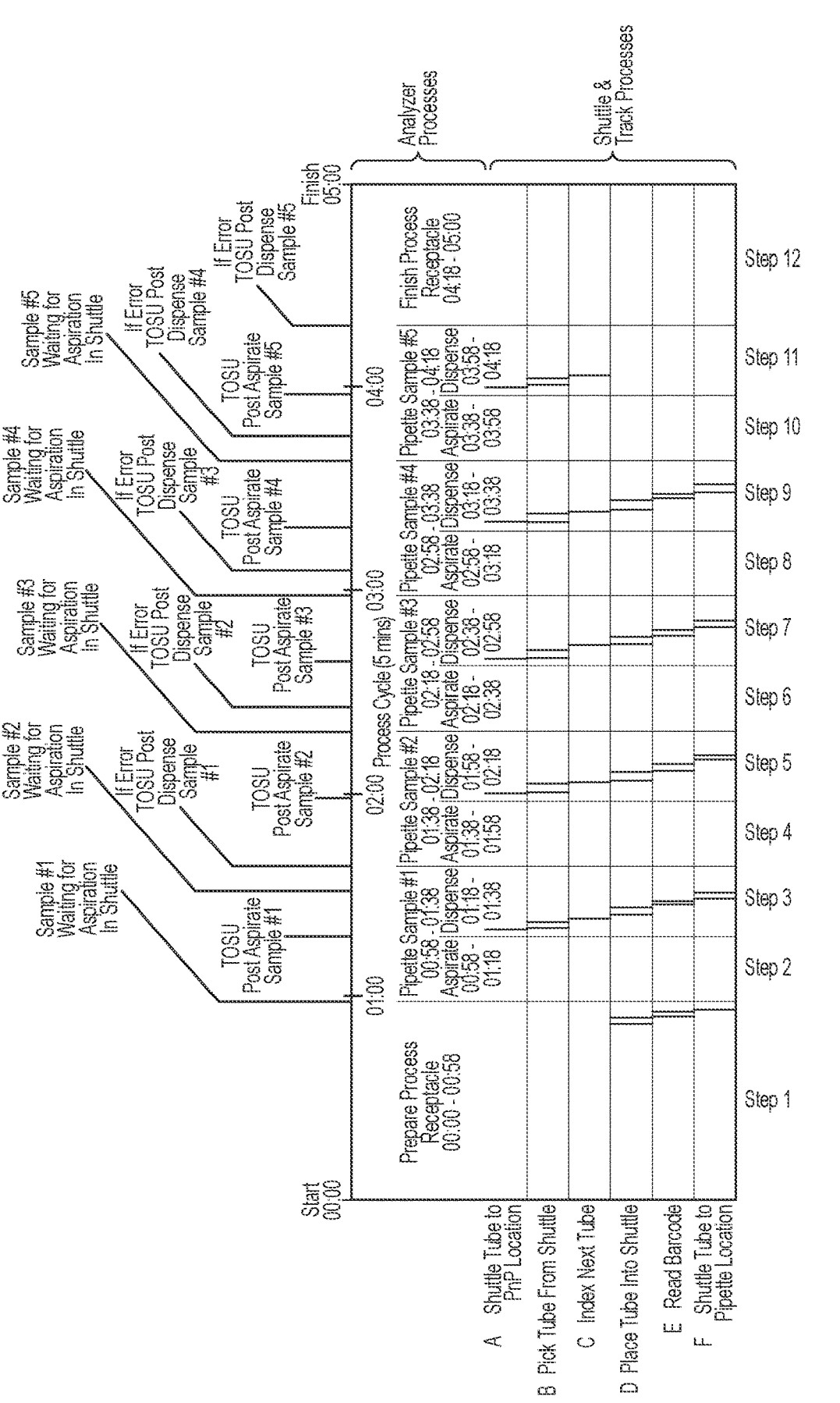
FIG. 7 is a timing diagram of an exemplary process cycle.

In order to maintain maximum throughput and efficiency and to optimize consumable usage, it is preferred for the sample containers to be processed in groups of a process number of sample container requiring the same assay. In one example, the process number of sample containers are scheduled by the controller (e.g., the analyzer software module) to be processed in a single process cycle, which is the amount of time required to transfer sample material from each of a process number of sample containers to each of a process number of process vessels of a receptacle apparatus within the analyzer, plus the amount of time required to move the receptacle apparatus to and from a sample transfer position within the analyzer. FIG. 7 is a timing diagram showing an exemplary five-minute process cycle for a reaction receptacle having five reaction vessels (i.e., a process number of 5).

Different assays performed by the analyzer may have significantly different time durations for each step within the process cycle. However, all steps must be completed during the process cycle (e.g., five minutes).

Processing a process number of sample containers within one process cycle utilizes one receptacle apparatus. If less than a process number of sample containers are provided to the analyzer for a given process cycle, then the receptacle apparatus will not be fully utilized (i.e., one or more process vessels of the receptacle apparatus will not be used) thus reducing throughput, since less than a process number of sample containers are processed within the process cycle, and less than a process number of assays will be performed by the analyzer as the receptacle apparatus is moved through the analyzer. This will also affect consumable (i.e., receptacle apparatus) usage since the receptacle apparatus is not used to full capacity and fewer samples are processed for each unfilled receptacle apparatus.

Given the example shown in FIG. 7, processing of the sample container during the process cycle and interaction with the track section 110 can be mapped out. FIG. 7 represents an exemplary process cycle of five minutes for a process number of 5 (i.e., each receptacle apparatus has five process vessels as shown in FIG. 8). This is an example only, and process numbers of more than 5 or less than 5 (but greater than 1), and process cycles of more or less than five minutes are also contemplated. FIG. 7 illustrates six sample container, or "Tube," manipulation steps, referred to in FIG. 7 as Shuttle & Track Processes." Referring to FIGS. 4 and 7, in manipulation step "A," "Shuttle Tube to PnP Location," shuttle module 150 transports the sample container from the analyzer 142 (e.g., from a pipetting location within the analyzer) to the sample container handoff position (pick-and-place ("PnP") location) 156 of the pick-and-place robot 154. In step "B," "Pick Tube From Shuttle," the pick-and-place robot 154 picks the sample container from the sample container handoff position (pick-and-place ("PnP") location) 156 and places it on the buffer queue 148. In step C, "Index Next Tube," the transfer module 158 indexes a sample container 120 from the buffer queue 148 to the sample container handoff position (pick-and-place ("PnP") location) 156. In step "D," "Place Tube Into Shuttle," the pick-and-place robot 154 transfers the sample container 120 to the shuttle module 150. In step "E," "Read Barcode," the barcode of the sample container is read on the shuttle module 150 (alternatively, the barcode of the sample container is read while the sample container is in the buffer queue and before it is transferred from the buffer queue 148 to the sample container handoff position (pick-and-place ("PnP") location) 156). In step "F," "Shuttle Tube to Pipette Location," the shuttle module 150 transfers the sample container to a pipetting location within or adjacent to the analyzer 142. FIG. 7 also illustrates different "Analyzer Processes" that occur during the Process Cycle: Prepare Receptacle apparatus, Pipette Sample #1 (aspirate sample material from a first sample container and dispense the sample material into a first receptacle vessel of the receptacle apparatus), Pipette Sample #2 (aspirate sample material from a second sample container and dispense the sample material into a second receptacle vessel of the receptacle apparatus), Pipette Sample #3 (aspirate sample material from a third sample container and dispense the sample material into a third receptacle vessel of the receptacle apparatus), Pipette Sample #4 (aspirate sample material from a fourth sample container and dispense the sample material into a fourth receptacle vessel of the receptacle apparatus), and Pipette Sample #5 (aspirate sample material from a fifth sample container and dispense the sample material into a fifth receptacle vessel of the receptacle apparatus).

Step 1 [00:00-00:58]: Prepare Receptacle Apparatus

Referring to the timing diagram of FIG. 7, the first part of the process cycle involves preparing the receptacle apparatus for a particular assay. This step includes such activities as moving a new receptacle apparatus into the sample transfer position, dispensing reagents into one or more of the process vessels, etc. Again, the exact steps and time durations of all steps within the process cycle can vary depending on the assay, but, for illustration purposes, step 1 of the timing diagram shown in FIG. 7, is 58 seconds long. During this first step, sample container #1 (the "Tube") is placed into the shuttle, the bar code of the sample container is read to confirm its identity, and sample container #1 is moved by the shuttle to the sample transfer position ("pipetting location" or "pipetting position") where it waits for fluid aspiration.

Step 2 [00:58-01:18]: Pipette Sample #1: Aspirate

Step 2 of the timing diagram example shown in FIG. 7 begins at 00:58, at which time the analyzer begins aspirating from sample container #1, e.g., with a robotic pipettor of the analyzer. As mentioned in Step 1, sample container #1 must be moved into the analyzer sample transfer position prior to the beginning of the aspiration step. Failure to do so will cause sample container #1 to miss the sample transfer window, and an aliquot of sample will not be transferred from sample container #1 into the receptacle apparatus. Once aspiration is complete, a Test Order Status Update (TOSU) post aspirate message will be communicated to the track section 110 (e.g., the WMS 136 or track controller 138). This message will contain either a success message or a process control failure message. In the illustration, step 2 extends from 00:58 to 01:18.

Step 3 [01:18-01:38]: Pipette Sample #1: Dispense/Return Sample Container #1/Retrieve Sample Container #2

Immediately following sample aspiration at step #2, and while sample container #1 is being transferred back to the analytic track 112, the analyzer will begin dispensing sample aspirated from sample container #1 into a process vessel of the receptacle apparatus. During sample dispensing from 01:18 to 01:38, the track section 110 (e.g., shuttle module 150, pick-and-place robot 154, and buffer queue 148) will exchange sample container #1 (the "Tube") for sample container #2 (the "Next Tube"). In the example shown in FIG. 7, the shuttle will move sample container #1 to the sample container handoff position (pick-and-place ("PnP") location) 156), the sample container will then be moved from the shuttle module 150 to the buffer queue 148 by the pick-and-place robot 154, and then sample container #2 will be indexed by transfer module 158 from the buffer queue 148 to the sample container handoff position (pick-and-place ("PnP") location) 156. Sample container #2 (sample container #2 is now the "Tube") is then placed onto the shuttle module 150 by the pick-and-place robot 154, the bar code of the sample container is read to confirm its identity, and then sample container #2 is moved by the shuttle module 150 to the sample transfer position of the analyzer 142 where it waits for fluid aspiration. In one example, it is preferred that sample container #2 is exchanged for sample container #1 while sample aspirated from sample container #1 is being dispensed, since the allotted transfer time of the next sample container (sample #2) into the sample transfer position within the analyzer may be extremely short. If sample container #2 is not moved into the sample transfer position within the fixed time slot of step 3, the analyzer will skip processing of sample #2.

Therefore, sample container #1 must be transferred back to the analytic track 112 and sample container #2 must be moved into analyzer's sample transfer position during the dispensing of sample #1.

Once dispensing of sample #1 is complete, a second TOSU post dispense message is sent to the track section 110 (e.g., WMS 136 or track controller 138) if there was a process control failure during dispensing. By the time the second TOSU is transmitted, sample container #1 is back on the analytic track 112 routing to another location on the track section 110. In one example, if no dispense failure occurred, a second TOSU message will not be sent.

Step 4 [01:38-01:58]: Pipette Sample #2: Aspirate

Step 4 of the timing diagram example shown in FIG. 7 begins at 01:38, at which time the analyzer begins aspirating from sample container #2, e.g., with a robotic pipettor of the analyzer. Once aspiration is complete, a TOSU post aspirate message will be communicated to the track section 110 (e.g., the WMS 136 or track controller 138). This message will contain either a success message or a process control failure message.

Step 5 [01:58-02:18]: Pipette Sample #2: Dispense/Return Sample Container #2/Retrieve Sample Container #3

Immediately following sample aspiration at step #4, and while sample container #2 is being transferred back to the analytic track 112, the analyzer will begin dispensing sample aspirated from sample container #2 into a second process vessel of the receptacle apparatus. During sample dispensing from 01:58 to 02:18, the track section 110 (e.g., shuttle module 150, pick-and-place robot 154, and buffer queue 148) will exchange sample container #2 for sample container #3.

Once dispensing of sample #2 is complete, a second TOSU post dispense message is sent to the track section 110 (e.g., WMS 136 or track controller 138) if there was a process control failure during dispensing. By the time the second TOSU is transmitted, sample container #2 is back on the analytic track 112 routing to another location on the track section 110. In one example, if no dispense failure occurred, a second TOSU message will not be sent.

Step 6 [02:18-02:38]: Pipette Sample #3: Aspirate

Step 6 of the timing diagram example shown in FIG. 7 begins at 02:18, at which time the analyzer begins aspirating from sample container #3, e.g., with a robotic pipettor of the analyzer. Once aspiration is complete, a TOSU post aspirate message will be communicated to the track section 110 (e.g., the WMS 136 or track controller 138). This message will contain either a success message or a process control failure message.

Step 7 [02:38-02:58]: Pipette Sample #3: Dispense/Return Sample Container #3/Retrieve Sample Container #4

Immediately following sample aspiration at step #6, and while sample container #3 is being transferred back to the analytic track 112, the analyzer will begin dispensing sample aspirated from sample container #3 into a third process vessel of the receptacle apparatus. During sample dispensing from 02:38 to 02:58, the track section 110 (e.g., shuttle module 150, pick-and-place robot 154, and buffer queue 148) will exchange sample container #3 for sample container #4.

Once dispensing of sample #3 is complete, a second TOSU post dispense message is sent to the track section 110 (e.g., WMS 136 or track controller 138) if there was a process control failure during dispensing. By the time the second TOSU is transmitted, sample container #3 is back on the analytic track 112 routing to another location on the track section 110. In one example, if no dispense failure occurred, a second TOSU message will not be sent.

Step 8 [02:58-03:18]: Pipette Sample #4: Aspirate

Step 8 of the timing diagram example shown in FIG. 7 begins at 02:58, at which time the analyzer begins aspirating from sample container #4, e.g., with a robotic pipettor of the analyzer. Once aspiration is complete, a TOSU post aspirate message will be communicated to the track section 110 (e.g., the WMS 136 or track controller 138). This message will contain either a success message or a process control failure message.

Step 9 [03:18-03:38]: Pipette Sample #4: Dispense/Return Sample Container #4/Retrieve Sample Container #5

Immediately following sample aspiration at step #8, and while sample container #4 is being transferred back to the analytic track 112, the analyzer will begin dispensing sample aspirated from sample container #4 into a fourth process vessel of the receptacle apparatus. During sample dispensing from 03:18 to 03:38, the track section 110 (e.g., shuttle module 150, pick-and-place robot 154, and buffer queue 148) will exchange sample container #4 for sample container #5.

Once dispensing of sample #4 is complete, a second TOSU post dispense message is sent to the track section 110 (e.g., WMS 136 or track controller 138) if there was a process control failure during dispensing. By the time the second TOSU is transmitted, sample container #4 is back on the analytic track 112 routing to another location on the track section 110. In one example, if no dispense failure occurred, a second TOSU message will not be sent.

Step 10 [03:38-03:58]: Pipette Sample #5: Aspirate

Step 10 of the timing diagram example shown in FIG. 7 begins at 03:38, at which time the analyzer begins aspirating from sample container #5, e.g., with a robotic pipettor of the analyzer. Once aspiration is complete, a TOSU post aspirate message will be communicated to the track section 110 (e.g., the WMS 136 or track controller 138). This message will contain either a success message or a process control failure message.

Step 11 [03:58-04:18]: Pipette Sample #5: Dispense/Return Sample Container #5

Immediately following sample aspiration at step #10, and while sample container #5 is being transferred back to the analytic track 112, the analyzer will begin dispensing sample aspirated from sample container #5 into a fifth process vessel of the receptacle apparatus. During sample dispensing from 03:58 to 04:18, the track section 110 (e.g., shuttle module 150, pick-and-place robot 154, and buffer queue 148) will return sample container #5 to analytic track 112. In some embodiments, sample container #5 will be exchanged for sample container #1 of the next receptacle apparatus to be processed.

Once dispensing of sample #5 is complete, a second TOSU post dispense message is sent to the track section 110 (e.g., WMS 136 or track controller 138) if there was a process control failure during dispensing. By the time the second TOSU is transmitted, sample container #5 is back on the analytic track 112 routing to another location on the track section 110. In one example, if no dispense failure occurred, a second TOSU message will not be sent.

Step 12 [04:18-5:00]: Finish Receptacle Apparatus

The final step for the process cycle is completing any reagent addition steps, receptacle apparatus movement to the next analyzer module, etc. At the conclusion of this final step, the next process cycle may start immediately, whether or not any samples have been scheduled. If no sample containers are present, or if less than a process number of sample containers are present, the next process cycle may be a five-minute idle window in which no samples will be processed even if a sample is loaded into analyzer during the five-minute window.

Hardware and Software

Aspects of the subject matter disclosed herein may be implemented via control and computing hardware components, software (which may include firmware), data input components, and data output components. Hardware components include computing and control modules (e.g., system controller(s), such as track controller 138, the workflow management system ("WMS") 136, and each analyzer software module 152), such as microprocessors, embedded controllers, application specific integrated circuits (ASICS), and computers, configured to effect computational and/or control steps by receiving one or more input values, executing one or more algorithms stored on non-transitory machine-readable media (e.g., software) that provide instruction for manipulating or otherwise acting on or in response to the input values, and output one or more output values. Such outputs may be displayed or otherwise indicated to a user for providing information to the user, for example information as to the status of the instrument or of a process being performed thereby, or such outputs may comprise inputs to other processes and/or control algorithms. Data input components comprise elements by which data is input for use by the control and computing hardware components. Such data inputs may comprise signals generated by sensors or scanners, such as, position sensors, speed sensors, accelerometers, environmental (e.g., temperature) sensors, motor encoders, barcode scanners, or RFID scanners, as well as manual input elements, such as keyboards, stylus-based input devices, touch screens, microphones, switches, manually operated scanners, etc. Data inputs may further include data retrieved from memory. Data output components may comprise hard drives or other storage media, monitors, printers, indicator lights, or audible signal elements (e.g., chime, buzzer, horn, bell, etc.).

Exemplary Embodiments

Aspects of the disclosure are summarized by the following numbered embodiments.

Embodiment 1 A system for processing a plurality of distinct samples, wherein each sample is contained within a discrete sample container, the system comprising. A) two or more analyzers, wherein each analyzer is configured to perform one or more functional assays on sample extracted from a sample container, wherein the one or more functional assays performed by each analyzer may be the same or different than the one or more functional assays performed by each of the other analyzers, wherein each analyzer is configured to perform each of the one or more functional assays within a receptacle apparatus comprising a process number of two or more operatively associated process vessels, and wherein each analyzer is configured to perform the same one of the one or more the functional assays on a different sample contained within each process vessel of the receptacle apparatus; B) a sample transfer device associated with each analyzer and configured to transfer a portion of a sample from a sample container to one of the process vessels of a receptacle apparatus; C) a conveyance configured to transport sample containers between the two or more analyzers; D) a buffer queue associated with each analyzer and configured to hold multiple sample containers diverted to the buffer queue from the conveyance; E) a scanner associated with each analyzer and configured to detect machine-readable identification information associated with each sample container transported on the conveyance; and F) one or more controllers programmed to: 1) identify one or more open assays for each sample container based on the identification information detected by the scanner; 2) determine if the sample container is a STAT sample container based on the identification information detected by the scanner; 3) cause a sample container to be diverted from the conveyance into one of the buffer queues if an open assay for that sample container corresponds to a functional assay of the analyzer associated with the buffer queue; 4) monitor a buffered container count for each buffer queue, wherein the buffered container count comprises, for each buffer queue, the number of sample containers held in that buffer queue with the same open assay; 5) monitor a buffered container holding time for each buffer queue, wherein the buffered container holding time comprises an elapsed time since a first sample container of each buffered container count was diverted into the buffer queue; and 6) with the sample transfer device of the associated analyzer, perform one of the following tasks: a) transfer a portion of sample from each of a process number of sample containers within the associated buffer queue having the same open assay into a different one of the process vessels of a receptacle apparatus if the buffered container count in the associated buffer queue for that assay is at least equal to the process number, b) transfer a portion of sample from each of a number of sample containers within the associated buffer queue having the same open assay into a different one of the process vessels of a receptacle apparatus if the buffered container holding time for the associated buffer queue for that open assay reaches a maximum holding time and the buffered container count in the associated buffer queue for that assay is less than the process number, or c) transfer a portion of sample from a STAT sample container diverted into the associated buffer queue into one of the process vessels of a receptacle apparatus.

Embodiment 2 The system of embodiment 1, wherein, if a STAT sample container is diverted into the associated buffer queue, the one or more controllers are configured to (i) transfer a portion of sample from each of any blocking sample containers that were diverted to the associated buffer queue before the STAT sample container into a different one of the process vessels of one or more receptacle apparatus, (ii) move any blocking sample containers from which sample was transferred in step (i) out of the buffer queue, and (iii) then transfer a portion of sample from the STAT sample container diverted into the associated buffer queue into one of the process vessels of a receptacle apparatus.

Embodiment 3 The system of embodiment 2, wherein, if the open assay of the blocking sample containers is the same as the open assay of the STAT sample container, sample is transferred from each of the blocking sample containers and the STAT sample container to different process vessels of the same receptacle apparatus in steps (i) and (iii).

Embodiment 4 The system of embodiment 2, wherein, if the open assay of the blocking sample containers is different from the open assay of the STAT sample container, sample is transferred from the blocking sample containers and the STAT sample container to different receptacle apparatus in steps (i) and (iii).

Embodiment 5 The system of embodiment 1, wherein, if a STAT sample container is diverted into the associated buffer queue, the one or more controllers are configured to (i) move any blocking sample containers diverted to the associated buffer queue before the STAT sample container out of the buffer queue, without transferring any sample from the blocking sample containers into the process vessels of a receptacle apparatus, and then (ii) transfer a portion of sample from the STAT sample container diverted into the associated buffer queue into one of the process vessels of a receptacle apparatus.

Embodiment 6 The system of any one of embodiments 1 to 5, wherein each analyzer is configured to simultaneously perform the same one of the one or more functional assays of that analyzer on a different sample contained within each process vessel of the receptacle apparatus.

Embodiment 7 The system of any one of embodiments 1 to 6, wherein the sample transfer device comprises a robotic pipettor.

Embodiment 8 The system of any one of embodiments 1 to 7, wherein the conveyance comprises a first track and the system further comprises a container holder associated with each sample container for holding the associated sample container, wherein the first track is configured to convey the container holders on the first track.

Embodiment 9 The system of embodiment 8, wherein each buffer queue comprises a second track configured to hold and convey the container holders, and the system further includes a diverter configured to selectively divert a container holder and sample container held thereby from the first track to the second track.

Embodiment 10 The system of any one of embodiments 1 to 9, wherein the scanner comprises a barcode scanner.

Embodiment 11 The system of any one of embodiments 1 to 10, wherein at least one of the one or more controllers is programmed to identify the one or more open assays of each sample container by accessing a database in which the identification information of each sample container is correlated with one or more open assays.

Embodiment 12 The system of any one of embodiments 1 to 7, wherein the conveyance comprises a recirculation loop configured and controlled to translate each sample container between the two or more analyzers until the first to occur of (1) sample has been extracted from the sample container to perform all open assays for that sample container, or (2) the sample container has traversed the recirculation loop a prescribed number of times or for a prescribed period of time.

Embodiment 13 The system of embodiment 12, wherein, after sample has been extracted from a sample container to perform all open assays for that sample container or the sample container has traversed the recirculation loop the prescribed number of times or for a prescribed period of time, the conveyance is configured to transfer the sample container to a container storage module.

Embodiment 14 The system of embodiment 13, further comprising a pick-and-place robot configured to transfer sample containers between the conveyance and the container storage module.

Embodiment 15 The system of any one of embodiments 1 to 14, further comprising one or more pre-analytic modules, wherein each pre-analytic module is configured to process a sample container before making the sample container available to the two or more analyzers, and wherein the conveyance is configured to translate the sample containers to the pre-analytic modules before transporting the sample containers between the two or more analyzers.

Embodiment 16 The system of embodiment 15, wherein the pre-analytic modules comprise one or more of a container de-capper configured to remove a cap from a sample container, a liquid level detection module configured to detect a liquid level within at least a portion of the sample containers, and a sample transfer module configured to transfer sample from a first type of sample container to a second type of sample container that will be made available to the two or more analyzers.

Embodiment 17 The system of any one of embodiments 1 to 16, further comprising an input module coupled to the conveyance and configured to hold sample containers.

Embodiment 18 The system of embodiment 17, further comprising a pick-and-place robot configured to transfer sample containers between the input module and the conveyance.

Embodiment 19 The system of embodiment 17 or 18, wherein the input module is configured to determine at least one of a height and width of the container, a shape of a bottom of the container, and whether the container is capped.

Embodiment 20 The system of embodiment 1, wherein the conveyance comprises: a recirculation segment configured to translate each sample container to the two or more analyzers; a pre-analytic segment; and an input module coupled to the pre-analytic segment and configured to hold sample containers Embodiment 21 The system of embodiment 20, wherein the recirculation segment comprises a continuous recirculation loop configured to translate each sample container between the two or more analyzers until the first to occur of (1) sample has been extracted from the sample container to perform all open assays of that sample container, or (2) the sample container has traversed the recirculation loop a prescribed number of times or for a prescribed period of time.

Embodiment 22 The system of embodiment 20 or 21, further comprising a pick-and-place robot configured to transfer sample containers between the input module and the pre-analytic segment, wherein the pre-analytic segment is configured to translate sample containers from the input module to the recirculation segment.

Embodiment 23 The system of embodiment 22, wherein the pick-and-place robot is controlled so that whether a sample container is transferred from the input module to the pre-analytic segment, or the order in which sample containers are transferred from the input module to the pre-analytic segment, is independent of any identification information associated with each sample container and/or any open assay(s) of the sample container.

Embodiment 24 The system of embodiment 22, wherein the input module contains an area dedicated to STAT sample containers, and wherein the STAT sample containers are transferred from the input module to the pre-analytic segment before any other sample containers are transferred from the input module to the pre-analytic segment.

Embodiment 25 The system of any one of embodiments 20 to 24, further comprising a pre-analytic scanner configured to detect the machine-readable identification information associated with each sample container transported on the pre-analytic segment, wherein the controller is configured to identify one or more open assays of each sample container based on the identification information detected by the pre-analytic scanner and to transfer a sample container from the pre-analytic segment to the recirculation segment if one or more functional assays of the two or more analyzers correspond to at least one of the one or more open assays of the sample container.

Embodiment 26 The system of embodiment 25, further comprising a container storage module coupled to the pre-analytic segment and configured to receive sample containers from the pre-analytic segment into the container storage module, and wherein the controller is configured to transfer a sample container on the conveyance to the container storage module if none of the two or more analyzers has a functional assay matching any of the one or more open assays of the sample container.

Embodiment 27 The system of embodiment 25, wherein the pre-analytic segment comprises a continuous pre-analytic loop, and wherein the controller is configured to convey a sample container around the pre-analytic loop if none of the two or more analyzers has a functional assay matching any of the one or more open assays of the sample container.

Embodiment 28 The system of any one of embodiments 1 to 27, wherein at least one of the two or more analyzers comprises a molecular testing instrument.

Embodiment 29 The system of embodiment 28, wherein the molecular testing instrument comprises a module for performing a nucleic acid-based amplification reaction.

Embodiment 30 The system of any one of embodiments 1 to 29, wherein each process vessel of each receptacle apparatus comprises a test tube, and wherein the receptacle apparatus comprises a process number of interconnected test tubes configured in an aligned arrangement.

Embodiment 31 The system of any one of embodiments 1 to 30, further comprising a shuttle module associated with each analyzer, wherein the shuttle module is configured to translate a sample container between the associated buffer queue and the associated analyzer.

Embodiment 32 The system of embodiment 31, further comprising a pick-and-place robot associated with each analyzer, wherein the pick-and-place robot is configured to transfer a sample container from the associated buffer queue to a sample container handoff position on the shuttle module, and the shuttle module is configured to translate the sample container between the sample container handoff position and a pipetting location within the associated analyzer.

Embodiment 33 The system of any one of embodiments 1 to 31, wherein each of the two or more analyzers is configured to move a receptacle apparatus into position to receive sample from the sample transfer device associated with the analyzer at the beginning of periodically recurring process cycles, and the one or more controllers are configured to perform: task F)6)a) at the beginning of a first process cycle after a process number of sample containers with the same open assay have been diverted to the associated buffer queue; task F)6)b) at the beginning of a first process cycle after the buffered container holding time for the associated buffer queue for that assay reaches the maximum holding time; or task F)6)c) at the beginning of a first process cycle after a STAT sample is diverted.

Embodiment 34 The system of any one of embodiments 1 to 31, wherein each of the two or more analyzers is configured to move a receptacle apparatus into position to receive sample from the sample transfer device associated with the analyzer at the beginning of periodically recurring process cycles, and wherein the maximum holding time comprises at least time remaining in a process cycle that is in progress when the first sample container of each buffered container count is diverted into the buffer queue.

Embodiment 35 The system of embodiment 34, wherein the maximum holding time comprises time remaining in a process cycle that is in progress when the first sample container of each buffered container count is diverted into the buffer queue plus the duration of one additional process cycle.

Embodiment 36 A method for automatically processing a plurality of distinct samples, wherein each sample is contained within a discrete sample container, and the samples are processed in one or more of two or more analyzers, wherein each analyzer is configured to perform one or more functional assays, wherein the two or more analyzers are configured to perform the same or different functional assays, wherein each analyzer is configured to perform each of the one or more functional assays within a receptacle apparatus comprising a process number of two or more operatively associated process vessels, and wherein each analyzer is configured to perform the same one of the one or more the functional assays on a different sample contained within each process vessel of the receptacle apparatus, wherein the method comprises: a) automatically conveying the sample containers between the two or more analyzers: b) during step a), identifying one or more open assays of each sample container; c) diverting sample containers to a buffer queue associated with one of the two or more analyzers if at least one open assay identified in step b) for the sample containers corresponds to the functional assay configured to be performed by the associated analyzer; d) monitoring a buffered container count for each buffer queue and for each functional assay of the associated analyzer, wherein the buffered container count comprises the number of sample containers held in each buffer queue for each functional assay of the associated analyzer; e) monitoring a buffered container holding time for each buffer queue, wherein the buffered container holding time comprises an elapsed time since a first sample container of each buffered container count was diverted into the buffer queue: f) for each buffer queue, detecting a first to occur of a first process state, a second process state, and a third process state, wherein the first process state means the buffered container count for a first assay is equal to the process number and the buffered container holding time for that assay has not reached a maximum holding time, the second process state means the buffered container count for the first assay is less than the process number and the buffered container holding time for the first assay has reached the maximum holding time, and the third process state means a diverted sample container in the buffer queue is designated STAT; g) if the first process state is detected for a buffer queue, transferring an amount of sample from each of the process number of sample containers requiring the first assay that are held in the buffer queue into one of the process number of process vessels of a receptacle apparatus; h) if the second process state is detected for the buffer queue, transferring an amount of sample from each of a number of sample containers requiring the first assay that are held in the buffer queue into one of a number of process vessels of a receptacle apparatus, wherein the number of sample containers is less than the process number; and i) if the third process state is detected for the buffer queue, transferring an amount of sample from the STAT sample container held in the buffer queue into a process vessel of a receptacle apparatus.

Embodiment 37 The method of embodiment 36, wherein the operatively associated process vessels of the receptacle apparatus are physically interconnected.

Embodiment 38 The method of embodiment 36 or 37, wherein, if the third process state is detected, step i) comprises (1) transferring a portion of sample from each of any blocking sample containers diverted to the buffer queue before the STAT sample container and having the same open assay into a different one of the process vessels of a receptacle apparatus, (2) moving the blocking sample containers from which sample was transferred in step i)(1) out of the buffer queue, (3) moving any blocking sample containers not moved out of the buffer queue in step i)(2) out of the buffer queue, and (4) then transferring a portion of sample from the STAT sample container diverted into the buffer queue into one of the process vessels of a receptacle apparatus.

Embodiment 39 The method of embodiment 36 or 37, wherein, if the third process state is detected, step i) comprises (1) moving any blocking sample containers diverted to the buffer queue before the STAT sample container out of the buffer queue, without transferring any sample from the blocking sample containers, and, after step i)(1), (2) transferring a portion of sample from the STAT sample container diverted into the buffer queue into one of the process vessels of the receptacle apparatus.

Embodiment 40 The method of any one of embodiments 36 to 39, wherein each analyzer is configured to simultaneously perform the same one of the one or more functional assays of that analyzer on a different sample contained within each process vessel of the receptacle apparatus.

Embodiment 41 The method of any one of embodiments 36 to 40, wherein transferring an amount of sample comprises transferring sample from a sample container to a process vessel with a robotic pipettor.

Embodiment 42 The method of any one of embodiments 36 to 41, wherein step a) comprises securing each sample container in a container holder and conveying the container holders on a first track.

Embodiment 43 The method of embodiment 42, wherein each buffer queue comprises a second track configured to hold and translate the container holders, and wherein diverting each one of the sample containers to the buffer queue comprises engaging at least one of the sample container and the container holder with a diverter configured to selectively divert a container holder and sample container held thereby from the first track to the second track.

Embodiment 44 The method of any one of embodiments 36 to 41, wherein step a) comprises conveying each sample container on a first track.

Embodiment 45 The method of embodiment 44, wherein each buffer queue comprises a second track configured to hold and translate the sample containers, and wherein diverting each one of the sample containers to the buffer queue comprises engaging the sample container with a diverter configured to selectively divert a sample container from the first track to the second track.

Embodiment 46 The method of any one of embodiments 36 to 45, wherein step b) comprises detecting machine-readable identification information associated with each sample container conveyed between the two or more analyzers and accessing a database in which the identification information of each sample container is correlated with one or more open assays.

Embodiment 47 The method of any one of embodiments 36 to 46, wherein step a) comprises conveying each sample container between the two or more analyzers until the first to occur of (1) sample has been extracted from the sample container to perform all open assays of that sample container, or (2) the sample container has traversed a conveyance loop connecting the two or more analyzers a prescribed number of times or for a prescribed period of time.

Embodiment 48 The method of any one of embodiments 36 to 47, further comprising processing a sample container with one or more pre-analytic modules before making the sample container available to the two or more analyzers, and wherein step a) further comprises conveying the sample containers to the pre-analytic modules before conveying the sample containers between the two or more analyzers.

Embodiment 49 The method of embodiment 48, wherein the pre-analytic modules comprise one or more of a container de-capper configured to remove a cap from a sample container, a liquid level detection module configured to detect a liquid level within at least a portion of the sample containers, a sample transfer module configured to transfer sample from a first type of sample container to a second type of sample container that will be made available to the two or more analyzers, and a sample purification module configured to isolate and purify a target material within the sample.

Embodiment 50 The method of any one of embodiments 36 to 46, further comprising: prior to step a), receiving sample containers at an input module; and transferring received sample containers from the input module to a pre-analytic segment.

Embodiment 51 The method of embodiment 50, wherein transferring received sample containers from the input module to the pre-analytic segment comprises moving each received sample container from the input module the pre-analytic segment with a pick-and-place robot.

Embodiment 52 The method of embodiment 50 or 51, wherein step b) comprises detecting machine-readable identification information associated with each sample container transported on the pre-analytic segment and identifying the one or more open assays of each sample container based on the identification information detected on the pre-analytic segment.

Embodiment 53 The method of any one of embodiments 36 to 52, further comprising transferring a sample container from the pre-analytic segment to a recirculation segment if at least one functional assay of the two or more analyzers corresponds to at least one of the one or more open assays of the sample container.

Embodiment 54 The method of embodiment 53, wherein the recirculation segment comprises a continuous recirculation loop, and wherein step a) comprises conveying each sample container between the two or more analyzers on the recirculation loop until the first to occur of (1) sample has been extracted from the sample container to perform all open assays of that sample container, or (2) the sample container has traversed the recirculation loop a prescribed number of times or for a prescribed period of time.

Embodiment 55 The method of embodiment 52, further comprising transferring a sample container to a container storage module that is coupled to the pre-analytic segment or to an output module coupled to the pre-analytic segment if, at the time the one or more open assays of the sample container are identified, none of the two or more analyzers has a functional assay that corresponds to any of the one or more open assays of the sample container.

Embodiment 56 The method of any one of embodiments 50 to 52, wherein whether a sample container is transferred from the input module to the pre-analytic segment, or the order in which sample containers are transferred from the input module to the pre-analytic segment, is independent of any identification information associated with each sample container and/or any open assay(s) of the sample container.

Embodiment 57 The method of embodiment 56, wherein the input module contains an area dedicated to STAT sample containers, and wherein the STAT sample containers are transferred from the input module to the pre-analytic segment before any other sample containers are transferred from the input module to the pre-analytic segment.

Embodiment 58 The method of embodiment 52, wherein the pre-analytic segment comprises a continuous pre-analytic loop, and wherein the method further comprises, if, at the time the one or more open assays of the sample container are identified, none of the two or more analyzers has a functional assay that corresponds to any of the one or more open assays of the sample container, transferring the sample container from the pre-analytic segment to a recirculation segment comprising a continuous recirculation loop and conveying the sample container on the recirculation loop until an analyzer having a functional assay that corresponds to the one or more open assays of the sample container becomes available or conveying the sample container on the pre-analytic loop until an analyzer having a functional assay that corresponds to one of the one or more open assays of the sample container becomes available.

Embodiment 59 The method of any one of embodiments 36 to 58, wherein each of the two or more analyzers is configured to move a receptacle apparatus into position to receive sample transferred from a sample container at the beginning of periodically recurring process cycles, and wherein the maximum holding time comprises at least time remaining in a process cycle that is in progress when the first sample container of each buffered container count is diverted into the buffer queue.

Embodiment 60 The method of embodiment 59, wherein the maximum holding time comprises time remaining in a process cycle that is in progress when the first sample container of each buffered container count is diverted into the buffer queue plus the duration of one additional process cycle.

Embodiment 61 The method of embodiment 59 or 60, wherein: step g) is commenced at the beginning of the first process cycle after a process number of sample containers requiring the same assay have been diverted to the associated buffer queue; step h) is commenced at the beginning of the first process cycle after the buffered container holding time for the associated buffer queue for that assay reaches the maximum holding time; or step i) is commenced at the beginning of the first process cycle after a STAT sample container is diverted to the buffer queue.

Embodiment 62. The method of any one of embodiments 36 to 61, wherein steps b) and c) are performed at a first one of the two or more analyzers, and wherein the method further comprises conveying the sample container to a second one of the two or more analyzers if no open assay identified in step b) corresponds to a functional assay of the first analyzer and thereafter performing steps b) and c) at the second analyzer or (2) the first analyzer lacks sufficient materials to perform a functional assay matching an open assay of the sample container.

Embodiment 63 A system for processing a plurality of distinct samples, wherein each sample is contained within a discrete sample container, the system comprising: A) two or more analyzers, wherein each analyzer is configured to perform one or more functional assays on sample extracted from a sample container, wherein the one or more functional assays performed by each analyzer may be the same or different than the one or more functional assays performed by each of the other analyzers, wherein each analyzer is configured to perform each of the one or more functional assays within a receptacle apparatus comprising a process number of two or more operatively associated process vessels, and wherein each analyzer is configured to perform the same one of the one or more functional assays on a different sample contained within each process vessel of the receptacle apparatus; B) a sample transfer device associated with each analyzer and configured to transfer a portion of a sample from a sample container to one of the process vessels of a receptacle apparatus; C) a conveyance configured to transport sample containers between the two or more analyzers; D) a buffer queue associated with each analyzer and configured to hold multiple sample containers received from the conveyance; E) a scanner associated with each analyzer and configured to detect machine-readable identification information associated with each sample container transported on the conveyance; and F) one or more controllers programmed to perform the following tasks: 1) identify one or more open assays to be performed on the sample contained in each sample container based on the identification information detected by the scanner; 2) cause a sample container to be diverted from the conveyance into one of the buffer queues if the sample container meets one or more sample selection criteria, wherein the sample selection criteria include whether an assay to be performed on the sample within that sample container corresponds to a functional assay of the analyzer associated with the buffer queue; 3) monitor a buffered container count for each buffer queue, wherein the buffered container count comprises, for each buffer queue, the number of sample containers held in that buffer queue with the same open assay, wherein the buffered container count is not greater than the process number; and 4) cause the sample transfer device of the associated analyzer to transfer a portion of sample from each of a process number of sample containers within the associated buffer queue requiring the same open assay into a different one of the process vessels of a receptacle apparatus if the buffered container count in the associated buffer queue for that open assay is equal to the process number.

Embodiment 64 The system of embodiment 63, wherein the operatively associated process vessels of the receptacle apparatus are physically interconnected.

Embodiment 65 The system of embodiment 63 or 64, wherein the sample selection criteria further includes whether an open assay of the sample container matches an open assay of a sample container currently held in that buffer queue.

Embodiment 66 The system of embodiment 65, wherein the one or more controllers are further configured to determine if the sample container is a STAT sample container based on the sample container's identification information detected by the scanner, and wherein the sample selection criteria further includes whether the sample container is a STAT sample container, and the one or more controllers are configured to cause a sample container to be diverted from the conveyance into one of the buffer queues if the sample container is a STAT sample container, even if the open assay of the sample container does not match an open assay of a sample container currently held in that buffer queue.

Embodiment 67 The system of embodiment 66, wherein the one or more controllers are configured to cause the sample transfer device of the associated analyzer to transfer a portion of sample from one or more sample containers within the associated buffer queue requiring the same open assay, including the STAT sample container, even if the one or more sample containers are less than the process number.

Embodiment 68 The system of any one of embodiments 63 to 66, wherein the one or more controllers are further configured to: monitor a buffered container holding time for each buffer queue, wherein the buffered container holding time comprises an elapsed time since a first sample container of each buffered container count was diverted into the buffer queue; and with the sample transfer device of the associated analyzer, transfer a portion of sample from each of a number of sample containers within the associated buffer queue with the same open assay into a different one of the process vessels of a receptacle apparatus, wherein the number of sample containers is less than the process number, if the buffered container holding time for the associated buffer queue for that assay reaches a maximum holding time and the buffered container count in the associated buffer queue for that assay is less than the process number.

Embodiment 69 The system of any one of embodiments 63 to 65, wherein each of the two or more analyzers is configured to move a process vessel into position to receive sample from the sample transfer device associated with the analyzer at the beginning of periodically recurring process cycles, and the one or more controllers are configured to perform task F)4) at the beginning of the first process cycle after a process number of sample containers with the same open assay have been diverted to the associated buffer queue.

Embodiment 70 The system of embodiment 66 or 67, wherein, if a STAT sample container is detected, the one or more controllers are configured to perform the following tasks: (i) transfer a portion of sample from each of any blocking sample containers diverted to the associated buffer queue before the STAT sample container and with the same open assay into a different one of the process vessels of one or more receptacle apparatus, (ii) move any blocking sample containers from which sample was transferred in task (i) out of the buffer queue, and then (iii) transfer a portion of sample from the STAT sample container diverted into the associated buffer queue into one of the process vessels of a receptacle apparatus.

Embodiment 71 The system of embodiment 70, wherein, if the open assay of the blocking sample containers is the same as the open assay of the STAT sample container, sample is transferred from the blocking sample container and the STAT sample container to the same receptacle apparatus in tasks (i) and (iii).

Embodiment 72 The system of embodiment 70, wherein, if the open assay of the blocking sample containers is different than the open assay the STAT sample container, sample is transferred from the blocking sample containers and the STAT sample container to different receptacle apparatus in tasks (i) and (iii).

Embodiment 73 The system of embodiment 66 or 67, wherein, if a STAT sample container is detected, the one or more controllers are configured to (i) move any blocking sample containers diverted to the associated buffer queue before the STAT sample container out of the buffer queue, without transferring any sample from the blocking sample containers, and then (ii) transfer a portion of sample from the STAT sample container diverted into the associated buffer queue into one of the process vessels of a receptacle apparatus.

Embodiment 74 The system of any one of embodiments 63 to 73, wherein each analyzer is configured to simultaneously perform the same one of the one or more functional assays of that analyzer on a different sample contained within each process vessel of the receptacle apparatus.

Embodiment 75 The system of any one of embodiments 63 to 74, wherein the sample transfer device comprises a robotic pipettor.

Embodiment 76 The system of any one of embodiments 63 to 75, wherein the conveyance comprises a first track and the system further comprises a container holder associated with each sample container for holding the associated sample container, wherein the first track is configured to convey the container holders on the first track.

Embodiment 77 The system of embodiment 76, wherein each buffer queue comprises a second track configured to hold and convey the container holders, and the system further includes a diverter configured to selectively divert a container holder and sample container held thereby from the first track to the second track.

Embodiment 78 The system of any one of embodiments 63 to 77, wherein the scanner comprises a barcode scanner.

Embodiment 79 The system of any one of embodiments 63 to 78, wherein at least one of the one or more controllers is programmed to identify the one or more open assays of each sample container by accessing a database in which the identification information of each sample container is correlated with one or more open assays.

Embodiment 80 The system of any one of embodiments 63 to 79, wherein the conveyance comprises a recirculation loop configured and controlled to translate each sample container between the two or more analyzers until the first to occur of (1) sample has been extracted from the sample container to perform all open assays of that sample container, or (2) the sample container has traversed the recirculation loop a prescribed number of times or for a prescribed period of time.

Embodiment 81 The system of embodiment 80, wherein, after sample has been extracted from a sample container to perform all open assays of that sample container or the sample container has traversed the recirculation loop the prescribed number of times or for a prescribed period of time, the conveyance is configured to transfer the sample container from the recirculation loop to a container storage module.

Embodiment 82 The system of embodiment 81, further comprising a pick-and-place robot configured to transfer sample containers between the conveyance and the container storage module.

Embodiment 83 The system of any one of embodiments 63 to 82, further comprising one or more pre-analytic modules, wherein each pre-analytic module is configured to process a sample container before making the sample container available to the two or more analyzers, and wherein the conveyance is configured to translate the sample containers to the pre-analytic modules before transporting the sample containers between the two or more analyzers.

Embodiment 84 The system of embodiment 83, wherein the pre-analytic modules comprise one or more of a container de-capper configured to remove a cap from a sample container, a liquid level detection module configured to detect a liquid level within at least a portion of the sample containers, and a sample transfer module configured to transfer sample from a first type of sample container to a second type of sample container that will be made available to the two or more analyzers.

Embodiment 85 The system of any one of embodiments 63 to 84, further comprising an input module coupled to the conveyance and configured to receive sample containers.

Embodiment 86 The system of embodiment 85, further comprising a pick-and-place robot configured to transfer sample containers between the input module and the conveyance.

Embodiment 87 The system of embodiment 85 or 86, wherein the input module is configured to determine at least one of a height and width of the container, a shape of a bottom of the container, and whether the container is capped.

Embodiment 88 The system of embodiment 63, wherein the conveyance comprises: a recirculation segment configured to translate each sample container to the two or more analyzers; a pre-analytic segment; and an input module coupled to the pre-analytic segment and configured to hold sample containers, wherein the pre-analytic segment is configured to translate sample containers from the input module to the recirculation segment.

Embodiment 89 The system of embodiment 88, wherein the recirculation segment comprises a continuous recirculation loop configured to translate each sample container between the two or more analyzers until the first to occur of (1) sample has been extracted from the sample container to perform all open assays of that sample container, or (2) the sample container has traversed the recirculation loop a prescribed number of times or for a prescribed period of time.

Embodiment 90 The system of embodiment 88, further comprising a pick-and-place robot configured to transfer sample containers between the input module and the pre-analytic segment.

Embodiment 91 The system of embodiment 89, wherein the pick-and-place robot is controlled so that whether a sample container is transferred from the input module to the pre-analytic segment, or the order in which sample containers are transferred from the input module to the pre-analytic segment, is independent of any identification information associated with each sample container and/or any open assay(s) of the sample container.

Embodiment 92 The system of embodiment 91, wherein the input module contains an area dedicated to STAT sample containers, and wherein the STAT sample containers are transferred from the input module to the pre-analytic segment before any other sample containers are transferred from the input module to the pre-analytic segment.

Embodiment 93 The system of any one of embodiments 88 to 92, further comprising a pre-analytic scanner configured to detect the machine-readable identification information associated with each sample container transported on the pre-analytic segment, wherein the controller is configured to identify one or more open assays of each sample container based on the identification information detected by the pre-analytic scanner and to transfer a sample container from the pre-analytic segment to the recirculation segment if at least one of the two or more analyzers has a functional assay matching at least one of the one or more open assays of the sample container.

Embodiment 94 The system of embodiment 93, further comprising a container storage module coupled to the pre-analytic segment and configured to receive sample containers from the pre-analytic segment into the container storage module, and wherein the controller is configured to transfer a sample container on the pre-analytic segment to the container storage module if none of the two or more analyzers has a functional assay matching any of the one or more open assays of the sample container.

Embodiment 95 The system of embodiment 93, wherein the pre-analytic segment comprises a continuous pre-analytic loop, and wherein the controller is configured to convey a sample container round the pre-analytic loop if none of the two or more analyzers has a functional assay matching any of the one or more open assays of the sample container.

Embodiment 96 The system of any one of embodiments 63 to 95, wherein at least one of the two or more analyzers comprises a molecular testing instrument.

Embodiment 97 The system of embodiment 96, wherein the molecular testing instrument comprises a module for performing a nucleic acid-based amplification reaction.

Embodiment 98 The system of any one of embodiments 63 to 97, wherein each process vessel of each receptacle apparatus comprises a test tube, and wherein the receptacle apparatus comprises a process number of interconnected test tubes configured in an aligned arrangement.

Embodiment 99 The system of any one of embodiments 63 to 98, further comprising a shuttle module associated with each analyzer, wherein the shuttle module is configured to translate a sample container between the associated buffer queue and the associated analyzer.

Embodiment 100 The system of embodiment 99, further comprising a pick-and-place robot associated with each analyzer, wherein the pick-and-place robot is configured to transfer a sample container from the associated buffer queue to a sample container handoff position on the shuttle module, and the shuttle module is configured to translate the sample container between the sample container handoff position and a pipetting location within the associated analyzer.

Embodiment 101 The system of embodiment 68, wherein each of the two or more analyzers is configured to move a receptacle apparatus into position to receive sample from the sample transfer device associated with the analyzer at the beginning of periodically recurring process cycles, and wherein the maximum holding time comprises at least the time remaining in a process cycle that is in progress when the first sample container of each buffered container count is diverted into the buffer queue.

Embodiment 102 The system of embodiment 101, wherein the maximum holding time comprises time remaining in a process cycle that is in progress when the first sample container of each buffered container count is diverted into the buffer queue plus the duration of one additional process cycle.

Embodiment 103 A non-transitory, computer-readable storage medium encoded with computer-executable instructions which, when executed by a computer, cause the computer to control a system for processing a plurality of distinct samples, wherein each sample is contained within a discrete sample container, and wherein the system comprises: (i) two or more analyzers, wherein each analyzer is configured to perform one or more functional assays on sample extracted from a sample container, wherein the one or more functional assays of each analyzer may be the same or different than the one or more functional assays of each of the other analyzers, wherein each analyzer is configured to perform each of the one or more functional assays within a receptacle apparatus comprising a process number of two or more operatively associated process vessels, and wherein each analyzer is configured to perform the same one of the one or more functional assays on a different sample contained within each process vessel of the receptacle apparatus, (ii) a sample transfer device associated with each analyzer and configured to transfer a portion of a sample from a sample container to one of the process vessels of a receptacle apparatus; (ii) a conveyance configured to transport sample containers to the two or more analyzers; (iv) a buffer queue associated with each analyzer and configured to hold multiple sample containers received from the conveyance; (v) a diverter associated with each analyzer and configured to divert a sample container from the conveyance to the associated buffer queue; and (vi) a scanner associated with each analyzer and configured to detect machine-readable identification information associated with each sample container transported on the conveyance, wherein the computer-executable instructions comprise instructions to; receive identification information for each sample container from each of the scanners; interrogate a database of sample information to identify one or more open assays for each sample container based on the identification information received from the scanner; determine if at least one open assay of the sample container corresponds to a functional assay of the analyzer associated with the scanner; if at least one open assay of the sample container corresponds to a functional assay of the associated analyzer, activate the diverter to divert the sample container from the conveyance and into a buffer queue associated with the analyzer; monitor a buffered container count for each buffer queue, wherein the buffered container count comprises, for each buffer queue, the number of sample containers held in that buffer queue with the same open assay; and cause the sample transfer device associated with the analyzer to transfer a portion of sample from each of a process number of sample containers within the associated buffer queue with the same open assay into a different one of the process vessels of a receptacle apparatus if the buffered container count in the associated buffer queue for that open assay is at least equal to the process number.

Embodiment 104 The non-transitory, computer-readable storage medium of embodiment 103, wherein the computer-executable instructions further comprise instructions to, after activating the diverter to divert a container from the conveyance and into a buffer queue associated with the analyzer, determine whether an open assay of a subsequent sample container matches the open assay of the sample container currently held in that buffer queue, and to activate the diverter to divert the subsequent sample container from the conveyance into the buffer queue only if the open assay of the subsequent sample container matches the open assay of the sample container currently held in that buffer queue.

Embodiment 105 The non-transitory, computer-readable storage medium of embodiment 104, wherein the computer-executable instructions further comprise instructions to not activate the diverter if no open assay of the subsequent sample container matches an open assay of the sample container currently held in that buffer queue so that the conveyance transports the subsequent sample container to a subsequent one of the two or more analyzers.

Embodiment 106 The non-transitory, computer-readable storage medium of embodiment 103, wherein the computer-executable instructions further comprise instructions to, after activating the diverter to divert at least one sample container from the conveyance and into a buffer queue associated with the analyzer: determine whether an open assay of a subsequent sample container matches an open assay of a sample container currently held in that buffer queue; interrogate the database of sample information to determine if the subsequent sample container is a STAT sample container based on the identification information received from the scanner; and activate the diverter to divert the subsequent sample container from the conveyance into the buffer queue only if the open assay of the subsequent sample container matches the open assay of the sample container currently held in that buffer queue or the subsequent sample container is a STAT sample container having an open assay corresponding to a functional assay of the associated analyzer.

Embodiment 107 The non-transitory, computer-readable storage medium of embodiment 106, wherein the computer-executable instructions further comprise instructions to cause the sample transfer device of the associated analyzer to transfer a portion of sample from one or more sample containers within the associated buffer queue having the same open assay, including the STAT sample container, even if the one or more sample containers are less than the process number.

Embodiment 108 The non-transitory, computer-readable storage medium of any one of embodiments 103 to 107, wherein the computer-executable instructions further comprise instructions to: monitor a buffered container holding time for each buffer queue, wherein the buffered container holding time comprises an elapsed time since a first sample container of each buffered container count was diverted into the buffer queue; and cause the sample transfer device associated with the analyzer to transfer a portion of sample from each of a number of sample containers within the associated buffer queue having the same open assay into a different one of the process vessels of a receptacle apparatus, wherein the number of sample containers is less than the process number, if the buffered container holding time for the associated buffer queue reaches a specified maximum holding time.

Embodiment 109 The non-transitory, computer-readable storage medium of embodiment 103 or 104, wherein each of the two or more analyzers is configured to move a receptacle apparatus into position to receive sample transferred from a sample container at the beginning of periodically recurring process cycles, and the computer-executable instructions further comprise instructions to cause the sample transfer device associated with the analyzer to transfer a portion of sample from each of a process number of sample containers within the associated buffer queue having the same open assay into a different one of the process vessels of a receptacle apparatus at the beginning of the first process cycle commencing after a process number of sample containers having the same open assay have been diverted to the associated buffer queue.

Embodiment 110 The non-transitory, computer-readable storage medium of embodiment 106 or 107, wherein, if a STAT sample container is detected, the computer-executable instructions further comprise instructions to: (i) cause the sample transfer device associated with the analyzer to transfer a portion of sample from each of any blocking sample containers diverted to the associated buffer queue before the STAT sample container and having the same open assay into a different one of the process vessels of a receptacle apparatus, (ii) cause any blocking sample containers from which sample was transferred in step (i) to be moved out of the buffer queue, and (iii) after (ii), cause the sample transfer device associated with the analyzer to transfer a portion of sample from the STAT sample container diverted into the associated buffer queue into one of the process vessels of a receptacle apparatus.

Embodiment 111 The non-transitory, computer-readable storage medium of embodiment 110, wherein, if the open assay of the blocking sample containers is the same as the open assay of the STAT sample container, the computer-executable instructions further comprise instructions to cause the sample transfer device associated with the analyzer to transfer sample from the blocking sample containers and the STAT sample container to different process vessels of the same receptacle apparatus in steps (i) and (iii).

Embodiment 112 The non-transitory, computer-readable storage medium of embodiment 109, wherein, if the open assay of the blocking sample containers is different than the open assay of the STAT sample container, the computer-executable instructions further comprise instructions to cause the sample transfer device associated with the analyzer to transfer sample from the blocking sample containers and the STAT sample container to different receptacle apparatus in steps (i) and (iii).

Embodiment 113 The non-transitory, computer-readable storage medium of embodiment 106 or 107, wherein, if a STAT sample container is detected, and more than a process number of blocking sample containers have been diverted to the associated buffer queue before the STAT sample container, and a process number of the blocking sample containers have the same open assay, the computer-executable instructions further comprise instructions to: (i) cause the sample transfer device associated with the analyzer to transfer a portion of sample from each of the process number of blocking sample containers having the same open assay into a different one of the process vessels of a first receptacle apparatus, (ii) cause the blocking sample containers from which sample was transferred in step (i) to be moved out of the buffer queue, (iii) cause any remaining blocking sample containers to be moved out of the buffer queue, and (iv) then cause the sample transfer device associated with the analyzer to transfer a portion of sample from the STAT sample container diverted into the associated buffer queue into one of the process vessels of a second receptacle apparatus.

Embodiment 114 The non-transitory, computer-readable storage medium of embodiment 106 or 107, wherein, if a STAT sample container is detected, the computer-executable instructions further comprise instructions to: (i) cause any blocking sample containers diverted to the associated buffer queue before the STAT sample container to be moved out of the buffer queue, without transferring any sample from the blocking sample containers, and (ii) then cause the sample transfer device associated with the analyzer to transfer a portion of sample from the STAT sample container diverted into the associated buffer queue into one of the process vessels of a receptacle apparatus.

Embodiment 115 The non-transitory, computer-readable storage medium of any one of embodiments 103 to 114, wherein each analyzer is configured to simultaneously perform the same one of the one or more functional assays of that analyzer on a different sample contained within each of a plurality of the process vessels of the receptacle apparatus.

Embodiment 116 The non-transitory, computer-readable storage medium of any one of embodiments 103 to 115, wherein the sample transfer device comprises a robotic pipettor.

Embodiment 117 The non-transitory, computer-readable storage medium of any one of embodiments 103 to 116, wherein the conveyance comprises a first track and the system further comprises a container holder associated with each sample container for holding the associated sample container, wherein the first track is configured to convey the container holders on the first track.

Embodiment 118 The non-transitory, computer-readable storage medium of embodiment 117, wherein each buffer queue comprises a second track configured to hold and convey the container holders, wherein the computer-executable instructions further comprise instructions to activate the diverter to divert the sample container from the first track to the second track.

Embodiment 119 The non-transitory, computer-readable storage medium of any one of embodiments 103 to 118, wherein the scanner comprises a barcode scanner.

Embodiment 120 The non-transitory, computer-readable storage medium of any one of embodiments 103 to 119, wherein the computer-executable instructions further comprise instructions to identify the one or more open assays of each sample container by accessing the database of sample information in which the identification information of each sample container is correlated with one or more open assays.

Embodiment 121 The non-transitory, computer-readable storage medium of any one of embodiments 103 to 120, wherein the conveyance comprises a recirculation loop, and wherein the computer-executable instructions further comprise instructions to translate each sample container on the recirculation loop to the two or more analyzers until the first to occur of (1) sample has been extracted from the sample container to perform all open assays of that sample container, or (2) the sample container has traversed the recirculation loop a prescribed number of times.

Embodiment 122 The non-transitory, computer-readable storage medium of embodiment 121, wherein, after sample has been extracted from a sample container to perform all open assays of that sample container, the computer-executable instructions further comprise instructions to cause the conveyance to convey the sample container to a container storage module.

Embodiment 123 The non-transitory, computer-readable storage medium of embodiment 122, wherein the computer-executable instructions further comprise instructions controlling a pick-and-place robot configured to transfer sample containers between the conveyance and the container storage module.

Embodiment 124 The non-transitory, computer-readable storage medium of any one of embodiments 103 to 123, wherein the system further comprises one or more pre-analytic modules, wherein each pre-analytic module is configured to perform an operation on a sample container before making the sample container available to the two or more analyzers, and wherein the computer-executable instructions further comprise instructions to cause the conveyance to translate the sample containers to the pre-analytic modules before conveying the sample containers to the two or more analyzers.

Embodiment 125 The non-transitory, computer-readable storage medium of embodiment 124, wherein the pre-analytic modules comprise one or more of a container de-capper configured to remove a cap from a sample container, a liquid level detection module configured to detect a liquid level within at least a portion of the sample containers, and a sample transfer module configured to transfer sample from a first type of sample container to a second type of sample container that will be made available to the two or more analyzers, wherein the first type of sample container has one or more different dimensions than the second type of sample container.

Embodiment 126 The non-transitory, computer-readable storage medium of any one of embodiments 103 to 125, wherein the system further comprises an input module coupled to the conveyance and configured to receive sample containers, wherein the computer-executable instructions further comprise instructions controlling a pick-and-place robot configured to transfer sample containers between the conveyance and the input module.

Embodiment 127 The non-transitory, computer-readable storage medium of embodiment 126, wherein the computer-executable instructions controlling the pick-and-place robot control the pick-and-place robot so that whether a sample container is transferred from the input module to the conveyance, or the order in which sample containers are transferred from the input module to the conveyance, is independent of any identification information associated with each sample container and/or any open assay(s) of the sample container.

Embodiment 128 The non-transitory, computer-readable storage medium of embodiment 127, wherein the computer-executable instructions controlling the pick-and-place robot control the pick-and-place robot so that STAT sample containers are transferred from a dedicated area of the input module to the conveyance before any other sample containers are transferred from the input module to the conveyance.

Embodiment 129 The non-transitory, computer-readable storage medium of embodiment 103, wherein the conveyance comprises: a recirculation segment, wherein the computer-executable instructions further comprise instructions to cause the recirculation segment to translate each sample container to the two or more analyzers; a pre-analytic segment; and an input module coupled to the pre-analytic segment and configured to hold sample containers, wherein the computer-executable instructions further comprise instructions to cause the input module to transfer sample containers to the pre-analytic segment and to cause the pre-analytic segment to translate sample containers from the input module to the recirculation segment.

Embodiment 130 The non-transitory, computer-readable storage medium of embodiment 129, wherein the recirculation segment comprises a continuous recirculation loop, wherein the computer-executable instructions further comprise instructions to cause the recirculation loop to translate each sample container between the two or more analyzers until the first to occur of (1) sample has been extracted from the sample container to perform all open assays of that sample container, or (2) the sample container has traversed the recirculation loop a prescribed number of times or for a prescribed period of time.

Embodiment 131 The non-transitory, computer-readable storage medium of embodiment 129 or 130, wherein the system further comprises a pre-analytic scanner configured to detect the machine-readable identification information associated with each sample container transported on the pre-analytic segment, wherein the computer-executable instructions further comprise instructions to: receive identification information for each sample container from the pre-analytic scanner; interrogate the database of sample information to identify one or more assays to be performed on the sample contained in each sample container based on the sample container's identification information detected by the pre-analytic scanner; and cause a sample container to be transferred from the pre-analytic segment to the recirculation segment if at least one of the two or more analyzers has a functional assay matching at least one open assay of the sample container.

Embodiment 132 The non-transitory, computer-readable storage medium of any one of embodiments 103 to 121, wherein the system further comprises a container storage module coupled to the conveyance and configured to receive sample containers from the conveyance into the container storage module, and wherein the computer-executable instructions further comprise instructions to transfer a sample container on the conveyance to the container storage module if none of the two or more analyzers has a functional assay corresponding to any of the one or more open assays of the sample container.

Embodiment 133 The non-transitory, computer-readable storage medium of embodiment 132, wherein the computer-executable instructions further comprise instructions controlling a pick-and-place robot configured to transfer sample containers between the conveyance and the container storage module.

Embodiment 134 The non-transitory, computer-readable storage medium of any one of embodiments 103 to 133, wherein at least one of the two or more analyzers comprises a molecular testing instrument.

Embodiment 135 The non-transitory, computer-readable storage medium of embodiment 134, wherein the molecular testing instrument comprises an instrument for performing a nucleic acid-based amplification reaction.

Embodiment 136 The non-transitory, computer-readable storage medium of any one of embodiments 103 to 135, wherein each process vessel of each receptacle apparatus comprises a test tube, and wherein the receptacle apparatus comprises a process number of interconnected test tubes configured in an aligned arrangement.

Embodiment 137 The non-transitory, computer-readable storage medium of any one of embodiments 103 to 136, wherein the system further comprises a pick-and-place robot associated with each analyzer and a shuttle module associated with each analyzer, wherein the computer-executable instructions further comprise instructions to cause the pick-and-place robot to transfer a sample container from the associated buffer queue to a sample container handoff position on the shuttle module and to cause the shuttle module to translate a sample container between the sample container handoff position and sample transfer location of the associated analyzer.

Embodiment 138 The non-transitory, computer-readable storage medium of embodiment 108, wherein each of the two or more analyzers is configured to move a receptacle apparatus into position to receive sample transferred from a sample container at the beginning of periodically recurring process cycles and wherein the maximum holding time comprises at least the time remaining in a process cycle that is in progress when the first sample container of each buffered container count is diverted into the buffer queue.

Embodiment 139 The non-transitory, computer-readable storage medium of embodiment 138, wherein the maximum holding time comprises the time remaining in a process cycle that is in progress when the first sample container of each buffered container count is diverted into the buffer queue and the duration of one additional process cycle.

Embodiment 140. A system for processing a plurality of samples, wherein each sample is contained within a sample container and each sample container has machine-readable identification information associated therewith, wherein the system comprises: a sample database storing identification information for each of the sample containers and in which the identification information of each sample container is correlated with one or more open assays associated with the sample container; a conveyance configured to transport sample containers; an input module configured to hold a plurality of sample containers; a container transfer robot configured to transfer sample containers from the input module to the conveyance; an input scanner configured to detect the machine-readable identification information associated with each sample container; at least one analyzer operatively associated with the conveyance, wherein each analyzer is configured to perform one or more functional assays on sample extracted from a sample container, wherein the one or more functional assays performed by each analyzer may be the same or different than the one or more functional assays performed by any other analyzer operatively associated with the conveyance; and at least one system controller in communication with the container transfer robot, the input scanner, and the sample database and programmed to: control the container transfer robot to transfer sample containers from the input module to the conveyance, wherein each sample container to be transferred is removed from the input module before scanning the machine-readable identification information associated with the sample container and before identifying the one or more open assays associated with the sample container, as or after each sample container is removed from the input module, activate the input scanner to automatically scan the machine-readable identification information of the sample container as the sample container passes the input scanner, access the sample database, and identify one or more open assays for each sample container transported on the conveyance based on the identification information detected by the input scanner.

Embodiment 141. The system of embodiment 140, wherein the system controller is programmed to activate the input scanner to automatically scan the machine-readable identification information of the sample container as the sample container is transported past the input scanner with the conveyance.

Embodiment 142. The system of embodiment 140 or embodiment 141, wherein the conveyance comprises: a first loop segment, wherein the input module is operatively associated with the first loop segment, and wherein the container transfer robot is configured to transfer sample containers from the input module to the first loop segment; and a second loop segment configured to translate each sample container to the at least one analyzer; wherein the system controller is in communication with all analyzers and is further programmed to: monitor the functional assays of all analyzers and/or the number of sample containers being transported on the second loop segment; compare the one or more open assays of each sample container with the functional assays of all analyzers and/or compare the number of sample containers being transported on the second loop segment with a second loop segment capacity limit; retain a sample container on the first loop segment if none of the functional assays matches any of the open assays for that sample container and/or if the number of sample containers being transported on the second loop segment is at least equal to the second loop segment capacity limit and transport the sample container around the first loop segment until at least one of the functional assays matches at least one of the open assays for that sample container and/or the number of sample containers being transported on the second loop segment is less than the second loop segment capacity limit; and transfer the sample container from the first loop segment to the second loop segment if at least one of the functional assays matches at least one of the open assays for that sample container and/or if the number of sample containers being transported on the second loop segment is less than the second loop segment capacity limit.

Embodiment 143. The system of embodiment 142, wherein the system controller is programmed to: monitor the functional assays of all analyzers operatively associated with the second loop segment; compare the one or more open assays of each sample container with the functional assays of all analyzers operatively associated with the second loop segment: monitor the number of sample containers being transported on the second loop segment, compare the number of sample containers being transported on the second loop segment with the second loop segment capacity limit; retain a sample container on the first loop segment if none of the functional assays matches any of the open assays for that sample container and if the number of sample containers being transported on the second loop segment is at least equal to the second loop segment capacity limit; and transport the sample container around the first loop segment until at least one of the functional assays matches at least one of the open assays for that sample container and the number of sample containers being transported on the second loop segment is less than the second loop segment capacity limit.

Embodiment 144. The system of any one of embodiments 140 to 143, wherein a portion of the input module is designated for STAT sample containers, and wherein the system controller is programmed to control the container transfer robot to transfer all sample containers from the portion of the input module that is designated for STAT sample containers to the conveyance before transferring sample containers from any other portion of the input module.

Embodiment 145. The system of any one of embodiments 140 to 144, wherein the container transfer robot comprises an input pick-and-place robot configured to transfer sample containers between the input module and the conveyance.

Embodiment 146. The system of embodiment 140 or 141, wherein the conveyance comprises a recirculation loop configured and controlled to repeatedly translate each sample container to the at least one analyzer until the first to occur of (1) sample has been extracted from the sample container to perform all open assays for that sample container, or (2) the sample container has traversed the recirculation loop a prescribed number of times or for a prescribed period of time.

Embodiment 147. The system of embodiment 146, further comprising a container storage module, and wherein, after sample has been extracted from a sample container to perform all open assays for that sample container or the sample container has traversed the recirculation loop the prescribed number of times or for a prescribed period of time, the conveyance is configured to transfer the sample container to the container storage module.

Embodiment 148. The system of embodiment 147, further comprising a container transfer robot configured to transfer sample containers between the conveyance and the container storage module.

Embodiment 149. The system of embodiment 148, wherein the container transfer robot is configured to transfer sample containers from the input module to the conveyance comprises an input pick-and-place robot; and the container transfer robot configured to transfer sample containers between the conveyance and the container storage module comprises a storage pick-and-place robot.

Embodiment 150. The system of embodiment 149, wherein the input pick-and-place robot and the storage pick-and-place robot comprise the same pick-and-place robot.

Embodiment 151. The system of any one of embodiments 140 to 150, further comprising one or more pre-analytic modules, wherein each pre-analytic module is configured to process a sample container before making the sample container available to the at least one analyzer, and wherein the conveyance is configured to translate the sample containers to the pre-analytic modules before transporting the sample containers to the at least one analyzer.

Embodiment 152. The system of embodiment 151, wherein the pre-analytic modules comprise at least one of a container de-capper configured to remove a cap from a sample container and a liquid level detection module configured to detect a liquid level within at least a portion of the sample containers.

Embodiment 153. The system of any one of embodiments 140 to 152, further comprising: a sample transfer module configured to transfer sample from at least one first type of sample container to at least one second type of sample container; and a container transfer robot configured to transfer each second type of sample container from the sample transfer module to the conveyance.

Embodiment 154. The system of embodiment 153, wherein each second type of sample container has machine-readable identification information associated therewith, and the sample database includes identification information for each second type of sample container and the identification information is correlated with one or more open assays associated with each second type of sample container.

Embodiment 155. The system of any one of embodiments 140 to 154, wherein the input module is configured to determine at least one of a height and width of the container, a shape of a bottom of the container, and whether the container is capped.

Embodiment 156. The system of embodiment 146, wherein the conveyance further comprises a pre-analytic loop, and the input module is operatively associated with the pre-analytic loop and the system controller is programmed to monitor the number of sample containers being transported on the recirculation loop, and wherein the system further comprises a pre-analytic scanner configured to detect the machine-readable identification information associated with each sample container transported on the pre-analytic loop, wherein the system controller is programmed to identify one or more open assays of each sample container based on the identification information detected by the pre-analytic scanner and to transfer a sample container from the pre-analytic loop to the recirculation loop if one or more functional assays of the at least one analyzer correspond to at least one of the one or more open assays of the sample container and/or if the number of sample containers being transported on the recirculation loop is less than a recirculation loop capacity limit.

Embodiment 157. The system of embodiment 156, wherein the system controller is programmed to transfer a sample container from the pre-analytic loop to the recirculation loop if one or more functional assays of the at least one analyzer correspond to at least one of the one or more open assays of the sample container and if the number of sample containers being transported on the recirculation loop is less than the recirculation loop capacity limit.

Embodiment 158. The system of embodiment 156 or 157, further comprising a container storage module coupled to the pre-analytic loop and configured to receive sample containers from the pre-analytic loop into the container storage module, and wherein the system controller is programmed to cause a sample container on the pre-analytic loop to be transferred to the container storage module if the at least one analyzer has no functional assay matching any of the one or more open assays of the sample container.

Embodiment 159. The system of embodiment 156, wherein the system controller is programmed to cause a sample container to be conveyed around the pre-analytic loop if the at least one analyzer has no functional assay matching any of the one or more open assays of the sample container.

Embodiment 160. The system of embodiment 159, further comprising a container storage module coupled to the pre-analytic loop and configured to receive sample containers from the pre-analytic loop into the container storage module, and wherein the system controller is programmed to monitor the number of times the sample container has traversed the pre-analytic loop or the amount of time the sample container has been on the pre-analytic loop and to cause the sample container to be transferred from the pre-analytic loop to the container storage module if the number of times the sample container has traversed the pre-analytic loop or the amount of time the sample container has been on the pre-analytic loop reaches a limit.

Embodiment 161. The system of any one of embodiments 140 to 160, wherein the machine-readable identification information comprises a barcode, and the input scanner comprises a barcode scanner.

Embodiment 162. A method for processing a plurality of samples with an automated system, wherein each sample is contained within a sample container and each sample container has machine-readable identification information and one or more open assays associated therewith, and wherein the automated system comprises a conveyance for transporting sample containers, an input module for holding a plurality of sample containers, an input scanner for detecting the machine-readable identification information associated with each sample container, at least one analyzer operatively associated with the conveyance, wherein each analyzer is configured to perform one or more functional assays on sample extracted from a sample container, wherein the one or more functional assays performed by each analyzer may be the same or different than the one or more functional assays performed by any other analyzer operatively associated with the conveyance, a sample database storing identification information for each of the sample containers and in which the identification information is correlated with one or more open assays for each sample container, and a system controller in communication with the sample database and the input scanner, wherein the method comprises: (A) with the system controller, causing each sample container to be automatically transferred from the input module to the conveyance, wherein the sample container is removed from the input module before scanning the machine-readable identification information associated with the sample container and before identifying the one or more open assays associated with the sample container, (B) as or after each sample container is removed from the input module, detecting the machine-readable identification information of the sample container with the input scanner as the sample container passes the input scanner; and (C) with the system controller, accessing the sample database and identifying one or more open assays for the sample container transported on the conveyance based on the identification information detected by the input scanner.

Embodiment 163. The method of embodiment 162, wherein the conveyance comprises a first loop segment and a second loop segment, wherein the input module is operatively associated with the first loop segment, wherein the at least one analyzer is operatively associated with the second loop segment, and wherein the second loop segment is configured to transport sample containers to the at least one analyzer, and wherein the method further comprises: with the system controller, monitoring the functional assays of all analyzers operatively associated with the second loop segment and/or the number of sample containers being transported on the second loop segment, with the system controller, comparing the one or more open assays of each sample container with the functional assays of all analyzers operatively associated with the second loop segment, and/or comparing the number of sample containers being transported on the second loop segment with a second loop segment capacity limit, with the system controller, causing the sample container to be retained on the first loop segment if none of the functional assays matches any of the open assays for that sample container and/or if the number of sample containers being transported on the second loop segment is at least equal to the second loop segment capacity limit and transporting the sample container around the first loop segment until at least one of the functional assays matches at least one of the open assays for that sample container and/or until the number of sample containers being transported on the second loop segment is less than the second loop segment capacity limit, and with the system controller, causing the sample container to be transferred from the first loop segment to the second loop segment if at least one of the functional assays matches at least one of the open assays for that sample container and/or if the number of sample containers being transported on the second loop segment is less than the second loop segment capacity limit.

Embodiment 164. The method of embodiment 163, wherein the method further comprises: with the system controller, monitoring the functional assays of all analyzers operatively associated with the second loop segment; with the system controller, comparing the one or more open assays of each sample container with the functional assays of all analyzers operatively associated with the second loop segment; with the system controller, monitoring the number of sample containers being transported on the second loop segment, with the system controller, comparing the number of sample containers being transported on the second loop segment with the second loop segment capacity limit, with the system controller, causing the sample container to be retained on the first loop segment if none of the functional assays matches any of the open assays for that sample container and if the number of sample containers being transported on the second loop segment is at least equal to the second loop segment capacity limit; with the system controller, transporting the sample container around the first loop segment until at least one of the functional assays matches at least one of the open assays for that sample container and the number of sample containers being transported on the second loop segment is less than the second loop segment capacity limit, and with the system controller, causing the sample container to be transferred from the first loop segment to the second loop segment if at least one of the functional assays matches at least one of the open assays for that sample container and the number of sample containers being transported on the second loop segment is less than the second loop segment capacity limit.

Embodiment 165. The method of any one of embodiments 162 to 164, wherein a portion of the input module is designated for STAT sample containers, and wherein transferring sample containers from the input module to the conveyance with a container transfer robot comprises transferring all sample containers from the portion of the input module that is designated for STAT sample containers to the conveyance before transferring sample containers from any other portion of the input module.

Embodiment 166. The method of any one of embodiments 162 to 164, wherein the automated system comprises a pick-and-place robot configured to transfer sample containers between the input module and the conveyance, wherein the system controller is in communication with the pick-and-place robot, and wherein step (A) comprises the system controller activating the pick-and-place robot to remove sample containers, one at a time, from the input module and then transfer each sample container to the conveyance.

Embodiment 167. The method of any one of embodiments 162 to 166, wherein the machine-readable identification information comprises a barcode, and wherein the input scanner comprises a barcode scanner.

Embodiment 168. The method of any one of embodiments 162, wherein the conveyance comprises a recirculation loop, and wherein the method further comprises causing a sample container to be repeatedly translated to the at least one analyzer by the recirculation loop until the first to occur of (1) sample has been extracted from the sample container to perform all open assays for that sample container, or (2) the sample container has traversed the recirculation loop a prescribed number of times or for a prescribed period of time.

Embodiment 169. The method of embodiment 168, wherein the automated system further comprises a container storage module, and wherein the method further comprises, after sample has been extracted from a sample container to perform all open assays for that sample container or the sample container has traversed the recirculation loop the prescribed number of times or for a prescribed period of time, causing the conveyance to transfer the sample container to the container storage module.

Embodiment 170. The system of embodiment 169, wherein the container storage module is temperature controlled.

Embodiment 171. The method of any one of embodiments 162 to 170, wherein the method further comprises, after step (C), one or more of: removing a cap from a sample container with a decapper; detecting a liquid level within at least a portion of the sample containers with a liquid level detection module; and with the input module determining at least one of a height and width of the container, a shape of a bottom of the container, and whether the container is capped.

Embodiment 172. The method of any one of embodiments 162 to 171, further comprising: with a sample transfer apparatus, transferring sample from at least one first type of sample container to at least one second type of sample container; and with the system controller, causing each second type sample container to be automatically transferred from the sample transfer module to the conveyance with a container transfer robot.

Embodiment 173. The method of any one of embodiments 162 to 172, wherein the automated system further comprises: two or more analyzers operatively associated with the conveyance, wherein each analyzer is configured to perform one or more functional assays on sample extracted from a sample container, wherein the one or more functional assays performed by each analyzer may be the same or different than the one or more functional assays performed by any other analyzer operatively associated with the conveyance; a distinct analyzer software module associated with each analyzer operatively associated with the conveyance, wherein the identity of each of the one or more functional assays of each analyzer is stored in an analyzer database associated with the analyzer software module; wherein the sample database is independent of the analyzer software modules and analyzer databases; a buffer queue associated with each analyzer and configured to hold multiple sample containers diverted to the buffer queue from the conveyance; and a scanner associated with each analyzer and configured to detect the machine-readable identification information associated with each sample container transported on the conveyance past the scanner; and wherein the system controller is in communication with each analyzer software module and each scanner, and wherein the method further comprises; (D) with each scanner, detecting the machine-readable identification information associated with each sample container transported on the conveyance past the scanner; (E) with the system controller, accessing the sample database and identifying the one or more open assays for the sample container based on the identification information detected by the scanner; (F) with the system controller, communicating the one or more open assays of the sample container to the analyzer software module of the analyzer associated with the scanner; (G) with the analyzer software module of the analyzer associated with the scanner, comparing the one or more open assays of the sample container with the identity of each of the one or more functional assays stored in the analyzer database of the associated analyzer; (H) communicating a divert instruction from the associated analyzer software module to the system controller to divert the sample container from the conveyance into the associated buffer queue if an open assay for that sample container corresponds to a functional assay of the analyzer associated; and (I) upon receiving the divert instruction, the system controller causing the sample container to be diverted from the conveyance into the associated buffer queue.

Embodiment 174. The method of embodiment 173, wherein the conveyance comprises a first track and the system further comprises a container holder associated with each sample container for holding the associated sample container, wherein the first track is configured to convey container holders on the first track, and wherein each buffer queue comprises a second track configured to hold and convey the container holders diverted into the buffer queue, wherein the system further includes a container diverter configured to selectively divert a sample container from the first track to the second track; and wherein step (I) comprises the system controller causing the container diverter to divert the sample container from the conveyance into the associated buffer queue.

Embodiment 175. The method of embodiment 173 or embodiment 174, wherein the machine-readable identification information comprises a barcode, and wherein the scanner associated with each analyzer comprises a barcode scanner.

Embodiment 176. The method of any one of embodiments 173 to 175, wherein the system further comprises a sample transfer device associated with each analyzer and configured to transfer a portion of a sample from a sample container to a process vessel within the associated analyzer, and wherein the method further comprises: (J) with the system controller, causing the sample transfer device to transfer an amount of sample from the sample container diverted into the buffer queue to a process vessel within the associated analyzer; and (K) with the system controller, causing the buffer queue to transport the sample container back to the conveyance.

Embodiment 177. A method for processing a plurality of samples with an automated system, wherein each sample is contained within a sample container, and wherein the automated system comprises a conveyance for transporting sample containers, an input module for holding a plurality of sample containers, an input scanner for detecting machine-readable identification information, at least one analyzer operatively associated with the conveyance, and a system controller, wherein the method comprises: (A) associating machine-readable identification information with each sample container; (B) associating one or more open assays with each sample container; (C) in a sample database accessible to the system controller, storing identification information for each of the sample containers and correlating the identification information of each sample container with the one or more open assays associated with the sample container; (D) configuring each analyzer to perform one or more functional assays on sample extracted from a sample container, wherein the one or more functional assays performed by each analyzer may be the same or different than the one or more functional assays performed by any other analyzer operatively associated with the conveyance, (E) with the system controller, causing each sample container to be automatically transferred from the input module to the conveyance before scanning the machine-readable identification information associated with the sample container and before identifying the one or more open assays associated with the sample container, (F) as or after each sample container is transferred from the input module, detecting the machine-readable identification information of the sample container with the input scanner as the sample container passes the input scanner; and (G) with the system controller, accessing the sample database and identifying one or more open assays for the sample container transported on the conveyance based on the identification information detected by the input scanner.

Embodiment 178. A non-transitory, computer-readable storage medium encoded with computer-executable instructions which, when executed by a computer, cause the computer to execute the method of any one of embodiments 162 to 177.

Embodiment 179. A system for processing a plurality of samples, wherein each sample is contained within a sample container, and each sample container has machine-readable identification information associated therewith, and wherein the system comprises: a sample database storing identification information for each of the sample containers and in which the identification information is correlated with one or more open assays for each sample container; a conveyance configured to transport sample containers, wherein the conveyance comprises a first loop segment and a second loop segment, and wherein sample containers are introduced to the system at the first loop segment; a pre-analytic scanner operatively associated with the first loop segment and configured to detect the machine-readable identification information associated with each sample container as the sample container passes the pre-analytic scanner; at least one analyzer operatively associated with the second loop segment, wherein each analyzer is configured to perform one or more functional assays on sample extracted from a sample container, and wherein the one or more functional assays performed by each analyzer may be the same or different than the one or more functional assays performed by any other analyzer operatively associated with the second loop segment, and wherein the number of analyzers that are operatively associated with the second loop segment and/or the one or more functional assays that each analyzer is configured to perform may vary with time; and at least one system controller in communication with the sample database, the pre-analytic scanner, and the at least one analyzer and programmed to: access the sample database and identify one or more open assays for each sample container transported on the first loop segment based on the identification information detected by the pre-analytic scanner, monitor the functional assays that all analyzers operatively associated with the second loop segment are configured to perform and the number of sample containers being transported on the second loop segment, compare the one or more open assays of each sample container with the functional assays of all analyzers operatively associated with the second loop segment, and/or compare the number of sample containers being transported on the second loop segment with a second loop segment capacity limit, cause the sample container to be retained on the first loop segment if none of the functional assays matches any of the open assays for that sample container and/or if the number of sample containers being transported on the second loop segment is at least equal to the second loop segment capacity limit and cause the sample container to be transported around the first loop segment until at least one of the functional assays matches at least one of the open assays for that sample container and/or the number of sample containers being transported on the second loop segment is less than the second loop segment capacity limit, and cause the sample container to be transferred from the first loop segment to the second loop segment if at least one of the functional assays matches at least one of the open assays for that sample container and/or the number of sample containers being transported on the second loop segment is less than the second loop segment capacity limit.

Embodiment 180. The system of embodiment 179, further comprising a distinct analyzer software module associated with each analyzer, wherein the identity of each of the one or more functional assays of each analyzer is stored in an analyzer database associated with the analyzer software module, and wherein the system controller is in communication with the analyzer software module of each analyzer, and wherein the system controller is programmed to monitor the functional assays of all analyzers by receiving information transmissions from each analyzer software module, wherein each information transmission includes the identity of each of the one or more functional assays of the associated analyzer.

Embodiment 181. The system of embodiment 179 or embodiment 180, wherein the system controller is programmed to monitor the number of sample containers being transported on the second loop segment by monitoring the number of sample containers transferred from the first loop segment to the second loop segment and monitoring the number of sample containers transferred from the second loop segment to the first loop segment.

Embodiment 182. The system of embodiment 186, further comprising a container storage module operatively associated with the first loop segment, and wherein the system controller is configured to monitor the number of times the sample container traverses the first loop segment and/or the period of time the sample container has been traversing the first loop segment and to cause the sample container to be transferred from the first loop segment to the container storage module if the number of times the sample container traverses the first loop segment and/or the period of time the sample container has been traversing the first loop segment exceeds a limit.

Embodiment 183. The system of any one of embodiments 179 to 182, further comprising a diverter operatively associated with the first loop segment and selectively configurable in a first configuration preventing a sample container from being transferred from the first loop segment to the second loop segment or a second configuration causing a sample container to be transferred from the first loop segment to the second loop segment, wherein the system controller is in communication with the diverter, and wherein the system controller is programmed to cause the sample container to be retained on the first loop segment by causing the diverter to be configured in the first configuration, and wherein the system controller is programmed to cause the sample container to be transferred from the first loop segment to the second loop segment by causing the diverter to be configured in the second configuration.

Embodiment 184. The system of any one of embodiments 179 to 183, wherein the pre-analytic scanner is configured to detect the machine-readable identification information associated with each sample container as the sample container is transported past the pre-analytic scanner operatively associated with the first loop segment.

Embodiment 185. The system of any one of embodiments 179 to 184, wherein the machine-readable identification information comprises a barcode, and wherein the pre-analytic scanner comprises a barcode scanner.

Embodiment 186. The system of any one of embodiments 179 to 185, wherein the second loop segment is configured and controlled to repeatedly translate each sample container transferred to the second loop segment to the at least one analyzer until the first to occur of (1) sample has been extracted from the sample container to perform all open assays for that sample container, or (2) the sample container has traversed the second loop segment a prescribed number of times or for a prescribed period of time.

Embodiment 187. The system of embodiment 186, further comprising a container storage module, and wherein, after sample has been extracted from a sample container to perform all open assays for that sample container or the sample container has traversed the second loop segment the prescribed number of times or for the prescribed period of time, the conveyance is configured and controlled to transfer the sample container to the container storage module.

Embodiment 188. The system of embodiment 187, further comprising a pick-and-place robot configured to transfer sample containers between the conveyance and the container storage module.

Embodiment 189. The system of embodiment 187 or embodiment 188, wherein the container storage module is temperature controlled.

Embodiment 190. The system of any one of embodiments 179 to 189, further comprising one or more pre-analytic modules operatively associated with the first loop segment, wherein each pre-analytic module is configured to process a sample container on the first loop segment before transferring the sample container to the second loop segment, and wherein the pre-analytic modules comprise at least one of a container de-capper configured to remove a cap from a sample container and a liquid level detection module configured to detect a liquid level within at least a portion of the sample containers.

Embodiment 191. The system of any one of embodiments 179 to 190, further comprising: a sample transfer module configured to transfer sample from at least one first type of sample container to at least one second type of sample container: and a container transfer robot configured to transfer each second type of sample container from the sample transfer module to the conveyance, and wherein the system controller is programmed to cause each second type sample container to be transferred from the sample transfer module to the first loop segment.

Embodiment 192 The system of embodiment 191, wherein each second type of sample container has machine-readable identification information associated therewith, and the sample database includes identification information for each second type of sample container and the identification information is correlated with one or more open assays associated with each second type of sample container; and wherein the system controller is programmed to: cause the pre-analytic scanner to detect the machine-readable identification information associated with each second type sample container as the second type sample container passes the pre-analytic scanner; access the sample database and identify one or more open assays for each second type sample container transported on the first loop segment based on the identification information detected by the pre-analytic scanner, cause the second type sample container to be retained on the first loop segment if none of the functional assays matches any of the open assays for that second type sample container and/or if the number of sample containers being transported on the second loop segment is at least equal to the second loop segment capacity limit and cause the second type sample container to be transported around the first loop segment until at least one of the functional assays matches at least one of the open assays for that second type sample container and/or the number of sample containers being transported on the second loop segment is less than the second loop segment capacity limit, and cause the second type sample container to be transferred from the first loop segment to the second loop segment if at least one of the functional assays matches at least one of the open assays for that second type sample container and/or the number of sample containers being transported on the second loop segment is less than the second loop segment capacity limit.

Embodiment 193. The system of any one of embodiments 179 to 191, further comprising: an input module configured to hold sample containers; and a pick-and-place robot configured to transfer sample containers between the input module and the first loop segment.

Embodiment 194. The system of embodiment 193, wherein the input module is configured to determine at least one of a height and width of the container, a shape of a bottom of the container, and whether the container is capped.

Embodiment 195. The system of any one of embodiments 179 to 194, wherein the at least one analyzer comprises a molecular testing instrument.

Embodiment 196. A method for processing a plurality of samples with an automated system, wherein each sample is contained within a sample container and each sample container has machine-readable identification information associated therewith, and wherein the automated system comprises: a sample database storing identification information for each of the sample containers and in which the identification information is correlated with one or more open assays for each sample container; a conveyance configured to transport sample containers, wherein the conveyance comprises a first loop segment and a second loop segment, and wherein sample containers are introduced to the system at the first loop segment; an pre-analytic scanner operatively associated with the first loop segment and configured to detect the machine-readable identification information associated with each sample container as the sample container passes the pre-analytic scanner; at least one analyzer operatively associated with the second loop segment, wherein each analyzer is configured to perform one or more functional assays on sample extracted from a sample container, wherein the one or more functional assays performed by each analyzer may be the same or different than the one or more functional assays performed by any other analyzer operatively associated with the second loop segment, and wherein the number of analyzers that are operatively associated with the second loop segment and/or the one or more functional assays that each analyzer is configured to perform may vary with time; and at least one system controller in communication with the sample database, the pre-analytic scanner, and the at least one analyzer, and wherein the method comprises: (A) with the pre-analytic scanner, detecting the machine-readable identification information associated with each sample container transported past the pre-analytic scanner; (B) with the system controller, accessing the sample database and identifying one or more open assays for each sample container transported on the first loop segment based on the identification information detected by the pre-analytic scanner; (C) with the system controller, monitoring the functional assays that all analyzers operatively associated with the second loop segment are configured to perform and/or monitoring the number of sample containers being transported on the second loop segment; (D) with the system controller, comparing the one or more open assays of each sample container with the functional assays of all analyzers operatively associated with the second loop segment, and/or comparing the number of sample containers being transported on the second loop segment with a second loop segment capacity limit; (E) with the system controller, causing the sample container to be retained on the first loop segment if none of the functional assays matches any of the open assays for that sample container and/or if the number of sample containers being transported on the second loop segment is at least equal to the second loop segment capacity limit, and causing the sample container to be transported around the first loop segment until at least one of the functional assays matches at least one of the open assays for that sample container and/or the number of sample containers being transported on the second loop segment is less than the second loop segment capacity limit, and (F) with the system controller, causing the sample container to be transferred from the first loop segment to the second loop segment if at least one of the functional assays matches at least one of the open assays for that sample container and/or if the number of sample containers being transported on the second loop segment is less than the second loop segment capacity limit.

Embodiment 197. The method of embodiment 196, wherein the system further comprises a container storage module operatively associated with the first loop segment, and wherein the method further comprises the system controller monitoring the number of times the sample container traverses the first loop segment and/or the period of time the sample container has been traversing the first loop segment and causing the sample container to be transferred from the first loop segment to the container storage module if the number of times the sample container traverses the first loop segment and/or the period of time the sample container has been traversing the first loop segment reaches a limit.

Embodiment 198. The method of embodiment 196 or 197, wherein the automated system further comprises a distinct analyzer software module associated with each analyzer, wherein the identity of each of the one or more functional assays of each analyzer is stored in an analyzer database associated with the analyzer software module, and wherein the system controller is in communication with the analyzer software module of each analyzer, and wherein monitoring the functional assays that all analyzers operatively associated with the second loop segment are configured to perform comprises the system controller receiving information transmissions from each analyzer software module, wherein each information transmission includes the identity of each of the one or more functional assays of the associated analyzer.

Embodiment 199. The method of embodiment 196, wherein monitoring the number of sample containers being transported on the second loop segment comprises the system controller monitoring the number of sample containers transferred from the first loop segment to the second loop segment and monitoring the number of sample containers transferred from the second loop segment to the first loop segment.

Embodiment 200. The method of any one of embodiments 196 to 199, wherein the automated system further comprises a diverter operatively associated with the first loop segment, and step (E) comprises, with the system controller, causing the diverter to be configured in a first configuration preventing a sample container from being transferred from the first loop segment to the second loop segment, and step (F) comprises, with the system controller, causing the diverter to be configured in a second configuration causing a sample container to be transferred from the first loop segment to the second loop segment.

Embodiment 201. The method of any one of embodiments 196 to 200, wherein step (A) comprises detecting the machine-readable identification information associated with each sample container as the sample container is transported past the pre-analytic scanner on the first loop segment.

Embodiment 202. The method of any one of embodiments 196 to 201, wherein the machine-readable identification information comprises a barcode, and wherein the pre-analytic scanner comprises a barcode scanner.

Embodiment 203. The method of any one of embodiments 196 to 202, wherein the second loop segment is configured and controlled to repeatedly translate each sample container to the at least one analyzer, wherein the automated system further includes a recirculation scanner operatively associated with the second loop segment and configured to detect the machine-readable identification information associated with each sample container transported on the second loop segment past the recirculation scanner, wherein the system controller is in communication with the recirculation scanner, and wherein the method further comprises: after step (F), extracting sample from a sample container transferred to the second loop segment to perform one of the one or more open assays of the sample container matching one of the one or more functional assays; revising the sample database to update the open assays correlated with the sample identification information for the sample container by changing the status of the open assay for which sample was extracted; with the recirculation scanner, detecting the machine-readable identification information associated with each sample container transported on the second loop segment past the recirculation scanner; with the system controller, accessing the sample database and identifying the one or more open assays for the sample container for which sample has not been extracted based on the identification information detected by the recirculation scanner; and with the system controller, causing the sample container to be conveyed off the second loop segment if there are no more open assays for the sample container.

Embodiment 204. The method of embodiment 203, further comprising: with the system controller, counting the number of times each sample container has traversed the second loop segment and/or tracking the period of time each sample container has been on the second loop segment; and with the system controller, causing the sample container to be conveyed off the second loop segment if the sample container has traversed the second loop segment a prescribed number of times or for a prescribed period of time.

Embodiment 205. The method of any one of embodiments 196 to 202, wherein the second loop segment is configured and controlled to repeatedly translate each sample container to the at least one analyzer, and wherein the method further comprises: with the system controller, counting the number of times each sample container has traversed the second loop segment and/or tracking the period of time each sample container has been on the second loop segment; and with the system controller, causing the sample container to be conveyed off the second loop segment if the sample container has traversed the second loop segment a prescribed number of times or for a prescribed period of time.

Embodiment 206. The method of embodiment 204, wherein the automated system further comprises a container storage module, and wherein the method further comprises: with the system controller, causing the sample container to be transferred to the container storage module if there are no more open assays for the sample container or the sample container has traversed the second loop segment the prescribed number of times or for a prescribed period of time.

Embodiment 207. The method of embodiment 206, wherein the automated system further comprises a pick-and-place robot configured to transfer sample containers between the conveyance and the container storage module, and the system controller is in communication with the pick-and-place robot, and wherein causing the sample container to be transferred to the storage module comprises the system controller activating the pick-and-place robot to transfer the sample container from the conveyance to the container storage module.

Embodiment 208. The method of embodiment 206 or embodiment 207, wherein the container storage module is temperature controlled.

Embodiment 209. The method of any one of embodiments 196 to 208, wherein the automated system further comprises an input module configured to hold sample containers, and wherein the method further comprises the system controller causing sample containers to be transferred from the input module to the first loop segment.

Embodiment 210. The method of any one of embodiments 196 to 209, wherein the method further comprises one or more of: removing a cap from a sample container with a decapper; and detecting a liquid level within at least a portion of the sample containers with a liquid level detection module.

Embodiment 211. The method of any one of embodiments 196 to 210, wherein the method further comprises: with a sample transfer module, transferring sample from at least one first type of sample container to at least one second type of sample container; and with the system controller, causing each second type sample container to be transferred from the sample transfer module to the first loop segment with a container transfer robot.

Embodiment 212. The method of embodiment 211, wherein each second type of sample container has machine-readable identification information associated therewith, and the sample database includes identification information for each second type of sample container and the identification information is correlated with one or more open assays associated with each second type of sample container, and wherein the method comprises: with the pre-analytic scanner, detecting the machine-readable identification information associated with each second type sample container transported past the pre-analytic scanner; with the system controller, accessing the sample database and identifying one or more open assays for each second type sample container transported on the first loop segment based on the identification information detected by the pre-analytic scanner; with the system controller, comparing the one or more open assays of each second type sample container with the functional assays of all analyzers operatively associated with the second loop segment and/or comparing the number of sample containers being transported on the second loop segment with a second loop segment capacity limit, with the system controller, causing the second type sample container to be retained on the first loop segment if none of the functional assays matches any of the open assays for that second type sample container and/or if the number of sample containers being transported on the second loop segment is at least equal to the second loop segment capacity limit, and causing the second type sample container to be transported around the first loop segment until at least one of the functional assays matches at least one of the open assays for that second type sample container and/or the number of sample containers being transported on the second loop segment is less than the second loop segment capacity limit, and with the system controller, causing the second type sample container to be transferred from the first loop segment to the second loop segment if at least one of the functional assays matches at least one of the open assays for that sample container and/or if the number of sample containers being transported on the second loop segment is less than the second loop segment capacity limit.

Embodiment 213. The method of embodiment 209, further comprising determining, with the input module, at least one of a height and width of the container, a shape of a bottom of the container, and whether the container is capped.

Embodiment 214. A method for processing a plurality of samples with an automated system, wherein each sample is contained within a sample container, and wherein the automated system comprises: a conveyance configured to transport sample containers, wherein the conveyance comprises a first loop segment and a second loop segment, and wherein sample containers are introduced to the system at the first loop segment; an pre-analytic scanner for detecting machine-readable identification information; at least one analyzer operatively associated with the second loop segment; and at least one system controller, and wherein the method comprises: (A) associating machine-readable identification information with each sample container; (B) associating one or more open assays with each sample container; (C) in a sample database accessible to the system controller, storing identification information for each of the sample containers and correlating the identification information of each sample container with the one or more open assays associated with the sample container; (D) configuring each analyzer to perform one or more functional assays on sample extracted from a sample container, wherein the one or more functional assays performed by each analyzer may be the same or different than the one or more functional assays performed by any other analyzer operatively associated with the conveyance, and wherein the number of analyzers that are operatively associated with the second loop segment and/or the one or more functional assays that each analyzer is configured to perform may vary with time; (E) with the pre-analytic scanner, detecting the machine-readable identification information associated with each sample container transported past the pre-analytic scanner; (F) with the system controller, accessing the sample database and identifying one or more open assays for each sample container transported on the first loop segment based on the identification information detected by the pre-analytic scanner; (G) with the system controller, monitoring the functional assays that all analyzers operatively associated with the second loop segment are configured to perform and/or monitoring the number of sample containers being transported on the second loop segment; (H) with the system controller, comparing the one or more open assays of each sample container with the functional assays of all analyzers operatively associated with the second loop segment, and/or comparing the number of sample containers being transported on the second loop segment with a second loop segment capacity limit; (I) with the system controller, causing the sample container to be retained on the first loop segment if none of the functional assays matches any of the open assays for that sample container and/or if the number of sample containers being transported on the second loop segment is at least equal to the second loop segment capacity limit, and causing the sample container to be transported around the first loop segment until at least one of the functional assays matches at least one of the open assays for that sample container and/or the number of sample containers being transported on the second loop segment is less than the second loop segment capacity limit, and (J) with the system controller, causing the sample container to be transferred from the first loop segment to the second loop segment if at least one of the functional assays matches at least one of the open assays for that sample container and/or if the number of sample containers being transported on the second loop segment is less than the second loop segment capacity limit.

Embodiment 215. A non-transitory, computer-readable storage medium encoded with computer-executable instructions which, when executed by a computer, cause the computer to execute the method of any one of embodiments 196 to 214.

Embodiment 216. A system for processing a plurality of samples, wherein each sample is contained within a sample container, and each sample container has machine-readable identification information associated therewith, and wherein the system comprises: a conveyance configured to transport sample containers, wherein the conveyance comprises a first loop segment and a second loop segment; a container storage module operatively associated with the first loop segment and configured to receive sample containers from the first loop segment and hold a plurality of sample containers; a scanner operatively associated with the first loop segment and configured to detect the machine-readable identification information associated with each sample container transported on the first loop segment; a sample database storing identification information for each of the sample containers and in which the identification information is correlated with one or more open assays for each sample container; at least one analyzer operatively associated with the second loop segment, wherein each analyzer is configured to perform one or more functional assays on sample extracted from a sample container, and wherein the number of analyzers that are operatively associated with the second loop segment and/or the one or more functional assays that each analyzer is configured to perform may vary with time; and at least one system controller in communication with the sample database and the scanner, and wherein the system controller is programmed to execute the following functions: (A) access the sample database and identify one or more open assays for each sample container transported on the first loop segment based on the identification information detected by the scanner; (B) monitor the functional assays that all analyzers operatively associated with the second loop segment are configured to perform and/or monitor the number of sample containers being transported on the second loop segment; (C) compare the one or more open assays of each sample container transported on the first loop segment with the functional assays of all analyzers operatively associated with the second loop segment and/or compare the number of sample containers being transported on the second loop segment with a second loop segment capacity limit: (D) cause a sample container to be retained on the first loop segment if none of the functional assays matches any of the open assays for that sample container and/or if the number of sample containers being transported on the second loop segment is at least equal to the second loop segment capacity limit; (E) cause the sample container to be transported around the first loop segment and repeat functions A, B, C, and D each time the sample container traverses the first loop segment until at least one of the functional assays matches at least one of the open assays for that sample container and/or until the number of sample containers being transported on the second loop segment is less than the second loop segment capacity limit; (F) monitor the number of times the sample container traverses the first loop segment and/or the amount of time the sample container has been traversing the first loop segment; and (G) cause the sample container to be transferred from the first loop segment to the container storage module if the number of times the sample container traverses the first loop segment and/or the amount of time the sample container has been traversing the first loop segment exceeds a limit.

Embodiment 217. The system of embodiment 216, wherein the system controller is programmed to: record the one or more open assays of each sample container transferred to the container storage module; compare the one or more open assays of each sample container stored in the container storage module with the functional assays of all analyzers operatively associated with the second loop segment and/or compare the number of sample containers being transported on the second loop segment with a second loop segment capacity limit; cause a sample container stored in the container storage module to be transferred from the container storage module to the first loop segment if at least one of the functional assays matches any of the open assays for that sample container and/or if the number of sample containers being transported on the second loop segment is less than the second loop segment capacity limit; and after the sample container is transferred from the container storage module to the first loop segment, cause the sample container to be transferred from the first loop segment to the second loop segment.

Embodiment 218. The system of embodiment 217, further comprising a container transfer robot configured to transfer sample containers between the first loop segment and the container storage module, wherein the system controller is in communication with the container transfer robot, and wherein the system controller is programmed to cause a sample container to be transferred from the first loop segment to the container storage module with the container transfer robot and to cause a sample container to be transferred from the container storage module to the first loop segment with the container transfer robot.

Embodiment 219. The system of any one of embodiments 216 to 218, further comprising a distinct analyzer software module associated with each analyzer, wherein the identity of each of the one or more functional assays of each analyzer is stored in an analyzer database associated with the analyzer software module, and wherein the system controller is in communication with the analyzer software module of each analyzer, and wherein the system controller is programmed to monitor the functional assays of all analyzers by receiving information transmissions from each analyzer software module, wherein each information transmission includes the identity of each of the one or more functional assays of the associated analyzer.

Embodiment 220. The system of any one of embodiments 216 to 219, wherein the system controller is programmed to monitor the number of sample containers being transported on the second loop segment by monitoring the number of sample containers transferred from the first loop segment to the second loop segment and monitoring the number of sample containers transferred from the second loop segment to the first loop segment.

Embodiment 221. The system of embodiment 217, further comprising an input diverter operatively associated with the first loop segment and selectively configurable in a first configuration preventing a sample container from being transferred from the first loop segment to the second loop segment or a second configuration causing a sample container to be transferred from the first loop segment to the second loop segment, wherein the system controller is in communication with the input diverter, and wherein the system controller is programmed to cause the sample container to be retained on the first loop segment by causing the input diverter to be configured in the first configuration, and wherein the system controller is programmed to cause the sample container to be transferred from the first loop segment to the second loop segment by causing the input diverter to be configured in the second configuration.

Embodiment 222. The system of any one of embodiments 216 to 220, wherein the container storage module is temperature controlled.

Embodiment 223. A method for processing a plurality of samples with an automated system, wherein each sample is contained within a sample container, and each sample container has machine-readable identification information asso-ciated therewith, and wherein the automated system comprises: a conveyance configured to transport sample containers, wherein the conveyance comprises a first loop segment and a second loop segment; a container storage module operatively associated with the first loop segment and configured to receive sample containers from the first loop segment and hold a plurality of sample containers; a scanner operatively associated with the first loop segment and configured to detect the machine-readable identification information associated with each sample container transported on the first loop segment; a sample database storing identification information for each of the sample containers and in which the identification information is correlated with one or more open assays for each sample container; at least one analyzer operatively associated with the second loop segment, wherein each analyzer is configured to perform one or more functional assays on sample extracted from a sample container, and wherein the number of analyzers that are operatively associated with the second loop segment and/or the one or more functional assays that each analyzer is configured to perform may vary with time; and at least one system controller in communication with the sample database and the scanner, and wherein the method comprises: (A) with the scanner, detecting the machine-readable identification information associated with each sample container transported on the first loop segment; (B) with the system controller, accessing the sample database and identifying one or more open assays for each sample container transported on the first loop segment based on the identification information detected by the scanner; (C) with the system controller, monitoring the functional assays of all analyzers operatively associated with the second loop segment and/or monitoring the number of sample containers being transported on the second loop segment; (D) with the system controller, comparing the one or more open assays of each sample container transported on the first loop segment with the functional assays of all analyzers operatively associated with the second loop segment and/or comparing the number of sample containers being transported on the second loop segment with a second loop segment capacity limit; (E) with the system controller, causing a sample container to be retained on the first loop segment if none of the functional assays matches any of the open assays for that sample container and/or if the number of sample containers being transported on the second loop segment is at least equal to the second loop segment capacity limit; (F) with the system controller, causing the sample container to be transported around the first loop segment and repeating steps (A), (B), (C), (D), and (E) each time the sample container traverses the first loop segment until at least one of the functional assays matches at least one of the open assays for that sample container and/or until the number of sample containers being transported on the second loop segment is less than the second loop segment capacity limit; (G) with the system controller, monitoring the number of times the sample container traverses the first loop segment and/or the amount of time the sample container has been traversing the first loop segment; and (H) with the system controller, causing the sample container to be transferred from the first loop segment to the container storage module if the number of times the sample container traverses the first loop segment and/or the amount of time the sample container has been traversing the first loop segment reaches a limit.

Embodiment 224. The method of embodiment 223, further comprising: (I) with the system controller, recording the one or more open assays of each sample container transferred to the container storage module in step (H); (J) with the system controller, comparing the one or more open assays of each sample container stored in the container storage module with the functional assays of all analyzers operatively associated with the second loop segment and/or comparing the number of sample containers being transported on the second loop segment with a second loop segment capacity limit; (K) with the system controller, causing a sample container stored in the container storage module to be transferred from the container storage module to the first loop segment if at least one of the functional assays matches any of the open assays for that sample container and/or if the number of sample containers being transported on the second loop segment is less than the second loop segment capacity limit; and (L) after the sample container is transferred from the container storage module to the first loop segment, with the system controller, causing the sample container to be transferred from the first loop segment to the second loop segment.

Embodiment 225. The method of embodiment 224, wherein the automated system further comprises a container transfer robot configured to transfer sample containers between the first loop segment and the container storage module, and wherein the system controller is in communication with the container transfer robot, and wherein step (H) comprises, causing the container transfer robot to transfer the sample container from the first loop segment to the container storage module, and step (K) comprises causing the container transfer robot to transfer the sample container from the container storage module to the first loop segment.

Embodiment 226. The method of any one of embodiments 223 to 225, wherein the automated system further comprises a distinct analyzer software module associated with each analyzer, wherein the identity of each of the one or more functional assays of each analyzer is stored in an analyzer database associated with the analyzer software module, and wherein the system controller is in communication with the analyzer software module of each analyzer, and wherein monitoring the functional assays of all analyzers operatively associated with the second loop segment comprises the system controller receiving information transmissions from each analyzer software module, wherein each information transmission includes the identity of each of the one or more functional assays of the associated analyzer.

Embodiment 227. The method of any one of embodiments 223 to 226, wherein monitoring the number of sample containers being transported on the second loop segment comprises the system controller monitoring the number of sample containers transferred from the first loop segment to the second loop segment and monitoring the number of sample containers transferred from the second loop segment to the first loop segment.

Embodiment 228. The method of embodiment 224, wherein the automated system further comprises an input diverter operatively associated with the first loop segment and selectively configurable in a first configuration preventing a sample container from being transferred from the first loop segment to the second loop segment or a second configuration causing a sample container to be transferred from the first loop segment to the second loop segment, wherein the system controller is in communication with the input diverter, and wherein step (E) comprises, with the system controller, causing the input diverter to be configured in the first configuration, and step (L) comprises, with the system controller, causing the input diverter to be configured in the second configuration.

Embodiment 229. The method of any one of embodiments 223 to 228, wherein the container storage module is temperature controlled.

Embodiment 230. A non-transitory, computer-readable storage medium encoded with computer-executable instructions which, when executed by a computer, causes the computer to execute the method of any one of embodiments 223 to 229.

Embodiment 231. A system for processing a plurality of samples, wherein each sample is contained within a sample container, and each sample container has machine-readable identification information associated therewith, and wherein the system comprises: a conveyance configured to transport sample containers, wherein the conveyance comprises a first loop segment and a second loop segment; a container storage module operatively associated with the first loop segment and configured to receive sample containers from the first loop segment and hold a plurality of sample containers; a recirculation scanner operatively associated with the second loop segment and configured to detect the machine-readable identification information associated with each sample container as the sample container is transported past the recirculation scanner on the second loop segment; a sample database storing identification information for each of the sample containers and in which the identification information is correlated with one or more open assays for each sample container; at least one analyzer operatively associated with the second loop segment, wherein each analyzer is configured to perform one or more functional assays on sample extracted from a sample container, and wherein the number of analyzers that are operatively associated with the second loop segment and/or the one or more functional assays that each analyzer is configured to perform may vary with time; and at least one system controller in communication with the sample database and the scanner, and wherein the system controller is programmed to execute the following functions: (A) access the sample database and identify any open assay(s) for each sample container transported on the second loop segment based on the identification information detected by the recirculation scanner, (B) cause the sample container to be retained on the second loop segment if the sample container has at least one open assay, (C) cause the sample container to be transported around the second loop segment and repeat functions A and B each time the sample container traverses the second loop segment, (D) monitor the number of times the sample container traverses the second loop segment and/or the amount of time the sample container has been traversing the second loop segment, (E) cause the sample container to be transferred from the second loop segment to the first loop segment if the number of times the sample container traverses the second loop segment and/or the amount of time the sample container has been traversing the second loop segment exceeds a limit, and (F) cause the sample container to be transferred from the first loop segment to the container storage module.

Embodiment 232. The system of embodiment 231, wherein the system controller is programmed to: record the one or more open assays of each sample container transferred to the container storage module; monitor the functional assays of all analyzers operatively associated with the second loop segment; compare the one or more open assays of each sample container stored in the container storage module with the functional assays of all analyzers operatively associated with the second loop segment; cause a sample container stored in the container storage module to be transferred from the container storage module to the first loop segment if at least one of the functional assays matches any of the open assays for that sample container; and after the sample container is transferred from the container storage module to the first loop segment, cause the sample container to be transferred from the first loop segment to the second loop segment.

Embodiment 233. The system of embodiment 231, wherein the system controller is programmed to: monitor the number of sample containers being transported on the second loop segment; compare the number of sample containers being transported on the second loop segment with a second loop segment capacity limit; and cause a sample container stored in the container storage module to be transferred from the container storage module to the first loop segment if at least one of the functional assays matches any of the open assays for that sample container and if the number of sample containers being transported on the second loop segment is less than the second loop segment capacity limit.

Embodiment 234. The system of embodiment 231, wherein the system controller is further programmed to: monitor the functional assays of all analyzers operatively associated with the second loop segment; compare the open assays of each sample container that has been scanned with the recirculation scanner with the functional assays of all analyzers operatively associated with the second loop segment; and cause the sample container to be retained on the second loop segment if the sample container has at least one open assay matching at least one functional assay until the number of times the sample container traverses the second loop segment and/or the amount of time the sample container has been traversing the second loop segment exceeds a limit.

Embodiment 235. The system of embodiment 234, wherein the system controller is programmed to: record the one or more open assays of each sample container transferred to the container storage module; compare the one or more open assays of each sample container stored in the container storage module with the functional assays of all analyzers operatively associated with the second loop segment; cause a sample container stored in the container storage module to be transferred from the container storage module to the first loop segment if at least one of the functional assays matches any of the open assays for that sample container; and after the sample container is transferred from the container storage module to the first loop segment, cause the sample container to be transferred from the first loop segment to the second loop segment.

Embodiment 236. The system of embodiment 235, wherein the system controller is programmed to: monitor the number of sample containers being transported on the second loop segment; compare the number of sample containers being transported on the second loop segment with a second loop segment capacity limit; and cause a sample container stored in the container storage module to be transferred from the container storage module to the first loop segment if at least one of the functional assays matches any of the open assays for that sample container and if the number of sample containers being transported on the second loop segment is less than the second loop segment capacity limit.

Embodiment 237. The system of embodiment 232 or 233, further comprising a container transfer robot configured to transfer sample containers between the first loop segment and the storage module, wherein the system controller is in communication with the container transfer robot, and wherein the system controller is programmed to cause a sample container to be transferred from the first loop segment to the container storage module with the container transfer robot and to cause a sample container to be transferred from the container storage module to the first loop segment with the container transfer robot.

Embodiment 238. The system of embodiment 232 or 234, further comprising a distinct analyzer software module associated with each analyzer, wherein the identity of each of the one or more functional assays of each analyzer is stored in an analyzer database that is associated with the analyzer software module, and wherein the system controller is in communication with the analyzer software module of each analyzer, and wherein the system controller is programmed to monitor the functional assays of all analyzers by receiving information transmissions from each analyzer software module, wherein each information transmission includes the identity of each of the one or more functional assays of the associated analyzer.

Embodiment 239. The system of embodiment 233 or 236, wherein the system controller is programmed to monitor the number of sample containers being transported on the second loop segment by monitoring the number of sample containers transferred from the first loop segment to the second loop segment and monitoring the number of sample containers transferred from the second loop segment to the first loop segment.

Embodiment 240. The system of any one of embodiments 231 to 239, further comprising an outlet diverter operatively associated with the second loop segment and selectively configurable in a first configuration preventing a sample container from being transferred from the second loop segment to the first loop segment or a second configuration causing a sample container to be transferred from the second loop segment to the first loop segment, wherein the system controller is in communication with the outlet diverter, and wherein the system controller is programmed to cause the sample container to be retained on the second loop segment by causing the outlet diverter to be configured in the first configuration, and wherein the system controller is programmed to cause the sample container to be transferred from the second loop segment to the first loop segment by causing the outlet diverter to be configured in the second configuration.

Embodiment 241. The system of any one of embodiments 231 to 240, wherein the container storage module is temperature controlled.

Embodiment 242. A method for processing a plurality of samples with an automated system, wherein each sample is contained within a sample container, and each sample container has machine-readable identification information associated therewith, and wherein the automated system comprises: a conveyance configured to transport sample containers, wherein the conveyance comprises a first loop segment and a second loop segment; a container storage module operatively associated with the first loop segment and configured to receive sample containers from the first loop segment and hold a plurality of sample containers; a recirculation scanner operatively associated with the second loop segment and configured to detect the machine-readable identification information associated with each sample container as the sample container is transported past the recirculation scanner on the second loop segment; a sample database storing identification information for each of the sample containers and in which the identification information is correlated with one or more open assays for each sample container; at least one analyzer operatively associated with the second loop segment, wherein each analyzer is configured to perform one or more functional assays on sample extracted from a sample container, and wherein the number of analyzers that are operatively associated with the second loop segment and/or the one or more functional assays that each analyzer is configured to perform may vary with time, and at least one system controller in communication with the sample database and the scanner, and wherein the method comprises: (A) with the recirculation scanner, detecting the machine-readable identification information associated with each sample container transported past the recirculation scanner; (B) with the system controller, accessing the sample database and identify any open assay(s) for each sample container transported on the second loop segment based on the identification information detected by the recirculation scanner; (C) with the system controller, causing the sample container to be retained on the second loop segment if the sample container has at least one open assay; (D) with the system controller, causing the sample container to be transported around the second loop segment and repeating steps (A), (B), and (C) each time the sample container traverses the second loop segment; (E) with the system controller, monitoring the number of times the sample container traverses the second loop segment and/or the amount of time the sample container has been traversing the second loop segment; (F) with the system controller, causing the sample container to be transferred from the second loop segment to the first loop segment if the number of times the sample container traverses the second loop segment and/or the amount of time the sample container has been traversing the second loop segment exceeds a limit; and (G) with the system controller, causing the sample container to be transferred from the first loop segment to the container storage module.

Embodiment 243. The method of embodiment 242, further comprising: (H) with the system controller, recording the one or more open assays of each sample container transferred to the container storage module; (I) with the system controller, monitoring the functional assays of all analyzers operatively associated with the second loop segment; (J) with the system controller, comparing the one or more open assays of each sample container stored in the container storage module with the functional assays of all analyzers operatively associated with the second loop segment; (K) with the system controller, causing a sample container stored in the container storage module to be transferred from the container storage module to the first loop segment if at least one of the functional assays matches any of the open assays for that sample container; and (L) after the sample container is transferred from the container storage module to the first loop segment, with the system controller, causing the sample container to be transferred from the first loop segment to the second loop segment.

Embodiment 244. The method of embodiment 243, further comprising: with the system controller, monitoring the number of sample containers being transported on the second loop segment; with the system controller, comparing the number of sample containers being transported on the second loop segment with a second loop segment capacity limit; and with the system controller, causing a sample container stored in the container storage module to be transferred from the container storage module to the first loop segment if at least one of the functional assays matches any of the open assays for that sample container and if the number of sample containers being transported on the second loop segment is less than the second loop segment capacity limit.

Embodiment 245. The method of embodiment 242, further comprising: with the system controller, monitoring the functional assays of all analyzers operatively associated with the second loop segment; with the system controller, comparing the open assays of each sample container that has been scanned with the recirculation scanner with the functional assays of all analyzers operatively associated with the second loop segment; and with the system controller, causing the sample container to be retained on the second loop segment if the sample container has at least one open assay matching at least one functional assay until the number of times the sample container traverses the second loop segment and/or the amount of time the sample container has been traversing the second loop segment exceeds a limit.

Embodiment 246. The method of embodiment 245, further comprising: with the system controller, recording the one or more open assays of each sample container transferred to the container storage module; with the system controller, comparing the one or more open assays of each sample container stored in the container storage module with the functional assays of all analyzers operatively associated with the second loop segment; with the system controller, causing a sample container stored in the container storage module to be transferred from the container storage module to the first loop segment if at least one of the functional assays matches any of the open assays for that sample container; and after the sample container is transferred from the container storage module to the first loop segment, with the system controller, causing the sample container to be transferred from the first loop segment to the second loop segment.

Embodiment 247. The method of embodiment 246, further comprising: with the system controller, monitoring the number of sample containers being transported on the second loop segment; with the system controller, comparing the number of sample containers being transported on the second loop segment with a second loop segment capacity limit; and with the system controller, causing a sample container stored in the container storage module to be transferred from the container storage module to the first loop segment if at least one of the functional assays matches any of the open assays for that sample container and if the number of sample containers being transported on the second loop segment is less than the second loop segment capacity limit.

Embodiment 248. The method of embodiment 243 or 244, wherein the automated system further comprises a container transfer robot configured to transfer sample containers between the first loop segment and the storage module, and wherein the system controller is in communication with the container transfer robot, and wherein step (G) comprises causing the sample container robot to transfer the sample container from the first loop segment to the container storage module and step (K) comprises causing the sample container robot to transfer the sample container from the container storage module to the first loop segment.

Embodiment 249. The method of embodiment 243 or 245, wherein the automated system further comprises a distinct analyzer software module associated with each analyzer, wherein the identity of each of the one or more functional assays of each analyzer is stored in an analyzer database that is associated with the analyzer software module, and wherein the system controller is in communication with the analyzer software module of each analyzer, and wherein monitoring the functional assays of all analyzers operatively associated with the second loop segment comprises the system controller receiving information transmissions from each analyzer software module, wherein each information transmission includes the identity of each of the one or more functional assays of the associated analyzer.

Embodiment 250. The method of embodiment 244 or 247, wherein monitoring the number of sample containers being transported on the second loop segment comprises the system controller monitoring the number of sample containers transferred from the first loop segment to the second loop segment and monitoring the number of sample containers transferred from the second loop segment to the first loop segment.

Embodiment 251. The method of any one of embodiments 242 to 250, wherein the automated system further comprises an outlet diverter operatively associated with the second loop segment and selectively configurable in a first configuration preventing a sample container from being transferred from the second loop segment to the first loop segment or a second configuration causing a sample container to be transferred from the second loop segment to the first loop segment, wherein the system controller is in communication with the outlet diverter, and wherein step (C) comprises, with the system controller, causing the outlet diverter to be configured in the first configuration, and wherein step (F) comprises, with the system controller, causing the outlet diverter to be configured in the second configuration.

Embodiment 252. The method of any one of embodiments 242 to 248, wherein the container storage module is temperature controlled.

Embodiment 253. A non-transitory, computer-readable storage medium encoded with computer-executable instructions which, when executed by a computer, cause the computer execute the method of any one of embodiments 242 to 252.

Embodiment 254. A system for processing a plurality of samples, wherein each sample is contained within a sample container, and each sample container has machine-readable identification information associated therewith, and wherein the system comprises: a conveyance configured to transport sample containers; two or more analyzers operatively associated with the conveyance, wherein each analyzer is configured to perform one or more functional assays on sample extracted from a sample container; a distinct analyzer software module associated with each analyzer operatively associated with the conveyance, wherein the identity of each of the one or more functional assays of each analyzer is stored in an analyzer database associated with the analyzer software module; a sample database storing identification information for each of the sample containers and in which the identification information is correlated with one or more open assays for each sample container, and wherein the sample database is independent of the analyzer software modules and analyzer databases; a buffer queue associated with each analyzer and configured to hold multiple sample containers diverted to the buffer queue from the conveyance; a scanner associated with each analyzer and configured to detect the machine-readable identification information associated with each sample container transported on the conveyance past the scanner; and at least one system controller programmed to access the sample database and identify the one or more open assays for each sample container transported on the conveyance based on the identification information detected by each scanner, and communicate the one or more open assays of the sample container to the analyzer software module of the analyzer associated with the scanner, wherein the associated analyzer software module is programmed to compare the one or more open assays of the sample container with the identity of each of the one or more functional assays stored in the analyzer database of the associated analyzer and to communicate an instruction to the system controller whether or not to divert the sample container from the conveyance into the associated buffer queue based at least in part on a result of the comparison.

Embodiment 255. The system of embodiment 254, wherein the analyzer software module is programmed to: communicate an instruction to the system controller to divert the sample container from the conveyance into the associated buffer queue if at least one open assay for that sample container corresponds to at least one functional assay of the analyzer associated with the buffer queue, or communicate an instruction to the system controller to not divert the sample container from the conveyance into the associated buffer queue if no open assay for that sample container corresponds to any functional assay of the analyzer associated with the buffer queue.

Embodiment 256. The system of embodiment 254, wherein an identity of each of one or more queued open assays is stored in the associated analyzer database, wherein each queued open assay comprises the identity of at least one open assay of each sample container previously diverted into the associated buffer queue that corresponds to at least one functional assay of the associated analyzer and from which sample has not yet been extracted for performing one of the corresponding functional assays, and wherein the associated analyzer software module is programmed to compare the one or more open assays of the sample container scanned with the associated scanner with the identity of each of the one or more queued open assays stored in the analyzer database of the associated analyzer and to communicate an instruction to the system controller whether or not to divert the sample container from the conveyance into the associated buffer queue based at least in part on a result of the comparison.

Embodiment 257. The system of embodiment 256, wherein the associated analyzer software module is programmed to communicate an instruction to the system controller whether or not to divert the sample container from the conveyance into the associated buffer queue based on whether one of the one or more open assays corresponds to a selected one of the one or more queued open assays.

Embodiment 258. The system of any one of embodiments 254 to 257, wherein the analyzer software module associated with each analyzer comprises a computer module housed within the associated analyzer.

Embodiment 259. The system of any one of embodiments 254 to 258, wherein the conveyance comprises a first track, and the system further comprises a container holder associated with each sample container for holding the associated sample container, and wherein the first track is configured to convey container holders on the first track.

Embodiment 260. The system of embodiment 259, wherein each buffer queue comprises a second track configured to hold and convey the container holders diverted into the buffer queue, and the system further includes a container diverter configured to selectively divert a sample container from the first track to the second track.

Embodiment 261. The system of any one of embodiments 254 to 260, wherein the machine-readable identification information associated with each sample container comprises a barcode and the scanner comprises a barcode scanner.

Embodiment 262. The system of any one of embodiments 254 to 261, further comprising an automated pipettor associated with each analyzer and configured to transfer a portion of a sample from a sample container to a process vessel within the associated analyzer, and wherein the system controller is further programmed to: cause the automated pipettor to transfer an amount of sample from the sample container diverted into the buffer queue to a process vessel within the associated analyzer; and after sample is transferred from the sample container to the process vessel, cause the buffer queue to transport the sample container back to the conveyance.

Embodiment 263. The system of any one of embodiments 254 to 262, wherein the conveyance comprises a recirculation loop configured and controlled to repeatedly translate each sample container to the two or more analyzers until the first to occur of (1) sample has been extracted from the sample container to perform all open assays for that sample container, or (2) the sample container has traversed the recirculation loop a prescribed number of times or for a prescribed period of time.

Embodiment 264. The system of embodiment 263, further comprising a container storage module, and wherein, after sample has been extracted from a sample container to perform all open assays for that sample container or the sample container has traversed the recirculation loop the prescribed number of times or for the prescribed period of time, the conveyance is configured and controlled to transfer the sample container to the container storage module.

Embodiment 265. The system of embodiment 264, further comprising a pick-and-place robot configured to transfer sample containers between the conveyance and the container storage module.

Embodiment 266. The system of embodiment 264 or embodiment 265, wherein the container storage module is temperature controlled.

Embodiment 267. The system of any one of embodiments 254 to 266, further comprising one or more pre-analytic modules, wherein each pre-analytic module is configured to process a sample container before making the sample container available to the two or more analyzers, and wherein the conveyance is configured to translate the sample containers to the pre-analytic modules before transporting the sample containers between the two or more analyzers, and wherein the pre-analytic modules comprise one or more of a container de-capper configured to remove a cap from a sample container and a liquid level detection module configured to detect a liquid level within at least a portion of the sample containers.

Embodiment 268. The system of any one of embodiments 254 to 267, further comprising a sample transfer module configured to transfer sample from at least one first type of sample container to at least one second type of sample container, and wherein the system controller is programmed to cause each second type sample container to which sample has been transferred to be transferred from the sample transfer module to the conveyance.

Embodiment 269. The system of any one of embodiments 254 to 268, further comprising: an input module configured to hold sample containers; and pick-and-place robot configured to transfer sample containers between the input module and the conveyance.

Embodiment 270. The system of embodiment 269, wherein the input module is configured to determine at least one of a height and width of the container, a shape of a bottom of the container, and whether the container is capped.

Embodiment 271. The system of embodiment 263, wherein the conveyance comprises a pre-analytic loop at which sample containers are provided to the system, and wherein the automated system further comprises a pre-analytic scanner configured to detect the machine-readable identification information associated with each sample container transported on the pre-analytic loop, wherein the system controller is programmed to identify one or more open assays of each sample container based on the identification information detected by the pre-analytic scanner and to transfer a sample container from the pre-analytic loop to the recirculation loop if one or more functional assays of the two or more analyzers correspond to at least one of the one or more open assays of the sample container and/or if a number of sample containers being transported on the recirculation loop is less than a recirculation loop capacity limit.

Embodiment 272. The system of embodiment 271, further comprising a container storage module coupled to the pre-analytic loop and configured to receive sample containers from the pre-analytic loop into the container storage module, and wherein the system controller is programmed to cause a sample container on the pre-analytic loop to be transferred from the pre-analytic loop to the container storage module if none of the two or more analyzers has a functional assay matching any of the one or more open assays of the sample container.

Embodiment 273. The system of embodiment 271, wherein the system controller is programmed to cause a sample container to be conveyed around the pre-analytic loop if none of the two or more analyzers has a functional assay matching any of the one or more open assays of the sample container.

Embodiment 274. The system of embodiment 273, wherein the system controller is programmed to: identify one or more open assays of each sample container based on the identification information detected by the pre-analytic scanner each time the sample container is conveyed around the pre-analytic loop, retain the sample container on the pre-analytic loop if none of the two or more analyzers has a functional assay that corresponds to any of the one or more open assays of the sample container and/or if a number of sample containers being transported on the recirculation loop is at least equal to the recirculation loop capacity limit, monitor the number of times the sample container traverses the pre-analytic loop and/or the period of time the sample container has been traversing the pre-analytic loop; and cause the sample container to be transferred from the pre-analytic loop to the container storage module if the number of times the sample container traverses the pre-analytic loop and/or if the period of time the sample container has been traversing the pre-analytic loop exceeds a limit.

Embodiment 275. The system of embodiment 274, wherein the system controller is programmed to retain the sample container on the pre-analytic loop if none of the two or more analyzers has a functional assay that corresponds to any of the one or more open assays of the sample container and/or if a number of sample containers being transported on the recirculation loop is at least equal to the recirculation loop capacity limit.

Embodiment 276. The system of any one of embodiments 254 to 274, wherein at least one of the two or more analyzers comprises a molecular testing instrument.

Embodiment 277. The system of embodiment 276, wherein the molecular testing instrument comprises a module for performing a nucleic acid-based amplification reaction.

Embodiment 278. The system of any one of embodiments 254 to 277, further comprising: a shuttle module associated with each analyzer, wherein the shuttle module is configured to translate a sample container between the associated buffer queue and the associated analyzer; and pick-and-place robot associated with each analyzer, wherein the pick-and-place robot is configured to transfer a sample container from the associated buffer queue to a sample container handoff position on the shuttle module, and the shuttle module is configured to translate the sample container between the sample container handoff position and a pipetting location within the associated analyzer.

Embodiment 279. A method for processing a plurality of samples with an automated system, wherein each sample is contained within a sample container and each sample container has machine-readable identification information associated therewith, and wherein the automated system comprises a conveyance configured to transport sample containers; two or more analyzers operatively associated with the conveyance, wherein each analyzer is configured to perform one or more functional assays on sample extracted from a sample container; a distinct analyzer software module associated with each analyzer operatively associated with the conveyance, wherein the identity of each of the one or more functional assays of each analyzer is stored in an analyzer database that is associated with the analyzer software module; a sample database storing identification information for each of the sample containers and in which the identification information is correlated with one or more open assays for each sample container, and wherein the sample database is independent of the analyzer software modules and analyzer databases; a buffer queue associated with each analyzer and configured to hold multiple sample containers diverted to the buffer queue from the conveyance; a scanner associated with each analyzer and configured to detect the machine-readable identification information associated with each sample container transported on the conveyance past the scanner; and at least one system controller in communication with each analyzer software module, the sample database, and each scanner, and wherein the method comprises: (A) with each scanner, detecting the machine-readable identification information associated with each sample container transported on the conveyance past the scanner; (B) with the system controller, accessing the sample database and identifying the one or more open assays for the sample container based on the identification information detected by the scanner; (C) with the system controller, communicating the one or more open assays of the sample container to the analyzer software module of the analyzer associated with the scanner; (D) with the analyzer software module of the analyzer associated with the scanner, comparing the one or more open assays of the sample container with the identity of each of the one or more functional assays stored in the analyzer database of the associated analyzer; and (E) communicating an instruction from the associated analyzer software module to the system controller whether or not to divert the sample container from the conveyance into the associated buffer queue based at least in part on a result of the comparison of step (D).

Embodiment 280. The method of embodiment 279, further comprising: communicating an instruction from the associated analyzer software module to the system controller to divert the sample container from the conveyance into the associated buffer queue only if one of the one or more open assays for that sample container corresponds to one of the one or more functional assays of the analyzer associated with the buffer queue; or communicating an instruction from the associated analyzer software module to the system controller to not divert the sample container from the conveyance into the associated buffer queue if no open assay for that sample container corresponds to any functional assay of the analyzer associated with the buffer queue.

Embodiment 281. The method of embodiment 279, further comprising: (F) storing an identity of each of one or more queued open assays in the associated analyzer database, wherein each queued open assay comprises the identity of at least one open assay of each sample container previously diverted into the associated buffer queue that corresponds to at least one functional assay of the associated analyzer and from which sample has not yet been extracted for performing one of the corresponding functional assays; (G) with the associated analyzer software module, comparing the one or more open assays communicated in step (C) with the identity of each of the one or more queued open assays stored in step (F); and (H) communicating an instruction from the associated analyzer software module to the system controller whether or not to divert the sample container from the conveyance into the associated buffer queue based at least in part on a result of the comparison of step (G).

Embodiment 282. The method of embodiment 279, further comprising: (F) storing an identity of each of one or more queued open assays in the associated analyzer database, wherein each queued open assay comprises the identity of at least one open assay of each sample container previously diverted into the associated buffer queue that corresponds to at least one functional assay of the associated analyzer and from which sample has not yet been extracted for performing one of the corresponding functional assays: (G) with the associated analyzer software module, comparing the one or more open assays communicated in step (C) with the identity of a selected one of the one or more queued open assays stored in step (F); and (H) communicating an instruction from the associated analyzer software module to the system controller whether or not to divert the sample container from the conveyance into the associated buffer queue based at least in part on a result of the comparison of step (G).

Embodiment 283. The method of any one of embodiments 279 to 282, further comprising, upon receiving an instruction from the associated analyzer software module to divert the sample container from the conveyance into the associated buffer queue, the system controller causing the sample container to be diverted from the conveyance into the associated buffer queue.

Embodiment 284. The method of any one of embodiments 279 to 283, wherein the analyzer software module associated with each analyzer comprises a computer module housed within the associated analyzer.

Embodiment 285. The method of any one of embodiments 279 to 284, wherein the conveyance comprises a first track and the system further comprises a container holder associated with each sample container for holding the associated sample container, wherein the first track is configured to convey container holders on the first track.

Embodiment 286. The method of embodiment 283, wherein the conveyance comprises a first track configured to convey sample containers thereon, and each buffer queue comprises a second track configured to convey the sample containers diverted into the buffer queue, and wherein the automated system further includes a container diverter configured to selectively divert a sample container from the first track to the second track; wherein causing the sample container to be diverted from the conveyance into the associated buffer queue comprises the system controller causing the container diverter to divert the sample container from the first track onto the second track.

Embodiment 287. The method of any one of embodiments 279 to 286, wherein the machine-readable identification information associated with each sample container comprises a barcode and the scanner comprises a barcode scanner.

Embodiment 288. The method of any one of embodiments 279 to 287, wherein the automated system further comprises an automated pipettor associated with each analyzer and configured to transfer a portion of a sample from a sample container to a process vessel within the associated analyzer, and wherein the method further comprises: the system controller causing the automated pipettor to transfer an amount of sample from the sample container diverted into the buffer queue to a process vessel within the associated analyzer; and the system controller causing the buffer queue to transport the sample container back to the conveyance.

Embodiment 289. The method of any one of embodiments 279 to 288, wherein the conveyance comprises a recirculation loop configured and controlled to repeatedly translate each sample container past the two or more analyzers, and wherein the method further comprises: the system controller counting the number of times each sample container has traversed the recirculation loop or tracking the period of time each sample container has been on the recirculation loop; and the system controller causing the sample container to be conveyed off the recirculation loop if the sample container has traversed the recirculation loop a prescribed number of times or for a prescribed period of time.

Embodiment 290. The method of embodiment 283, wherein the conveyance comprises a recirculation loop configured and controlled to repeatedly translate each sample container past the two or more analyzers, wherein the automated system further includes an automated pipettor associated with each analyzer and configured to extract a portion of a sample from a sample container and a recirculation scanner operatively associated with the recirculation loop and configured to detect the machine-readable identification information associated with each sample container transported on the recirculation loop past the recirculation scanner, and wherein the system controller is in communication with the recirculation scanner, and wherein the method further comprises: after causing the sample container to be diverted from the conveyance into the associated buffer queue, the system controller causing the automated pipettor to extract sample from the sample container to perform one of the one or more open assays of the sample container with the associated analyzer; revising the sample database to update the open assays correlated with the sample identification information for the diverted sample container by changing the status of the open assay performed by the associated analyzer; the recirculation scanner detecting the machine-readable identification information associated with each sample container transported on the recirculation loop past the recirculation scanner; the system controller accessing the sample database and identifying the one or more open assays for the sample container for which sample has not been extracted based on the identification information detected by the recirculation scanner; and the system controller causing the sample container to be conveyed off the recirculation loop if there are no remaining open assays for the sample container.

Embodiment 291. The method of embodiment 290, further comprising: the system controller counting the number of times each sample container has traversed the recirculation loop or tracking the period of time each sample container has been on the recirculation loop; and the system controller causing the sample container to be conveyed off the recirculation loop if the sample container has traversed the recirculation loop a prescribed number of times or for a prescribed period of time.

Embodiment 292. The method of embodiment 291, wherein the automated system further comprises a container storage module configured to hold a plurality of sample containers, and wherein the method further comprises: the system controller causing the sample container to be transferred to the container storage module if there are no more open assays for the sample container or the sample container has traversed the recirculation loop the prescribed number of times or for a prescribed period of time.

Embodiment 293. The method of embodiment 292, wherein the automated system further comprises a pick-and-place robot configured to transfer sample containers between the conveyance and the container storage module, and the system controller is in communication with the pick-and-place robot; and wherein causing the sample container to be transferred to the storage module comprises the system controller activating the pick-and-place robot to transfer the sample container from the conveyance to the storage module.

Embodiment 294. The method of embodiment 292 or embodiment 293, wherein the container storage module is temperature controlled.

Embodiment 295. The method of any one of embodiments 279 to 293, wherein the method further comprises removing a cap from a sample container with a decapper or detecting a liquid level within at least a portion of the sample containers with a liquid level detection module.

Embodiment 296. The method of any one of embodiments 279 to 295, wherein the method further comprises: with a sample transfer module, transferring sample from at least one first type of sample container to at least one second type of sample container; and the system controller causing each second type sample container to be transferred from the sample transfer module to the conveyance.

Embodiment 297. The method of embodiment 290, wherein the conveyance further comprises a pre-analytic loop at which sample containers are provided to the system, and wherein the automated system further comprises a pre-analytic scanner operatively associated with the pre-analytic loop and configured to detect the machine-readable identification information associated with each sample container transported on the pre-analytic loop past the pre-analytic scanner, and wherein the system controller is in communication with the pre-analytic scanner, and wherein the method further comprises: the pre-analytic scanner detecting the machine-readable identification information associated with each sample container transported on the pre-analytic loop past the pre-analytic scanner; the system controller accessing the sample database and identifying the one or more open assays for the sample container based on the identification information detected by the pre-analytic scanner; the system controller comparing the one or more open assays for the sample container with the functional assays stored in all analyzer databases and/or comparing the number of sample containers being transported on the recirculation loop with a recirculation loop capacity limit; and with the system controller, causing a sample container to be transferred from the pre-analytic loop to the recirculation loop if one or more functional assays of the two or more analyzers correspond to at least one of the one or more open assays of the sample container and/or if the number of sample containers being transported on the second loop segment is less than the second loop segment capacity limit.

Embodiment 298. The method of embodiment 297, wherein the automated system further comprises a container storage module configured to receive sample containers, and wherein the method further comprises: the system controller causing a sample container on the pre-analytic loop to be transferred from the pre-analytic loop to the container storage module if none of the two or more analyzers has a functional assay matching any of the one or more open assays of the sample container.

Embodiment 299. The method of embodiment 298, further comprising, the system controller causing a sample container to be conveyed around the pre-analytic loop if none of the two or more analyzers has a functional assay matching any of the one or more open assays of the sample container.

Embodiment 300. The method of embodiment 299, further comprising: the system controller identifying one or more open assays of each sample container based on the identification information detected by the pre-analytic scanner each time the sample container is conveyed around the pre-analytic loop, the system controller causing the sample container to be retained on the pre-analytic loop if none of the two or more analyzers has a functional assay that corresponds to any of the one or more open assays of the sample container and/or if a number of sample containers being transported on the recirculation loop is at least equal to the recirculation loop capacity limit, the system controller monitoring the number of times the sample container traverses the pre-analytic loop and/or the period of time the sample container has been traversing the pre-analytic loop; and the system controller causing the sample container to be transferred from the pre-analytic loop to the container storage module if the number of times the sample container traverses the pre-analytic loop and/or if the period of time the sample container has been traversing the pre-analytic loop reaches a limit.

Embodiment 301. The method of embodiment 300, further comprising the system controller causing the sample container to be retained on the pre-analytic loop if none of the two or more analyzers has a functional assay that corresponds to any of the one or more open assays of the sample container and/or if a number of sample containers being transported on the recirculation loop is at least equal to the recirculation loop capacity limit.

Embodiment 302. A non-transitory, computer-readable storage medium encoded with computer-executable instructions which, when executed by a computer, cause the computer execute the method of any one of embodiments 279 to 301.

Embodiment 303. A method for processing a plurality of samples with an automated system, wherein each sample is contained within a sample container, and each sample container has machine-readable identification information associated therewith, and wherein the automated system comprises: a sample database storing identification information for each of the sample containers and in which the identification information is correlated with one or more open assays for each sample container; a conveyance configured to transport sample containers; a container storage module operatively associated with the conveyance and configured to receive sample containers from the conveyance and hold a plurality of sample containers; a scanner operatively associated with the conveyance and configured to detect the machine-readable identification information associated with each sample container transported on the conveyance; at least one analyzer operatively associated with the conveyance and configured to perform the one or more functional assays on sample material extracted from a sample container, wherein the one or more functional assays include at least one of the one or more open assays; and at least one system controller in communication with the sample database, the conveyance, and the scanner, wherein the method comprises: (A) with the system controller, causing each sample container to be automatically transported by the conveyance to the at least one analyzer; (B) at the analyzer, automatically extracting an amount of sample from the sample container so that one of the one or more open assays can be performed on the extracted sample by the analyzer; (C) revising the sample database to update the open assays correlated with the sample identification information for the sample container by changing the status of the open assay for which sample was extracted in step (B); (D) with the scanner, detecting the machine-readable identification information associated with the sample container; (E) with the system controller, accessing the sample database and identifying any open assay(s) for the sample container for which sample has not been extracted based on the identification information detected by the scanner; (F) if one or more open assays are identified for the sample container in step (E), repeating steps (A) through (E) for each of the one or more open assays; (G) if no open assays are identified for the sample container in step (E), with the system controller, causing the sample container to be transferred from the conveyance to the container storage module; (H) with the system controller, receiving additional test instructions for the sample container after the sample container has been transferred to the container storage module, wherein the additional test instructions are based on results of at least one of the one or more open assays for which sample was extracted in step (B); (I) with the system controller, causing the sample container for which additional test instructions have been received to be transferred from the container storage module to the conveyance; and (J) with the system controller, causing the sample container to be transferred by the conveyance to the at least one analyzer to extract sample for the additional test instructions.

Embodiment 304. The method of embodiment 303, wherein the additional test instructions include one or more of: repeating an open assay because of an error encountered in previously performing the open assay; reflex testing; and performing an assay that is different from the one or more open assays to detect a different analyte.

Embodiment 305. The method of embodiment 303 or 304, wherein the conveyance comprises a first loop segment and a second loop segment, wherein the container storage module is operatively associated with the first loop segment, and the at least one analyzer is operatively associated with the second loop segment.

Embodiment 306. The method of embodiment 305, further comprising: with the system controller, monitoring the functional assays of all analyzers and comparing the additional test instructions with the functional assays of all analyzers; and performing step (I), only if the additional test instructions correspond to at least one functional assay.

Embodiment 307. The method of embodiment 306, further comprising: with the system controller, monitoring the number of sample containers being transported on the second loop segment and comparing the number of sample containers being transported on the second loop segment with a second loop segment capacity limit; and performing step (I), only if the additional test instructions correspond to at least one functional assay and the number of sample containers being transported on the second loop segment is less than the second loop segment capacity limit.

Embodiment 308. The method of any one of embodiments 303 to 307, wherein one or more of the sample containers includes a penetrable cap, and step (B) comprises extracting sample material through the penetrable cap without removing the penetrable cap from the sample container.

Embodiment 309. The method of embodiment 305, further comprising. (K) with the system controller, monitoring the number of sample containers being transported on the second loop segment; (L) with the system controller, comparing the number of sample containers being transported on the second loop segment with a second loop segment capacity limit; (M) with the system controller, causing the sample container to be retained on the first loop segment if the number of sample containers being transported on the second loop segment is at least equal to the second loop segment capacity limit, and causing the sample container to be transported around the first loop segment until the number of sample containers being transported on the second loop segment is less than the second loop segment capacity limit, and (N) with the system controller, causing the sample container to be transferred from the first loop segment to the second loop segment if the number of sample containers being transported on the second loop segment is less than the second loop segment capacity limit.

Embodiment 310. The method of embodiment 309, wherein monitoring the number of sample containers being transported on the second loop segment comprises the system controller monitoring the number of sample containers transferred from the first loop segment to the second loop segment and monitoring the number of sample containers transferred from the second loop segment to the first loop segment.

Embodiment 311. The method of embodiment 309 or 310, wherein the automated system further comprises a diverter operatively associated with the first loop segment, and step (M) comprises, with the system controller, causing the diverter to be configured in a first configuration preventing a sample container from being transferred from the first loop segment to the second loop segment, and step (N) comprises, with the system controller, causing the diverter to be configured in a second configuration causing a sample container to be transferred from the first loop segment to the second loop segment.

Embodiment 312. The method of any one of embodiments 303 to 311, wherein step (D) comprises detecting the machine-readable identification information associated with each sample container as the sample container is transported past the scanner on the conveyance.

Embodiment 313. The method of any one of embodiments 303 to 312, wherein the machine-readable identification information comprises a barcode, and the scanner comprises a barcode scanner.

Embodiment 314. The method of embodiment 305, wherein the automated system further comprises an input module configured to hold sample containers, and wherein the method further comprises, with the system controller, causing sample containers to be transferred from the input module to the first loop segment.

Embodiment 315. The method of embodiment 314, further comprising determining, with the input module, at least one of a height and width of the container, a shape of a bottom of the container, and whether the container is capped.

Embodiment 316. The method of any one of embodiments 303 to 315, wherein the method further comprises one or more of: removing a cap from a sample container with a decapper; and detecting a liquid level within at least a portion of the sample containers with a liquid level detection module.

Embodiment 317. The method of any one of embodiments 303 to 316, wherein the method further comprises: with a sample transfer module, transferring sample material from at least one first type of sample container to at least one second type of sample container; and with the at least one system controller, causing each second type sample container to be transferred from the sample transfer module to the conveyance.

Embodiment 318. The method of any one of embodiments 303 to 317, wherein the automated system further comprises at least one container transfer robot configured to transfer sample containers between the conveyance and the container storage module, and wherein the system controller is in communication with the container transfer robot, and wherein step (G) comprises causing the container transfer robot to transfer the sample container from the conveyance to the container storage module, step (I) comprises causing the container transfer robot to transfer the sample container from the container storage module to the conveyance, and step (G) and step (I) are performed with the same container transfer robot or different container transfer robots.

Embodiment 319. The method of any one of embodiments 303 to 318, wherein the container storage module is temperature controlled.

Embodiment 320. A non-transitory, computer-readable storage medium encoded with computer-executable instructions which, when executed by a computer, cause the computer the execute method of any one of embodiments 303 to 319.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the scope of the following appended claims.

The invention claimed is:

1. A system for processing a plurality of distinct samples, wherein each sample is contained within a discrete sample container, the system comprising:

A) two or more analyzers, wherein each analyzer is configured to perform one or more functional assays on sample extracted from a sample container, wherein the one or more functional assays performed by each analyzer may be the same or different than the one or more functional assays performed by each of the other analyzers, wherein each analyzer is configured to perform each of the one or more functional assays within a receptacle apparatus comprising a process number of two or more operatively associated process vessels, and wherein each analyzer is configured to perform the same one of the one or more functional assays on a different sample contained within each process vessel of the receptacle apparatus;

B) a sample transfer device associated with each analyzer and configured to transfer a portion of a sample from a sample container to one of the process vessels of a receptacle apparatus;

C) a conveyance configured to transport sample containers between the two or more analyzers;

D) a buffer queue associated with each analyzer and configured to hold multiple sample containers diverted to the buffer queue from the conveyance;

E) a scanner associated with each analyzer and configured to detect machine-readable identification information associated with each sample container transported on the conveyance; and F) one or more controllers configured to implement an assay matching operation that diverts sample containers from the conveyance to one of the analyzers in a manner that maximizes system throughput and efficiency while enabling the system to selectively alter the assay matching operation to (1) prioritize processing a STAT sample container or (2) when the assay matching operation cannot be completed within a prescribed period time, wherein the one or more controllers are programmed to:

1) identify one or more open assays for each sample container based on the identification information detected by the scanner;

2) determine if the sample container is a STAT sample container based on the identification information detected by the scanner;

3) cause a sample container to be diverted from the conveyance into one of the buffer queues if an open assay for that sample container corresponds to a functional assay of the analyzer associated with the buffer queue;

4) monitor a buffered container count for each buffer queue, wherein the buffered container count comprises, for each buffer queue, the number of sample containers held in that buffer queue with the same open assay;

5) monitor a buffered container holding time for each buffer queue, wherein the buffered container holding time comprises an elapsed time since a first sample container of each buffered container count was diverted into the buffer queue; and 6) with the sample transfer device of the associated analyzer, perform one of the following tasks:

a) transfer a portion of sample from each of a process number of sample containers within the associated buffer queue having the same open assay into a different one of the process vessels of a receptacle apparatus if the buffered container count in the associated buffer queue for that assay is at least equal to the process number, b) transfer a portion of sample from each of a number of sample containers within the associated buffer queue having the same open assay into a different one of the process vessels of a receptacle apparatus if the buffered container holding time for the associated buffer queue for that open assay reaches a maximum holding time and the buffered container count in the associated buffer queue for that assay is less than the process number, or c) transfer a portion of sample from a STAT sample container diverted into the associated buffer queue into one of the process vessels of a receptacle apparatus.

2. The system of claim 1, wherein, if a STAT sample container is diverted into the associated buffer queue, the one or more controllers are configured to (i) transfer a portion of sample from each of any blocking sample containers that were diverted to the associated buffer queue before the STAT sample container into a different one of the process vessels of one or more receptacle apparatuses, (ii) move any blocking sample containers from which sample was transferred in (i) out of the buffer queue, and (iii) then transfer a portion of sample from the STAT sample container diverted into the associated buffer queue into one of the process vessels of a receptacle apparatus.

3. The system of claim 2, wherein, if the open assay of the blocking sample containers is the same as the open assay of the STAT sample container, sample is transferred from each of the blocking sample containers and the STAT sample container to different process vessels of the same receptacle apparatus in (i) and (iii), and wherein, if the open assay of the blocking sample containers is different from the open assay of the STAT sample container, sample is transferred from the blocking sample containers and the STAT sample container to different receptacle apparatuses in (i) and (iii).

4. The system of claim 1, wherein, if a STAT sample container is diverted into the associated buffer queue, the one or more controllers are configured to (i) move any blocking sample containers diverted to the associated buffer queue before the STAT sample container out of the buffer queue, without transferring any sample from the blocking sample containers into the process vessels of a receptacle apparatus, and then (ii) transfer a portion of sample from the STAT sample container diverted into the associated buffer queue into one of the process vessels of a receptacle apparatus.

5. The system of claim 1, wherein the conveyance comprises a first track and the system further comprises a container holder associated with each sample container for holding the associated sample container, wherein the first track is configured to convey the container holders on the first track, and wherein each buffer queue comprises a second track configured to hold and convey the container holders, and the system further includes a diverter configured to selectively divert a container holder and sample container held thereby from the first track to the second track.

6. The system of claim 1, wherein the conveyance comprises a recirculation loop configured and controlled by the one or more controllers to translate each sample container between the two or more analyzers until the first to occur of (1) sample has been extracted from the sample container to perform all open assays for that sample container, or (2) the sample container has traversed the recirculation loop a prescribed number of times or for a prescribed period of time.

7. The system of claim 6, wherein, after sample has been extracted from a sample container to perform all open assays for that sample container or the sample container has traversed the recirculation loop the prescribed number of times or for a prescribed period of time, the conveyance is configured to transfer the sample container to a container storage module.

8. The system of claim 1, further comprising one or more pre-analytic modules, wherein each pre-analytic module is configured to process a sample container before making the sample container available to the two or more analyzers, and wherein the conveyance is configured to translate the sample containers to the pre-analytic modules before transporting the sample containers between the two or more analyzers.

9. The system of claim 8, wherein the pre-analytic modules comprise one or more of a container de-capper configured to remove a cap from a sample container, a liquid level detection module configured to detect a liquid level within at least a portion of the sample containers, and a sample transfer module configured to transfer sample from a first type of sample container to a second type of sample container that will be made available to the two or more analyzers.

10. The system of claim 1, further comprising an input module coupled to the conveyance and configured to hold sample containers.

11. The system of claim 1, wherein the conveyance comprises:

a recirculation segment configured to translate each sample container to the two or more analyzers, wherein the recirculation segment comprises a continuous recirculation loop configured to translate each sample container between the two or more analyzers until the first to occur of (1) sample has been extracted from the sample container to perform all open assays of that sample container, or (2) the sample container has traversed the recirculation loop a prescribed number of times or for a prescribed period of time;

a pre-analytic segment; and an input module coupled to the pre-analytic segment and configured to hold sample containers.

12. The system of claim 11, further comprising a pick-and-place robot configured to transfer sample containers between the input module and the pre-analytic segment, wherein the pre-analytic segment is configured to translate sample containers from the input module to the recirculation segment, wherein the pick-and-place robot is controlled by the one or more controllers so that whether a sample container is transferred from the input module to the pre-analytic segment, or the order in which sample containers are transferred from the input module to the pre-analytic segment, is independent of any identification information associated with each sample container and/or any open assay(s) of the sample container.

13. The system of claim 12, wherein the input module contains an area dedicated to STAT sample containers, and wherein the STAT sample containers are transferred from the input module to the pre-analytic segment before any other sample containers are transferred from the input module to the pre-analytic segment.

14. The system of claim 11, further comprising a pre-analytic scanner configured to detect the machine-readable identification information associated with each sample container transported on the pre-analytic segment, wherein the one or more controllers are configured to identify one or more open assays of each sample container based on the identification information detected by the pre-analytic scanner and to transfer a sample container from the pre-analytic segment to the recirculation segment if one or more functional assays of the two or more analyzers correspond to at least one of the one or more open assays of the sample container.

15. The system of claim 14, further comprising a container storage module coupled to the pre-analytic segment and configured to receive sample containers from the pre-analytic segment into the container storage module, and wherein the the one or more controllers are configured to transfer a sample container on the pre-analytic segment to the container storage module if none of the two or more analyzers has a functional assay matching any of the one or more open assays of the sample container.

16. The system of claim 14, wherein the pre-analytic segment comprises a continuous pre-analytic loop, and wherein the one or more controllers are configured to convey a sample container around the pre-analytic loop if none of the two or more analyzers has a functional assay matching any of the one or more open assays of the sample container.

17. The system of claim 1, further comprising:

a shuttle module associated with each analyzer, wherein the shuttle module is configured to translate a sample container between the associated buffer queue and the associated analyzer; and a pick-and-place robot associated with each analyzer, wherein the pick-and-place robot is configured to transfer a sample container from the associated buffer queue to a sample container handoff position on the shuttle module, and the shuttle module is configured to translate the sample container between the sample container handoff position and a pipetting location within the associated analyzer.

18. The system of claim 1, wherein each of the two or more analyzers is configured to move a receptacle apparatus into position to receive sample from the sample transfer device associated with the analyzer at the beginning of periodically recurring process cycles, and the one or more controllers are configured to perform:

task F)6)a) at the beginning of a first process cycle after a process number of sample containers with the same open assay have been diverted to the associated buffer queue;

task F)6)b) at the beginning of a first process cycle after the buffered container holding time for the associated buffer queue for that assay reaches the maximum holding time; or task F)6)c) at the beginning of a first process cycle after a STAT sample is diverted.

19. The system of claim 1, wherein each of the two or more analyzers is configured to move a receptacle apparatus into position to receive sample from the sample transfer device associated with the analyzer at the beginning of periodically recurring process cycles, and wherein the maximum holding time comprises at least time remaining in a process cycle that is in progress when the first sample container of each buffered container count is diverted into the buffer queue.

20. The system of claim 19, wherein the maximum holding time comprises time remaining in a process cycle that is in progress when the first sample container of each buffered container count is diverted into the buffer queue plus the duration of one additional process cycle.

* * * * *